United States Patent [19]

Ordish

[11] Patent Number: 5,195,031
[45] Date of Patent: Mar. 16, 1993

[54] TRADING SYSTEM FOR PROVIDING REAL TIME CONTEXT SENSITIVE TRADING MESSAGES BASED ON CONVERSATION ANALYSIS

[75] Inventor: Christopher J. Ordish, Surrey, England

[73] Assignee: Reuters Limited, England

[21] Appl. No.: 261,984

[22] Filed: Oct. 24, 1988

[51] Int. Cl.[5] .......................................... G06F 15/21
[52] U.S. Cl. .................................. 364/403; 364/408; 364/DIG. 2; 395/800
[58] Field of Search ............... 364/513, 408, 200, 900, 364/401

[56] References Cited

U.S. PATENT DOCUMENTS

| | | | |
|---|---|---|---|
| 4,412,287 | 10/1983 | Braddock | 364/408 |
| 4,525,779 | 6/1985 | Davids et al. | 364/200 |
| 4,531,184 | 7/1985 | Wigan et al. | 364/200 |
| 4,670,848 | 6/1987 | Schramm | 364/513 |
| 4,688,195 | 8/1987 | Thompson et al. | 364/300 |
| 4,752,889 | 6/1988 | Rappaport et al. | 364/513 |

FOREIGN PATENT DOCUMENTS 2165421 4/1986 United Kingdom .

OTHER PUBLICATIONS

Elaine Rich, "Natural Language Interface", Computer 1984, Sep. pp. 39-47.

*Primary Examiner*—Gail O. Hayes
*Attorney, Agent, or Firm*—Bryan, Cave, McPheeters & McRoberts

[57] ABSTRACT

A video communication trading system network includes a plurality of subscriber keystations (410,412) at least one of which employs a conversation analyzing keystation terminal controller (400,400a) for parsing a trading conversation between designated keystations (98a,602) for automatically providing trading conversation context sensitive trading data messages, such as trading conversation textual message prompts based on real time trading conversation analysis. The trading system network includes a message switching interface (300) for routing trading conversational messages throughout the network. The context sensitive prompt messages are analysis driven to provide prompt messages based on the analyzed dialogue as the conversation progresses. These prompts can be manually overridden by the user. The system also provides for dynamic creation of a ticket (416,404), which is also displayed, as the conversation progresses based on the real time analysis of the conversation. This analysis also provides error messages, such as highlighting inconsistencies on the screen (410) in the content of the conversation, such as an incorrect value date. In using the system, both parties to the conversation do not have to have the same type of terminal controller (96,400,400a) and only the party desiring the benefits of conversation analysis need, by way of example, employ the terminal controller (400,400a) of the present invention.

39 Claims, 22 Drawing Sheets

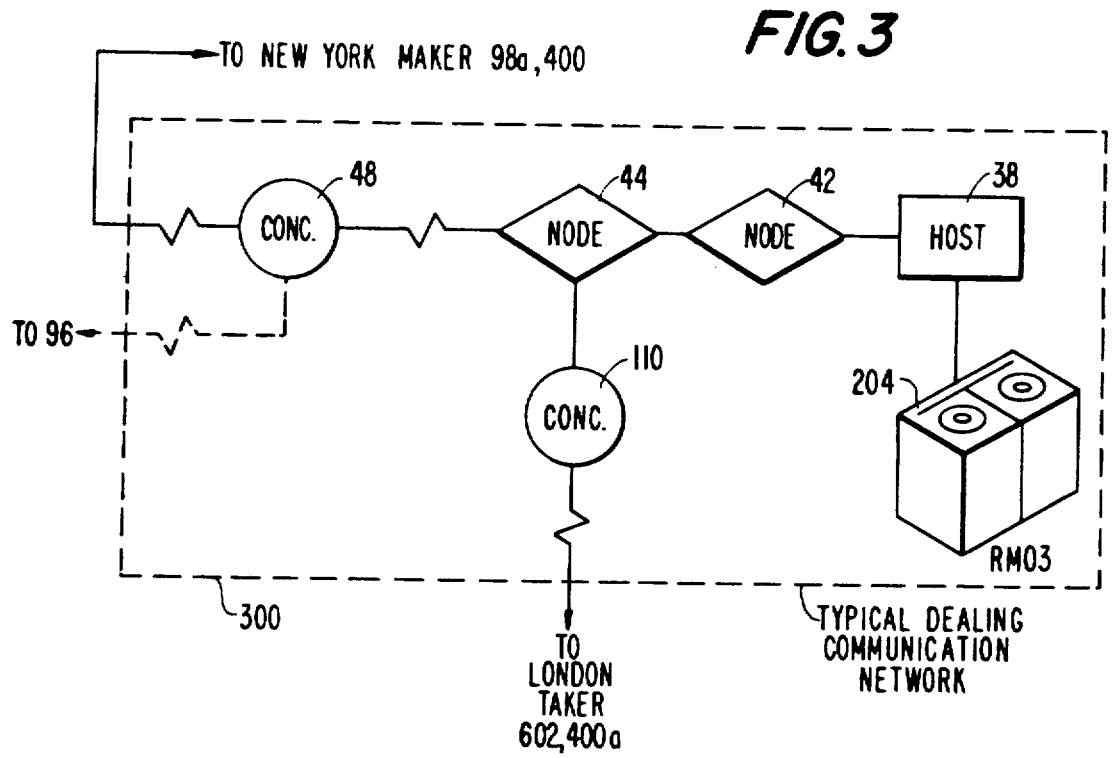

FIG. 5  NEW YORK MAKER

SPOT GBP PLS
\#30 50 (TX)
 AT 50 I BUY 4 MIO GBP
\#4 AGREED MY USD TO CHASE (TX)
 |
 (FIG. 16)
 MY GBP TO LLOYDS LONDON
\# TO CONFIRM AT 1.5450 I SELL 4 MIO GBP VAL 27 FEB 87 (TX)
 |
 (FIG. 17)
 THANKS AND BYE

FIG. 6  NEW YORK MAKER CAPTURE SEQUENCE (CAPTURE)   B AMERICA   NEW YORK
              |            |
           (FIG. 20)    (FIG. 21)
\ SPOT GBP (TX)
   |           |
(FIG. 22)  (FIG. 23)
\ 50 (TX)
   |
(FIG. 24)
\ AT 50 I SELL 4 MIO GBP (TX)
   |
(FIG. 25)
\ MY USD TO CHASE
   |
(FIG. 26)
\ THEIR GBP TO LLOYDS LONDON
   |
(FIG. 27)

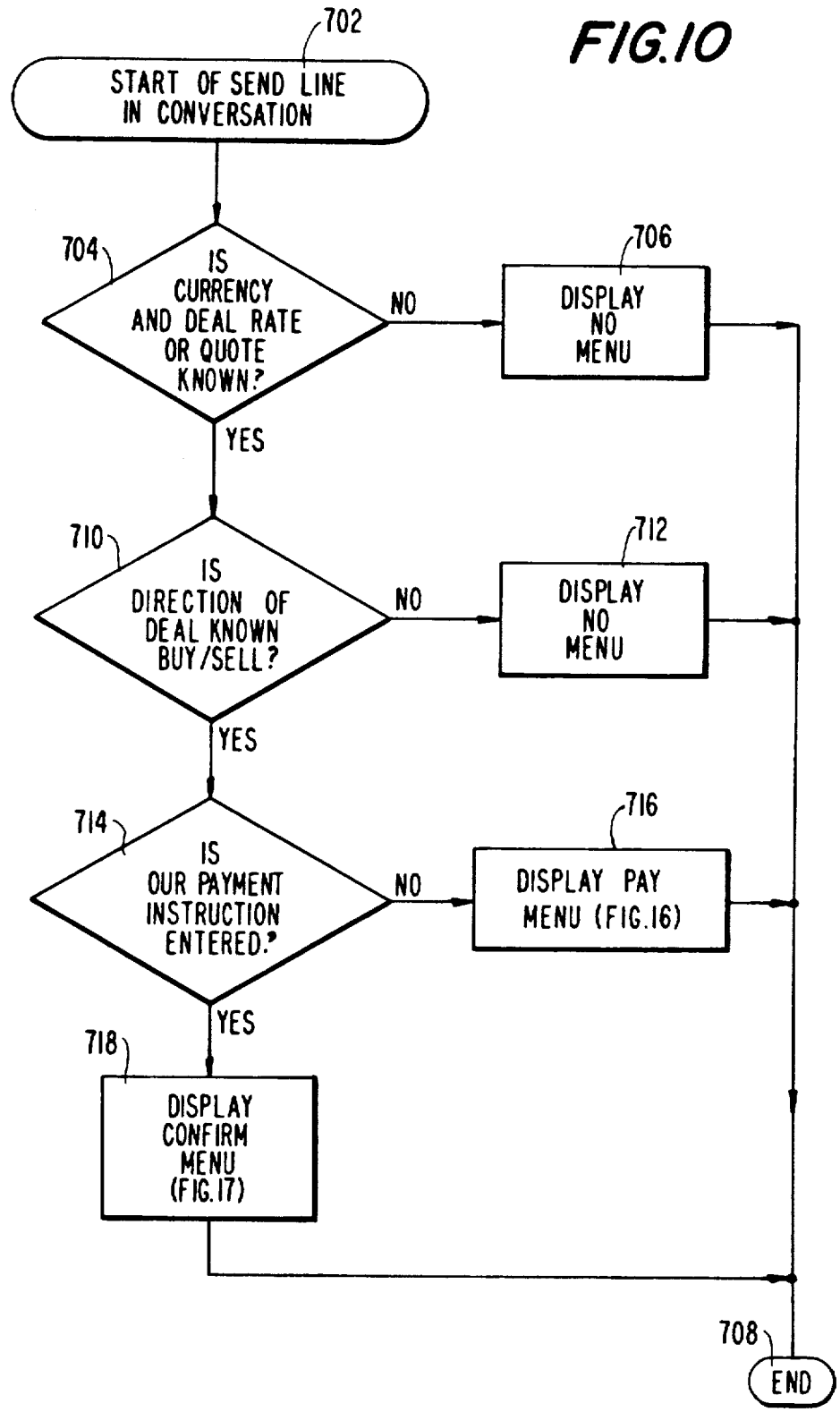

FIG.11

| | | | |
|---|---|---|---|
| 1 AAMM* | 8 DFRL*L | F EPGL*Y | M HYHY*F | T KSTS*S |
| 2 AAMM*F | 9 DFRL*P | G FFGP* | N IFGH* | U LONG* |
| 3 AABB*Y | A DFRL*S | H FGHT* | O JFPS* | V MING*G |
| 4 ALGA* | B DFRL*Y | I GBPL*G | P JKLM*S | W MING*L |
| 5 BRHL* | C EANA* | J GBPL*S | Q JWTB* | X MING*S |
| 6 BRTY* | D EANA*G | K GBPL*Y | R KRSR* | Y NONB* |
| 7 CMMB* | E EPLG* | L HIGH* | S KSTS*F | Z (MORE) |

CODE
0 FOR INDEX
〈SPACE〉 TO RESET

FIG.12

| | |
|---|---|
| 1 SPOT CHF PSE | INTEREST |
| 2 SPOT DEM PSE | 0 FOR INDEX |
| 3 SPOT FRF PSE | 〈SPACE〉 TO RESET |
| 4 SPOT GBP PSE | |
| 5 SPOT JPY PSE | |

FIG.13

| | | | |
|---|---|---|---|
| 1 AT 1.5450 | I BUY | 1 MIO GBP | |
| 2 AT 1.5430 | I SELL | 1 MIO GBP | |
| 3 AT 1.5430 | I BUY | 1 MIO USD | |
| 4 AT 1.5450 | I SELL | 1 MIO USD | |
| 5 MY RISK | | | |
| 6 NO INTEREST THERE, THANKS | | | |

TRADE
0 FOR INDEX
〈SPACE〉 TO RESET

```
1 TO CONFIRM AT 1.5450 I BUY 4 MIO GBP VAL 27 FEB 87
2 VAL 27 FEB 87
3
4 STANDARD INSTRUCTIONS
5 MY GBP TO MY ACCOUNT
6 MY GBP TO (BANK)
7 MY GBP TO LLOYDS LONDON
8 MY GBP TO EBCO
9 MY GBP TO NAT WEST CHIPS 555666
```

```
PAY
0 FOR INDEX
(SPACE) TO RESET
```

FIG.14

```
1 TO CONFIRM AT 1.5450 I BUY 4 MIO GBP VAL 27 FEB 87
2 VAL 27 FEB 87
3
4 DEAL IS WITH (BANK)
5 THANKS AND BYE
```

```
CONFIRM
0 FOR INDEX
(SPACE) TO RESET
```

| | |
|---|---|
| 1 TO CONFIRM AT 1.5450 I SELL 4 MIO GBP VAL 27 FEB 87<br>2 4 AGREED VAL 27 FEB 87<br>3 4 AGREED<br>4 4 AGREED STANDARD INSTRUCTIONS<br>5 4 AGREED MY USD TO MY ACCOUNT<br>6 4 AGREED MY USD TO (BANK)<br>7 4 AGREED MY USD TO CHASE NY<br>8 4 AGREED MY USD TO MAN HANOVER NY | PAY<br>0 FOR INDEX<br>(SPACE) TO RESET |

FIG.17

| | |
|---|---|
| 1 TO CONFIRM AT 1.5450 I SELL 4 MIO GBP VAL 27 FEB 87<br>2 VAL 27 FEB 87<br>3<br>4 DEAL IS WITH (BANK)<br>5 THANKS AND BYE | CONFIRM<br>0 FOR INDEX<br>(SPACE) TO RESET |

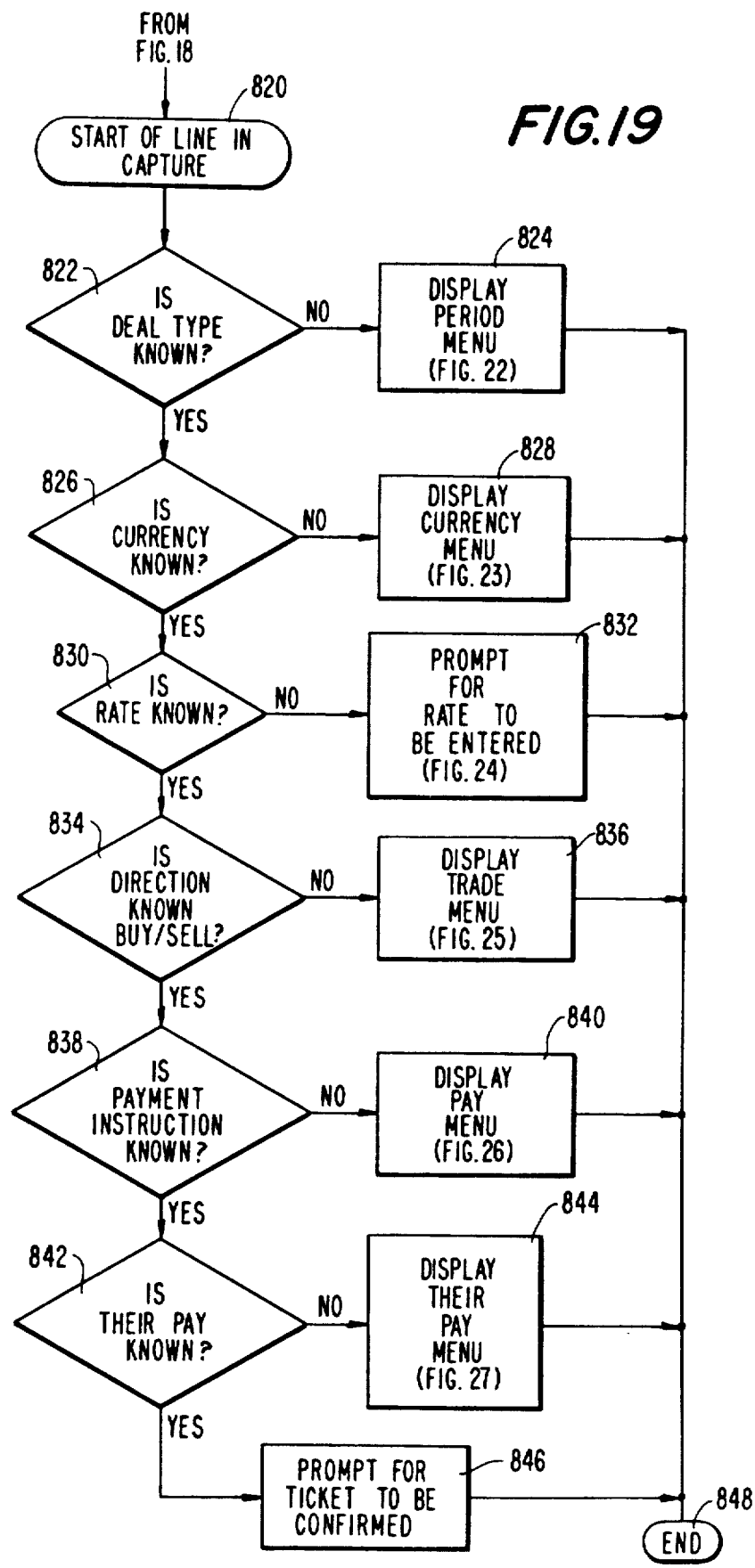

| 1 B AMERICA | OR PRESS | BANK |
| 2 CHASE | FIRST LETTER OF | SPACE TO RESET |
| 3 C LYONNAIS | BANK NAME | 0 FOR INDEX |
| 4 UBS | | |

FIG. 20

| 1 AMSTERDAM | 6 LONDON | OR PRESS | TOWN |
| 2 BAHRAIN | 7 NEW YORK | FIRST LETTER | SPACE TO RESET |
| 3 FRANKFURT | 8 PARIS | OF TOWN. | 0 FOR INDEX |
| 4 GENEVA | 9 TOKYO | | |
| 5 HONG KONG | | | |

FIG. 21

| 1 SPOT | A OVERNIGHT | H 1 MONTH | O 1 YEAR | PERIOD |
| 2 SWAP | B TOM/NEXT | I 2 MONTH | P 2 YEAR | 0 FOR INDEX |
| 3 DEPOSIT | C SPOT/NEXT | J 3 MONTH | Q 3 YEAR | (SPACE) TO RESET |
| 4 FWD/FWD | D 1 WEEK | K 4 MONTH | R 4 YEAR | |
| 5 OUTRIGHT | E 2 WEEK | L 5 MONTH | S 5 YEAR | |
| 6 TOMORROW | F 3 WEEK | M 6 MONTH | T 10 YEAR | |
| 7 TT | G 4 WEEK | N 9 MONTH | U 20 YEAR | |
| | | | V 30 YEAR | |

| | | | CURRENCY<br>0 FOR INDEX<br>(SPACE) TO RESET |
|---|---|---|---|
| | | T XEU<br>U ZAR | |
| 1 USD<br>2 ATS<br>3 AUD<br>4 BEC<br>5 BEF<br>6 CAD<br>7 CHF<br>8 DEM<br>9 (PERIOD) | A DKK<br>B ESP<br>C FIM<br>D FRF<br>E GBP<br>F GRD<br>G HKD<br>H IRP<br>I ITL | J JPY<br>K KWD<br>L MLR<br>M NLG<br>N NOK<br>O NZD<br>P PTE<br>Q SAR<br>R SEK | |

FIG. 24

ENTER THE RATE

FIG. 25

| | | | | | TRADE<br>0 FOR INDEX<br>(SPACE) TO RESET |
|---|---|---|---|---|---|
| 1 AT | 1.5450 | I BUY | I MIO | GBP/GBP | |
| 2 AT | 1.5450 | I SELL | I MIO | GBP/GBP | |
| 3 AT | 1.5450 | I BUY | I MIO | USD/USD | |
| 4 AT | 1.5450 | I SELL | I MIO | USD/USD | |

FIG. 26

1 AT 1.5450 I SELL 4 MIO GBP VAL 27 FEB 87
2 VAL 27 FEB 87
3
4 STANDARD INSTRUCTIONS
5 MY USD TO MY ACCOUNT
6 MY USD TO (BANK)
7 MY USD TO CHASE NY
8 MY USD TO MAN HANOVER NY

PAY
0 FOR INDEX
(SPACE) TO RESET

FIG. 27

1
2 VAL 27 FEB 87
3
4 STANDARD INSTRUCTIONS
5 THEIR GBP TO THEIR
6 THEIR GBP TO (BANK)

THEIR PAY
0 FOR INDEX
(SPACE) TO RESET

FIG. 34

| | MENU SCREENS PROMPTS | | | | | CALLS 0/0 | HELP |
|---|---|---|---|---|---|---|---|
| | TO KIBU ROYAL BANK OF 01 * 2359GMT RECEIVE | | | | | | |
| | # SPOT DEM PSE FROM JONES) | | | | | SPOT-NO DEAL SPOT USD USD/DEM 9SEP88 | |
| CNI | | | | | | | |
| 1035 | CCY DEM | DEAL KIBU*D | NAME KIB | REUTER ASD | SPOT RATES 1.6985/95 | PREV 85/95 | HI*EURO*LO FXFX 1.7035 1.6760 |
| 1035 | GBP | WMCA*G | NATWEST | LDN | 1.7525/45 | 25/40 | 1.7566 1.7505 |
| 1035 | CHF | WMCC*C | NATWEST | LDN | 1.3955/65 | 65/80 | 1.3965 1.3822 |
| 1035 | JPY | WACH*J | NATWEST | LDN | 129.75/85 | 80/90 | 130.95 129.15 |
| 1034 | FRF | BFPX*F | B FRANCO | PAR | 5.7420/50 | 30/60 | 5.7525 5.7230 |
| 1035 | NLG | AMRR*N | AMRO BK | RTD | 1.9075/85 | 00/50 | 1.9110 1.9000 |
| 1035 | ITL | BCIX*I | B.C.I. | MIL | 1252.25/2.75 | 75/50 | 1254.50 1247.00 |
| 1034 | XEU | PRBX*X | PRIVAT | COP | 1.2145/50 | 35/40 | 1.2262 1.2135 |
| XAU PBUK 430.00 / 430.50 * ED3 8.50/8.62 * FED PREB * LFDA DEC | | | | | | | |
| | | | | | | CNU READY | |
| WED SEP 07 09:21 1988 | | | | | | | |

TRADING SYSTEM FOR PROVIDING REAL TIME CONTEXT SENSITIVE TRADING MESSAGES BASED ON CONVERSATION ANALYSIS

CROSS-REFERENCE TO RELATED APPLICATIONS

This application is related to and an improvement on commonly-owned U.S. Pat. No. 4,531,184, entitled "Conversational Video System Having Contact Selection Control", issued Jul. 23, 1985, naming Jack S. Wigan, David G. Ure and John M. Richards as joint inventors thereof, the contents of which is specifically incorporated by reference herein in its entirety; U.S. Pat. No. 4,525,779, entitled "Conversational Video System", issued Jun. 25, 1985, naming Martin Davids, Peter Blackman and Lily Teo as joint inventors thereof; and the contemporaneously filed U.S. patent application Ser. No. 261,578 entitled "Fast Contact Conversational Video System", naming Christopher J. Ordish as the sole inventor thereof. The contents of each of the above patents and application is incorporated by reference herein in their entirety.

TECHNICAL FIELD

The present invention relates to two-way video communication systems and particularly to such systems capable of providing subscriber to subscriber video data communication in a conversational mode.

BACKGROUND ART

Communication systems for transmitting data point to point are well known, such as conventional telex systems and data base access systems. In addition, of course, telephone systems are well known two-way conversational communication media with the disadvantage being that a telephone system does not provide any hard copy nor does it allow you to, on the same device, obtain supplementary data while carrying on the conversation. Such supplementary data may be particularly important if the purpose of the conversation is commodity dealing, such as in the money or foreign exchange market. With respect to telex communication, apart from its associated rate of speed, it does not enable you to readily carry on two different two-way telex communications alternately so that you can carry on "telex conversations" with two different subscribers at substantially the same time. Moreover, neither the telex communication systems nor telephone communication systems provide a listing of incoming callers prior to acceptance of the message by the recipient. With respect to two-way data-base access systems, such prior art systems do not in reality provide a real time conversational communication in that they merely provide for remote storage of information which may subsequently be retrieved upon request by a subscriber or, in certain instances, can be provided to the subscriber if he is accessing the particular storage location to which the data is being provided. However, this is still not a real-time conversation type of video communication system in which a pair of subscribers or users can interact in real time in a conversational mode. With respect to prior art telephone and data-base access systems, a prior art system merging these two technologies is known as the Delphi system which is a telephone message management system in which speech messages may be pre-recorded and stored in a data base for subsequent automatic transmission to incoming callers and in which incoming messages may be stored for subsequent later transmission to proscribed recipients. However, this system is not a true conversational video communication system nor does it enable a particular user to carry on multiple conversations substantially simultaneously. These disadvantages were overcome by the interactive conversational video systems described in the aforementioned commonly-owned U.S. Pat. Nos. 4,531,184 and 4,525,779, incorporated by reference herein, which systems are capable of providing interactive conversational type of video communication between pairs of users or subscribers, as well as enabling multiple conversations to be carried out by a given user or subscriber in real-time and in association with database retrieval of supplementary data, such as in the commercially available Reuters Dealing System employed for commodity dealing such as in the money market. In such systems, such as in the money market, speed of contact is important in initiating and making deals usually involving substantial sums of money where slight delays can result either in a lost deal or a substantial variation in exchange rate. Thus, although the use of a keyboard to manually type in contacts to be made is often satisfactory, there are many instances when such manually initiated contact is not fast enough in the rapidly paced foreign exchange market, such as when important new financial information which could affect a trade or deal is being displayed to the subscriber, such as via a Reuters Monitor page. The system described in the aforementioned contemporaneously filed U.S. Patent application of Christopher Ordish, one of the inventors named herein, is an improvement on the previously described systems contained in the aforementioned U.S. Pat. Nos. 4,531,184 and 4,525,779 so as to enable faster contact to be achieved when needed by the subscriber who can, thus, automatically initiate contact via the use of a pointer on the screen displaying the financial data. None of the aforementioned systems, however, actually analyze the video conversation in real time so as to provide tickets based on such analysis, or to provide context sensitive prompts to speed up dealer input, or to generate error messages to alert the dealer if inconsistencies are detected in the video conversation. All of these features help facilitate a more rapid and accurate video conversation between subscribers. Thus, although artificial intelligence and so called expert systems have been becoming more prevalent in other areas, applicants are unaware of any prior adaptation of these systems in a trading system environment, particularly in the foreign exchange market where the resultant benefits are considerable. These disadvantages of the prior art are overcome by the present invention.

DISCLOSURE OF THE INVENTION

In a video communication trading system network capable of providing textual data messages to a plurality of subscriber terminals throughout the network for selectively conducting trading conversations therebetween, at least a portion of the plurality of subscriber terminals comprise subscriber keystations, with each of the subscriber keystations comprising a video display for providing a textual video display of trading data input to the network, the trading system network includes a message switching interface network for routing video conversational textual data trading messages throughout the trading system network, and at least one conversation analyzing keystation terminal controller interface operatively connected between at least one of the subscriber keystations and the message switching interface network for routing trading data input by the one subscriber keystation to at least another designated subscriber keystation through the message switching interface network and for receiving trading data input to the message switching interface network by the designated other subscriber keystation for controlling communication of the trading conversation between the one subscriber keystation and the designated other subscriber keystation. The conversation analyzing keystation terminal controller comprises means for analyzing the trading conversations substantially in real time for providing messages, such as context sensitive prompt messages, or error messages, in conjunction with the trading conversation based on the real time trading conversation analysis. The context sensitive prompt messages are analysis driven to provide prompt messages based on the analyzed dialogue as the conversation progresses. These prompts can be manually overridden by the user. The system also provides for dynamic creation of a ticket, which is also displayed, as the conversation progresses based on the real time analysis of the conversation. This analysis also provides error messages, such as highlighting inconsistencies on the screen in the content of the conversation, such as an incorrect value date. In using the system, both parties to the conversation do not have to have the same type of terminal controller and only the party desiring the benefits of conversation analysis need, by way of example, employ the terminal controller of the present invention.

BRIEF DESCRIPTION OF DRAWINGS

FIG. 3 is a functional block diagram of a typical foreign exchange dealing communication network, such as the communication network disclosed in commonly owned U.S. Pat. No. 4,525,779, usable in the system of FIG. 1;

FIG. 4 is a diagrammatic illustration of typical conversation relating to a spot deal as it appears at a London Taker employing the context sensitive prompts of the present invention;

FIG. 5 is a diagrammatic illustration similar to FIG. 4 of the same conversation as it appears at a New York Maker in the above example;

FIG. 6 is a diagrammatic illustration similar to FIG. 4 of a capture sequence for entry of an offline deal relating to the same conversation by the New York Maker of FIG. 5 by way of example;

FIG. 10 is a diagrammatic flow chart of the handling of context sensitive prompts from conversation analysis in accordance with the conversation of FIG. 4 from the side of the Market Maker;

FIG. 11 is a diagrammatic illustration of a typical Code prompt menu for the Market Taker prompts in accordance with the present invention;

FIG. 12 is a diagrammatic illustration of a typical Interest prompt menu for the Market Taker prompts in accordance with the present invention;

FIG. 13 is a diagrammatic illustration of a typical Trade prompt menu for the Market Taker prompts in accordance with the present invention;

FIG. 14 is a diagrammatic illustration of a typical Pay prompt menu for the Market Taker prompts in accordance with the present invention;

FIG. 15 is a diagrammatic illustration of a typical Confirm prompt menu for the Market Taker prompts in accordance with the present invention;

FIG. 16 is a diagrammatic illustration of a typical Acceptor's Pay prompt menu for the Market Maker prompts in accordance with the present invention;

FIG. 17 is a diagrammatic illustration of a typical Acceptor's Confirm prompt menu for the Market Maker prompts in accordance with the present invention;

FIG. 19 is a diagrammatic flow chart of the handling of context sensitive prompts from conversation analysis during the offline data capture or entry of FIG. 18 in accordance with the conversation of FIG. 6;

FIG. 20 is a diagrammatic illustration of a typical Bank prompt menu for the Market Maker during offline data capture in accordance with the present invention;

FIG. 21 is a diagrammatic illustration of a typical Town prompt menu for the Market Maker during offline data capture in accordance with the present invention;

FIG. 22 is a diagrammatic illustration of a typical Period Display prompt menu for the Market Maker prompts during offline data capture in accordance with the present invention;

FIG. 23 is a diagrammatic illustration of a typical Currency prompt menu for the Market Maker prompts during offline data capture in accordance with the present invention;

FIG. 24 is a diagrammatic illustration of a typical Rate prompt menu for the Market Maker prompts during offline data capture in accordance with the present invention;

FIG. 25 is a diagrammatic illustration of a typical Trade prompt menu for the Market Maker prompts during the offline data capture in accordance with the present invention;

FIG. 26 is a diagrammatic illustration of a typical Pay prompt menu for the Market Maker prompts during offline data capture in accordance with the present invention;

FIG. 27 is a diagrammatic illustration of a typical Their Pay prompt menu for the Market Maker prompts during offline data capture in accordance with the present invention;

FIG. 34 is a diagrammatic illustration, similar to FIG. 33, of another typical conversational screen display in accordance with the present invention.

BEST MODE FOR CARRYING OUT THE INVENTION

Figure 1:
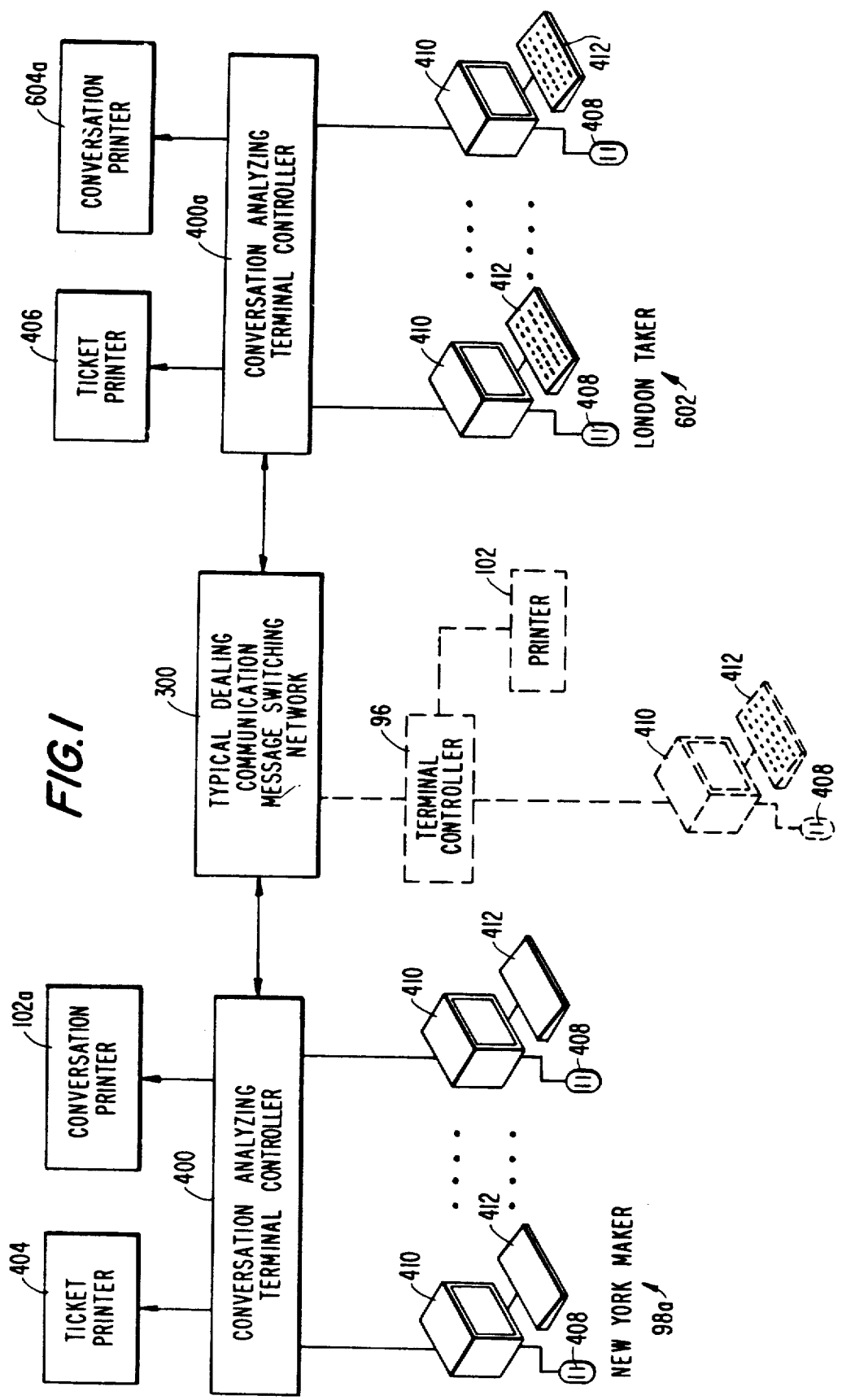
FIG. 1 is an overall system functional block diagram of the conversational video system of the present invention employing the improved conversation analyzing terminal controller and context sensitive prompts.

Referring now to the drawing in detail, and initially to FIGS. 1-3 and 28-32, the overall conversation analysis in the conversational video system of the present invention shall be described before describing the context sensitive prompt feature of the present invention since it is the conversation analysis software which drives the analysis driven prompts and lets you know in real time where you are in the conversation that is going on between counterparties, such as foreign exchange traders, such as in the example of spot deal conversations of FIGS. 4 and 5, so that the appropriate prompt selection menu may be employed based on the analysis of the key points in the conversation as it proceeds in real time. As will be further explained hereinafter, this real time conversation analysis also enables the preparation of Dealing tickets in real time while the deal is being arranged through the use of what are commonly called artificial intelligence techniques to analyze the dealing dialogue and generate the ticket. Thus, the system of the present invention is what is commonly termed an expert type of system. In the preferred system of the present invention context sensitive or analysis driven prompts, which will be described in greater detail hereinafter, are preferably employed to speed up the dealer input since time is generally of the essence in foreign exchange dealings. Of course, although the system is described by way of example with respect to foreign exchange dealing it may be used in connection with any type of video communication where rapid input of conversation information is desired. As will also be explained in greater detail hereinafter, the system of the present invention can also be used for data capture of offline deals as well. Furthermore, the system of the present invention, because of its conversation analysis function, preferably is capable of generating error messages to the user to alert the user if an inconsistency is detected in the conversation being analyzed, such as if the value date is improper or the range of prices is improper, by way of example.

Apart from the conversation analysis function and the context sensitive or analysis driven prompts and associated features to be described in greater detail hereinafter, the system of the present invention is substantially similar to other conversational video systems developed by applicant's assignee and described in commonly-owned U.S. Pat. Nos. 4,525,779; 4,388,489; 4,531,184; and the commonly-owned contemporaneously-filed U.S. patent application entitled "Fast Contact Conversational Video System", the contents of all of which are specifically incorporated by reference herein in their entirety. As shown in FIG. 1, by way of example, which is a functional block diagram of the overall system of the present invention, the block labeled "Typical Dealing Communication Network", generally referred to by reference numeral 300, and illustrated in greater detail in FIG. 3, is basically the same type of communication network as illustrated in FIG. 13J, by way of example, of U.S. Pat. No. 4,525,779 and the same reference numerals have been used in FIG. 3 as are used in U.S. Pat. No. 4,525,779 for like functioning components such as for the concentrators 48 and 110, for the nodes 44 and 42, for the host computer 38, and for the storage device 204. Of course, other packet switching communication networks could be employed if desired in place of network 300. By way of comparison of the overall system functional block diagram of FIG. 1 with that of FIG. 13J of U.S. Pat. No. 4,525,779, by way of example, it can be seen that the terminal controller 96, shown in FIG. 13J of U.S. Pat. No. 4,525,779 is preferably replaced by the conversation analyzing terminal controller 400 or 400a of the present invention which enables real time conversation analysis of the video conversations between, for example, a New York Maker 98a and a London Taker 602, such as the conversation illustrated in FIGS. 4 and 5, and the provision of context sensitive or analysis driven prompts. As will also be described in greater detail hereinafter, in addition to the conversation printer, such as printer 102, 102a, and 604a, there are preferably ticket printers 404, 406, by way of example, which enable the printing of Dealing tickets based on real time conversation analysis, as will be described in greater detail hereinafter. In addition, the user terminals or keystations illustrated in FIG. 1 are shown as also having a conventional mouse 408, such as the mouse described in the aforementioned "Fast Contact Conversational Video System" patent application incorporated by reference herein, such as for providing the fast contact feature disclosed therein. Of course, if desired, the mouse 408 may be omitted. Moreover, as shown by way of example in FIG. 1, both parties to a conversation need not have a conversation analyzing terminal controller, such as 400 or 400a and one of the parties may have a terminal controller of the type of controller 96, by way of example, described in U.S. Pat. No. 4,525,779, in which instance that party will not have the benefit of the present invention of real time conversation analysis to provide context sensitive or analysis driven prompts or automatic ticket generation or inconsistency notification based on such real time conversation analysis. If that party wishes those benefits, then a conversation analyzing terminal controller such as controller 400 would preferably be employed in place of the previous terminal controller 96. The data display terminals or video monitors or screens 410 illustrated in FIG. 1, which are conventional video monitors, having associated keyboards 412, provide the screen displays, such as illustrated by way of example in FIGS. 33 and 34, to provide the video conversations, such as described in U.S. Pat. No. 4,525,779, by way of example, with the addition of the features of the present invention of conversation analysis and context sensitive or analysis driven prompts as well as ticket generation based on such analysis.

Figure 2:
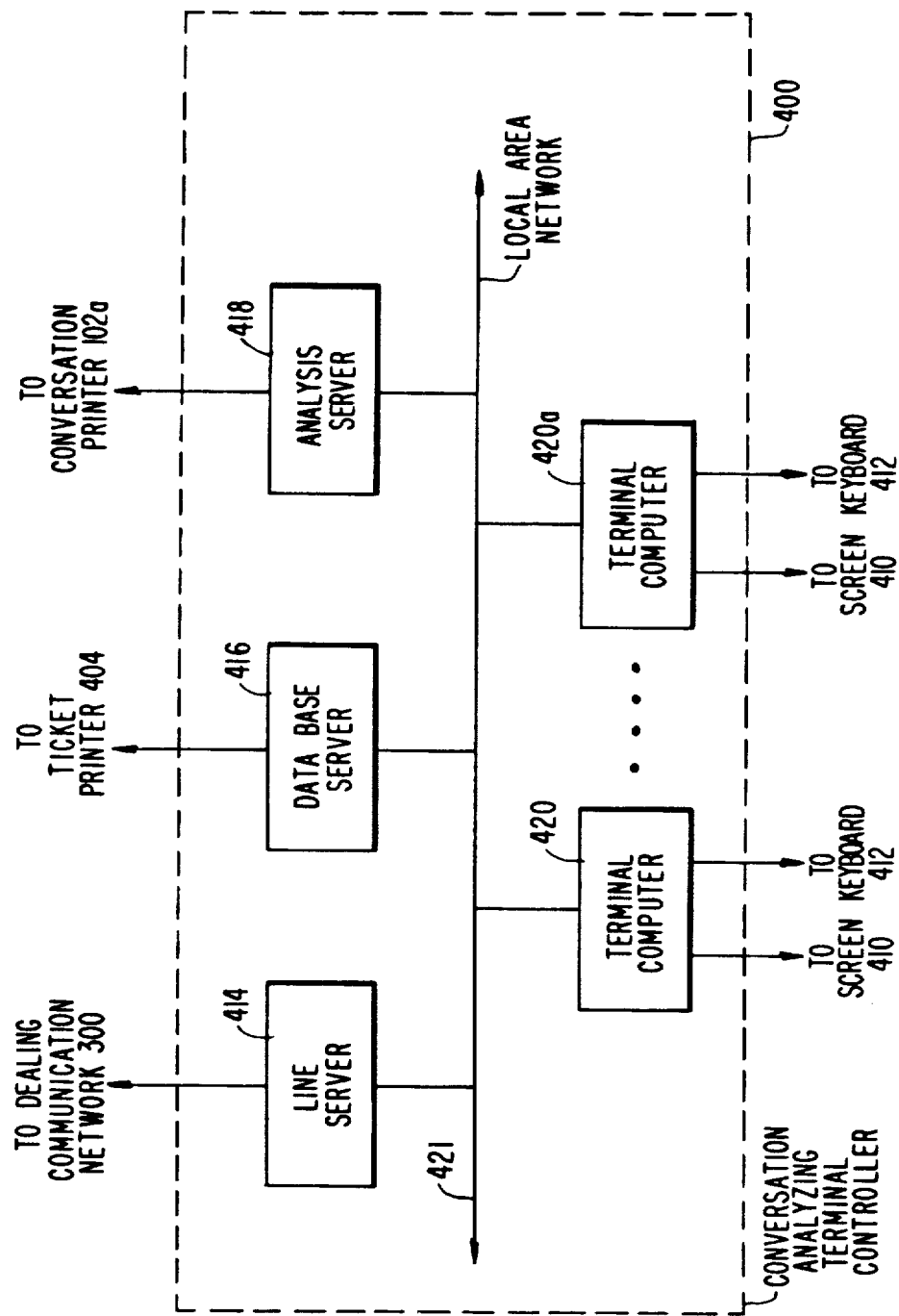
FIG. 2 is a functional block diagram of a typical conversation analyzing terminal controller usable in the system of FIG. 1.

The presently preferred conversation analyzing terminal controller 400 or 400a is illustrated by way of example in FIG. 2. As shown and preferred in FIG. 2, the conversation analyzing terminal controller 400, 400a, of the present invention preferably includes a line server 414, a data base server 416, and a conversation analysis server 418, all of which are preferably 80386 computers, such as COMPAQ 80386 based computer. In addition, as also shown and preferred in FIG. 2, the conversation analyzing terminal controller 400, which can preferably serve a plurality of terminals, such as up to 12, by way of example, includes an 80386 based terminal computer 420, 420a, for each keystation associated with the conversation analyzing terminal controller 400 with one output to the screen or video display 410 and the other output to the keyboard 412 from the terminal computer 420, 420a. The various computers 414, 416, 418, 420 and 420a are preferably tied together in a conventional local area network 421 so as to permit communication between appropriate ones of the various computers 414, 416, 418, 420, 420a in accomplishing the conversation analysis, context sensitive prompts, inconsistency alert, and automatic ticket generation functions of the present invention. The line server 414 preferably serves as an interface between the terminal computers 420, 420a and the appropriate concentrator 48 or 110, in the communication network 300. The data base server 416 preferably stores conversations and completed Dealing tickets and provides this information to the ticket printer 404 or 406 and to the conversation printer 102a or 604a, as well as to a back office computer (not shown) if that is desired. The conversation analysis server 418 preferably stores the conversation analysis software, such as the software to be described in greater detail hereinafter with reference to FIGS. 28-32 and the software of Table B annexed hereto as an Appendix. The analysis server 418 preferably analyzes the conversation in real time and provides the desired context sensitive or analysis driven prompts to the Maker or Taker's screen, depending on whom the conversation analyzing terminal controller 400 or 400a is associated with at the time, provides Dealing tickets to the data base server 416 associated with it, and alerts the user to inconsistencies in the conversation by providing such alerts to the screen 410.

As will be described in greater detail hereinafter, preferably the conversation analysis software which is contained by way of example in Table B annexed hereto as an Appendix, and the context sensitive prompt or prompt menu selecting software are written in C language for use with an 80386 computer, with the communication itself between two counterparties being referred to herein as a conversation. Preferably, this system is employed in connection with foreign exchange trading, although it is not so limited. Although in the example of FIG. 2, three separate servers 414, 416 and 418 are shown, these servers can be combined into a single computer, if desired, with each keystation still being supported by a dedicated terminal computer 420, 420a, and with, as previously mentioned, these keystation computers 420, 420a being linked to the servers 414, 416 and 418 by a conventional local area network 421. Preferably, communication over the local area network 421 uses a virtual connection such as provided by the MS-NET standard variant. In addition, preferably, all of the data about each conversation in progress, such as up to 24 such conversations for a given conversation analyzing terminal controller 400 by way of example, is held in a global array with each element in this array pointing to a structure of type CONVDATA in accordance with the software given by way of example in Table B. This is a type which holds the various network handles associated with the conversation, the text buffer for the conversation, and so on. It also preferably includes an element identified as SAVEDDATA of type ANALYSISDATA, which is used to store the state of the conversation analysis. The conversation analysis is driven by the receipt of packets of text from the various keystations. These successive chunks of text arrive in ANALYZE TEXT PACKETS which are directed to the correct procedure by the environment, which has been informed of the destination of the input messages by a call to NetRegisterReply in the procedure Ov-main in section caserver.c. in the software of Table B. The incoming packets of text are directed to the procedure fn ReplyAnalysisMessages in the section camesage.c. When an ANALYSE TEXT packet is received for a conversation, (Current Conv) is set to point to the CONVDATA structure for the appropriate conversation, and the saved analysis state and ticket are preferably copied into the working areas pointed to by the globals (Ticket) and (Analysis Data). Then the procedure ReplyAnalyseText in the section camesage.c of Table B is called to check the request. If appropriate, the analysis is initialized. This happens when text is deleted, for example, by an interrupt. Any new text is added to the conversation and the C library procedure setjump of Table B is called to store the current C context for the longjump return from parsing to be described below with reference to FIG. 28. This call to setjump returns zero, and then the parsing routine parse of Table B is preferably called to analyze the conversation from the last saved state. When the parsing is terminated by reaching the end of the text currently held, the longjump call returns to the point at which setjump was called with a non zero reply, and the analysis is wrapped up by notifying the keystation of any change to the analysis.

Figure 28:
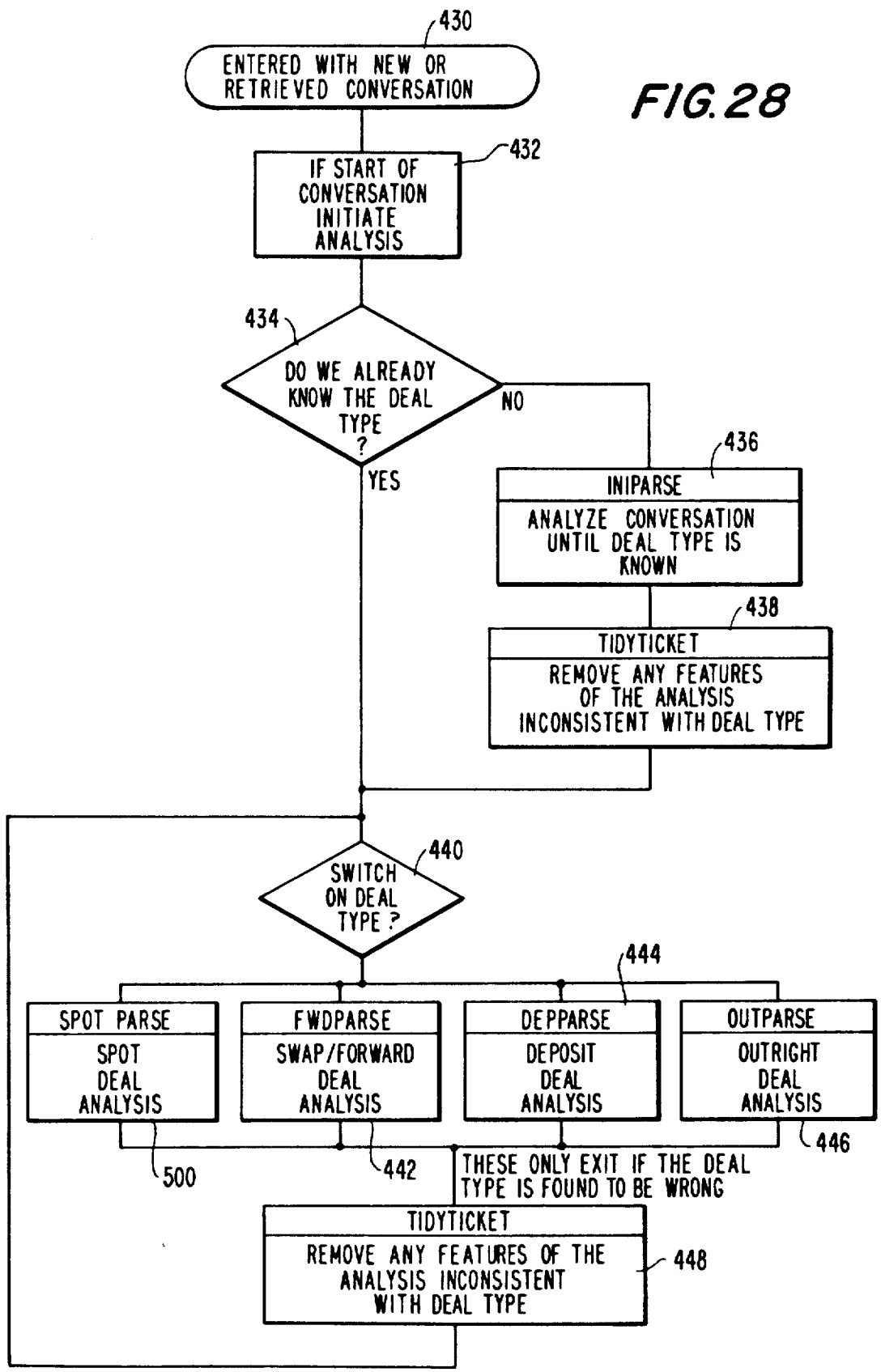
FIG. 28 is a diagrammatic flow chart of the overall parse procedure in accordance with the conversation analysis software of the present invention.

Now referring to FIG. 28, the parsing procedure shall briefly be described. One of ordinary skill in the art may readily understand this parsing procedure without further explanation by reference to the software listing of Table B; however, we shall briefly describe this procedure for clarity herein and give an example of the parsing procedure as it relates to parsing a typical spot deal in the procedure spotparse in the section spotpars.c of Table B, with reference to FIGS. 29-32, so as to further clarify the example of a typical conversation analysis and context sensitive or analysis driven prompt scenario for a spot deal, by way of example, shown in FIGS. 4-6. As shown and preferred in FIG. 28, the parsing code is restarted by a call to the procedure parse in the conversation analysis software of Table B each time there is more text to analyze. Any saved analysis is preferably restored, and the current position in the text is set to the point at which the analysis was last saved. Text is preferably obtained during parsing by the procedure nextch in the section read.c of Table B. During the parsing, the analysis is preferably saved whenever a word or phrase has been successfully parsed. This preferably normally sets a start point for any subsequent parse. The end of a phase of conversation analysis is preferably triggered when the nextch procedure of Table B finds the current end of the conversation text.

This preferably temporarily terminates the parse by a longjump as described above, leaving the saved analysis state as last saved.

Preferably, the conversation analysis, such as exemplified by Table B, always starts on the parse procedure, such as the parse procedure illustrated by the flow chart of FIG. 28. As shown and preferred in FIG. 28, if no previous conversation analysis has been done, the analysis state is initialized, such as represented by reference numerals 430 and 432. Preferably, there is then a check to see if the type of deal is known since the system is capable of analyzing a plurality of different types of deals, such as, by way of example, a spot deal, an outright deal, a swap/forward deal, and a deposit deal. This is represented by reference numeral 434 in FIG. 28. A spot deal as used herein is one in which one party buys a specified amount of currency X from the other party, paying him in currency Y at a specified exchange rate, with the deal taking place on the spot date. A spot date is normally two working days time, but could be today or tomorrow. An outright deal as used herein is one which is similar to a spot deal except that the deal takes place on a specified future date. Future dates are either standard dates, which can be determined from a conventional statement, such a "3 months", or specific dates, which are known as broken dates. A swap/forward deal as used herein is one which is equivalent to a spot deal plus a subsequent outright deal the other way around for the same amount, or to two outright deals for the same amount, different ways around, but on different dates. For example, dealer A may agree to buy one million dollars worth of francs from dealer B on the spot date and three months later sell him back one million dollars worth of francs. The number of francs involved will normally be different in the two deals because the rates will be different. In the normal forward deal as used herein, the first of the two transactions will be at spot. A forward/forward deal as used herein is when both transactions are for forward dates. An overnight deal as used herein has one transaction today and the second on the next trading day. A tomorrow/next deal as used herein has the first transaction on the next trading day. Lastly, a deposit deal as used herein is one in which one party deposits a specified amount of a specified currency with the other Party for a specified period at a specified interest rate.

If the type of deal is not known, the conversation is preferably parsed by a routine called initparse in Table B until the type of deal can be deduced. Once the type of deal is known, the information extracted during the parse is preferably pruned of data incompatible with the type of deal, and then the conversation is preferably reexamined by a parsing procedure that assumes that the type of deal has been determined, such as represented by reference numeral 440 in FIG. 28. The deal specific parsing is then preferably expected to continue as long as the conversation runs; however, that deal assumption may be contradicted by a clear indication that the conversation is about a different type of deal. In such a case, the information extracted is preferably again pruned to correspond to the new type of deal and then further parsing is done assuming the new type of deal. However, in this instance the parse does not restart from the beginning of the conversation but continues from the current point. The pruning of incompatible data occurs during the routine tidyticker in Table B represented by the reference numeral 448 in FIG. 28, with this routine preferably removing any features of the analysis inconsistent with the deal type. The routines used for parsing the various deal types, by way of example, are illustrated in FIG. 28 by reference numerals 500 which refers to the routine spotparse of Table B for performing spot deal analysis, 442 which refers to the routine fwdparse of Table B for performing swap/forward deal analysis, 444 which refers to the routine depparse of Table B for performing deposit deal analysis, and 446 which refers to the routine outparse of Table B for performing outright deal analysis. These various deal analysis routines 500, 442, 444, 446, one of which is selected at a time, are preferably only exited to the tidyticker routine 448 if the deal type is found to be wrong from that originally anticipated.

Referring now to FIGS. 29-32, the method of parsing shall now be illustrated herein, by way of example, by reference to FIGS. 29-32 which illustrate the procedure for parsing a typical spot deal in the procedure spotparse of the analysis software of Table B. This procedure is given reference numeral 500 in FIG. 28, and is located in the section spotpars.c in the conversation analysis software routine of Table B annexed hereto. At each stage this routine preferably saves the analysis state and then performs a switch on the last identified symbol which has been obtained by nextsym in Table B. Keywords which are valid in the context of a spot deal, such as the word TODAY, preferably cause the analysis to be updated appropriately. Other keywords lead to a search for a possible sequence of keywords. Thus, the word AT may often be followed by a number that can be analyzed as a spot rate by the procedure parsespot in the section spot.c in the analysis software listing of Table B annexed hereto. If the rate can be analyzed, the rate will preferably be saved in the analysis data. However the sequence of keywords looked for can include phrases which are not within context for a spot deal in the above example. For example the word BUY may be followed by the words AND SELL. If the expression BUY AND SELL or an equivalent phrase is found, the deal is assumed to be a swap deal and the spot parse will end with a reply leading to a swap parse. Procedures to parse particular strings are preferably typically called with a Boolean parameter force. This parameter is preferably true if the context and the analysis makes it very likely that the selected analysis should succeed, and is false if the analysis is one of several possibilities. For example the word AT is expected to be followed by a rate and so the next number is analyzed by parsespot(-true). If the parameter force is true, the parsing can preferably accept more ways of expressing the expected kind of entity even though in a different context these might have a different meaning. For example, when parsing a spot rate in which the approximate rate is known, the analysis will accept any specified rate after the keyword AT, but will require a rate close to the expected value in a less clear context in which the number could mean other things, for example, the volume of the deal. If no relevant symbol is found in the current context, the parsing procedure preferably calls comnparse in the section comparse.c of Table B. This routine preferably looks for a number of general keywords not specific to one deal type.

Conversation analysis is preferably performed on words or groups of symbols which are extracted by nextsym in section read.c of the conversation analysis software listing annexed hereto as Table B. Until the conclusion of a stage of analysis, the symbols found are preferably stored in a buffer so that the analysis can backtrack if the current hypothesis proves incorrect. If a reanalysis is in progress, and there is such a queue of extracted symbols, nextsym preferably selects the next item in the queue. Otherwise, nextsym preferably reads a symbol from the text using the routine readsym. The procedure readsym illustrated in the analysis software listing of Table B annexed hereto preferably obtains characters from the text buffer using the routine readch as described above. If the characters constitute a recognized word in the vocabulary, a reference to this word is preferably recorded. At this stage fully replaceable synonyms, such as PLEASE and PLS, are merged to a single symbol code, held under the identifier (symbol). Other words are preferably allocated to a symbol such as S currency and individually identifed by a number held in (symval). In the case of a currency identifier, this preferably identifies the actual currency.

Figure 29:
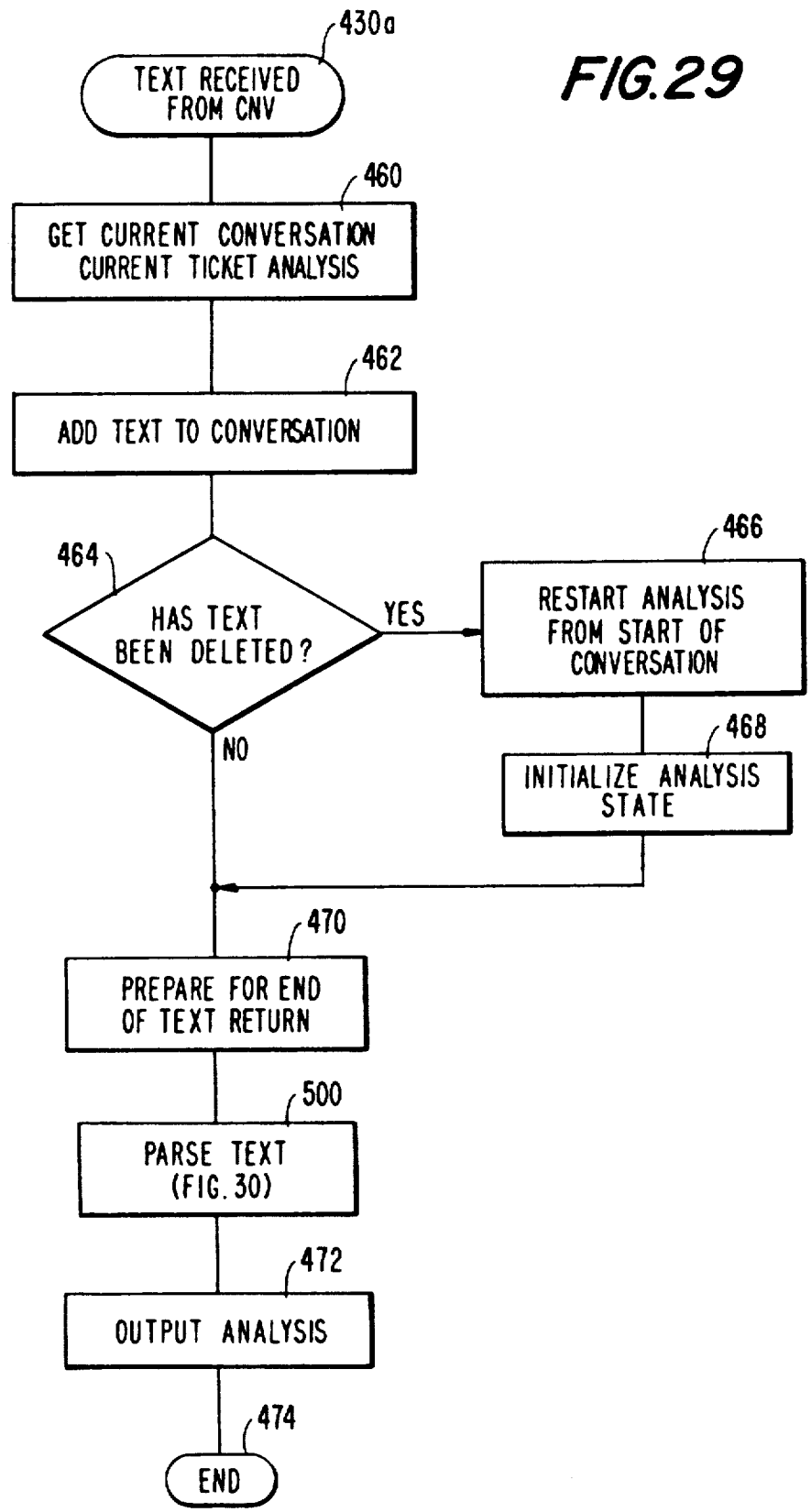
FIG. 29 is a diagrammatic flow chart of the spot parse procedure in accordance with the present invention, assuming a typical spot type deal.

Referring now to FIG. 29, if the assumption is made that the deal type is a spot deal, then FIG. 28 essentially converts to the illustration shown in FIG. 29. Briefly reviewing the flow chart of FIG. 29, the parse procedure starts with the text being received from the conversation, such as represented by reference numeral 430a. The current conversation current ticket analysis is then gotten, such as represented by reference numeral 460 and then text is added to the conversation, such as represented by reference numeral 462. A determination is then preferably made of whether the text has been deleted such as represented by reference numeral 464. If the text has been deleted, then the analysis is preferably restarted from the start of the conversation, such as represented by reference numeral 466, and the analysis state is initialized, such as represented by reference numeral 468. This then brings you to prepare for the end of text return, such as represented by 470. If, however, the text has not been deleted, then the routine goes directly to the prepare for end of text return 470, such as shown in FIG. 29. From this prepare for end of text return 470, the routine preferably goes to parse the text in a spot parse routine 500, such as was described with reference to FIG. 28. Thereafter, there is, preferably, an analysis of the output, such as represented by reference numeral 472, and the routine ends, such as represented by reference numeral 474.

Figure 30:
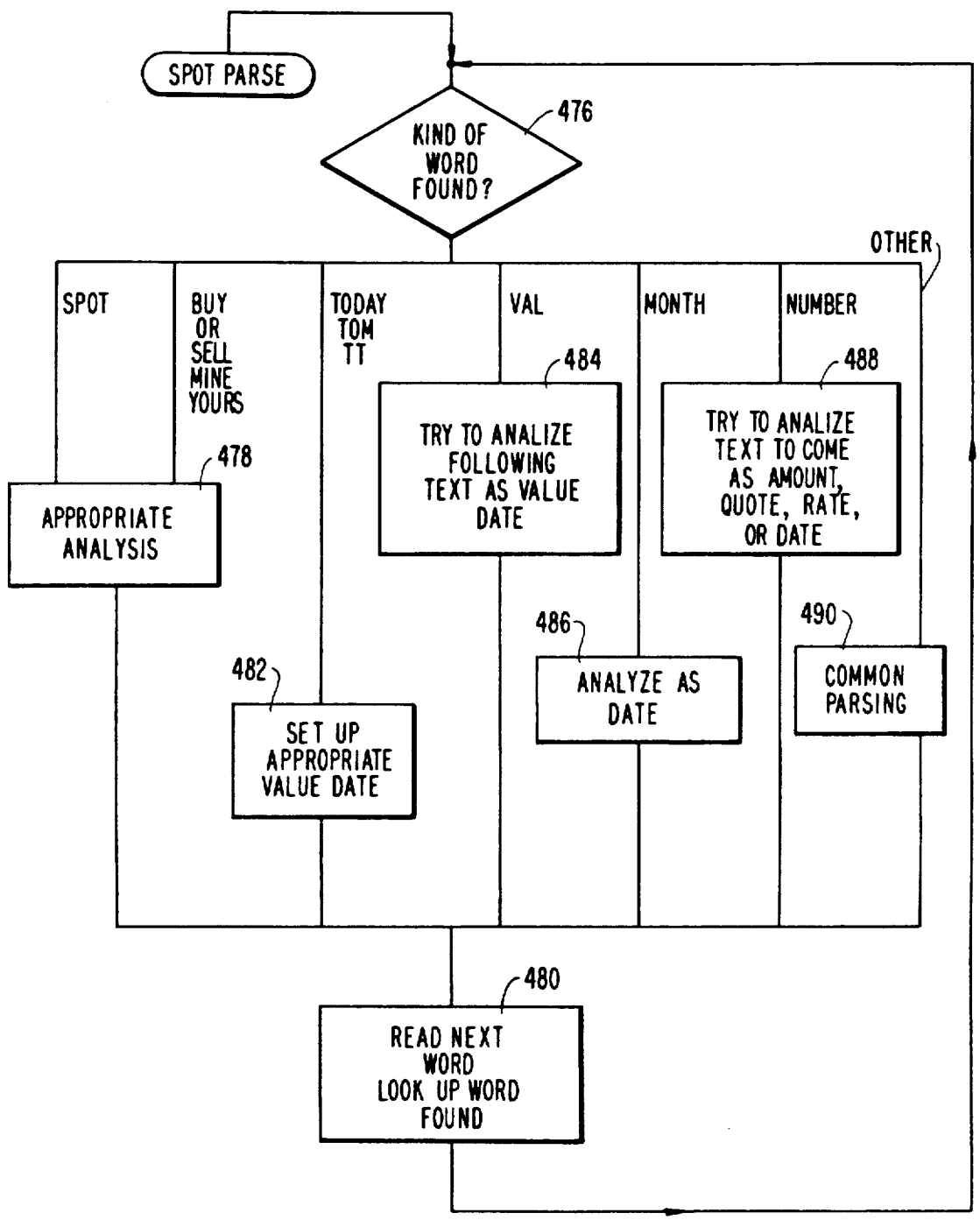
FIG. 30 is a diagrammatic flow chart of an example within the spot parse analysis illustrating the extraction of a value date in a typical spot deal such as referred to in FIG. 29.

Referring now to FIG. 30, this figure illustrates the spot parse routine 500 referred to in FIGS. 28 and 29 and illustrates, by way of example, the extraction of a value date in a spot deal. FIG. 30 is based on the assumption that an initial word has been found and looked up so that you know what it is. A determination is then preferably made as to what kind of word has been found, such as represented by reference numeral 476 in FIG. 30, such as whether it is spot; buy or sell or mine or yours; today or tomorrow or tt (telegraphic transfer); val; month; number; or other, all of which are preferably represented as different branches in FIG. 30, with certain of these words preferably being collected or grouped together in the same branch. If the word found is spot or buy or sell or mine or yours, then preferably an appropriate analysis in accordance with the analysis software routine contained in Table B annexed hereto, under the heading spotparse is conducted, such as represented by reference numeral 478, and the results of the analysis then preferably cause the next word to be looked up and found and the routine repeated, such as represented by reference numeral 480. If the word that is found, however, is today or tomorrow or tt, then preferably an appropriate value date is set up, such as represented by reference numeral 482, and the next word is then preferably looked up and found and the routine repeated. If, however, the word that is found is val, indicating value, then the conversation analysis software of Table B tries to analyze the following text as value date, such as represented by reference numeral 484, and, thereafter, the next word is read and the routine is repeated. If, instead, the word found is month, this is analyzed as date, such as represented by reference numeral 486, and, thereafter, the next word is found and the routine repeated. If, however, the word found is a number, then the analysis software of Table B preferably tries to analyze the text to determine if it is an amount, a quote, a rate or a date, such as represented by reference numeral 488, and, thereafter, the next word is then read and the routine repeated. Lastly, if it is some other word then common parsing is preferably employed, such as represented by reference numeral 490, such as if the word, by way of example, is counterparty. This procedure, as explained above, can readily be understood by one of ordinary skill in the art referring to the analysis software listing annexed hereto as Table B.

As was previously mentioned, the preferred conversation analysis software includes an error detection procedure which checks the deals as they occur in real time, reporting erroneous or suspect conditions to the user based on analysis of the conversation, with the error messages preferably being placed below the insert line in the screen display and the suspect flag data being highlighted in the summary analysis display on the screen so as to provide an alert. Some of the conditions checked for, by way of example, are an attempt to use a value date which is a bank holiday, such as, by way of example, the message USD BANK HOLIDAY 4 JUL 88; an attempt to deal on the wrong side of a quote, such as the message, by way of example, CHECK RATE 20?; or the use of the wrong rates in a swap deal, such as the message, by way of example, RATES QUOTED DO NOT MATCH DEAL; or errors in the larger figures not quoted in the trade, such as, by way of example, the message SHOULD RATE BE 6.6764?.

Figure 31:
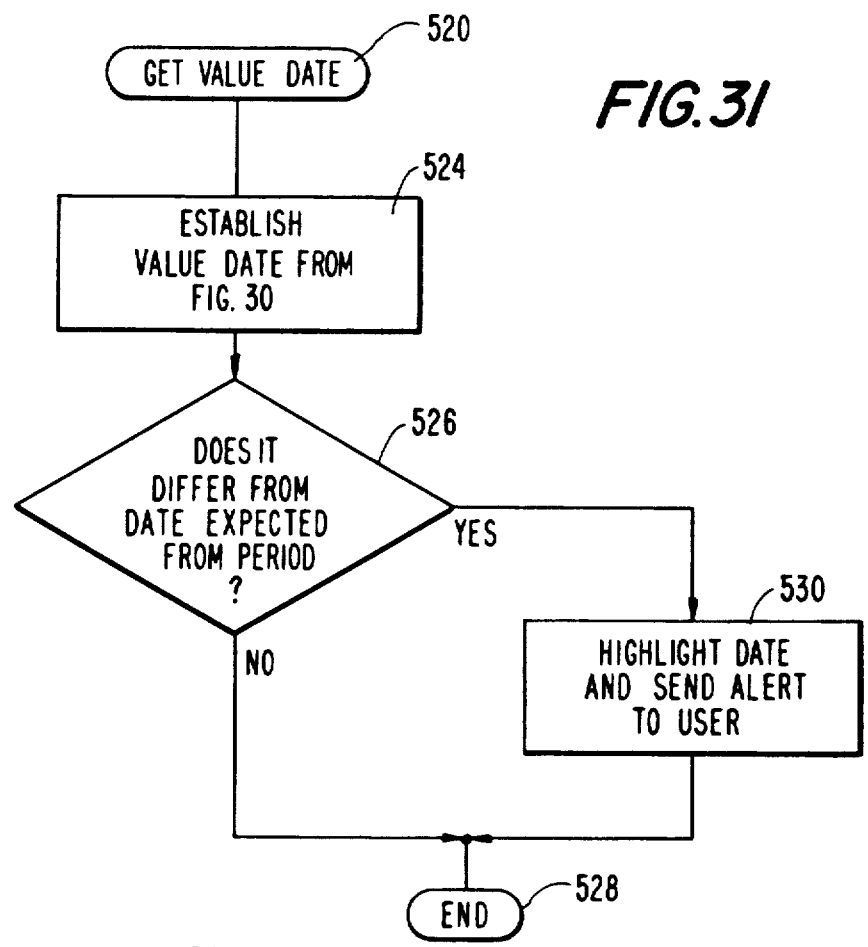
FIG. 31 is a diagrammatic flow chart of the handling of inconsistencies in the value date, or rates, in accordance with the present invention.

By way of example, FIG. 31 illustrates a preferred handling of inconsistencies in value date. In this regard the value date is gotten, such as represented by reference numeral 520: the value date is then established from the routine of FIG. 30, such as represented by reference numeral 524: a determination is then made as to whether the value date differs from the date expected from the period, such as represented by reference numeral 526. If the value date does not differ, the routine is ended, such as represented by reference numeral 528, whereas if the value date does differ, then the date is highlighted and an alert is sent to the user as an error message, such as represented by reference numeral 530. This procedure can also preferably be used for checking rates.

Figure 32:
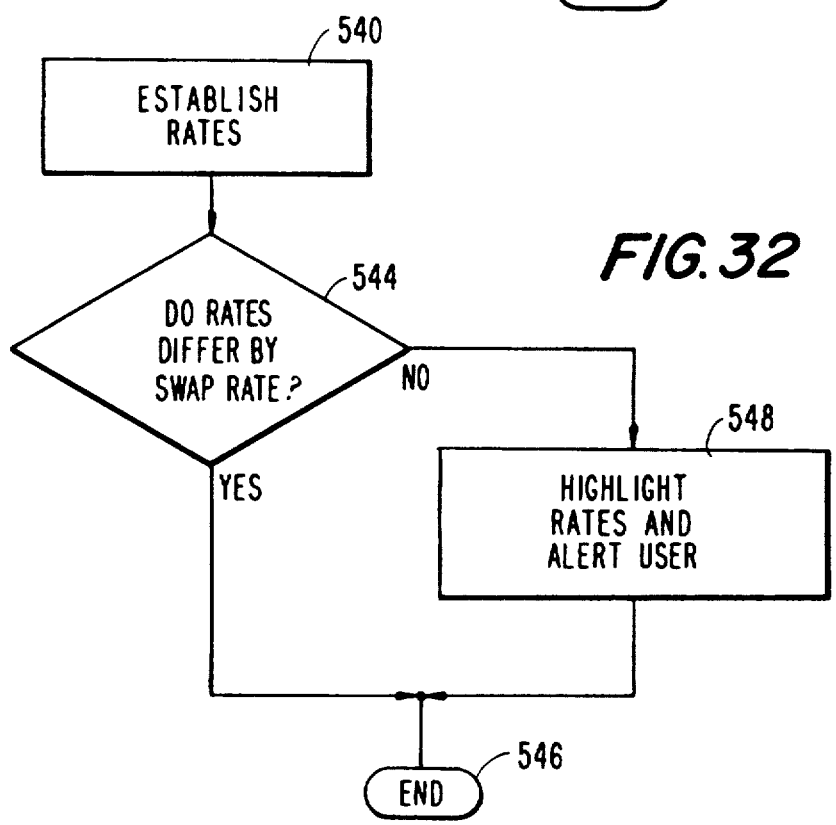
FIG. 32 is a diagrammatic flow chart of the handling of inconsistencies in swap rates in accordance with the present invention.

In this regard, FIG. 32 illustrates a procedure for preferably handling inconsistencies in swap rates. In the illustrated procedure, the rates are first established, such as represented by reference numeral 540, and then a determination is made as to whether the rates differ by the swap rate, such as represented by reference numeral 544. If the rates differ by the swap rate, then this routine is preferably ended, such as represented by reference numeral 546. If, however, the rates do not differ by the swap rate, then the rates are preferably highlighted and an alert is sent to the user as an error message, such as represented by reference numeral 548 in FIG. 32.

In order to better appreciate the determination of inconsistencies in value date, we shall now briefly explain a typical method, for calculating the correct value date by using a holiday file and a period file, by way of example. In the below example, all trading days for non-Islamic currencies are assumed to be Monday through Friday. For standard period quotations involving a split date, a split date adjustment is included in the quoted rates by way of example. In the normal standard cross rates, the split date does not have to be allowed for as it is preferably included correctly. In calculating spot value dates, by way of example, one may employ rules which allow for one working day to process the transaction in the second currency and to ensure two halves of the transaction can take place on the same day in the currency and in the U.S. dollar. Of course other currencies than the U.S. dollar may be specified without requiring an intervening trading day before the spot value date. Preferably, in this example, the same value date would be used for spot and deposits even though, theoretically, it would be possible to make a deposit in a currency when a spot exchange would not be possible. The earliest spot value date, given provision for an intermediate trading day in a currency, could be derived from a table listing the days, the earliest trading day, the middle day, and the earliest value date, by way of example. If the currency did not require a middle day, the earliest value date would be the middle day. Holidays on the earliest trading day in the currency country or in the U.S. would preferably have no effect on the value date. A U.S. holiday on the middle day would preferably have no effect on the value date, however a holiday in the other currency on the middle day would preferably move the target value date forward until it would be the second trading day in the currency. If the target value date were a holiday in either currency or in the U.S. dollar, the value date would preferably be the first week day after this on which all currencies and the U.S. dollar can be dealt. The same value date would preferably be used even for direct exchanges between two currencies.

The period value dates can be calculated, by way of example, by selecting a preferred value date and then adjusting it for holidays, with the preferred period value date being calculated from the spot value date for the transaction. For periods of a fixed number of days, such as a week, the preferred value date can be determined and if this is not a trading day in all relevant currencies, the actual value date would be the first day after the preferred day on which all currencies concerned can trade. Preferably, in this example, for contracts of one or more months or years, the forward value date must occur in the appropriate month. If the spot date is the last possible trading date in the month, the preferred value date would be the last week day in the forward month, whereas if the forward date would be after the last week day in the forward month, the preferred value date would be the last week day in the forward month. Otherwise, the preferred value date would be on the same date in the month as the spot value date. If this preferred date is not a trading day in all currencies involved, including the dollar in this example, the date would preferably be moved later within the month until a common trading day were identified. If there were no later date satisfying this criterion, the date would be brought earlier until a trading day in all relevant currencies were found. Two periods are preferably allowed before spot. These are overnight and tomorrow/next. The expression overnight signifies from the first trading day to the second trading day with these days being trading days in both currencies. The expression tomorrow/next refers to from the second trading day to the third trading day, with these days again being trading days in both currencies. Broken date value dates are preferably normally accepted as entered, and the users warned or alerted about dates falling on Sundays or holidays in any relevant currency.

In the above example, Saturday dates are assumed to be relevant to an Islamic currency, and are preferably adjusted to the Friday before for any non-Islamic currency. Similarly a Friday value date is adjusted to the following Saturday for an Islamic currency, and deals involving both Islamic and non-Islamic currencies for either Friday or Saturday are shown as split. The deposit value dates for a currency are preferably assumed to be the same as the forward value dates, which is a common convention in foreign exchange even if a deposit could have been made in the currency, but the forward value date is preferably moved because a preferred date fell on a U.S. holiday. The quoted spot rate is preferably the rate which is used for the calculated value date The quoted deposit rate for a currency is preferably assumed to be correct in spite of any changes in value date. Thus, in the above manner, by way of example, the correct value dates may be calculated and ultimately used by the conversation analysis software of Table B to determine inconsistencies in the conversations being analyzed.

Figure 33:
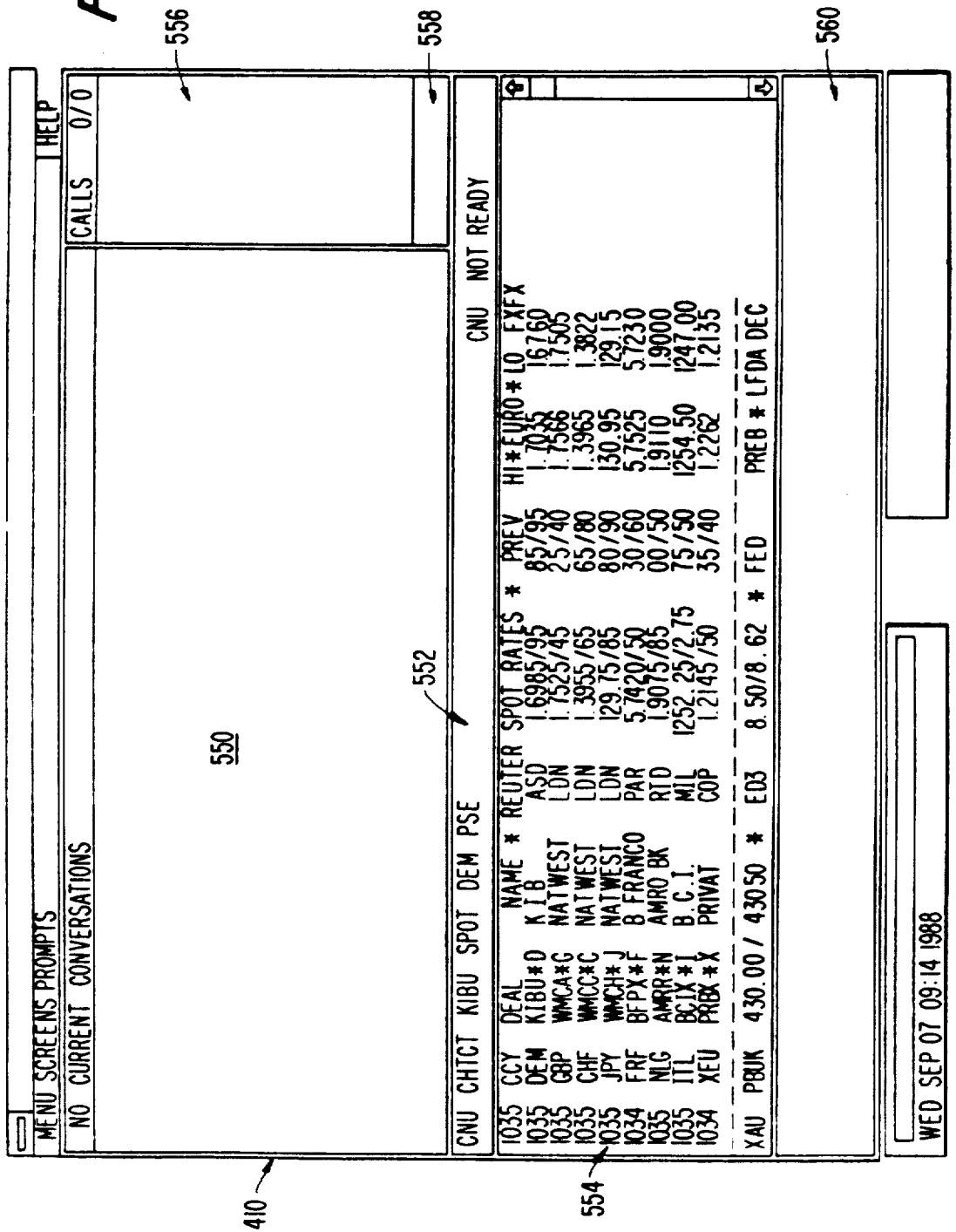
FIG. 33 is a diagrammatic illustration of a typical conversational screen display in accordance with the present invention.

Before explaining the presently preferred use of context sensitive prompts in the system of the present invention with reference to FIGS. 4 through 27, and FIGS. 1 through 3 where appropriate, we shall briefly describe, by way of example, typical screen layouts for the video monitor 410 employed at the keystations in the system of the present invention. As shown by way of example in FIG. 33, the screen may include a first display area 550 for displaying one or more conversations, an insert or contact line 552, and a second or general display area 554 beneath the insert line for displaying additional financial information, such as a REUTER MONITOR page, prompt menus, analysis of the conversations, etc. In this area 554, the analysis of conversations would normally preferably replace the REUTER MONITOR display. This area 554 is also used for prompts and expanded analyses. There is also a location on the screen, such as location 556 for preferably displaying incoming calls and alerts and there is another area 558 on the screen for preferably displaying the ticket to be written based on the conversation analysis. In the example of FIG. 33 a news alert window 560 is also shown with it being located beneath the general display window 554. As was previously mentioned, more than one conversation can be displayed in the conversation area 550.

Referring now to FIG. 34, this basically shows the same screen as in FIG. 33 with the exception that a ticket being written is shown in area 558 and a portion of a conversation is shown in conversation area 550, by way of example. As previously mentioned, 80386 computers may be employed with these screens 410 and may use conventional software, such as Microsoft Windows 3, and an EGA PLUS graphics card to provide the aforementioned screen display. With respect to the keyboard 412, the keyboard 412 may be a conventional Dealing type keyboard, such as employed by Reuters in providing its Dealing Service, but preferably includes additional keys, such as a CAPTURE key for entering the conversation mode ready to start an offline conversation, a CONFIRM key for confirming that the conversation analysis generated from the conversation analysis software of Table B is correct, a PROMPT key which when pressed in a conversation mode will provide display of a prompt menu depending upon the context of the conversation at that point in time but, if the context does not indicate an appropriate menu, then a prompt index would be displayed (if no conversation were selected, [CONTACT] would be generated and the CODE menu displayed), a REVIEW key for entering the review mode in which the last review screen that was displayed would be redisplayed in the general display area 554, a TICKET key which uses the general display area 554 for displaying the expanded analysis for the current conversation, and a WRONG key for marking the analysis as wrong. Of course any other desired configuration of keys may be employed consistent with the functions to be performed by the conversation analysis software. Thus, as can be seen from the above discussion, the conversation analysis of the present invention employing the preferred conversation analysis software of Table B by way of example, is the process of extracting information from the conversation with the results of the analysis being displayed in the conversation analysis area 554 of the screen as they are obtained in real time and being used to control the current prompt to be offered in real time. Preferably, this conversation analysis is only applied to the text of a conversation and to user additions to this text once the conversation is ended, as will be described in greater detail hereinafter with respect to the use of context sensitive or analysis driven prompts in accordance with the present invention, since it is the real time conversation analysis which preferably determines the context sensitive or analysis driven prompts. The following information about a deal is preferably extracted from the context of the conversation so as to enable the appropriate prompt menus and prompts to be provided in accordance with the prompt menu software by way of example: deal type and direction, currency or currencies involved, actual rates to be used, amount and currency in which the amount is quoted, period and the value date or dates, and the payment instructions, with apparent errors and inconsistencies in the conversation being identified or alerted to the user on the screen 410. In this regard, as previously mentioned with reference to FIG. 2, the analysis server 418 is the location where the conversation analysis software of Table B is preferably stored or resident in the conversation analyzing terminal controller 400 of the present invention so as to analyze the conversation and provide context sensitive or analysis driven prompts to the screen 410, tickets to the database server 416, and determine inconsistencies in the conversation which are indicated as errors to the user on the screen 410.

As will be described in greater detail hereinafter, in prior video conversational systems, such as described in the aforementioned U.S. Pat. No. 4,525,779 and the other patents and applications incorporated by reference herein, the dealers, assuming the systems were used for foreign exchange trading, which were involved in the conversation had to type in most text in full, although some abbreviations could be employed. In the system of the present invention, however, context sensitive or analysis driven prompts are employed to provide appropriate prompt menus for the dealer to select items from in real time based on an analysis of the conversation in real time. Any selected items from these prompt menus are then preferably appended to the text in the insert line thereby preferably minimizing the number of keystrokes required to enter the information. Thus, in the system of the present invention, the current context of the conversation is preferably used in two ways. Firstly, the context of the conversation is used to select an appropriate prompt menu for the stage of the conversation though the selection can be, if desired, preferably overridden by the user. In addition, in some menus, the context of the conversation will preferably control the prompts that are offered for selection such as, for example, if the trades suggested are those likely in view of the quotation requested, and the payment instructions offered offer the transfers needed for the agreed deal. The prompts are preferably organized in menus, as previously mentioned, with each menu preferably having a name, such as PAY or INTEREST, with typical prompt menus being shown by way of example in FIGS. 11-17, with FIGS. 11-15 being Market Taker prompts and FIGS. 16 and 17 being Market Maker prompts, and with FIGS. 20-27 relating to Market Maker Capture prompts for capturing offline deals, by way of example.

As will be described hereinafter, the content of some menus preferably changes with the context of the current conversation, and other menus include the provision of an index where the number of options is too great for a single selection. Preferably, each item in a menu is identified by a digit or a letter with digits preferably being used for small menus. Preferably, in the system of the present invention, selections can only be made when the menu is on display, such as by using the mouse 408; or by typing the appropriate number, or pressing the appropriate letter on the keyboard 412. If desired, the user can select other menus from the current menus by selecting an INDEX menu and then selecting the desired option from the index. As was previously mentioned, most menu items give text for inclusion in a conversation, with this text preferably always being added to the insert line and insert being forced if the terminal 410 is not already in the insert or contact state. If the selected prompt text is not the first text on the insert line, the text is preferably placed at the cursor position with a preceding space if the cursor is not on a space character. After selection from a menu, the rest of the line is preferably cleared and the cursor is preferably normally placed one space to the right of the inserted text. However, in some texts the cursor can be positioned within the text. By way of example, if the text contains an asterisk which is shown in the menu or an exclamation mark which is not shown or used as text, the cursor is preferably placed on these characters.

If the text will not fit in the insert line, the action depends on whether an online or offline conversation is in progress. For an online conversation, selection fails with an error message. For an offline conversation, the line up to the cursor is accepted with an automatic ENDLINE, and the insert line is cleared prior to adding the new text. For real conversations, the user must preferably always accept the insert line by DEAL, ENDLINE, TRANSMIT or ENDCONTACT before it is placed in the conversation and passed to the counterparty. For offline conversations, preferably an automatic TRANSMIT is generated after selections which normally do not require editing. These include, by way of example, counterparty specifications and payment instructions. Menus are displayed appropriate to the current conversation. If a conversation is left and then reselected, the prompt preferably returns to the state it would be if the conversation had been selected but no keys had been pressed over the interval. These menus, as previously mentioned, are preferably displayed in the general display area 554 of the screen 410 and preferably overlay anything already there. If a menu is removed, the area 554 preferably reverts to its previous display. The prompt menu preferably uses just as much space as it requires and updating of any of the background display still visible would then preferably occur. The number of rows for the menu is preferably kept to a minimum so that the underlying information, such as a REUTER MONITOR page can still be seen. When the contents of a displayed menu are context dependent, they are preferably kept up to date after the analysis of each line of conversation.

This display of prompt menus preferably depends on the prompt state of the terminal 410. Preferably in any setting, pressing the key labeled PROMPT causes the display of a menu selected on the context of the conversation. These menus can be removed by pressing the word SPACE or any alpha character not included in the menu. Automatic prompts can also occur, which is the default setting of the menuing system, and provide menus for selection without requiring the user to press the PROMPT key. In this state, the system normally selects an appropriate menu at the start of each line when the user is in the SEND state. Selection is suppressed if a menu is already on display or if the current menu would be in the INDEX menu. Selection is also preferably suppressed if a menu is rejected earlier in the same SEND state. Thus, if the user wishes to include several lines of non-standard text into the conversation, it is only necessary to press SPACE once to remove the automatic prompts. During the preparation of the contact and capture command line, an automatic prompt is shown when the CONTACT or CAPTURE key is depressed. In one case, the prompt is for Dealing Codes and the second for a bank name. If a selection is made from the Dealing Codes, the INTEREST menu is preferably selected, whereas if the selection is made of a bank name, the TOWN menu is preferably selected. As will be described in greater detail hereinafter, in providing and selecting prompt menus, it is preferably desired to know whether the user is the Market Maker or Market Taker, and whether the prompts are being handled during CONTACT or CAPTURE. In the below example, the person who started the conversation is initially assumed to be the Taker, although this role can be changed if the other party asked for a quotation, or if the supposed Taker makes a two sided quotation.

It is also preferred to know when the volume of the deal is confirmed by the Market Maker. This may preferably happen explicitly or by any input to the conversation implying acceptance of a previous state in which the volume has been suggested. If a deal for a particular volume is being discussed during the conversation being analyzed, the volume is agreed as soon as the trade price is fixed. As was previously mentioned, the context variable prompt menus, include such items as a CONFIRM menu, a PAYMENT menu, and a TRADE menu. However, as was also previously mentioned, when a deal has been conducted not using the conversation video system of the present invention, but rather offline, it is still possible to use the system of the present invention to analyze such deals by inputting appropriate information to the system in the Market Maker Capture mode, such as illustrated by way of example in FIG. 6. Apart from the different method of establishing the counterparty, offline and online conversations are preferably analyzed in the same way. As was also previously mentioned, the automatic prompt system of the present invention provides two types of menu; one which contain items which are the same for all conversations and are, therefore, referred to as invariant, and another type in which the menus are changed to contain information extracted from the conversation and are, therefore, referred to as variant. An example of variant menus are the CONFIRM menu, the PAY menu and the TRADE menu; and an example of invariant menus are the BANK menu, the BROKER menu, if desired, the CAPTURE RATE menu, the CAPTURE CONFIRM menu, the CODE menu, the CURRENCY menu, the INTEREST menu, the MONTH menu, the PERIOD menu, the TOWN menu, and the TYPE menu. The menu displayed can also preferably be driven from the conversation analysis system so that at each point in the conversation the menu displayed reflects the usual next step to be taken in moving the dialogue towards a deal.

Conversations in the system of the present invention, as illustrated in FIGS. 4-6, by way of example, can, preferably, basically be started in three ways; namely, the user can contact another dealer, the user can accept a call from another dealer, or the user can enter the complete deal, using the CAPTURE function, as an offline deal. The particular menus displayed, as will be described below, preferably depend intially on how the conversation is started, with the person making the contact normally being referred to as the Market Taker and the person accepting the contact normally being referred to as the Market Maker, although the system of the present invention preferably adapts when the roles are reversed.

Referring now to FIGS. 4-27, the functioning of the context sensitive or analysis driven prompts in accordance with the present invention shall now be described in greater detail with reference to a typical spot deal. FIGS. 4 and 5 illustrate both sides of the conversation, starting with the Market Taker in FIG. 4, assuming a New York Maker 98a. In addition, as will be described in detail after the use of context sensitive prompts in an online deal has been described with reference to FIGS. 4 and 5, the use of these prompts in connection with data capture or entry of an offline deal shall then be described with reference to FIG. 6. It should be noted that in FIG. 4, the symbol "#" signifies entry of a line of conversation by the Market Taker, and the absence of this symbol signifies entry of a line of conversation by the Market Maker. Similarly, in FIG. 5, the symbol "#" signifies entry of a line of conversation by the Market Maker, and the absence of this symbol signifies entry of a line of conversation by the Market Taker. With respect to FIG. 6, the symbol "/" signifies entry of a line of conversation during the Market Maker Capture Sequence.

Referring now to FIGS. 4, 7-9 and 11-15, the functioning of the context sensitive or analysis driven prompts in accordance with the present investion shall now be described. As was previously mentioned, FIGS. 4, 7-9 and 11-15 illustrate a typical spot deal conversation from the side of the Market Taker, which in the example of FIG. 1, is the London Taker 602. As shown and preferred in FIG. 4, to initiate the conversation, the Market Taker presses the CONTACT key. Once the Market Taker has pressed the CONTACT key, the CODE menu, such as the menu illustrated in FIG. 11, may appear on the screen 410 of his terminal so that a single key sequence can be used to select one of the usual contacts for this dealer. It is preferably a user option in the system of the present invention whether the menu appears automatically, and can be removed by the SPACE key, or whether this menu is only shown if the user presses the PROMPT key. The user then reviews the CODE menu to determine if his desired dealer contact appears, and if so selects the contact, such as by using the mouse or typing in the appropriate code. When the four-character dealer code is entered by the Market Taker from the CODE menu of FIG. 11, the CODE menu is preferably replaced by an INTEREST menu, such as shown in FIG. 12. The INTEREST menu is also preferably presented on the first line of the conversation if no interest is found on the contact line. It should be noted that in the above example, the TRANSMIT key or function is represented by the symbol TX. Once an interest has been detected, the INTEREST menu of FIG. 12 is preferably removed from the screen 410, but is not replaced until the rates from the Market Maker have been extracted from the conversation dialogue. When the rates are available, the TRADE menu, illustrated in FIG. 13, is preferably configured for the rates specified. Since the volume for the deal is not normally known by the conversation analysis system in advance, a default condition, such as 1 MIO can be assumed, which can preferably be changed after the item has been selected and the actual text entered into the insert line. In the example of FIG. 4, an actual selection of 4 MIO is shown as having been made.

When a deal has been arranged and payment instructions need to be specified, the PAY menu of FIG. 14 is displayed on the screen 410. It should be noted that preferably the first three items in the displayed PAY menu of FIG. 14 are from the CONFIRM menu of FIG. 15, with the remainder giving options to the user for the payment instructions. The direction of the deal, such as BUY or SELL, has been established at this point and so the currency to be transferred is also known. The last three menu items preferably provide payment instructions to the bank specified by the user for the currency. Of course, if less than three banks have been specified, fewer options are presented. When all the required information has been extracted from the conversation by analyzing the conversation, the CONFIRM menu of FIG. 15 is preferably displayed on the screen 410. The CONFIRM menu preferably remains on the screen 410 until the conversation has been ended or until the menu is removed by the user. The CONFIRM menu has access to all the extracted information from the conversation, including the volume of the deal. The first item in the CONFIRM menu confirms the deal, whereas the second allows the value date to be edited, and the third is used for the rates of a swap deal. The fourth item in the CONFIRM menu of FIG. 15 allows the counterparty for the deal to be specified if the conversation is with a broker, by way of example, although no broker need be employed. The fifth item in the CONFIRM menu is preferably only present when the conversation is live. FIG. 4 illustrates the appearance of these various prompt menus throughout the conversation by indicating the FIG. number corresponding to the appropriate prompt menu at the appropriate point in the conversation. In addition, as was previously mentioned, the symbol "#" in FIG. 4 indicates the entry of a line of conversation by the London Market Taker 602 and where this symbol is absent it indicates the receipt of a line of conversation entered by the New York Market Maker 98a at the other end of the conversation.

Figure 7:
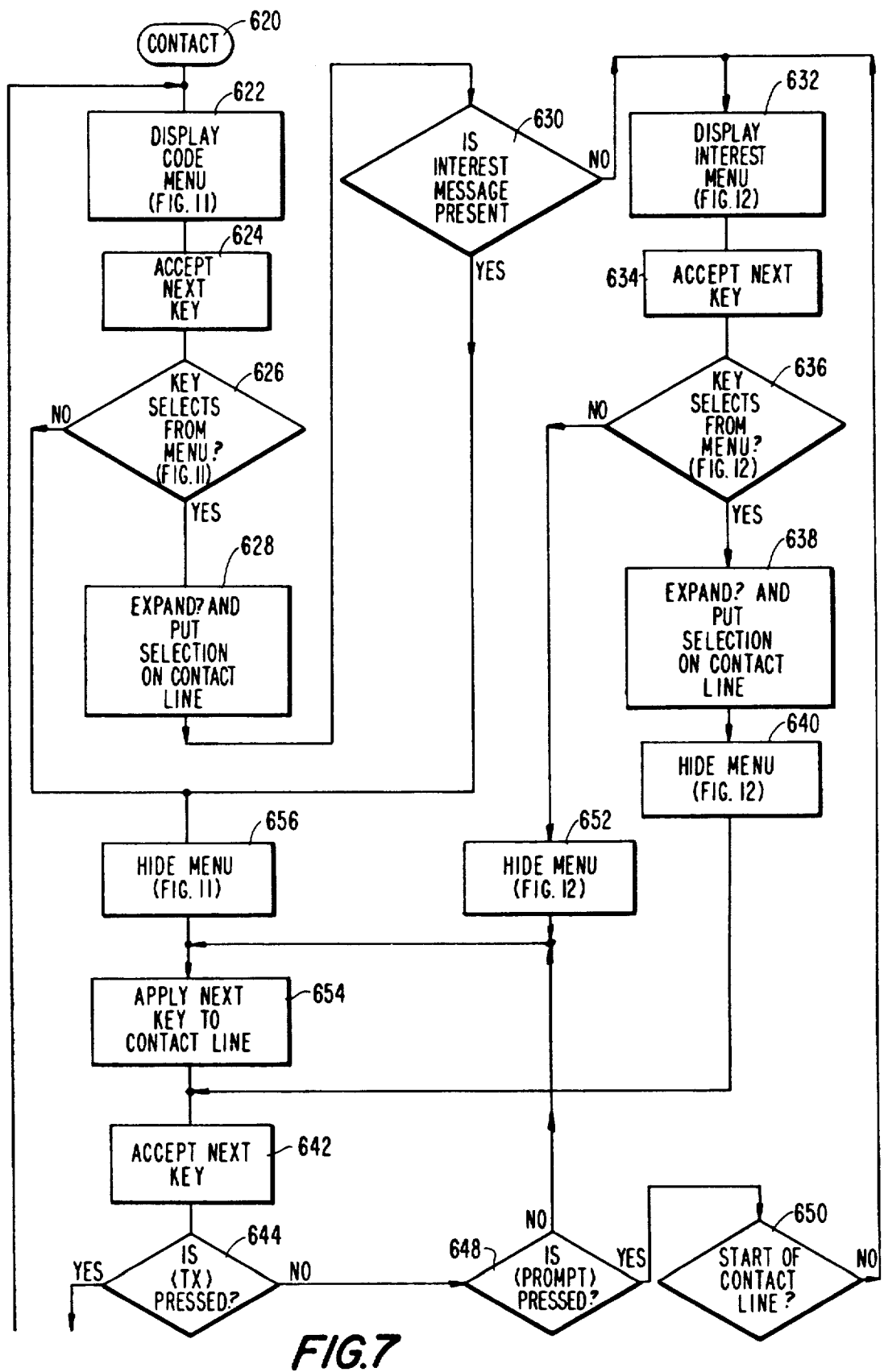
FIG. 7 is a diagrammatic flow chart of the handling of context sensitive prompts with the contact line as it relates to the conversation of FIG. 4 from the side of the Market Taker.
Figure 8:
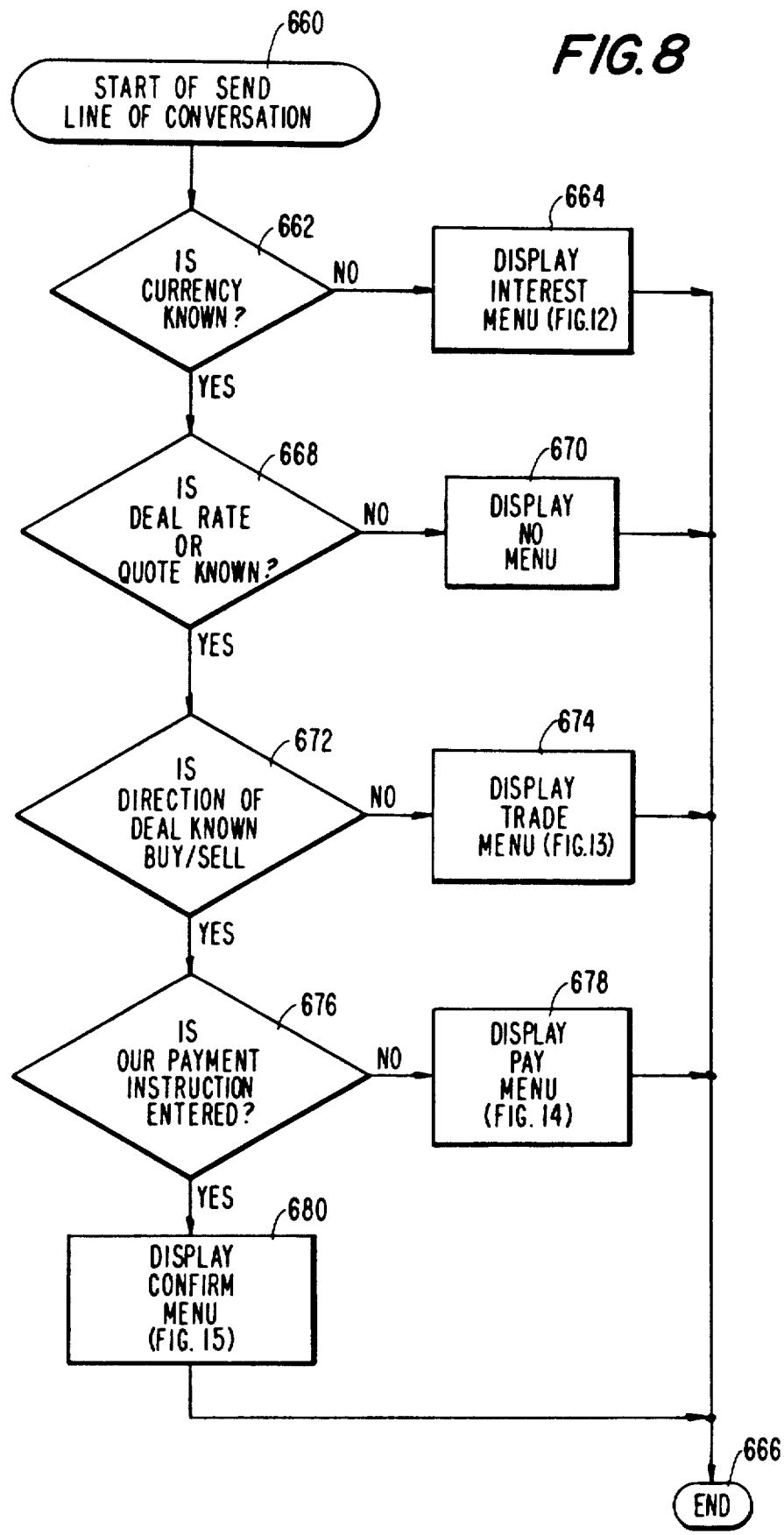
FIG. 8 is a diagrammatic flow chart of the handling of context sensitive prompts from the conversation analysis in the Market Taker's conversation of FIG. 4.
Figure 9:
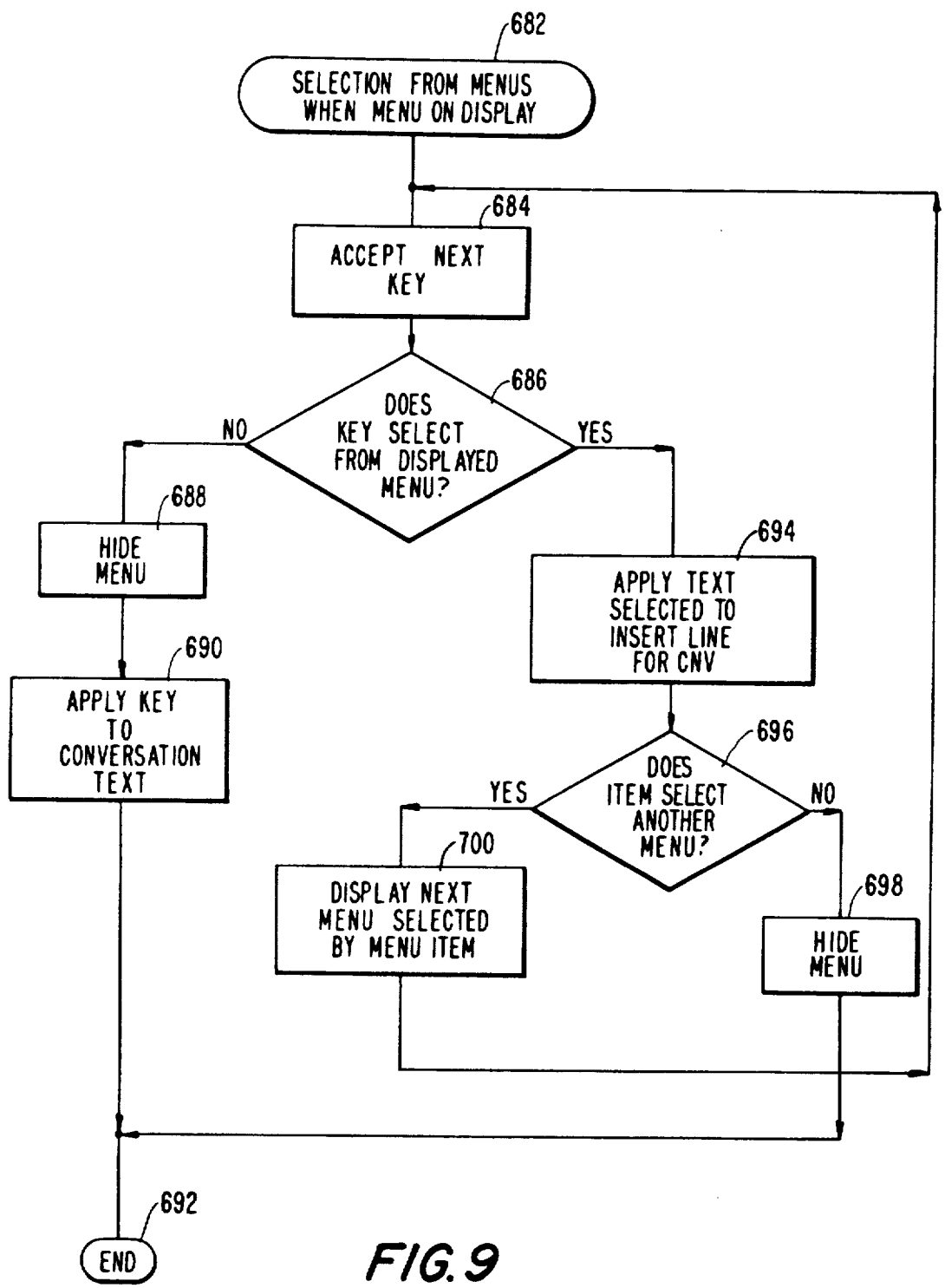
FIG. 9 is a diagrammatic flow chart of the key selection procedure in connection with selection from the prompt menus in accordance with the present invention and is applicable to the exemplary conversations of FIGS. 4, 5 and 6 with respect to the Market Maker, Market Taker and Market Capture, by way of example.

Referring now to FIGS. 7-9, the aforementioned prompt menu selection sequence for providing the context sensitive or analysis driven prompts shall be described in greater detail, with the assumption being made that, by way of example, the actual conversation analysis is accomplished in the manner previously described by utilizing the conversation analysis software of Table B, which is stored in the analysis server 418. As shown and preferred in FIG. 7, the CONTACT key is depressed as represented by reference numeral 620. The CODE menu of FIG. 11 is then shown on the screen, as represented by reference numeral 622, and the next key is then accepted, as represented by reference numeral 624. A determination is then made as to whether the key has selected an item from the CODE menu as represented by reference numeral 626. If a contact from the CODE menu has been selected, then the symbol is expanded and the selection is put on the contact line, as represented by reference numeral 628. A determination is then made as to whether an interest message is present, as represented by reference 630. If no interest message is Present, then the INTEREST menu of FIG. 12 is displayed as represented by reference numeral 632. The next key is then accepted, as represented by reference numeral 634, and a determination is then made as to whether the key has selected an item which appears in the INTEREST menu of FIG. 12, as represented by reference numeral 636. If the item does appear in the INTEREST menu then, if necessary, it is expanded and the selection is put on the contact line, as represented by reference numeral 638, and then the INTEREST menu is hidden, as represented by reference numeral 640, and the system is ready to accept the next key, as represented by reference numeral 642. The system then determines if the TRANSMIT or TX key has been pressed, as represented by reference numeral 644 and, if the answer is yes, contact is made, as represented by the reference numeral 646. If the TRANSMIT key has not been pressed, then the system determines if the PROMPT key has been pressed, as represented by reference numeral 648. If the PROMPT key has been pressed, then a determination is made as to whether it is the start of the contact line, as represented by reference numeral 650. If it is the start of a contact line, then the sequence repeats itself and the system displays the CODE menu, as represented by reference numeral 622. If it is not the start of a contact line, then the prior sequence, starting with the display of the INTEREST menu, as represented by reference numeral 632, is repeated.

With respect to that sequence, which starts with the display of the INTEREST menu 632, if a determination is made that the key selected is not from the INTEREST menu, then the INTEREST menu of FIG. 12 is hidden, as represented by reference numeral 652, and the next key is applied to the contact line, as represented by reference numeral 654. The next key is then accepted, as represented by reference numeral 642, and a determination is made as to whether the TRANSMIT key has been pressed, as represented by numeral 644.

Similarly, if an interest message is already present after the dealer to be contacted has been placed on the contact line, as represented by reference numeral 630, the CODE menu of FIG. 11 is hidden, as represented by reference numeral 656, and the next key is applied to the contact line, as represented by reference numeral 654. Thereafter, as previously mentioned, the next key is accepted, as represented by reference numeral 642, and a determination is made as to whether it is the TRANSMIT key which has been pressed, as represented by reference numeral 644.

Referring now to FIG. 8, we shall describe the sequence with respect to the handling of the prompts from the conversation analysis of the Market Taker's conversation, in which the actual menu displayed preferably depends on where you are in the conversation being analyzed. Thus, as shown and preferred in FIG. 8, at the start of the SEND line in the conversation, as represented by reference numeral 660, a determination is made as to whether, at this point, the currency is known, as represented by reference number 662. If the currency is not known, then the INTEREST menu of FIG. 12 is displayed on the screen, such as represented by reference numeral 664, and this sequence is ended, as represented by reference numeral 666. If, however, the currency is known, a determination is then made as to whether the deal rate or quote is known, as represented by reference numeral 668. If the deal rate or quote is not known then no display provided, as represented by reference numeral 670, and the routine is ended. If, however, the deal rate or quote is known, then a determination is made whether the direction of the deal, that is BUY or SELL, is known, as represented by reference numeral 672. If the direction of the deal is not known, then the TRADE menu of FIG. 13 is preferably displayed on the screen, such as represented by reference numeral 674, and this procedure is then ended. If, however, the direction of the deal is known, then a determination is made as to whether the Market Taker's payment instruction has been entered, as represented by reference numeral 676. If the payment instruction has not been entered, then the PAY menu of FIG. 14 is displayed on the screen, such as represented by reference numeral 678 and the routine is ended. If, however, the payment instruction has been entered, then the CONFIRM menu of FIG. 15 is displayed on the screen, such as represented by reference numeral 680 and, thereafter, this routine is ended.

Referring now to FIG. 9, this illustrates the treatment of the key strokes after the appropriate prompt menu has been displayed and applies equally to the various situations presented in FIGS. 4-6 for the Market Taker, the Market Maker, and the Market Maker Capture Sequence, respectively. Thus, as shown and preferred in FIG. 9, a selection is made from the prompt menu when the menu is on display by striking the appropriate key, or by moving the mouse to the appropriate position or by typing in the appropriate code, such as represented by reference numeral 682. The system is then ready to accept the next key, as represented by reference numeral 684, and a determination is then made as to whether the key selected is from the particular prompt menu being displayed, such as represented by reference numeral 686. If the key selected is not from the displayed prompt menu, then the prompt menu which was displayed is hidden, as represented by reference numeral 688, and the key is applied to the conversation text, as represented by reference numeral 690, and the routine ended, as represented by reference numeral 692. If, however, the key which has been selected is from the displayed prompt menu, then the text selected is applied to the insert line for the conversation, as represented by reference numeral 694, and a determination is made as to whether this causes a selection of another prompt menu, as represented by reference numeral 696. If this does not cause a selection of another prompt menu, then the one which has been displayed is hidden, as represented by reference numeral 698, and the routine is ended. If, however, this does cause the selection of another prompt menu, then this new prompt menu is displayed on the screen, such as represented by reference numeral 700, and the sequence repeats itself, starting with the acceptance of the next key, as represented by reference numeral 684, and a determination of whether this next key selects from the then displayed menu, as represented by reference numeral 686.

Referring now to FIGS. 5, 9, 10, 16 and 17, the same conversation shall now be looked at from the side of the New York Market Maker 98a. Again, in this instance, as previously mentioned, the symbol "#" represents entry of a line of conversation by the Market Maker as it appears on his screen, and the absence of this symbol now represents entry of a line of conversation by the Market Taker, which has been received by the Market Maker. In this regard, the two prompt menus which are displayed to the Market Maker during this conversation are the Acceptor's PAY menu of FIG. 16, which is displayed when a deal has been recognized, and the Acceptor's CONFIRM menu of FIG. 17, which is displayed after the deal pay instructions have been issued and remains on the screen 410 of the Market Maker, preferably until the end of the conversation, the start of another deal, or its removal by the user. With respect to the Acceptor's PAY menu of FIG. 16, all the information required for the menu items is known. The volume for the deal is taken from the Market Taker's deal request, but, if desired, can be edited after a menu item has been selected if such editing is required. If the acceptor has already agreed to the volume, or specified a payment instruction, the part of the text agreeing to the volume would preferably be omitted.

The sequence of displaying these prompt menus based on the conversation analysis of the Market Maker's conversation, in accordance with the system of the present invention, is shown in greater detail in FIG. 10. Thus, at the start of the SEND line in the Market Maker's conversation, as represented by reference numeral 702, a determination is made as to whether the currency and deal rate or quote are known, as represented by reference numeral 704. If the currency and deal or quote are not known, then no display is provided, as represented by reference numeral 706, and the routine is ended, as represented by reference numeral 708. If, however, the currency and deal rate or quote are known, then a determination is made as to whether the direction of the deal, that is BUY or SELL, is known, as represented by reference numeral 710. If the direction of the deal is not known, then no display is provided, as represented by reference numeral 712, and the sequence is ended. If, however, the direction of the deal is known, then a determination is made as to whether the Market Maker's payment instructions have been entered, as represented by reference numeral 714. If the payment instructions have not been entered, then the Acceptor's PAY menu of FIG. 16 is displayed on the screen 410, as represented by reference numeral 716, and the sequence is ended. If, however, the payment instructions for the Market Maker have been entered, then the Acceptor's CONFIRM menu of FIG. 17 is displayed on the screen 410, as represented by reference numeral 718, and the sequence is ended.

As was previously mentioned, the conversation analysis system of the present invention can be used in conjunction with the aforementioned context sensitive or analysis driven prompts to facilitate offline capture of deals. An example of such an offline capture or entry of the same deal, as was previously described with reference to FIGS. 4 and 5, is illustrated in FIG. 6 which shows the Market Maker Capture Sequence, and shall be described in greater detail hereinafter with reference to FIGS. 6, 9 and 18-27. As will be described hereinafter, the Market Maker Capture Sequence is effectively the same as a combination of the Market Taker and Market Maker sequence where a single individual handles both sides of the conversation. During the capture process, preferably the user is always presented with a prompt at the start of each line. Thus, after pressing the CAPTURE key, the user is preferably expected to enter the bank that the deal is with. To facilitate this, the BANK menu of FIG. 20 is preferably displayed on a screen 410. This BANK menu allows the selection of bank name from a list of banks, preferably in alphabetic order, and is used in offline deal capture, preferably for the entry of the counterparty. After selection of a bank name, preferably a TOWN prompt menu, such as represented by FIG. 21, is displayed so as to enable the user to specify a town. When a town is selected in an offline conversation, it is preferably assumed to be followed by a TRANSMIT(TX). Thereafter, the PERIOD DISPLAY prompt menu of FIG. 22 is displayed on the screen 410 of the user. If a deal type, such as SPOT is selected from the PERIOD menu of FIG. 22, then the next prompt menu offers a selection of currencies in the CURRENCY prompt menu of FIG. 23. When the currency and deal have been established, the user is then prompted to enter the rate for the deal in the PROMPT menu of FIG. 24. Once the rate or rates are known the user can then preferably select from the TRADE menu of FIG. 25. Thereafter, preferably the PAY menu of FIG. 26 is displayed. This PAYMENT INSTRUCTION menu is preferably similar to that previously described with reference to the normal Market Maker operation with reference to FIG. 16, however, there is no need to state "for agreed" or to "confirm". The THEIR PAY menu of FIG. 27 is then preferably displayed on the screen so as to prompt the Market Maker capturing the offline deal to enter the other party's payment instructions. This would, preferably complete entry of the offline deal except if a broker were employed, in which instance the user could select from the CONFIRM menu and enter the broker's name.

Figure 18:
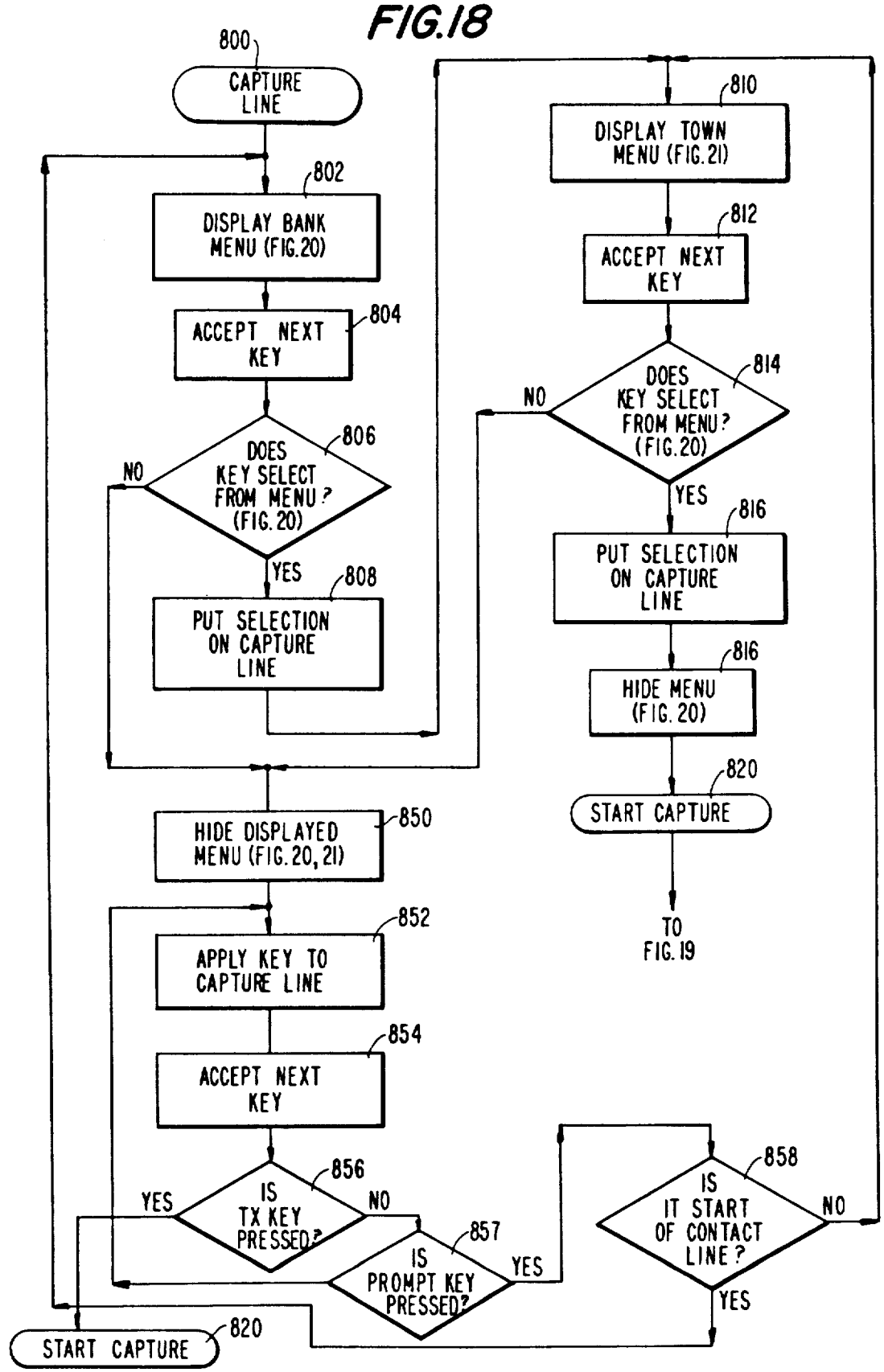
FIG. 18 is a diagrammatic flow chart of offline data entry in connection with data capture of an offline deal corresponding to the conversation illustrated in FIG. 6.

Referring now to FIG. 18, the aforementioned offline data capture data entry sequence shall be described in greater detail. As shown and preferred, the user enters the capture sequence by pressing the CAPTURE key as represented by reference numeral 800. The BANK menu of FIG. 20 is then displayed on the screen as represented by reference numeral 802. The next key is then accepted as represented by reference numeral 804 and a determination is made as to whether the key has selected an item from the menu of FIG. 20, as represented by reference numeral 806. If the key has selected an item displayed in the BANK menu of FIG. 20, the selection is then put on the capture line of the display, as represented by reference numeral 808, and the TOWN menu of FIG. 21 is then displayed, as represented by reference numeral 810. After the TOWN menu prompt has been displayed, the next key is accepted, as represented by reference numeral 812, and a determination is made as to whether the key has selected an item from the TOWN menu, as represented by reference numeral 814. If the key has selected an item from the TOWN menu of FIG. 21, then the selection is put on the capture line, as represented by reference numeral 816, and the menu of FIG. 21 is then hidden, as represented by reference numeral 818. The start of the actual capture sequence is then ready to begin, as represented by reference numeral 820, with this sequence being shown in greater detail in FIG. 19. FIG. 19 illustrates the handling of the prompts from the conversation analysis during offline data entry starting out with a start of a line in the capture sequence, as represented by reference numeral 820. A determination is then made as to whether the deal type is known, as represented by reference numeral 822. If the deal type is not known then the PERIOD DISPLAY prompt menu of FIG. 22 is displayed on the screen, as represented by reference numeral 824. If the deal type, however, is known, then a determination is made as to whether the currency is known, as represented by reference numeral 826. If the currency is not known, then the CURRENCY menu of FIG. 23 is displayed on the screen 410, such as represented by reference numeral 828. If, however, the currency is known, then a determination is made as to whether the rate is known, as represented by reference numeral 830. If the rate is not known then the PROMPT for the rate to be entered illustrated in FIG. 24 is displayed on the screen, such as represented by reference numeral 832. If, however, the rate is known then a determination is made as to whether the direction of the deal, that is BUY or SELL, is known, as represented by reference numeral 834. If the direction of the deal is not known then the TRADE menu of FIG. 25 is displayed on the screen, such as represented by reference number 836. If the direction of the deal is known, then the determination is made as to whether the payment instructions are known, as represented by reference numeral 838. If the payment instructions are not known then the PAY menu of FIG. 26 is displayed on the screen, as represented by reference numeral 840. If, however, payment instructions are known then determination is made as to whether the other party's payment instructions, known as their pay, is known, as represented by reference numeral 842. If their payment instructions are not known, then the THEIR PAY prompt menu of FIG. 27 is displayed on the screen, such as represented by reference numeral 844. If their payment instructions are known, then a prompt is provided for the ticket to be confirmed, such is represented by reference numeral 846, and the sequence is ended, as represented by reference numeral 848.

Referring once again to FIG. 18, if, after the BANK menu is shown and a key selected which is not from the BANK menu of FIG. 20, then the BANK menu of FIG. 20 is hidden, as represented by reference numeral 850. The same is preferably true if the key selected after display of the TOWN prompt menu of FIG. 21 is not from an item on that menu. After these menus have been hidden, the key is applied to the capture line, as represented by reference numeral 852, and the next key is accepted, as represented by reference numeral 854. A determination is then made as to whether or not the TRANSMIT(TX) key has been pressed, as represented by reference numeral 856. If the TRANSMIT key has been pressed then the capture sequence of FIG. 19 is initiated. If, however, the TRANSMIT key has not been pressed, then a determination is made as to whether the PROMPT key has been pressed, as represented by reference numeral 857. If the PROMPT key has not been pressed then the sequence loops back to apply the key to the capture line, as represented by reference numeral 852. If the PROMPT key has been pressed, then a determination is made as to whether it is the start of a contact line, as represented by reference numeral 858. If it is not the start of a contact line then the sequence repeats itself by displaying the TOWN menu, as represented by reference numeral 810, and starting from this point. If, however, it is the start of a contact line, then the sequence repeats itself by displaying the BANK menu, such as represented by reference numeral 802.

It should be noted that preferably there is always a current prompt menu depending on the context of the conversation in the system of the present invention. This prompt menu can be automatically displayed or, if desired, can only be displayed when the PROMPT key is pressed. Preferably, if automatic prompt menus are to be displayed in the system of the present invention, the current menu is normally displayed when a new line is started and the conversation is in the SEND state, with the exceptions being if the menu would be the INDEX menu and if the last menu in this SEND state was not used. In addition, as previously mentioned, when a capture command is entered the BANK menu of FIG. 20 is automatically displayed on the screen. Similarly, when a contact command is entered, the CODE menu is preferably automatically displayed on the screen.

As was previously mentioned, tickets are preferably created in the system of the present invention as the system extracts information by analyzing conversations, with the display of the ticket being generated appearing in area 558 on the screen 410. Preferably, only one analysis can be associated with one conversation and, after a user confirms the analysis of the current conversation, a ticket can be printed on the ticket printer 404 or 406 depending on whether it is the Market Maker or the Market Taker, respectively, when the conversation is next terminated or printed. Preferably, the ticket printer 404, 406 is a separate printer with the same characteristics as the conversation printer 102a, 604a; namely, it accepts serial data and it prints on continuous paper. As a conversation takes place, the associated conversation analysis area on the screen 410 preferably shows a summary of the analysis information, such as in area 558, which, if desired, can become a fully expanded version of the current analysis which is then displayed in the general display area 554. When the conversation is terminated and saved, preferably the analysis is saved with it. Preferably, in the system of the present invention, conversations and analyses are saved and deleted only as more storage is required. Before a conversation analysis can be confirmed in the system of the present invention, preferably it must contain at least the following information about the deal: the deal type, the deal direction, the currency or currencies, the amount, the rate or rates, and the value date. Thereafter, the user can confirm the conversation analysis by pressing the CONFIRM key. Once an analysis has been set into the confirming mode, the next time the conversation is ended on the dealer's screen 410, preferably a ticket is printed and, thereafter, the conversation cannot be edited any further. Preferably, in the system of the present invention, a confirmed analysis cannot be marked as cancelled or wrong and, therefore, the only way to cancel the effect of a confirmed deal is to enter a compensating deal by an offline conversation. If the analysis has not been confirmed, it can then be marked as cancelled or wrong at any time during a real or offline conversation or when wrapping up a conversation by pressing the CANCEL or WRONG keys. An analysis marked as cancelled can be changed to wrong and vice versa, and an analysis marked as cancelled or wrong can be confirmed. As was previously mentioned, in the preferred system of the present invention, the way to generate a ticket on the ticket printer 404, 406, is by setting the conversation being analyzed to the CONFIRMING state which ends the analysis. It should be noted that in the system of the present invention, the conversation summary analysis which ultimately results in the generated ticket is updated during the course of the dialogue or conversation and provides additional visual feedback to the dealer. This conversation summary analysis area 558 of the screen 410 preferably contains or displays information such as the type of deal, the analysis status, the period, the volume and volume currency, the rates and currencies involved, the value dates, and whether all payment instructions on each side have been entered. If this analysis finds inconsistent data, as previously mentioned, the fields concerned in this display are preferably highlighted to alert the user. With respect to the analysis status, there are preferably seven areas of analysis which are preferably indicated in the display area 558. These various analysis status indications are NO DEAL where the system does not think there has been a deal, INCOMPLETE where the system thinks there has been a deal but has not been able to extract all the details needed for the analysis to be confirmed, EXTRACTED where the system thinks there has been a deal and has extracted sufficient details needed for the analysis to be confirmed, CONFIRMING where the dealer has confirmed the analysis but the conversation has not been ended or printed, CONFIRMED where the dealer has confirmed the analysis and the relevant part of the conversation has been ended and sent for printing, CANCELLED where the dealer has marked the analysis as cancelled, and WRONG where the dealer has marked the analysis as wrong. When a conversation starts the status is NO DEAL with the subsequent events causing it to change. Thus the status changes from NO DEAL to INCOMPLETE when the conversation analysis finds a line which it understands as a deal, such as a line which specifies an amount if being bought or sold. The analysis status then changes from INCOMPLETE to EXTRACTED when the conversation analysis finds the last piece of information it needs to allow the analysis to be confirmed. The analysis then changes from EXTRACTED, CANCELLED, or WRONG, to CONFIRMING, when the dealer has pressed CONFIRMED and the analysis has sufficient relevant information for the deal to be confirmed. The analysis status changes from CONFIRMING to CONFIRMED when the dealer terminates the conversation or presses the PRINT key. The analysis status changes from EXTRACTED or INCOMPLETE or NO DEAL when the system receives information from the counterparty indicating that some of the relevant text has not been received or has been backed out by an interrupt, which is normally indicated to the dealer as an interrupt or as a fault in the conversation. In order to change the analysis status to CANCELLED, the dealer presses the CANCELLED key from any status except CONFIRMED. This is also true with respect to changing the analysis status to WRONG. This is accomplished by the dealer pressing the WRONG key from any status, except CONFIRMED, to WRONG.

In the system of the present invention, pressing the TICKET key causes the expanded analysis display mode to be entered. As was previously mentioned, in this mode, the general display area of the screen 554 is preferably used to display the expanded analysis for the current conversation. If there is no current conversation, this general area display 554 is preferably blank except for the heading ANALYSIS OF CONVERSATION. The expanded analysis preferably shows the full contents of all the fields that can appear on the analysis except that payment instructions may, if necessary, be truncated. In the case of forward deals, preferably the information for both value dates is shown, requiring four transactions. While in expanded analysis display mode, the expanded analysis on display is preferably kept up-to-date with the conversation. Swapping between two conversations would automatically preferably swap between the two expanded analyses so that the one for the current conversation was always visible. The expanded analysis display mode preferably remains in effect until a different use of the general display area 554 is requested. Preferably, if a printout of the conversation analysis is requested, the output on the conversation printer 102a, 604a is similar to that of the displayed window, although the payment instructions may be moved to a separate line if desired. With respect to printing a ticket with the ticket printer 404, 406, the format of the ticket is preferably similar to the expanded analysis, however the order of the information may be changed to present the more critical information first. Thus, by utilizing the system of the present invention, in which conversation analysis is employed, context sensitive or analysis driven prompts not only facilitate the rapid conduct of the conversation or rapid capture of offline deals, but facilitate the real time creation of tickets as well.

| AMOUNT    | H | READCONV  | H |          |   |           |   |           |   |
|-----------|---|-----------|---|----------|---|-----------|---|-----------|---|
| COMPARSE  | H | TYPES     | H | DATE     | H | DATEPARS  | H | DEBUG     | H |
| DEPOSIT   | H | DEPOSIT2  | H | DEPPARS  | H | PAY2      | H | FORWARD   | H |
| FWDPARS   | H | FWDRATES  | H | INITPARS | H | INSERT    | H | MISCPARS  | H |
| NUMBER    | H | NUMBER2   | H | OUTPARS  | H | PARSE     | H | PAY       | H |
| PERIOD    | H | READ      | H | SPOT     | H | SPOT2     | H | SPOTPARS  | H |
| CA_PMT    | H | VOCAB     | H | FRX      | H | GETFRX    | H | DATEPROC  | H |
| TICKMES   | H | CASERVER  | H | CAMESAGE | H | CADATA    | H | OGB       | H |
| QTW_STOR  | H | QTW_SRCH  | H | QTW_RPRT | H | QTW_REVI  | H | QTW_PRNT  | H |
| STATES    | H | QTW_MENU  | H | QTW_EDIT | H | QTW_AUDT  | H | MACROS    | H |
| QTW_ANAL  | H | QTW_TKTS  | H | CURRDATA | H | ANALDATA  | H | CAINIT    | H |
| CURRENCY  | H | QTW_DATA  | H | TWPKTNOS | H | QKT_DART  | H | QKT_MONI  | H |
| CAMONIT   | H | CAGLOB    | H | QUERY    | H | CURINFO   | H | PROMPT    | H |

```
/********************************************************************
 *                                                                  *
 *  amount.h - Routines to handle amounts                           *
 *                                                                  *
 *  Written by Alan Stokes                                          *
 *                                                                  *
 *  Copyright (C) 1987 Richards Computer Products Ltd               *
 *                                                                  *
 ********************************************************************/ if !defined(AMOUNT_H)
define AMOUNT_H

/* Attempt to parse a number as an amount */
extern BOOL parseamount(BOOL);

#endif

/********************************************************************
 *                                                                  *
 *  readconv.h - Read a conversation from a file into the text area *
 *                                                                  *
 *  Written by Alan Stokes/Roger Abbott                             *
 *                                                                  *
 *  Copyright (C) 1987 Richards Computer Products Ltd               *
 *                                                                  *
 ********************************************************************/ extern int readconv( int First, PSTR Buffer, int BufferSize,
DATESTRUCT *Date, int *TheEnd );
extern FILE *convfile;
```

```c
/************************************************************************
 *                                                                      *
 * comparse.h - Common parsing routines                                 *
 *                                                                      *
 * Written by Alan Stokes                                               *
 *                                                                      *
 * Copyright (C) 1987 Richards Computer Products Ltd                    *
 *                                                                      *
 ************************************************************************/ if !defined(COMPARSE_H)
define COMPARSE_H

/* Handle the common subset of parsing */
extern int commonparse(void);

/* Fill in a text field containing the rest of the current line. */
extern BOOL skiptext(TEXTPOS *);

#endif
/*
 *      Standard Type Declaration
 *
 * $Header:   V:/caserver/overlay/h/types.h_v   1.0   22 Jul 1988 15:22:50   Duncan $
 *
 * $Revision:   1.0 $
 *
 * $Date:   22 Jul 1988 15:22:50 $
 *
 * $Author:   Duncan $
 *
 * (c) Richards Computer Products Ltd
 *
 * $Logfile:   V:/caserver/overlay/h/types.h_v $
 *
 * $Workfile:   types.h $
 *
 * $Log:   V:/caserver/overlay/h/types.h_v $
 *
 *    Rev 1.0   22 Jul 1988 15:22:50   Duncan
 * Initial revision.
 *
 *    Rev 1.0   24 May 1988 17:15:02   Graham
#if !defined(TYPES_H)
#define TYPES_H
typedef unsigned charBYTE;
typedef unsigned shortWORD;
typedef unsigned longDWORD;
typedef char*PSTR;
typedef char far*LPSTR;
typedef intBOOL;
typedef unsigned intboolean;
typedef WORDHANDLE;
typedef void far*FARPTR;
typedef int (far pascal *FARPROC)();
typedef int (near pascal *NEARPROC)();

#define NEAR near
#define FAR far
#define PASCAL pascal
#define VOID void
define CDECL cdecl if !defined(NULL)
      #define NULL 0
   #endif
#endif
```

```
/***************************************************************
 *                                                              *
 *  date.h - Definitions date-handling procedures               *
 *                                                              *
 *  Written by Alan Stokes/Roger Abbott                         *
 *                                                              *
 *  Copyright (C) 1987 Richards Computer Products Ltd           *
 *                                                              *
 ***************************************************************/ if !defined(DATE_H)
define DATE_H

/* Number of seconds in a day (must be a long constant) */
#define SECONDSPERDAY(60L*60*24)

/* Compare two split dates */
extern BOOL samesplit(SPLITDATE *, SPLITDATE *);

/* Convert a date to a date structure */
extern void datetostruct(DATE d, DATESTRUCT far *s);

/* Convert a date structure to a date */
extern DATE structtodate( DATESTRUCT far *s);

/* Compare two date structures */
extern int datecomp( DATESTRUCT far *s1, DATESTRUCT far *s2 );

/* Return how many days there are in a month */
extern int daysinmonth(DATESTRUCT far *s);

/* Return the day of the week */
extern  int DayOfWeek(DATE Days);

/* Write a DATE as DDMMMYY */
extern void writedate(DATE);

/* Write a DATE with the day as Ddd nn Mon yyyy */
extern void wrwdate( DATE );

/* Check that two dates are reasonably close */
extern BOOL similardate(DATE, DATE);

#endif

/***************************************************************
 *                                                              *
 *  datepars.h - Routines to parse dates                        *
 *                                                              *
 *  Written by Alan Stokes                                      *
 *                                                              *
 *  Copyright (C) 1987 Richards Computer Products Ltd           *
 *                                                              *
 ***************************************************************/ if !defined(DATEPARS_H)
define DATEPARS_H

/* Parse a single value date */
extern BOOL parsedate(BOOL, FIELDNAME);

/* Routine to parse a single or double date */
extern BOOL parsedates(BOOL);

#endif

/***************************************************************
 *                                                              *
 *  debug.h - Useful routines for debug mode                    *
 *                                                              *
 *  Written by Alan Stokes/Roger Abbott                         *
 *                                                              *
 *  Copyright (C) 1987 Richards Computer Products Ltd           *
 *                                                              *
 ***************************************************************/
```

```c
#if !defined(DEBUG_H)
#define DEBUG_H

/* Procedure to echo a change to a field on the screen */
extern void echo(FIELDNAME, BOOL);

/* Echo a conversation charcter from an 'Analyse Text' message */
extern void EchoInput( int ch );

/* Procedure to echo a change to the output ticket on the screen */
extern void EchoOutput(FIELDNAME);
extern void EchoNotify( LPTKTITEM Item );

/* Procedure to echo a change to a query status on the screen */
extern void EchoQuery(FIELDNAME, BOOL);

/* Procedure to display a symbol as it is read in */
extern void showsym(void);

/* Variables to control display and other options */
extern BOOL Optc, Opts, Optt, Opto, Optn, Opta;
extern int ScrollAreaTop;

/* This variable is in CAserver but put it here to avoid having to
include the whole of cadata.h and ticket.h etc. */
extern int CurrentCAcnvid;

extern void InitDebugDisplay( int MaxConvsDisplayed );
extern void WriteScrollArea( int ch );
extern void ClearWindow( void );
extern void SetCursor( int x, int y );
extern void InitScreen( void );

#endif

/*******************************************************************
 *                                                                 *
 * deposit.h - Routines to handle deposit rates                    *
 *                                                                 *
 * Written by Alan Stokes                                          *
 *                                                                 *
 * Copyright (C) 1987 Richards Computer Products Ltd               *
 *                                                                 *
 *******************************************************************/ if !defined(DEPOSIT_H)
define DEPOSIT_H

/* Parse a single deposit rate and convert it to the standard form. */
extern BOOL parsedep(BOOL);

/* Parse a deposit quote */
extern BOOL parsedeps(void);

#endif

/*******************************************************************
 *                                                                 *
 * deposit2.h - Routines to manipulate deposit rates               *
 *                                                                 *
 * Written by Alan Stokes                                          *
 *                                                                 *
 * Copyright (C) 1987 Richards Computer Products Ltd               *
 *                                                                 *
 *******************************************************************/ if !defined(DEPOSIT2_H)
define DEPOSIT2_H include "types.h"

/* Convert an integer number of 32nds to a string containing a deposit rate in
 * the standard form.
 */
```

```
extern void inttodep(int, PSTR);

/* Convert a string containing a deposit rate to an integer */
extern int deptoint(PSTR);

#endif

/***************************************************************
 *                                                              *
 * deppars.h - Routines for analysing a deposit deal            *
 *                                                              *
 * Written by Alan Stokes                                       *
 *                                                              *
 * Copyright (C) 1987 Richards Computer Products Ltd            *
 *                                                              *
 ***************************************************************/ if !defined(DEPPARS_H)
define DEPPARS_H

/* Parse a deposit conversation. */
extern int depparse( void );

#endif

/***************************************************************
 *                                                              *
 * pay2.h - More routines for handling payment instructions     *
 *                                                              *
 * Written by Alan Stokes                                       *
 *                                                              *
 * Copyright (C) 1987 Richards Computer Products Ltd            *
 *                                                              *
 ***************************************************************/ if !defined(PAY2_H)
define PAY2_H

/* Insert a text field as a payment instruction */
extern BOOL insertpay(TEXTPOS *, BOOL, BOOL, BOOL, int, BOOL);

/* Skip through a payment instruction */
extern BOOL skippay(TEXTPOS *, BOOL);

#endif

/***************************************************************
 *                                                              *
 * forward.h - Routines to handle forward rates                 *
 *                                                              *
 * Written by Alan Stokes                                       *
 *                                                              *
 * Copyright (C) 1987 Richards Computer Products Ltd            *
 *                                                              *
 ***************************************************************/ if !defined(FORWARD_H)
define FORWARD_H

/* Parse a forward quote */
extern BOOL parseforwards(BOOL);

/* Parse a single forward rate */
extern BOOL parseforward(BOOL);

#endif

/***************************************************************
 *                                                              *
 * fwdpars.h - Routines to parse a forward deal                 *
 *                                                              *
 * Written by Alan Stokes                                       *
 *                                                              *
 * Copyright (C) 1987 Richards Computer Products Ltd            *
 *                                                              *
 ***************************************************************/
```

```
#if !defined(FWDPARS_H)
#define FWDPARS_H

/* Parse a forward conversation. */
extern int fwdparse( void );

#endif

/************************************************************
 *                                                          *
 * fwdrates.h - Handle rates in a forward deal              *
 *                                                          *
 * Written by Alan Stokes                                   *
 *                                                          *
 * Copyright (C) 1987 Richards Computer Products Ltd        *
 *                                                          *
 ************************************************************/ if !defined(FWDRATES_H)
define FWDRATES_H

/* Parse the rates in a forward conversation */
extern BOOL parserates(BOOL);

#endif

/************************************************************
 *                                                          *
 * initpars.h - Initial parsing (deal type unknown)         *
 *                                                          *
 * Written by Alan Stokes                                   *
 *                                                          *
 * Copyright (C) 1987 Richards Computer Products Ltd        *
 *                                                          *
 ************************************************************/ if !defined(INITPARS_H)
define INITPARS_H

/* Procedure to parse a conversation when the deal type is unknown. As soon
 * as we know the deal type the procedure returns with the deal type.
 */
extern int initparse( void );

#endif

/************************************************************
 *                                                          *
 * insert.h - Routines to manipulate the ticket             *
 *                                                          *
 * Written by Alan Stokes                                   *
 *                                                          *
 * Copyright (C) 1987 Richards Computer Products Ltd        *
 *                                                          *
 ************************************************************/ if !defined(INSERT_H)
define INSERT_H

/* Procedure to insert a value into the ticket (to avoid problems, there is
 * one preocedure for each sort of value)
 */
extern void insertnum(FIELDNAME, int, FIELDSTATUS);
extern void insertstring(FIELDNAME, PSTR, FIELDSTATUS);
extern void inserttext(FIELDNAME, TEXTPOS *, FIELDSTATUS);
extern void insertdate(FIELDNAME, SPLITDATE *, FIELDSTATUS);
extern void CopyToOutputTicket( FIELDNAME field );

/* Procedures to handle the ticket */ extern BOOL know(FIELDNAME);
extern void setstatus( void );
extern void delfield(FIELDNAME);

#endif
```

```
/************************************************************
 *                                                          *
 * miscpars.h - Useful routines for parsing                 *
 *                                                          *
 * Written by Alan Stokes                                   *
 *                                                          *
 * Copyright (C) 1987 Richards Computer Products Ltd        *
 *                                                          *
 ************************************************************/ if !defined(MISCPARS_H)
define MISCPARS_H

/* Check for a possible amount specification; parameter indicates forcing
 * mode.  Returns whether it succeeded.
 */
extern BOOL checkamount(BOOL);

/* Handle a single currency found in the conversation.  We may insert the
 * currency into the ticket, possibly as the amount currency.
 */
extern BOOL handlecur(int, BOOL, BOOL);

/* Handle a currency specification (of one or two currencies). */
extern BOOL currencies(void);

#endif

/************************************************************
 *                                                          *
 * number.h - Routines for handling numeric symbols         *
 *                                                          *
 * Written by Alan Stokes                                   *
 *                                                          *
 * Copyright (C) 1987 Richards Computer Products Ltd        *
 *                                                          *
 ************************************************************/ if !defined(NUMBER_H)
define NUMBER_H

/* Read the next numeric character */
extern char nextnumch(BOOL);

/* Put back the last character, so nextnumch() will return the same value
 * a second time.
 */
extern void unnumch(void);

/* Return the number of actual digits in a number */
extern int digits(PSTR);

/* Return the number of digits after the decimal point (if any) */
extern int DPpos(PSTR);

/* Attempt to form a spot rate by concatenating num2 onto num1. */
extern BOOL append(PSTR, PSTR);

/* Given a spot rate and the little figures of a rate, calculate what
 * the rate intended was.
 */
extern BOOL merge(PSTR, PSTR, BOOL);

/* Compare two number strings */
extern int comparenum(PSTR, PSTR);

/* Insert a sign into an unsigned number, increasing its length by one. */
extern void setsign(int, PSTR);

/* Given a signed number remove the sign and return what it was. */
extern int getsign(PSTR);

/* Compare two signed numbers (which are forwards) */
extern int compareforward(PSTR, PSTR);

#endif
```

```
/************************************************************
 *                                                          *
 * number2.h - More routines to handle numbers              *
 *                                                          *
 * Written by Alan Stokes                                   *
 *                                                          *
 * Copyright (C) 1987 Richards Computer Products Ltd        *
 *                                                          *
 ************************************************************/ if !defined(NUMBER2_H)
define NUMBER2_H

/* Read a section of a number.  We return whether we succeeded.  Sign contains
 * the sign of the number as +/- 1, or 0 if no sign was detected.
 */
extern BOOL nextnum(PSTR, int *);

#endif

/************************************************************
 *                                                          *
 * outpars.h - Routines to parse an outright deal           *
 *                                                          *
 * Written by Alan Stokes                                   *
 *                                                          *
 * Copyright (C) 1987 Richards Computer Products Ltd        *
 *                                                          *
 ************************************************************/ if !defined(OUTPARS_H)
define OUTPARS_H

/* This routine parses an outright conversation. */
extern int outparse( void );

#endif

/************************************************************
 *                                                          *
 * parse.h - Main routines for parsing a conversation       *
 *                                                          *
 * Written by Alan Stokes                                   *
 *                                                          *
 * Copyright (C) 1987 Richards Computer Products Ltd        *
 *                                                          *
 ************************************************************/ if !defined(PARSE_H)
define PARSE_H

/* Routine to parse a conversation */
extern void parse( void );

/* Tidy up any inconsistencies in the ticket, assuming that the deal type is
 * changing to the given deal.
 */
extern void tidyticket(int);

#endif

/************************************************************
 *                                                          *
 * pay.h - Payment instructions handling                    *
 *                                                          *
 * Written by Alan Stokes                                   *
 *                                                          *
 * Copyright (C) 1987 Richards Computer Products Ltd        *
 *                                                          *
 ************************************************************/ if !defined(PAY_H)
define PAY_H
```

```c
/* Remove any payment instructions we have already read and mark further
 * payment instructions unlikely (used after a dealer types SWAP LATER).
 */
extern void killpay(void);

/* Parse a payment instruction.  Returns whether one was found or not. */
extern BOOL parsepay(void);

#endif

/********************************************************************
 *                                                                  *
 *  period.h - Routines to handle periods                           *
 *                                                                  *
 *  Written by Alan Stokes                                          *
 *                                                                  *
 *  Copyright (C) 1987 Richards Computer Products Ltd              *
 *                                                                  *
 ********************************************************************/ if !defined(PERIOD_H)
define PERIOD_H

/* Routine to parse a period definition, setting the dates if possible. */
extern BOOL parseperiod(void);

/* Routine to try and guess what the dates should be for the period and
 * currencies we have worked out.
 */
extern void guessdates(void);

/* Routine to try and guess the period given the currencies and the dates. */
extern void guessperiod(void);

#endif

/********************************************************************
 *                                                                  *
 *  read.h - Definition of symbols and low-level reading routines   *
 *                                                                  *
 *  Written by Alan Stokes                                          *
 *                                                                  *
 *  Copyright (C) 1987 Richards Computer Products Ltd              *
 *                                                                  *
 ********************************************************************/ if !defined(READ_H)
define READ_H

/* Procedure to read the next symbol */
extern void nextsym(void);

/* Procedure to go back to the previous symbol */
extern void backsym(void);

/* Move back over the symbols just mistakenly read */
extern void backphrase(void);

/* Generate a string from a text reference */
extern void copytext(TEXTPOS *text, PSTR string, int MaxLen);

/* Possible values of symbol */
#define S_NUMBER-1
#define S_JUNK-2
define S_ENDLINE-3 define S_A44
define S_ABA46
#define S_AGAINST16
#define S_AMOUNT5
#define S_AND17
#define S_AT4
#define S_B30
#define S_BACK60
```

```
#define S_BORROW 39
#define S_BUY 1
#define S_C 45
#define S_COMMENT 52
#define S_COUNTERPARTY 53
#define S_CREDIT 57
#define S_CURRENCY 14
#define S_DEALER 59
#define S_DATES 33
#define S_DEP 34
#define S_DIGIT 12
#define S_FOR 6
#define S_FWD 36
#define S_IS 54
#define S_LATER 58
#define S_LEND 38
#define S_ME 8
#define S_MINE 10
#define S_MIO 3
#define S_MONTH 13
#define S_MTH 27
#define S_MY 37
#define S_N 23
#define S_NOISE 49
#define S_NY 51
#define S_O 21
#define S_ONITE 47
#define S_OUTRIGHT 56
#define S_PAY 35
#define S_PAYMENT 43
#define S_PERCENT 50
#define S_PLEASE 48
#define S_RATES 18
#define S_S 22
#define S_SELL 2
#define S_SLASH 19
#define S_SN 25
#define S_SPOT 0
#define S_SWAP 31
#define S_T 20
#define S_TH 32
#define S_TN 24
#define S_TO 29
#define S_TODAY 40
#define S_TOM 41
#define S_TT 42
#define S_VAL 7
#define S_WEEK 26
#define S_YARD 15
#define S_YEAR 28
#define S_YOU 9
#define S_YOURS 11
#define S_WRAP 55
#define S_UP 61
#define S_RIGHTARROW 62
#define S_STANDARD 63
#define S_INSTRUCTIONS 64
#define S_F 65
/* Next is 66 */ endif

/*******************************************************************
 *                                                                 *
 * spot.h - Routines to read spot quotes & rates                   *
 *                                                                 *
 * Written by Alan Stokes                                          *
 *                                                                 *
 * Copyright (C) 1987 Richards Computer Products Ltd              *
 *                                                                 *
 *******************************************************************/ if !defined(SPOT_H)
define SPOT_H
```

```
/* Routine to parse the spot deal rate */
extern BOOL parsespot(BOOL);

/* Routine to parse a spot quote */
extern BOOL parsequote(BOOL);

#endif

/************************************************************
 *                                                          *
 * spot2.h - Routines for handling spot rates               *
 *                                                          *
 * Written by Alan Stokes                                   *
 *                                                          *
 * Copyright (C) 1987 Richards Computer Products Ltd        *
 *                                                          *
 ************************************************************/ if !defined(SPOT2_H)
define SPOT2_H

/* Check that a number is a good spot rate.  This may involve
 * altering the number to bring it into the standard form.
 */
extern BOOL goodspot(PSTR);

/* Return a reasonable approximation to the spot rate if possible */
extern BOOL assumespot(PSTR);

/* Return a reasonable approximation to the outright rate if possible */
extern BOOL assumeout(PSTR);

/* Extract the bigfigs from a number.  We return -1 if we couldn't
 * find the necessary info.
 */
extern BOOL getbigfigs(PSTR, int *);

/* Check that a short stub (a few digits from the start of a spot
 * rate) has big figures in agreement with what we expect.
 */
extern BOOL samebigfigs(PSTR, int);

/* Check that a number string matches a bigfigs. */
extern BOOL checkbigfigs(PSTR, int, BOOL);

#endif

/************************************************************
 *                                                          *
 * spotpars.h - Routines to parse a spot deal               *
 *                                                          *
 * Written by Alan Stokes                                   *
 *                                                          *
 * Copyright (C) 1987 Richards Computer Products Ltd        *
 *                                                          *
 ************************************************************/ if !defined(SPOTPARS_H)
define SPOTPARSE_H

/* Procedure to parse a spot conversation.  The result is the deal type
 * to change to.
 */
extern int spotparse( void );

#endif
/*
 * ca_pmt.h
 *
 * CA server and prompt functions for data pointer transfer and event indication.
 *
 * $Header:   V:/caserver/overlay/h/ca_pmt.h_v   1.0   22 Jul 1988 15:23:52   Duncan  $
 *
 * $Author:   Duncan  $
 *
```

```
* $Revision:   1.0  $
*
* $Log:   V:/caserver/overlay/h/ca_pmt.h_v  $
*
*    Rev 1.0   22 Jul 1988 15:23:52   Duncan
* Initial revision.
*
*    Rev 1.1   27 Jun 1988 15:25:52   Graham
* Changed the return type of CARegisterInterest to and int and the parameter of CAClearInterest to a
* n int to allow a
* return value of -1 to indicate failure.
*
*    Rev 1.0   27 Jun 1988 15:02:14   Graham
* Initial revision.
*/
#if !defined(CA_PMT_H)
define CA_PMT_H if !defined(TYPES_H)
        #include "types.h"
    #endif include "currdata.h"

typedef struct {
    WORDSequence;/* Sequence number of updates (starts at 0)*/
    WORDsize;/* Number of elements in the currency array*/
    LPCA_CURRENCY_DATA far *currencies;/* pointer to array of currency structures*/
} CURRSTRUCT, *PCURRSTRUCT, far *LPCURRSTRUCT;

/* void FAR PASCAL function(LPTW_TICKET ticket, WORD hUser); */ typedef void (FAR PASCAL * PASCAL LPTICKETFUN)(LPTW_TICKET ticket, WORD hUser);

/* void FAR PASCAL function(int currency); */ typedef void (FAR PASCAL * FAR PASCAL LPCURRENCYUPDATE)(int currency);
/*************************************************************************************************\
*     *
*         FUNCTIONS PROVIDED BY THE PROMPTS SYSTEM     *
*     *
\*************************************************************************************************/

LPCURRSTRUCTPMTGetCurrencyData(void);/* Provided by the PROMPT system for CA server*/

/* Can only be used AFTER PMTGetCurrencyData has returned a valid pointer at least once */
voidPMTRegisterCurrencyFun(LPCURRENCYUPDATE function);
void FAR PASCAL PmtInitPhase_1(void (FAR PASCAL * FAR PASCAL function)(void));
BOOL FAR PASCALPmtInitPhase_0(void);

/*************************************************************************************************\
*     *
* FUNCTIONS PROVIDED BY THE CA SERVER     *
*     *
\*************************************************************************************************/ intCAGetTicketIndex(long Dconvref, LPTW_TICKET far *ticket);/* Returns handle to ticket -1 == fail*/
voidCAFreeIndex(int Index);/* Indicates no more interest in ticket*/
/* Rigsiter an interest in a ticket. Returns a handle to the for the FREE or -1 for failure */
intCARegisterInterest(WORD CAcnvid, LPTICKETFUN function, WORD hUser);
/* Removes an interest function from the interest function list in the CA server */
voidCAClearInterest(int handle);
extern HCHANNELGetChannelHandle(WORD);

extern char far *CAFRXASpotRate(int currencynumber);

externBOOL FAR PASCALfnMenuNotifyReq(HANDLE hUser, WORD Id, long Dcnvref, LPPACKETHEAD packet);

#endif
```

```
/*************************************************************
 *                                                           *
 * vocab.h - Definitions and procedures for the vocabulary   *
 *                                                           *
 * Written by Alan Stokes                                    *
 *                                                           *
 * Copyright (C) 1987 Richards Computer Products Ltd         *
 *                                                           *
 *************************************************************/ if !defined(VOCAB_H)
define VOCAB_H typedef struct VOCWORD
{
    char symbol, symval;
    PSTR string;
} VOCWORD;

/* The vocabulary is global */
extern VOCWORD vocab[];

/* Given a C string returns NULL if the string is not a recognisable word,
   otherwise returns a pointer to its VOCWORD entry. */
extern VOCWORD *lookup(PSTR);

#endif

/*************************************************************
 *                                                           *
 * frx.h  Header file for FRXA-E processing                  *
 *                                                           *
 * Written by Roger H. Abbott                                *
 *                                                           *
 * Copyright (C) 1988 Richards Computer Products Ltd         *
 *                                                           *
 *************************************************************/ if !defined(FRX_H)
define FRX_H

/* The number of currencies on the FRX pages */
#define NFRXcurrencies 30

/* These macros take an FRX currency number, range 1-30, and calculate
various row and column numbers */ define MaxHolidays (30*10+9*32) /*10 fixed per currency and all 9 lines */ define CalcSpotRow( Currency )  ((Currency-1)/10)/* on FRXA */
define CalcSpotCol( Currency )  ((Currency-1)%10)/* on FRXA */
#define CalcPage( Currency ) ((Currency-1)%3)/* 0-2 for FRXB-D */
#define CalcLine( Currency ) ((Currency-1)/3)/* The line number for
the forward/deposit rate and spread fields of FRXB-D. This is
also the column number for the Swiftcode/flag on FRXB-D */

/* Macros for extracting bits from the TypeFlag */ define ReciprocalQuotation(Currency) \
((DecodeFRX(GetTypeFlag(Currency))&16)!=0)
#define Year365(Currency) \
((DecodeFRX(GetTypeFlag(Currency))&8)!=0)
#define SpotDecPoint(Currency) \
(DecodeFRX(GetTypeFlag(Currency))&7)

/* Some of the common Monitor page sizes and other constants */
#define MonLines 14
#define MonCols 64
#define CurrenciesPerPage 10
#define NoPeriods 6

/* Definitions of the various structures that FRX pages can have */ typedef struct SpotRateLine {
char Rate[CurrenciesPerPage][4];
```

```c
char Spread[CurrenciesPerPage][2];
char SpotRowCycle;
char UpdateRowCycle;
char UpdateRowNumber;
char Unused;
} SpotRateLine;

typedef struct UpdateLine {
char CycleNumber;
char Blank;
char Update[62];
} UpdateLine;

typedef struct SpotUpdatesPage {
char HeaderLine[MonCols];
char PageNames[MonCols];
SpotRateLine SpotRates[3];
UpdateLine Updates[7];
char Unused[2][MonCols];
} SpotUpdatesPage, *PSUP;

typedef struct CurrencyName {
char Swiftcode[3];
char TypeFlag;
} CurrencyName;

typedef struct CurrencyPeriodLine {
CurrencyName Name[CurrenciesPerPage];
char Period[NoPeriods][3];
char Unused[6];
} CurrencyPeriodLine;

typedef struct ForwardRateLine {
char ForwardDeposit[NoPeriods][6];
char Spread[NoPeriods][4];
char Unused[4];
} ForwardRateLine;

typedef struct CurrencyPage {
char HeaderLine[MonCols];
CurrencyPeriodLine CurrencyNames;
ForwardRateLine ForwardRates[CurrenciesPerPage];
char Unused[2][MonCols];
} CurrencyPage, *PCP;

typedef struct HolidayPage {
char HeaderLine[MonCols];
char HolidayEquates[MonCols];
char Valid;
char StartEndMonths[11];
char CommonDates[20][2];
char Unused[12];
char Holidays[11*MonCols];
} HolidayPage, *PHP;

typedef struct UnstructuredMonitorPage {
char PackedInfo[MonLines][MonCols];
} UnstructuredMonitorPage, *PUMP;

typedef union MonitorPage {
UnstructuredMonitorPage UMP;
SpotUpdatesPage SUP;
CurrencyPage CP;
HolidayPage HP;
} MonitorPage;

/* References to variables which are declared in frx.c */ extern MonitorPage FRXA, FRXB, FRXC, FRXD, FRXE;
extern PSUP PSpotUpdatesPage;
extern PCP PCurrencyPage[3];
extern PHP PHolidayPage;
extern PUMP MonitorPageAddress[5];

/* References to functions in frx.c */
```

```c
/* The general naming convention is that:
xxxxxPointer() returns a pointer to the packed character field,
Binxxxx() returns a long integer signed binary version of the same,
Getxxxx() returns a character string.
*/

/* Getxxxx() assembles the quote in character format into an array.
The currency number is the FRX number. This is found in FRXnumber[]. */ extern int GetSpotBid( int Currency, char *String, int Length );
extern int GetSpotAsk( int Currency, char *String, int Length );
extern int GetFwdBid( int Currency, char *String, int Length, int Period );
extern int GetFwdAsk( int Currency, char *String, int Length, int Period );
extern int GetDepositBid(
int Currency, char *String, int Length, int Period );
extern int GetDepositAsk(
int Currency, char *String, int Length, int Period );

extern int DecodeFRX( char ch );
extern char GetTypeFlag( int Currency );
extern int FindFRXcode( PSTR swiftcode );
extern char *GetSwiftcode( int Currency );
extern char *SpotPointer( int Currency );
extern char *SpotSpreadPointer( int Currency );
extern char *FwdPointer( int Currency, int Period );
extern char *FwdSpreadPointer( int Currency, int Period );
extern long BinSpot( int Currency );
extern long BinSpotSpread( int Currency );
extern long BinFwd( int Currency, int Period );
extern long BinDeposit( int Currency, int Period );
extern long BinFwdSpread( int Currency, int Period );
extern long BinDepositSpread( int Currency, int Period );
extern void ApplyUpdateLine( char Line[] );
extern void InitialiseFrx( void );
extern void DecodeDate( PSTR Pointer, DATESTRUCT far *DP, int BaseYear );
extern void ExtractHolidays( void );

/* Miscellaneous functions which may be used outside */
extern  int LongToChar(long Value,char *String,int Point,int After);
extern  int LongToFraction(long Value,char *String,int Point,int Den);
extern  int RateUnknown(char *String,int Length);

/* Information extracted from the FRX pages */
extern DATE FRXdate;
extern DATE *HolidayList[NFRXcurrencies+1];
extern DATE AllHolidays[];
extern BOOL MoslemWeekend[NFRXcurrencies+1];

#endif

/***********************************************************
 *                                                         *
 *  getfrx.h  Load and maintain the FRXA-E monitor pages   *
 *                                                         *
 *  Written by Roger H. Abbott                             *
 *                                                         *
 *  Copyright (C) 1988 Richards Computer Products Ltd     *
 *                                                         *
 ***********************************************************/ if !defined(GETFRX_H)
define GETFRX_H extern int LoadFrxPages( void );

endif

/***********************************************************
 *                                                         *
 *  dateproc.h - Definitions of more date-handling procedures *
 *                                                         *
 *  Written by Roger Abbott                                *
 *                                                         *
 *  Copyright (C) 1988 Richards Computer Products Ltd     *
 *                                                         *
 ***********************************************************/
```

```c
#if !defined(DATEPROC_H)
define DATEPROC_H include "qtw_tkts.h"

extern  DATE SplitDate(DATE Days,int Currency);
extern  void guessdates(void);
extern  void guessperiod(void);
extern  int GoodCur(FIELDNAME Field);
extern  void GetDates(PERIOD Period,int Cur1,int Cur2,
SPLITDATE *Near, SPLITDATE *Far);
extern DATE NextWorkingDay( DATE Day, int Cur1, int Cur2 );
extern DATE AddWeeks( DATE Date, int Inc, int Cur1, int Cur2 );
extern DATE AddMonths( DATE Date, int Inc, int Cur1, int Cur2 );
extern DATE AddYears( DATE Date, int Inc, int Cur1, int Cur2 );
extern  BOOL Holiday(DATE Date,int Currency);
extern  BOOL Weekend(DATE Days,int Currency);
extern  BOOL GoodValue(DATE Days,int Cur1,int Cur2);
externBOOL GoodDate( int Cur1, int Cur2, SPLITDATE *Date );

#endif

/****************************************************************
 *                                                              *
 * tickmes.h - Ticket message processing                        *
 *                                                              *
 * Written by Roger H. Abbott                                   *
 *                                                              *
 * Copyright (C) 1988 Richards Computer Products Ltd            *
 *                                                              *
 ****************************************************************/ if !defined( TICKMES_H )
define TICKMES_H

/****************************************************************
 *                                                              *
 * tickmes.h - Ticket message processing                        *
 *                                                              *
 * Written by Roger H. Abbott                                   *
 *                                                              *
 * Copyright (C) 1988 Richards Computer Products Ltd            *
 *                                                              *
 ****************************************************************/ if !defined( TICKMES_H )
define TICKMES_H extern REPLY_FUNCTION fnReplyTicketSnapshotReq;

extern REPLY_FUNCTION fnReplyCASrchSnapshotReq;
extern REPLY_FUNCTION fnReplyCASrchNotifyReq;
extern REPLY_FUNCTION fnReplyCASrchCancel;

extern REPLY_FUNCTION fnReplyNewExternalTicket;

extern LPTKTITEM TicketFetch(
LPTKTITEM DestPtr, TICKET_FIELD field, LPTW_TICKET pTicket );
extern BOOL CheckTicketMatch(
LPTW_TICKET pTicket, LPTKTITEM Criteria, int Length );
extern BOOL CheckItemMatch( LPTW_TICKET pTicket, LPTKTITEM Item );
extern WORD ExpandItemList( TICKET_FIELD field, TICKET_FIELD far *Array );
extern WORD FAR PASCAL ProcessNotifyDetails(void far * task, HANDLE hUser);
extern int NotifyRequestSpace( void );

#endif

/****************************************************************
 *                                                              *
 * caserver.h - Conversation analysis server main program       *
 *                                                              *
 * Written by Roger H. Abbott                                   *
 *                                                              *
 * Copyright (C) 1988 Richards Computer Products Ltd            *
 *                                                              *
 ****************************************************************/
```

```c
#include "qtw_tkts.h"

/* The number of seconds between alive broadcast messages. */
#define ALIVETIMEPERIOD 15000

/* The length of the Notify Queue List */
#define NOTIFYQSIZE 20

/* A Ticket Snapshot area is set up in response to each
Ticket Snapshot Request and also after every analysis when a Ticket
Notify is in force. We use this structure to store all the details of
what to send, including how far we have got with sending the replies.
The Ticket Snapshot area data can be examined at any time, and a further
message sent. The area is released as soon as all the reply has been sent.

Details of the Ticket Notify Request are held in the conversation data area.
*/ typedef struct {
WORD TicketCount;/* The number of tickets to send */
WORD NextTicket;/* Index to the next Dcnvref to send */
WORD ItemCount;/* The number of items to send per ticket */
WORD NextItem;/* Index to next item to send */
long far *Dcnvref;/* Pointers to the list of Dcnvrefs */
TICKET_FIELD far *Identifier;/* and list of identifiers */
BYTE Data[512];/* Copied from the message */
} TICKSNAPREQ, *PTICKSNAPREQ, far *LPTICKSNAPREQ;

/* This one stores all the details of a Search Snapshot Request and
how far we have got with the replies. Such an area is set up in response to
a Search Snapshot request and is released as soon as all the
reply has been sent. */ typedef struct {
BOOL BothCurrencies;/* Different Cur1 and Cur2 specified */
int Length;/* Of Data[] */
int TicketIndex;/* The next ticket to check when searching */
BYTE Data[512];/* Copied from the message */
} TICKSRCHREQ, *PTICKSRCHREQ, far *LPTICKSRCHREQ;

/* This one stores all the details of a Search Notify Request. Our Id
is the index into an array NotifyList[]. The search notify areas are
examined only (a) just after the request has been received and
(b) at the end of a call to the analysis routine. These
areas are released only on receipt of a Search Cancel or loss of
communication with the requestor. */ typedef struct {
BOOL BothCurrencies;/* Different Cur1 and Cur2 specified */
int Length;/* Of Data[] */
BYTE Data[512];/* Copied from the message */
} TICKSRCHNOTREQ, *PTICKSRCHNOTREQ, far *LPTICKSRCHNOTREQ;

/* This structure holds details of how to decide what to send in respose to
all notify and search requests. */ typedef struct {
BOOL IsInUse;
WORD MessageType;/* The requset message type */
HANDLE Channel;/* User channel handle for replies */
WORD TheirID;/* Their reply handle */
union {
TICKSNAPREQ TkSnapReq;
TICKSRCHREQ TkSrchReq;
TICKSRCHNOTREQ TkSrchNotReq;
} ReplyDetails;
} NOTIFY_DETAILS, *PNOTIFY_DETAILS, far *LPNOTIFY_DETAILS;

extern void AllocateStorage( void );
extern BOOL OvMain(char far * far *envp);
extern void initconv( int Index );
extern LPCATICKET GetTicketPointer( WORD index );
extern void UnlockTicket( WORD index );
extern int GetTicketIndex( long Dref );
extern void AddChange( TICKET_FIELD Item );
```

```c
extern void InitiateShutdown( LPSTR code );
extern void FAR PASCAL DefCREATETCB(void far *task);
extern void FAR PASCAL DefFREETCB(void far *task);

/* Variables for the ticket array */
extern HANDLE TicketHandle;
extern long far *TicketDcnvrefs;
extern int MaxTickets;
extern int LockCount;

/* Variables to control debugging display of analysis */
extern short DefaultDisplayHandle;
extern short ConvDisplayHandle[];
extern int DisplayedConvs;
extern BOOL ClosingDown;
extern int LockCount;

/* The database and the index to the current converation */
extern LPCONVDATA CAdatabase[ MAXCONVERSATIONS ];
extern int CurrentCAcnvid;
extern LPCONVDATA CurrentConv;
extern int TktNotifyIndex;

extern int MaxConversations;
extern int MaxKeystations;

extern HCHANNEL ChannelHandle[ KS1_CHAN_HANDLE + MAXKEYSTATIONS + 1];
extern CH_STATUS ChannelStatus[ KS1_CHAN_HANDLE + MAXKEYSTATIONS + 1];

extern BOOL WeAreBroker;

extern HREPLY AnalyseReqHandle, SnapshotReqHandle,
CASrchSnapshotReqHandle, CASrchNotifyReqHandle,
NewExtTktHandle, StartupReplyHandle;

extern LPNOTIFY_DETAILS NotifyQueue[ NOTIFYQSIZE ];

/* A common buffer area used to construct messages */
extern char Buffer[512];

/************************************************************
 *                                                          *
 * camesage.h - Conversation analysis message processing    *
 *                                                          *
 * Written by Roger H. Abbott                               *
 *                                                          *
 * Copyright (C) 1988 Richards Computer Products Ltd.       *
 *                                                          *
 ************************************************************/ extern REPLY_FUNCTION fnReplyAnalyseConvRequest;
extern REPLY_FUNCTION fnReplyAnalyseText;
extern REPLY_FUNCTION fnReplyTerminateAnalyseReq;

extern REPLY_FUNCTION fnReplyStoreTicket;
extern REPLY_FUNCTION fnReplyRetrieveTicket;
extern REPLY_FUNCTION fnReplyAnalysisMessages;
extern REPLY_FUNCTION fnTktNotifyCancel;

extern void TerminateConv( int CAcnvid );

/************************************************************
 *                                                          *
 * cadata.h - Conversation analysis structures and global data *
 *                                                          *
 * Written by Roger H. Abbott                               *
 *                                                          *
 * Copyright (C) 1987 Richards Computer Products Ltd       *
 *                                                          *
 ************************************************************/ if !defined(CADATA_H)
define CADATA_H
```

```c
#if !defined(TYPES_H)
#include "types.h"
endif if !defined(ANALDATA_H)
include "analdata.h"
endif if !defined(CHANNEL_H)
include "channel.h"
endif if !defined(TICKET_H)
include "ticket.h"
endif if !defined(CA_PMT_H)
include "ca_pmt.h"
endif if !defined(MACROS_H)
include "macros.h"
endif

/* Max chars per line */
#define MAXLINELEN 60
/* The maximum number of conversations we can analyse at one time */
#define MAXCONVERSATIONS 24
/* Absolute maximum keystations. There may be less than this */
#define MAXKEYSTATIONS 12
/* Maximimum dumber of conversations on debugging display */
#define MAXCONVSDISPLAYED 4
/* The size of buffer allocated for conversation text */
#define MAXCONVSIZE 4000
/* Maximum number of notify requests per conversation */
#define TKT_NOT_PER_CONV 2

/* Our own channel handles */
#define SERV_CHAN_HANDLE 0
#define DMGR_CHAN_HANDLE 1
#define KS1_CHAN_HANDLE 2

/* Values for the conversation status */
#define CA_FREE 0
#define CA_FETCHING_TICKET 1
#define CA_CONV_IN_PROGRESS 2
#define CA_STORING_TICKET 3
/* The following structure holds pointers to all the data for conversations
which are being analysed. The ticket is held outside the structure as it
is required to be kept after the analysis has finished, and may be re-used
if a conversation is edited. The saved data and saved tickets are not
required after the analysis has finished, so are stored in the structure.
Also in the structure are those data items which must not be saved and
restored when analysis is re-started. */ typedef struct
{
/* The status of the conversation, as one of the CA_ defined values */
int Status;

/* The reply handles used by this conversation. */
HREPLY StoreTicketHandle;/* For store ticket reply */
HREPLY ConvTicketRetrieveHandle;/* For ticket data/reject */
HREPLY AnalysisTextHandle;/* Analyse text/terminate */
HREPLY TktNotifyHandle[TKT_NOT_PER_CONV]; /* To cancel a notify */

/* Channel and ID for messages. Our ID is the index to this structure. */
HANDLE KeystationChannel;
WORD TheirID;

/* Data for processing ticket notify requests */
WORD TheirNotifyID[ TKT_NOT_PER_CONV ];
TICKET_FIELD NotifyRequestList[ TKT_NOT_PER_CONV ][ TKT_Last ];
TICKET_FIELD NotifyActionList[ TKT_Last ];
int ChangedItems;
```

```c
/* Data for interface to the prompt system */
HANDLE PromptTicketHandle;
LPTICKETFUN PromptNotify;

/* The array index of the ticket item in EMS memory. If this is negative
the conversation area is not in use. */
int TicketIndex;

/* The handle used to display debugging info, or -1 if no display */
short DisplayHandle;

/* Positions in the text at which ticket items were most recently changed. */
int ConvLastInsertPos[ t_max ];
int ConvLastQueryPos[ t_max ];

/* The text buffer for the conversation */
char TextBuffer[ MAXCONVSIZE ];

/* The data saved at points at which analysis can be re-started. */
ANALYSISDATA SavedData;
TW_TICKET SavedTicket;

/* The next row and column expected to be sent by the keystation. */
int NextRowExpected, NextColExpected;

/* The next DbPos at which text is to be added to the buffer (when the
conversation is going) or to the ticket (while this is being retrieved. */
int NextDbPos;/* N.B. ConvText[NextDbPos] = '\0' */

/* Whether or not a bad text position message is on display */
BOOL BadPosDisplayed;

/* Whether or not NOT_ON_FRXA message is on display */
BOOL NotOnFRXADisplayed;

} CONVDATA, *PCONVDATA, far *LPCONVDATA;

/* The CA ticket storage area is an array allocated from the free space to
be as large as possible, after allowing for conversation text. */ typedef struct
{
TW_TICKET Ticket;
BOOL IsInUse;/* If this slot is occupied */
BOOL IsBeingAnalysed;/* If being used by analysis */
WORD StartNumber;/* From the 'Ticket Data' message */
} CATICKET, *PCATICKET, far *LPCATICKET;
typedef LPCATICKET far *LPLPCATICKET;

/* Pointers to the tickets needed by parse(). */
extern LPTW_TICKET OutputTicket;/* In the ticket array */
#endif
#if !defined(DGB_H)
    #define DGB_H
/*
 * This header file contains some standard macros which I find useful.
 */
#if !defined (unless)
    #define unless(x) if (!(x))
    #define until(x)  while (!(x))
#endif
#if !defined (max)
    #define max(a, b) ((a) > (b) ? (a) : (b))
    #define min(a, b) ((a) < (b) ? (a) : (b))
    #define abs(v) ((v) < 0 ? -(v) : (v))
#endif
#if !defined (FALSE)
    #define FALSE 0
#endif
#if !defined (TRUE)
    #define TRUE 1
endif
```

```
/* Until Microsoft actually implements these, I shall use dummies: */
#if !defined(const)
#define const
#endif
#if !defined (volatile)
#define volatile
endif if !defined (HIGH)
define HIGH(a)(sizeof(a)/sizeof(a[0]))
#define ARRAY_END(a)(&(a[HIGH(a)]))
endif /* ***WARNING - these macros are extemely non portable.
 * On anything but Microsft C v4.00 replace them with library calls.
 */
#define ARRAYCLEAR(var) {struct CS {char d[max(sizeof(var)-2,1)];};\
if (sizeof(&var[0]) == 2) CLEARNF(sizeof(var), var, near)\
else CLEARNF(sizeof(var), var, far);\
} define STRUCTCLEAR(var) {struct CS {char d[max(sizeof(var)-2,1)];};\
if(sizeof(&var)==2)CLEARNF(sizeof(var), &var, near)\
else CLEARNF(sizeof(var), &var, far)} define CLEARNF(size, ptr, distance) {\
    if (size >= 2) * (WORD distance *) (ptr) = 0;\
    if (size >= 4) * (struct CS distance *) ((WORD distance *) (ptr) + 1) = *(struct CS distance *)(ptr);\
    if (size == 1 || size == 3) * ((BYTE distance *) (ptr) + size - 1) = 0;\
} endif /*DGB_H*/
if !defined( PTW_STOR_H )
    #define PTW_STOR_H
    #include "ptw_STOR.h"
#endif
#if !defined( PTW_SRCH_H )
    #define PTW_SRCH_H
    #include "ptw_SRCH.h"
#endif
#if !defined( PTW_RPRT_H )
    #define PTW_RPRT_H
    #include "ptw_RPRT.h"
#endif
#if !defined( PTW_REVI_H )
    #define PTW_REVI_H
    #include "ptw_REVI.h"
#endif
#if !defined( PTW_PRNT_H )
    #define PTW_PRNT_H
    #include "ptw_PRNT.h"
#endif
/*
 * STATE DECLARATIONS
 *
 * $Header:   V:/caserver/overlay/h/states.h_v   1.0   22 Jul 1988 15:24:32   Duncan $
 *
 * $Revision:   1.0 $
 *
 * $Date:   22 Jul 1988 15:24:32 $
 *
 * $Author:   Duncan $
 *
 * (c) Richards Computer Products Ltd
 *
 * $Logfile:   V:/caserver/overlay/h/states.h_v $
 *
 * $Workfile:   states.h $
 *
 * $Log:   V:/caserver/overlay/h/states.h_v $
 *
 *    Rev 1.0   22 Jul 1988 15:24:32   Duncan
 * Initial revision.
 *
```

```
*    Rev 1.0   24 May 1988 17:15:06   Graham
* Initial revision.
*/
   STATE_DECL(UNINIT),
   STATE_DECL(LOADED),
   STATE_DECL(INIT),
   STATE_DECL(ERROR),
   STATE_DECL(UNLOED)

#if !defined( PTW_MENU_H )
   #define PTW_MENU_H
   #include "ptw_MENU.h"
#endif
#if !defined( PTW_EDIT_H )
   #define PTW_EDIT_H
   #include "ptw_EDIT.h"
#endif
#if !defined( PTW_AUDT_H )
   #define PTW_AUDT_H
   #include "ptw_AUDT.h"
#endif
/*
 *    Usefull Macros
 *
 * $Header:   V:/caserver/overlay/h/macros.h_v   1.0   22 Jul 1988 15:24:42   Duncan $
 *
 * $Revision:   1.0 $
 *
 * $Date:   22 Jul 1988 15:24:42 $
 *
 * $Author:   Duncan $
 *
 * (c) Richards Computer Products Ltd
 *
 * $Logfile:   V:/caserver/overlay/h/macros.h_v $
 *
 * $Workfile:   macros.h $
 *
 * $Log:   V:/caserver/overlay/h/macros.h_v $
 *
 *    Rev 1.0   22 Jul 1988 15:24:42   Duncan
 * Initial revision.
 *
 *    Rev 1.0   24 May 1988 17:14:18   Graham
 * Initial revision.
 */
#if !defined(MACROS_H)
   #define MACROS_H
/*
 * This header file contains some standard macros which I find useful.
 */
#if !defined (unless)
   #define unless(x) if (!(x))
   #define until(x)  while (!(x))
#endif
#if !defined (max)
   #define max(a, b) ((a) > (b) ? (a) : (b))
   #define min(a, b) ((a) < (b) ? (a) : (b))
   #define abs(v) ((v) < 0 ? -(v) : (v))
#endif
#if !defined (FALSE)
   #define FALSE 0
#endif
#if !defined (TRUE)
   #define TRUE 1
endif if !defined (HIGH)
/*
 * HIGHreturns the largest index for an array 'a'
 * ARRAY_ENDreturns the address of the last element in the array 'a'
 */
#define HIGH(a)(sizeof(a)/sizeof(a[0]))
#define ARRAY_END(a)(&(a[HIGH(a)]))
endif
```

```c
#if !defined(HIBYTE)
#defineHIBYTE(word)((word) >> 8)
#define LOBYTE(word)((word) &0xFF)
endif define export
define EXPORT
#define localstatic
#define LOCALstatic
#define importextern
define IMPORTextern endif /*MACROS_H*/
if !defined( PTW_ANAL_H )
    #define PTW_ANAL_H
    #include "ptw_ANAL.h"
#endif
#if !defined( PTW_TKTS_H )
    #define PTW_TKTS_H
    #include "ptw_tkts.h"
#endif
/*
 * Definition of CURRENCY_DATA
 *
 */ if !defined(CURRDATA_H)
define CURRDATA_H if !defined(TYPES_H)
        #include "types.h"
    #endif define MAXCURRENCIES100 typedef struct {
    WORDFirstDay;
    charswift[4];
    WORDDecimalPlaces : 3;
    WORDIs365Days: 1;
    WORDIsInverse: 1;
    WORDIsMoslem: 1;
} CURRENCY_DATA, *PCURRENCY_DATA, far *LPCURRENCY_DATA;

typedef struct {
    WORDFirstDay;
    charswift[4];
    WORDDecimalPlaces : 3;
    WORDIs365Days: 1;
    WORDIsInverse: 1;
    WORDIsMoslem: 1;
    charPay1[25];
    charPay2[25];
    charPay3[25];
    charHolidayInclude[127];
    charHolidayExclude[127];
} CA_CURRENCY_DATA, near *PCA_CURRENCY_DATA, far *LPCA_CURRENCY_DATA;

#endif

/****************************************************************
 *                                                              *
 *  analdata.h - Structures and external definitions needed by  *
 *    the analysis routines                      *              *
 *                                                              *
 *  Written by Roger H. Abbott                                  *
 *                                                              *
 *  Copyright (C) 1988 Richards Computer Products Ltd           *
 *                                                              *
 ****************************************************************/ if !defined(ANALDATA_H)
define ANALDATA_H
```

```c
#if !defined(TYPES_H)
#include "types.h"
endif if !defined(MACROS_H)
include "macros.h"
endif if !defined(TICKET_H)
include "ticket.h"
endif if !defined(PTW_TKTS_H)
include "qtw_tkts.h"
endif typedef WORD DATE;

/* The days of the week */
#define SUNDAY 0
#define MONDAY 1
#define TUESDAY 2
#define WEDNESDAY 3
#define THURSDAY 4
#define FRIDAY 5
#define SATURDAY 6

/* Maximum size of a word/number */
#define MAXWORDLEN 30
/* Number of elements in the symbol queue */
#define QUEUESIZE 25

/* Values of the LineFlag bits */
#define CF_THEIR 0x01     /* Originated at far end */
#define CF_TX 0x02        /* Ended in TRANSMIT */
#define CF_SYS 0x04       /* System-generated line */
#define CF_HIGHLIGHT 0x08 /* Highlit line */
#define CF_DEAL 0x10      /* Deal key was pressed */
#define CF_OFFLINE 0x20   /* Line was entered offline */
#define CF_WRAPUP 0x40    /* Gererated in 'wrap-up' state */
#define CF_LINESTART 0x80 /* This bit indicates the start of a line */

/* Holds a split value date (includes two dates) */
typedef struct
{
    DATE date1, date2;
} SPLITDATE;

/* Hold a date in all its components. */
typedef struct
{
    int day, month, year;
} DATESTRUCT;
/* Definition of a text field. This stores a reference to a section of the
 * text in a conversation.
 */
typedef struct
{
    /* Start row and column, start and end position which are inclusive */
    int Srow, Scol, Spos, Epos;
} TEXTPOS;

/* Names of the fields in the ticket status array. These names must be
different from the global ticket names for historic reasons. Some day
it may be worthwhile going through the analysis to change all the names
to the global ones. If so, special provision must be made for bigfigs,
which does not occurr in the global ticket. */
typedef enum
{
    t_deal,   /* num, the current deal type */
    t_quoter, /* num, who is making the quote */
    t_buy,    /* num, whether we are buying/taking the amount */
    t_cur1,   /* num, first currency */
    t_cur2,   /* num, second currency (usually dollar) */
    t_amount, /* string, the amount of the transaction */
    t_amountcur, /* num, which of the two currencies the amount is in */
```

```
    t_mypay, /* text, our first payment instruction */
    t_yourpay, /* text, your first payment instruction */
    t_low, /* string, the low part of the quote */
    t_high, /* string, the high part of the quote */
    t_rate,/* string, the near spot rate */
    t_quotecur,/* num, which of the two currencies the quote is for */
    t_near,/* date, near value dates */
    t_bigfigs,/* num, the first two digits of the rate and the DP pos */
/* The following fields are for deposits/forwards */
    t_far,/* date, far value dates */
    t_fwd,/* string, the forward rate for the transaction */
    t_rate2,/* string, the far spot rate */
    t_period,/* num, the deal period */
    t_mypay2,/* text, our second payment instructions */
    t_yourpay2,/* text, your first payment instructions */
/* Miscellaneous fields */
    t_comment,/* text, comment on the conversation */
    t_counterparty, /* text, the counterparty for a broker deal */
    t_dealer,/* text, our dealer id */
    t_status,/* The status of the ticket */
/* This field is used to get the size of the ticket */
    t_max
} FIELDNAME;

/* Possible values of the status of a field in the ticket, in roughly
 * increasing order of dependability: not known, assumed from monitor
 * pages (or from our beliefs), deduced from other information, and
 * extracted from the conversation. */
typedef enum
{st_unknown,
st_assumed,
st_deduced,
st_extracted
} FIELDSTATUS;

/* The symbol queue, used to store symbols that have been unread as a
 * circular buffer */
typedef struct
{
   int symbol, symval;
   BOOL speaking;
   TEXTPOS symtext;
} QUEUE;

/* Each analysis needs extra information not stored in the ticket.
We keep this is a structure and access it via a pointer */
typedef struct
{
/* Flag which if set true causes all line ends to be handled as newlines */
BOOL nowrap;

/* The following data describes the most recently read symbol */
/* Buffer to store the current symbol in */
char symbuf[MAXWORDLEN+1];

/* Position within the text of the current symbol */

TEXTPOS symtext;

/* The most recently read symbol and its associated value */
int symbol, symval;

/* Whether the most recent symbol was said by us */
BOOL speaking;

/* Count of the number of symbols read - used to remember positions in the
 * symbol stream. */
int symcount;

/* Whether the first character of the next symbol has already been read (only
 * made global for initialisation). */
BOOL charpending;
```

```c
/* An array holding the status of the items in the ticket for which the
quality of the information may vary. */
FIELDSTATUS TicketItemStatus[t_max];

/* Pointer to an array containing the analysis position in the conversation
at which the working ticket information was copied into the output ticket.
For each item, this number is only allowed to increase. This prevents the
output ticket backtracking on re-analysis of the same part of the text. */
int far *LastInsertPos;

/* The same thing for queries */
int far *LastQueryPos;

/* The number of queries placed on ticket items */
int Queries;

/* The symbol queue, used to store symbols that have been unread as a
circular buffer */
QUEUE queue[QUEUESIZE];

/* Position of the head, the tail and the current symbol within the
symbol queue. */
int qhead, qtail, qptr;

/* The character just read from the conversation */
char convch;

DATESTRUCT conversationdate;

/* Variables concerned with numbers. */
char numbuf[MAXWORDLEN+1];  /* Holds the symbol being worked on */
int numpos;       /* Position we have reached in numbuf */

/* The big figures used in checking rates */
int BigFigs;

/* Flags used for handling payment instructions. Foundpay is true if a
 * suspected start of payment instructions has been found, and nopay is true
 * if no payment instructions are expected. */
BOOL foundpay, nopay;

/* A text structure describing the current payment instruction. */
TEXTPOS PayText;

/* Whether the symbol NY has been seen in the payment instruction (means the
 * dollar is involved). */
BOOL foundny;

/* Various variables used in communication between readamt() and nextpart() */
int dpcount;/* Number of decimal points encountered */
int dppos;/* Where the first decimal point was */
BOOL ended;/* Whether we have reached the end of the amount */

/* The pointer the the conversation text and it maximum length */
LPSTR ConvText;
int MaxChars;

/* The current analysis index into the conversation buffer */
int BufPos;

/* The last encountered and therefore current flag byte */
char LineFlag;

} ANALYSISDATA, *PANALYSISDATA, far *LPANALYSISDATA;
extern void SaveAnalysisState( void );

extern PANALYSISDATA AnalysisData;
extern PTW_TICKET Ticket;/* Near data wotking copy */
```

```c
#endif
/****************************************************************
 *                                                              *
 * cainit.h - Conversation analysis server initialisation       *
 *Not to be called until prompts are initialised                *
 *                                                              *
 * Written by Roger H. Abbott                                   *
 *                                                              *
 * Copyright (C) 1988 Richards Computer Products Ltd            *
 *                                                              *
 ****************************************************************/ extern BOOL FAR PASCAL fnDMGRunsolicited(
HANDLE hUser, WORD Id, void far *lpPacket);
extern BOOL FAR PASCAL fnReplyStartup(
HANDLE hUser, WORD Id, void far *lpPacket);
extern void GetTicketCount( void );
extern void ALLFRXRead( void );
extern void InitStartup( void );

/****************************************************************/
/* RCP       :   TICKET WRITER PHASE ONE                      */
/* Filename  :   currency.h                                   */
/* Version   :   V1.02  14:00  14 June 1988                   */
/*               by G.J.Smith                                 */
/*               Format of Currency details as stored in      */
/*               the Data Manager.                            */
/*               This data is requested via GLOBAL_CURRENCY   */
/*                                                            */
/* (C) RCP 1987 Copyright of Richards Computer Products       */
/****************************************************************/ define BCPLSTR char define GLOBAL_CURR_ZERO  512
/* This is the number which must be quoted to the Data Manager */
/* to read or write currency zero.                             */ define SWIFTBYTES    3
define MAXCURRENCIES 100

/* 1. This is the structure of the block obtained by requesting */
/*    data and quoting GLOBAL_CURRENCYNAME.                     */

/* There will be 'CurrencyCount' entries.                       */ typedef struct CURRENCY_NAME
    {
      BYTE CurrencyCount ;
      char Name[1][SWIFTBYTES+1] ;   /* Null-terminated */
    }
CURRNAME, *PCURRNAME, far *LPCURRNAME ;

/* 2. What follows is the structure of the global data block which */
/*    is used to hold all currency data.                           */ typedef struct
    {
    Long      FirstDay ;
    char      SwiftCode[SWIFTBYTES+1] ; /* Null-terminated */
    WORD      DecimalPlaces : 3 ;
    WORD      Is365Days : 1 ;
    WORD      IsInverse : 1 ;
    WORD      IsMoslem : 1 ;

BCPLSTR   Pay1[1] ;
    BCPLSTR   Pay2[1] ;
    BCPLSTR   Pay3[1] ;
    BYTE      HolidayInclude[1] ;  /* Null-terminated */
    BYTE      HolidayExclude[1] ;  /* Null-terminated */
    }
CURRDATA, *PCURRDATA, far *LPCURRDATA ;
#undef BCPLSTR
```

```
#if !defined( PTW_DATA_H )
    #define PTW_DATA_H
    #include "ptw_DATA.h"
#endif
/*>>WEB<< "ticket.web" <TW packet numbers>*/ line 310 "ticket.web"
define STORE_TICKET_REQ 0x0319
#define TICKET_COUNT_REQ 0x031A
#define TICKET_RETRIEVE_REQ 0x031B
#define EDIT_CONV_REQ 0x031C
#define OLD_TEXT_REQ 0x031D
#define AUDIT_COUNT_REQ 0x031E
#define AUDIT_RETRIEVE_REQ 0x031F
#define REPRINT_REQUEST 0x0320
#define PRINT_REQUEST 0x0321
define PRINT_SPLIT_TICKET 0x0322 line 321
define OFFLINE_CONV_STARTED 0x0409
#define PRINT_DATA 0x040A
#define PRINT_END 0x040B
#define PRINT_RELEASE 0x040C
define PRINT_CONFIRM 0x040D line 327
define STORE_TICKET_REPLY 0x080E
#define TICKET_COUNT_REPLY 0x080F
#define TICKET_RETRIEVE_REJECT 0x0810
#define TICKET_DATA 0x0811
#define EDIT_CONV_REJECT 0x0812
#define EDIT_CONV_ACCEPT 0x0813
#define OLD_TEXT_REJECT 0x0814
#define OLD_TEXT_REPLY 0x0815
#define AUDIT_COUNT_REPLY 0x0816
#define AUDIT_RETRIEVE_REJECT 0x0817
#define AUDIT_DATA 0x0818
#define REPRINT_REPLY 0x0819
#define PRINT_REPLY 0x081A
#define PRINT_DATA_ACK 0x081B
define PRINT_END_ACK 0x081C line 343
define ANALYSE_CONV_REQUEST 0x0900
#define TICKET_SNAPSHOT_REQ 0x0901
#define UNUSED_0902 0x0902
#define CA_SRCH_SNAPSHOT_REQ 0x0903
#define CA_SRCH_NOTIFY_REQ 0x0904
#define NEW_EXTERNAL_TICKET 0x0905
define MENU_SNAPSHOT_REQ 0x0906 line 351
define ANALYSE_TEXT 0x0A00
#define TERMINATE_ANALYSE_REQ 0x0A01
#define UNUSED_0A02 0x0A02
#define TICKET_NOTIFY_CANCEL 0x0A03
#define CA_SRCH_CANCEL 0x0A04
#define UNUSED_0A05 0x0A05
#define MENU_NOTIFY_REQ 0x0A06
#define MENU_NOTIFY_CANCEL 0x0A07
#define TICKET_NOTIFY_REQ 0x0A08
define ANALYSE_NEWLINE 0x0A09 line 362
define MENU_HAS_CHANGED 0x0B00 line 364
define ANALYSE_CONV_ACCEPT 0x0C00
#define ANALYSE_CONV_REJECT 0x0C01
#define CONV_ANALYSIS_COMPLETE 0x0C02
#define TICKET_REJECT 0x0C03
#define TICKET_DATA_REPLY 0x0C04
#define TICKET_NOTIFY_ACCEPT 0x0C05
#define TICKET_DISCARDED 0x0C06
#define CA_SRCH_REJECT 0x0C07
```

```c
#define CA_SRCH_SNAPSHOT_REPLY 0x0C08
#define CA_SRCH_NOTIFY_ACCEPT 0x0C09
#define CA_SRCH_NOTIFY 0x0C0A
#define CA_SRCH_UNNOTIFY 0x0C0B
#define MENU_REJECT 0x0C0C
#define MENU_NOTIFY_ACCEPT 0x0C0D
#define MENU_DATA 0x0C0E
#define ANALYSIS_INCONSISTENT 0x0C0F
#if !defined( PKT_DART_H )
    #define PKT_DART_H
    #include "pkt_dart.h"
#endif
#if !defined( PKT_MONI_H )
    #define PKT_MONI_H
    #include "pkt_moni.h"
#endif
/*****************************************************************
 *                                                               *
 *   camonit.h - Conversation analysis server monitor interface  *
 *                                                               *
 *   Written by Roger H. Abbott                                  *
 *                                                               *
 *   Copyright (C) 1988 Richards Computer Products Ltd          *
 *                                                               *
 *****************************************************************/ extern int MonPageIndex;
extern WORD ServerMonID;
extern long FRXtimeout;

#define MONITOR_TIMEOUT_PERIOD 8000
#define MONITOR_REREAD_PERIOD 3600000L
define MONITOR_TRY_AGAIN_PERIOD 120000L extern BOOL KeystationListensIssued;
extern BOOL MonPageOnView;

/* Initialise the fetching of FRXE-A */
extern void GetMonitorPages( void );

/* Assume we have all the page when this timeout expires */
extern WORD FAR PASCAL MonitorTimeout(void far *task, HANDLE hUser);

/* Process a MON_TEXT message */
extern void ProcessMonText( void far *lpPacket );

/* Can we send a view request ? */
extern BOOL MonReqSpace( void );

/* After a Mon view reject or unavailable, set timer to try later */
extern void TryFRXlater( void );
/*****************************************************************
 *                                                               *
 *   caglob.h - Conversation analysis server initialisation startup. *
 *              Ask for global data, proceed on any error except busy *
 *              Not to be called until prompts are initialised.  *
 *                                                               *
 *   Written by Roger H. Abbott                                  *
 *                                                               *
 *   Copyright (C) 1988 Richards Computer Products Ltd          *
 *                                                               *
 *****************************************************************/ extern void far pascal CAinit( void );
extern REPLY_FUNCTION fnReplyGlobData;

/*****************************************************************
 *                                                               *
 *   query.h - Routines for checking the ticket                  *
 *                                                               *
 *   Written by Roger Abbott from the BCPL of Alan Stokes        *
 *                                                               *
 *   Copyright (C) 1988 Richards Computer Products Ltd          *
 *                                                               *
 *****************************************************************/
```

```
#if !defined(QUERY_H)
#define QUERY_H

/* Check that a new value in the ticket is valid */
extern void check(FIELDNAME field, int valchanged);
extern void SetQuery(FIELDNAME Field, BOOL On);
extern void SendAnalysisInconsistent( REASONCODE Why );

#endif

/***********************************************************************
 *                                                                      *
 * curinfo.h - Routines to provide currency information                 *
 *                                                                      *
 * Written by Alan Stokes/Roger Abbott                                  *
 *                                                                      *
 * Copyright (C) 1987 Richards Computer Products Ltd                    *
 *                                                                      *
 ***********************************************************************/ if !defined(CURINFO_H)
define CURINFO_H define SWIFTBYTES  3 typedef struct
    {
    char SwiftCode[SWIFTBYTES] ;
    WORD Is365Days : 1 ;
    WORD IsInverse : 1 ;
    WORD IsMoslem : 1 ;
    }
DMCURRENCY ;

/* References to functions in curinfo.c */

/* Get information strings about a particular currency (CA code) */
extern BOOL getspot(int cur1, int cur2, int quotecur, PSTR Low, PSTR high);
extern BOOL getfwd(int cur1, int cur2, int quotecur,
int Period, PSTR Low, PSTR High);
extern BOOL getoutright(int cur1, int cur2, int quotecur,
int Period, PSTR Low, PSTR High);
extern void InitCurinfo( void );
extern int FindCAcode(char *Pointer);
extern void GetFRXcodes( void );
extern void DumpCurrencyInfo( void );

/* Variables containing currency information */ extern DMCURRENCY SwiftcodeTable[];
extern int FRXnumber[];
extern char DefSpot[ RATEBYTES+1 ];
extern int PmtCurrencies;
extern char Dollar;

#endif
/*
 *
 * $Header:   V:/caserver/overlay/h/prompt.h_v   1.0   25 Aug 1988   9:34:00   Graham  $
 *
 * $Author:   Graham  $
 *
 * $Log:   V:/caserver/overlay/h/prompt.h_v  $
 *
 *    Rev 1.0   25 Aug 1988   9:34:00   Graham
 * Initial revision.
 *
 *    Rev 1.0   21 Jul 1988  10:48:12   Graham
 * Prompt system header file
 *
 *    Rev 1.0   17 Jun 1988  17:01:24   Graham
 * Initial revision.
 *
 */
```

```c
#include "types.h"
#include "qtw_data.h"
#include "qtw_menu.h"
#include "ch~nnel.h"
#include "tasks.h"

#if !defined(PROMPT_H)
#define PROMPT_H

/*==========================================================================*/
/*
 * Menu system constants
 */
#define MAXCOLWIDTH 20
#define COLUMNINCMAXCOLWIDTH
#define LASTCOLWIDTH 20
define SINGLECOLWIDTH 60 define MAXMENUCOLS (SINGLECOLWIDTH + LASTCOLWIDTH)

/*
 * Initialisation constants
 */
/* Just for now lets default to 2K*/
#define DEFAULT_SIZE 512
#define DEFAULT_CURRECYNAMESSIZE DEFAULT_SIZE
#define DEFAULT_BANKNAMESSIZE DEFAULT_SIZE
#define DEFAULT_BROKERNAMESSIZE (DEFAULT_SIZE * 2)
#define DEFAULT_TOWNNAMESSIZE (DEFAULT_SIZE * 2)
#define DEFAULT_CONTACTNAMESSIZE DEFAULT_SIZE
define DEFAULT_INTERESTNAMESSIZE DEFAULT_SIZE /*
 * Offsets into the datablocks array for the data items read from the
 * data manager.
 */
#define CURRENCYNAME_BLOCK 0
#define CURRENCY_BLOCK 1
#define BANK_BLOCK 2
#define BROKER_BLOCK 3
#define TOWN_BLOCK 4
#define CONT_CODES_BLOCK 5
#define INTEREST_BLOCK 6

/*
 * Usefull macros for menu system
 */
#define NIF SetOutputPage(PmtOutputPage); Kprintf("Menu function not implimented yet\n"); return TRUE;
#ifdef DEBUG
#define FUNCTRACE(funcname) SetOutputPage(PmtOutputPage); Kprintf(#funcname "Called\n");
#else
#define FUNCTRACE(funcname)
#endif
/* First lets have a macro for finding the max index for the static arrays */
#define MAXARRAYINDEX(array) (sizeof(array)/sizeof(array[0]) - 1)

#define BUFFERSIZE 400 /* Restricted size */
#define MAXBUFFERSIZE 512
#define MAXDATASIZE (BUFFERSIZE - sizeof(PKT_MENU_DATA) - sizeof(BYTE))
#define BANKTITLE "Bank"
#define BROKERTITLE "Broker"
#define TOWNTITLE "Towns"
#define CONTACTTITLE "Contact"
#define INTERESTTITLE "Interest"
#define CURRENCYTITLE "Currency"
#define PAYTITLE "Pay"
#define TRADETITLE "Trade"
#define CONFIRMTITLE "Confirm"
```

```c
#defineBankFirstLetter"or press\nfirst letter of\nBank name"
#defineSPACEtoRESET"SPACE to RESET"
#defineZEROforINDEX"for Index"
#defineNULLSTRING""
#defineMAXCONVERSATIONS24

/****************************************************************************************\
*       *
*MENU/PROMPT CONSTANTS    *
*       *
\****************************************************************************************/ define PMTS_PER_MENU36/* Number of prompts per menu*/
define PMTS_PER_COL9 defineMAX_BANK_PMT_SIZE(sizeof(PROMPT) + 40)/* Size of the prompt structure + 20 bytes for each string */
defineMAX_BROKER_PMT_SIZE(sizeof(PROMPT) + 40)/* Size of the prompt structure + 20 bytes for each string */
#defineMAX_TOWN_PMT_SIZE(sizeof(PROMPT) + 40)/* Size of the prompt structure + 20 bytes for each string */
#define MAX_CONTACT_PMT_SIZE(sizeof(PROMPT) + 7)/* Size of prompt struct + 7 bytes for contact name & code */
#define MAX_INTEREST_PMT_SIZE(sizeof(PROMPT) + 28)/* Size of prompt struct + 28 bytes for each string */
#define MAX_CURRENCY_PMT_SIZE(sizeof(PROMPT) + 5)/* Size of prompt struct + 4 bytes for swift code and null */
#define MAX_PERIOD_PMT_SIZE(sizeof(PROMPT) + 20)/* Should be enough */
#define MAX_MONTH_PMT_SIZE(sizeof(PROMPT) + 20)
#define MAX_INDEX_PMT_SIZE(sizeof(PROMPT) + 20)

/*      CONTACT CODES   */ defineCONTACT_MENUS2/* 2 contact menus*/
define CONTACT_PMTS68/* 68 prompts for contact menu(s) (2 x more)*/
#defineCONTACT_PMTS_PER_MENU(PMTS_PER_MENU - 1)
#define CONTACT_PMTS_PER_COL7/* Number of prompts / column for contact menu*/

/*  INTEREST CODES   */
#defineINTEREST_MENUS1/* 1 contact menu*/
#define INTEREST_PMTS18/* 68 prompts for contact menu(s) (2 x more)*/
#defineINTEREST_PMTS_PER_MENU(PMTS_PER_MENU - 1)
#define INTEREST_PMTS_PER_COL7/* Number of prompts / column for contact menu*/

/*  CURRENCY CODES   */
#defineCURRENCY_PMTS_PER_MENU(PMTS_PER_MENU - 2)
#define CURRENCY_MENUS((MAXCURRENCIES + INTEREST_PMTS_PER_MENU - 1) / INTEREST_PMTS_PER_MENU)
#define CURRENCY_PMTS100/* 68 prompts for contact menu(s) (2 x more)*/
#define CURRENCY_PMTS_PER_COL9/* Number of prompts / column for contact menu*/

/* PAY   */
#definePAYPROMPTCOUNT12
#define THEIRPAYPROMPTCOUNT9
#defineMAX_PAY_PMT_SIZE(sizeof(PROMPT) + 50)
#define PAY_PMTS_PER_COL9
#define THEIRPAY_PMTS_PER_COL6

/*    CONFIRM   */
#define CONFIRMPROMPTCOUNT10
#define MAX_CONFIRM_PMT_SIZE(sizeof(PROMPT) + 50)

/*TRADE   */
#define TRADEPROMPTCOUNT9
#define MAX_TRADE_PMT_SIZE(sizeof(PROMPT) + 50)

/*==========================================================================================*/

/****************************************************************************************\
*       *
*TYPES   *
*       *
\****************************************************************************************/ typedef BOOL FAR PASCALMENU_FUNCTION (WORD, WORD, long, char);
typedef MENU_FUNCTION FAR PASCAL *LPMENU_FUNCTION;
typedef HANDLE PHANDLE;
```

```c
typedef struct CANotify {
   WORDSendID;/* The send id or Request id used for replies*/
   WORDReplyHandle;/* My reply handle for replies to the accept*/
   WORDLine;/* Line number where last prompt was selected*/
   MENUIDLastAutoSlct;/* Last menu which was automatically generated*/
   charAutoSlct;/* 'TRUE' if generating an auto select menu*/
   charSelectChar;/* The character used for selection from the menu*/
   WORDChannelIndex;/* Index to get the channel from the CA server*/
   longDcnvref;
   struct {
      charSlctChar;
      intline;
   } selected[MAX_MENU];
}CANOTIFY, *PCANOTIFY, far *LPCANOTIFY;

/* Let's make some task control blocks and associated functions for the Tx of menus */
typedef struct {
   TCB_COMMONcommon;
   PHANDLEparams;
}FIXEDMENUTCB, *PFIXEDMENUTCB, far *LPFIXEDMENUTCB;

/*
 * Define menus for which we know the sizes and number of the columns
 * at compile time.
 *
 * Note that this structure MUST be kept up to date with ticket.web
 */ define __MENUSTRUCT(name, number)\
typedef struct name##MENU {\
   WORDMenuID;\
   charSubMenuID;\
   WORD MenuIsFixed : 1;\
   WORDAlphaSelectsSubMenu : 1;\
   WORDDoNotRedisplay : 1;\
   WORD Rows;\
   WORD Columns;\
   WORD WidthOfColumn[number]; \
}name##MENU, *P##name##MENU, far *LP##name##MENU;

__MENUSTRUCT(INDEX, 4)
__MENUSTRUCT(MONTH, 5)
__MENUSTRUCT(PERIOD, 5)
__MENUSTRUCT(TYPE, 2)
__MENUSTRUCT(BANK, 5)
__MENUSTRUCT(BROKER, 5)
__MENUSTRUCT(TOWN, 5)
__MENUSTRUCT(PAY, 2)
__MENUSTRUCT(CONFIRM, 2)
__MENUSTRUCT(TRADE, 2)

#undef __MENUSTRUCT

/* Some parameter blocks */ typedef struct GENERICPARAMETER {
   BOOLinuse;
   chardata[16];
} GENERICPARAMETER, *PGENERICPARAMETER, far *LPGENERICPARAMETER;

typedef struct FIXEDPARAM {
   WORDReplyID;
   MENUIDMenuID;
   charSubMenuID;/* The sub menu id we are generating*/
   WORDIsFirst : 1;/* TRUE if the menu block is to be sent*/
   WORDPromptNumber;/* How far we have got so far*/
   char far*string;/* The next string to send*/
   longDcnvref;
}FIXEDPARAMS, *PFIXEDPARAMS, far *LPFIXEDPARAMS;

#define NOAUTOTX0
#define AUTOTX1
#define CLEANMNU2
```

```
extern HCHANNELchannel;
extern PHANDLEFixedParamIdx;/* Parameter handle for fixed menu items*/
extern charbuffer[];/* Tmp buffer used for sends*/
extern char farspaces[];/* For insert text*/
extern char farblank[];
extern char far*nullstring;
extern PROMPTMorePrompt;
extern char far*MoreText[];
extern CANOTIFYCANotifyIDList[];
extern LPMENU_FUNCTIONmenufunctab[];
extern BOOLAgreedMap[];
extern char farPmtPmtTxt[];/* Usefull tmp buffers for constructing prompts*/
extern char farPmtInsTxt[];
FIXEDPARAMSfixedparam;/* Fixed menu parameter block for tmp storage*/

/*
 * Initialisation data areas.
 *
 * The following data areas are set up during the intialisation phase
 * of the CA Server and are used by the menu system for text of the
 * prompts.
 */

/* define the currency structure used internally by the CA server */
#include "currdata.h"
 extern LPCA_CURRENCY_DATACurrencyTable[];
 extern char far*CurrencyMenus[];
 extern int CurrencyCount;
 extern char far*CurrencyNames[];

extern char far*BanksPrimary[];
 extern char far*BanksAlpha[];

extern char far*BrokersPrimary[];
 extern char far*BrokersAlpha[];

extern char far*TownsPrimary[];
 extern char far*TownsAlpha[];

extern char far*ContactAlpha[];
 extern char far*ContactMenus[];
 extern intContactCount;

extern char far*InterestAlpha[];
 extern char far*InterestMenus[];
 extern intInterestCount;

extern LPTW_TICKETpmttkt;
 extern shortPmtOutputPage;

/*
 * Initialisation functions
 */

BOOL FAR PASCALPmtInitPhase_0(void);
void FAR PASCAL PmtInitPhase_1(void (FAR PASCAL * FAR PASCAL function)(void));
void FAR PASCAL PmtInitMenuData(void);
voidNextItem(void);
BOOL FAR PASCAL fnGlobalDataReadReq(HANDLE, WORD, LPPKT_READ_REPLY);
BOOL FAR PASCALfnDataHasChanged(HANDLE, WORD, LPPKT_DATA_HAS_CHANGED);
BOOLReadMapIsEmpty(void);
BOOLCurrencyMapIsEmpty(void);
BOOL FAR PASCALCurrencyNameUpack(char far *data, WORD size);
BOOL FAR PASCALCurrencyUpack(char far *data, WORD size);
BOOL FAR PASCALBanksUpack(char far *data, WORD size);
BOOL FAR PASCALBrokersUpack(char far *data, WORD size);
BOOL FAR PASCALTownsUpack(char far *data, WORD size);
BOOL FAR PASCALContactUpack(char far *data, WORD size);
BOOL FAR PASCALInterestUpack(char far *data, WORD size);

/*
 * Menu Generation functions
 */
```

```c
extern int pascal far GenCurrentMenu(WORD hUser, WORD Id, long DconvRef, char SubMenuID);
extern int pascal far GenBankMenu(WORD hUser, WORD Id, long DconvRef, char SubMenuID);
extern int pascal far GenBrokerMenu(WORD hUser, WORD Id, long DconvRef, char SubMenuID);
extern int pascal far GenCaptureRateMenu(WORD hUser, WORD Id, long DconvRef, char SubMenuID);
extern int pascal far GenCaptureConfirmMenu(WORD hUser, WORD Id, long DconvRef,char SubMenuID);
extern int pascal far GenContactMenu(WORD hUser, WORD Id, long DconvRef, char SubMenuID);
extern int pascal far GenConfirmMenu(WORD hUser, WORD Id, long DconvRef, char SubMenuID);
extern int pascal far GenCurrencyMenu(WORD hUser, WORD Id, long DconvRef, char SubMenuID);
extern int pascal far GenCrossCurrencyMenu(WORD hUser, WORD Id, long DconvRef, char SubMenuID);
extern int pascal far GenInterestMenu(WORD hUser, WORD Id, long DconvRef, char SubMenuID);
extern int pascal far GenMonthMenu(WORD hUser, WORD Id, long DconvRef, char SubMenuID);
extern int pascal far GenFirstPayMenu(WORD hUser, WORD Id, long DconvRef, char SubMenuID);
extern int pascal far GenSecondPayMenu(WORD hUser, WORD Id, long DconvRef, char SubMenuID);
extern int pascal far GenTheirFirstPayMenu(WORD hUser, WORD Id, long DconvRef, char SubMenuID);
extern int pascal far GenTheirSecondPayMenu(WORD hUser, WORD Id, long DconvRef, char SubMenuID);
extern int pascal far GenPeriodMenu(WORD hUser, WORD Id, long DconvRef, char SubMenuID);
extern int pascal far GenTownMenu(WORD hUser, WORD Id, long DconvRef, char SubMenuID);
extern int pascal far GenTradeMenu(WORD hUser, WORD Id, long DconvRef, char SubMenuID);
extern int pascal far GenTypeMenu(WORD hUser, WORD Id, long DconvRef, char SubMenuID);
extern int pascal far GenIndexMenu(WORD hUser, WORD Id, long DconvRef, char SubMenuID);

/*
 * 'Task' functions for menu packet construction
 */
extern void FAR PASCAL FixedMenuAlloc(void far *task);
extern void FAR PASCAL FixedMenuFree(void far *task);
extern WORD FAR PASCAL IndexAction(void far *task, HANDLE hUser);
extern WORD FAR PASCAL BankAction(void far *task, HANDLE hUser);
extern WORD FAR PASCAL BrokerAction(void far *task, HANDLE hUser);
extern WORD FAR PASCAL ContactAction(void far *task, HANDLE hUser);
extern WORD FAR PASCAL InterestAction(void far *task, HANDLE hUser);
extern WORD FAR PASCAL CurrencyAction(void far *task, HANDLE hUser);
extern WORD FAR PASCAL PeriodAction(void far *task, HANDLE hUser);
extern WORD FAR PASCAL TownAction(void far *task, HANDLE hUser);
extern WORD FAR PASCAL TypeAction(void far *task, HANDLE hUser);
extern WORD FAR PASCAL FirstPayAction(void far *task, HANDLE hUser);
extern WORD FAR PASCAL MonthAction(void far *task, HANDLE hUser);
extern WORD FAR PASCAL TradeAction(void far *task, HANDLE hUser);
extern WORD FAR PASCAL SecondPayAction(void far *task, HANDLE hUser);
extern WORD FAR PASCAL TheirFirstPayAction(void far *task, HANDLE hUser);
extern WORD FAR PASCAL TheirSecondPayAction(void far *task, HANDLE hUser);
extern WORD FAR PASCAL CaptureRateAction(void far *task, HANDLE hUser);
extern WORD FAR PASCAL CaptureConfirmAction(void far *task, HANDLE hUser);
extern WORD FAR PASCAL ConfirmAction(void far *task, HANDLE hUser);

/*
 * Micselaneous functions for string manipulations and prompt string
 * generation
 */
extern int      CountAlphaStrings(char, char far *);
extern char far *   SkipStrings(char far *, char far *, int);
extern int      BuildPrompt(void far *buffer, PROMPT *template, char far *insert, char far *prompt, int limit);
extern char far     *CurrencyString(int SwiftCode);
extern char far     *AmountCurrencyString(LPTW_TICKET ticket);
extern char far     *OtherCurrencyString(LPTW_TICKET ticket);
extern char far     *TransactionString(LPTW_TICKET ticket);
extern char far     *TheirTransactionString(LPTW_TICKET ticket);
extern char far     *DealRate(LPTW_TICKET ticket);
extern char far     *Amount(LPTW_TICKET ticket);
extern char far     *LowQuote(LPTW_TICKET ticket);
extern char far     *HighQuote(LPTW_TICKET ticket);
extern char far     *NearRate(LPTW_TICKET ticket);
extern char far     *FarRate(LPTW_TICKET ticket);
extern char far     *NearDate(LPTW_TICKET ticket);
extern char far     *FarDate(LPTW_TICKET ticket);
extern void     ConfirmMenuItem(LPTW_TICKET ticket, LPSTR buf);
extern void     ValMenuItem(LPTW_TICKET tkt, LPSTR buf, BOOL agreed);
extern void     RatesMenuItem(LPTW_TICKET tkt, LPSTR buf, BOOL agreed);

MENUID   TicketToMenuId(LPTW_TICKET ticket, WORD CANotifyID);

/*
 * Network channel reply functions
 */
extern BOOL PASCAL FAR fnMenuSnapReq(HANDLE hUser, WORD Id,struct MenuSnapReq far *packet);
externBOOL FAR PASCALfnMenuNotifyReq(HANDLE hUser, WORD Id, long Dcnvref, LPPACKETHEAD packet);
externBOOL FAR PASCALfnMenuNotifyCancel(HANDLE hUser, WORD id, LPPACKETHEAD packet);
externBOOL FAR PASCALfnMenuNotifyReply(HANDLE hUser, WORD id, LPPACKETHEAD packet);
```

```
BOOL FAR PASCALfnMenuNotifySelect(HANDLE CAChannelIndex, WORD CANotifyID, LPPKT_MENU_NOTIFY_SELECT packet);
BOOL FAR PASCALfnMenuNotifyPeek(HANDLE CAChannelIndex, WORD CANotifyID, LPPKT_MENU_NOTIFY_PEEK packet);

#define __REPLYFUNC(func)\
extern BOOL PASCAL FAR func(HANDLE hUser,WORD Id,void far *packet);

__REPLYFUNC(fnMenuNotifyCancl)
__REPLYFUNC(fnGlobalReadReject)
__REPLYFUNC(fnGlobalReadReply)
#undef __REPLYFUNC
void SendReject(WORD reason, HCHANNEL channel, HREPLY ReplyID);
void SendNotifyAccept(HCHANNEL channel, WORD Keystation, WORD CANotifyID);
void FAR PASCALPMTUpdateFunction(LPTW_TICKET ticket, WORD hUser);
WORD FAR PASCAL GetCurrentCALineNumber(WORD CAcnvid);

/*
 * Parameter block handling routines
 */

PHANDLEParmAlloc(void);
void ParmFree(PHANDLE parameter);
void far *ParmAddr(PHANDLE parameter);

/*
 * Some macros to make life easier
 */ define SWAPDEAL(t)(t->DealType == SWAP)
define DEPDEAL(t)(t->DealType == DEPOSIT)
#define SPOTDEAL(t)(t->DealType == SPOT)
#define CURR1OK(t)(t->Currency1 != TKT_UNKNOWN)
#define CURR2OK(t)(t->Currency2 != TKT_UNKNOWN)
#defineMARKETMAKER(t)(t->Quoter == US)
#define MARKETTAKER(t)(t->Quoter != US)
#define OFFLINE(t)(t->Flags.StartOnline)
#define AMOUNTOK(t)(*t->Amount != 0)
#define OURPAY1(t)(*t->OurPay1Val != 0)
#define OURPAY2(t)(*t->OurPay2Val != 0)
#define THEIRPAY1(t)(*t->TheirPay1Val != 0)
#define THEIRPAY2(t)(*t->TheirPay2Val != 0)
#define LOQUOTEOK(t)(*t->LowQuote != 0)
#define LOWQUOTE(t)(t->LowQuote)
#define HIQUOTEOK(t)(*t->HighQuote != 0)
#define HIGHQUOTE(t)(t->HighQuote)
#define BUYER(t)(t->Buyer != TKT_UNKNOWN)
#define BUYERISUS(t)(t->Buyer == US)

/*
 * Buyer is usAmount curr = C1Swap DealPaySecond PayTheir payTheir pay 2
 * ===============================================================================
 *
 * 00    OC1   X    C2    X
 *
 * 00    1C2   C1   C1    C2
 *
 * 01    OC2   X    C1    X
 *
 * 01    1C1   C2   C2    C1
 *
 * 10    OC2   X    C1    X
 *
 * 10    1C1   C2   C2    C1
 *
 * 11    OC1   X    C2    X
 *
 * 11    1C2   C1   C1    C2
 */ typedef struct {
   CURRENCYFirst;
   CURRENCYSecond;
```

```
#define SWAPDEAL(t)(t->DealType == SWAP)
define DEPDEAL(t)(t->DealType == DEPOSIT)
#define SPOTDEAL(t)(t->DealType == SPOT)
#define CURR1OK(t)(t->Currency1 != TKT_UNKNOWN)
#define CURR2OK(t)(t->Currency2 != TKT_UNKNOWN)
#define MARKETMAKER(t)(t->Quoter == US)
#define MARKETTAKER(t)(t->Quoter != US)
#define OFFLINE(t)(t->Flags.StartOnline)
#define AMOUNTOK(t)(*t->Amount != 0)
#define OURPAY1(t)(*t->OurPay1Val != 0)
#define OURPAY2(t)(*t->OurPay2Val != 0)
#define THEIRPAY1(t)(*t->TheirPay1Val != 0)
#define THEIRPAY2(t)(*t->TheirPay2Val != 0)
#define LOQUOTEOK(t)(*t->LowQuote != 0)
#define LOWQUOTE(t)(t->LowQuote)
#define HIQUOTEOK(t)(*t->HighQuote != 0)
#define HIGHQUOTE(t)(t->HighQuote)
#define BUYER(t)(t->Buyer != TKT_UNKNOWN)
#define BUYERISUS(t)(t->Buyer == US)

/*
 * Buyer is usAmount curr = C1Swap DealPaySecond PayTheir payTheir pay 2
 * =====================================================================
 *
 * 00    0C1   X    C2   X
 *
 * 00    1C2   C1   C1   C2
 *
 * 01    0C2   X    C1   X
 *
 * 01    1C1   C2   C2   C1
 *
 * 10    0C2   X    C1   X
 *
 * 10    1C1   C2   C2   C1
 *
 * 11    0C1   X    C2   X
 *
 * 11    1C2   C1   C1   C2
 */ typedef struct {
   CURRENCYFirst;
   CURRENCYSecond;
   CURRENCYTheirFirst;
   CURRENCYTheirSecond;
}PAY;

extern PAYPayCurrency[2][2][2];

#define OURFIRSTPAYCURR(t)((PayCurrency[BUYERISUS(t)][t->AmountCurr == CURR1][SWAPDEAL(t)].First == CURR1) ? \
 t->Currency1 : t->Currency2)

#define OURSECONDPAYCURR(t)((PayCurrency[BUYERISUS(t)][t->AmountCurr == CURR1][SWAPDEAL(t)].Second == CURR1) ? \
 t->Currency1 : t->Currency2)

#define THEIRFIRSTPAYCURR(t)((PayCurrency[BUYERISUS(t)][t->AmountCurr == CURR1][SWAPDEAL(t)].TheirFirst == CURR1)?\
 t->Currency1 : t->Currency2)

#define THEIRSECONDPAYCURR(t)((PayCurrency[BUYERISUS(t)][t->AmountCurr == CURR1][SWAPDEAL(t)].TheirSecond == CURR1)?\
 t->Currency1 : t->Currency2)

#define AMOUNTCURR(t)(BUYERISUS(t) ? ((t->AmountCurr == CURR1) ? t->Currency1 : t->Currency2) : \
((t->AmountCurr == CURR1) ? t->Currency2 : t->Currency1))
#define OTHERCURR(t)(BUYERISUS(t) ? ((t->AmountCurr == CURR1) ? t->Currency2 : t->Currency1) : \
((t->AmountCurr == CURR1) ? t->Currency1 : t->Currency2))

#endif

TICKET WRITER CODE FILES
------------------------

AMOUNT.C
CAMESAGE.C
CASERVER.C
COMPARSE.C
CURINFO.C
DATE.C
DATEPARS.C
```

```
DATEPROC.C
DEBUG.C
DEPOSIT.C
DEPOSIT2.C
DEPPARS.C
FORWARD.C
FRX.C
FULLFRX.C
FWDPARS.C
FWDRATES.C
GETFRX.C
INITPARS.C
INSERT.C
KPRINTF.C
KTIME.C
KWIN.C
MESLEN.C
MISCPARS.C
NETWORK.C
NUMBER.C
NUMBER2.C
OUTPARS.C
OVMEM.C
PARSE.C
PAY.C
PAY2.C
PERIOD.C
PTW_SIZE.C
QUERY.C
READ.C
READCONV.C
SPOT.C
SPOT2.C
SPOTPARS.C
SRVEMS.C
T.C
T1.C
T2.C
T3.C
TESTCA.C
TESTDATE.C
TESTFRX.C
TICKMES.C
VOCAB.C

/************************************************************************
 *                                                                      *
 * amount.c - Routines to handle amounts                                *
 *                                                                      *
 * Written by Alan Stokes                                               *
 *                                                                      *
 * Copyright (C) 1987 Richards Computer Products Ltd                    *
 *                                                                      *
 ************************************************************************/ include <string.h>
include <ctype.h> include "analdata.h"
include "amount.h"
#include "number.h"
#include "read.h"
#include "insert.h"

static BOOL readamt(PSTR, BOOL *);
static BOOL nextpart(PSTR);
static BOOL similar(PSTR, PSTR);
static int sigfigs(PSTR);
static BOOL addzeros(int, PSTR);

/* Add a number of zeros onto the end of an amount, checking the length
 * doesn't exceed the maximum.
 */
```

```c
static BOOL addzeros(count, amount)
int count;
PSTR amount;
{
   int i = strlen(amount);
   if (i + count > AMOUNTBYTES)
      return (FALSE);
   else
   {
      for (; count > 0; i++, count--)
         amount[i] = '0';
      amount[i] = '\0';
      return (TRUE);
   }
}

/* Return the number of significant figures in a number (i.e. the number of
 * digits before the sequence of zeros at the end of the number.
 */
static int sigfigs(number)
PSTR number;
{
   int result = strlen(number);

for(; --result >= 0 && number[result] == '0';)
      ;

return (++result);
}

/* Check that two amounts are similar; this means they have the same number of
 * digits, or if one has an extra digit the extra digit must be a 1.
 */
static BOOL similar(amount1, amount2)
PSTR amount1, amount2;
{
   int len1 = strlen(amount1), len2 = strlen(amount2);

if (len1 == len2)
      return (TRUE);
   else if (abs(len1 - len2) != 1)
      return (FALSE);
   else if (len1 > len2)
      return (amount1[0] == '1');
   else
      return (amount2[0] == '1');
}

/* Read a 'part' of an amount.  This is a series of digits, terminated by a
 * decimal point or suchlike punctuation.  We have to keep track of how many
 * decimal points have been found and where.
 */
static BOOL nextpart(part)
PSTR part;
{
   int pos = 0;
   BOOL result = TRUE;

part[0] = '\0';

for (;;)
   {
      char ch = nextnumch(TRUE);

switch (ch)
      {
   case '.': case ',':
      /* These are both decimal points */
      if (++AnalysisData->dpcount == 1)
         AnalysisData->dppos = pos;
      return (result);
   case ';': case ' ':
      /* These are ignored, but act as separators between parts of the
       * amount.
```

```
    */
    if (AnalysisData->dpcount == 1)
        /* A decimal point already found is to be discarded */
        ++AnalysisData->dpcount;
    return (result);
default:
    if (isdigit(ch))
    {
        part[pos++] = ch;
        if (pos > AMOUNTBYTES)
    return (FALSE);
        part[pos] = '\0';
        break;
    }
    else
    {
        /* Strange characters - this must be at the end of the
* number
*/
        until (ch == 0 || ch == ' ')
        { ch = nextnumch(FALSE);
    if (isdigit(ch))
        /* More digits found; this part is illegal */
        result = FALSE;
        }

AnalysisData->ended = TRUE;
        return (result);
    }
        }
    }
}

/* Read an amount from one or more number symbols.
 * An amount may be in millions or in ordinary units; we can only tell from
 * the size of the number (3 is in millions; 3 000 000 is probably ordinary
 * units). If the amount is in more than one section the succeeding sections
 * will always three digits. The parameter is the string into which we want
 * the amount to be placed (it is stored as a string containing only digits).
 * The result is whether we were successful. The inmillions flag is set if
 * we assumed the amount was in millions and added an appropriate number of
 * zeros.
 * Many complications are caused by the fact that decimal points and commas
 * are interchangeable & indistinguishable.
 */
static BOOL readamt(PSTR amount, BOOL *inmillions)
{
    /* Number of decimal points encountered so far, and position of the first
     * (if applicable)
     */
    int len; /* Length of amount */
    static char part[AMOUNTBYTES+1];

AnalysisData->ended = FALSE;
    AnalysisData->dpcount = 0;
    AnalysisData->numpos = 0;

strcpy(AnalysisData->numbuf, AnalysisData->symbuf);

unless (nextpart(part))
        return (FALSE);
    strcpy(amount, part);
    len = strlen(amount);

/* A leading zero is only allowed if it is immediately followed by a
     * decimal point; in this case delete it.
     */
    if (amount[0] == '0')
    {
        unless (AnalysisData->dpcount == 1 && AnalysisData->dppos == 1)
    return (FALSE);
        --(AnalysisData->dppos);
        --len;
        memmove(amount, amount+1, len * sizeof(char));
```

```
}
    until (AnalysisData->ended)
    {
        BOOL inmiddle = (AnalysisData->numpos != 0); /* In middle of a symbol */
        int olddppos = AnalysisData->dppos;
        int olddpcount = AnalysisData->dpcount;
        int partlen;
        BOOL goodpart;

if (!nextpart(part))
goodpart = FALSE;
        else
        {
partlen = strlen(part);

if (partlen == 3 ||
(AnalysisData->ended && AnalysisData->dpcount == 1 &&
len+partlen < 4))
    /* Ok if we get another three character bit, or if we reach the
     * end and the break was caused by the decimal point (eg 1.23)
     */
    goodpart = TRUE;
else if (partlen != 0)
    /* A peculiar number of characters, so reject it */
    goodpart = FALSE;
else
{
    /* A null-length section.  Check that this is just garbage at the
     * end of the amount (eg 750.000,.-- (!)). All further parts
     * must contain no digits.
     */
    goodpart = TRUE;
    until (AnalysisData->ended || !goodpart)
    {
        if (!nextpart(part) || (partlen = strlen(part)) != 0)
  goodpart = FALSE;
    }
    if (goodpart)
        /* Ignore any subsequent decimal points discovered */
    {
        AnalysisData->dppos = olddppos;
        olddpcount = AnalysisData->dpcount;
    }
}
        } if (!goodpart)
        {
/* We just found something not part of the amount */
if (AnalysisData->symcount == 0 || inmiddle)
    /* We are halfway through a single symbol, or this is the first
     * symbol, so we can't ignore this part, so the whole amount must
     * be in error.
     */
    return (FALSE);

/* Otherwise, just ignore this part & assume we have reached the end.
 */
backsym();
AnalysisData->dppos = olddppos;
olddpcount = AnalysisData->dpcount;
break;
        }

/* Having found a valid part we add it on to the end of the amount */
        {
int newlen = len + partlen;

if (newlen > AMOUNTBYTES)
    /* Amount now too big */
    return (FALSE);
strcpy(amount + len, part);
len = newlen;
        }
    }
```

```c
    /* Number must not start with a '0' (the exception is handled above), and
     * must contain some digits.
     */
    if (amount[0] == '0' || digits(amount) == 0)
        return (FALSE);

if (len < 4 || (AnalysisData->dpcount == 1 &&
    AnalysisData->dppos < 4 && len < 5 ) )
    {
        /* This is such a small number it must be a number of millions */
        int extrazeros = 6;

if (AnalysisData->dpcount == 1)
 extrazeros = extrazeros - (len - AnalysisData->dppos);
        addzeros(extrazeros, amount);
        *inmillions = TRUE;
    }
    else
        *inmillions = FALSE;

return (TRUE);
}

/* Attempt to parse a number as an amount.  force is TRUE if we know the
 * number must be an amount.  The result is whether we were successful.
 */
BOOL parseamount(force)
BOOL force;
{
    static BOOL ok;
    static BOOL inmillions;
    static char amount[AMOUNTBYTES+1];

ok = TRUE;
    AnalysisData->symcount = 0;

if (!readamt(amount, &inmillions))
        ok = FALSE;
    else
    {
        nextsym();
        switch (AnalysisData->symbol)
        {
    case S_MINE: case S_YOURS: case S_CURRENCY:
        /* These are strong indications that the number was an amount */
        force = TRUE;
        backsym();
        break;
    case S_MIO:
        if (!inmillions)
            /* This indicates the amount is a number of millions; if we
 * have not already assumed this we must do something
 * about it
 */
            unless (addzeros(6, amount))
        ok = FALSE;
        force = TRUE;
        break;
    case S_YARD:
        /* Short for milliard - 10^9. */
        unless (addzeros((inmillions ? 3 : 9), amount))
            ok = FALSE;
        force = TRUE;
        break;
    case S_AGAINST: case S_MONTH:
        /* This is probably a date, unless force is set */
        if (force)
            backsym();
        else
            ok = FALSE;
        break;
    case S_MTH: case S_WEEK: case S_YEAR:
    case S_TH: case S_PERCENT:
        /* These mean it cannot be an amount */
        ok = FALSE;
```

```
      break;
default:
      backsym();
      break;
   } if (ok && !force)
      {
/* Unless the force flag is set make some checks on the
 * reasonableness of the number as an amount.
 */
BOOL knowold = know(t_amount);
PSTR oldamount = Ticket->Amount;

/* If there is already an amount the new one must be similar to
 * it; otherwise just check it looks reasonable.
 */
if (knowold && !similar(amount, oldamount))
   ok = FALSE;
else unless (knowold && strcmp(amount, oldamount) == 0)
{
   int maxsigfigs;
   int len = strlen(amount);

if (len > 6)
      maxsigfigs = 4;
   else
      maxsigfigs = 3;

unless (len > 5 && sigfigs(amount) <= maxsigfigs)
      ok = FALSE;
}
      }
   } if (ok)
      insertstring(t_amount, amount, st_extracted);
   else
      backphrase();

return (ok);
}

/*************************************************************
 *                                                           *
 * camesage.c - Conversation analysis message processing     *
 *                                                           *
 * Written by Roger H. Abbott                                *
 *                                                           *
 * Copyright (C) 1988 Richards Computer Products Ltd         *
 *                                                           *
 *************************************************************/ include <setjmp.h>
include <ctype.h> include "cadata.h"
include "caserver.h"
#include "camesage.h"
#include "qtw_anal.h"
#include "qtw_stor.h"
#include "date.h"
#include "parse.h"
#include "ovmem.h"
#include "debug.h"
#include "Kprintf.h"
#include "tickmes.h"
#include "insert.h"
#include "query.h"
#include "lstring.h"
#include "ktime.h"
#include "tasks.h"

extern jmp_buf mark;
   jmp_buf mark;
```

```
static void SendAnalyseReject( HANDLE hUser, WORD Id, REASONCODE Why );
static BOOL ReplyTicketRetrieveReject(
HANDLE hUser, WORD Id, LPPKT_REASON lpPacket);
static BOOL ReplyTicketData(
HANDLE hUser, WORD Id, LPPKT_TICKETDATA lpPacket);
static void ReplyAnalyseText( LPPKT_ANALYSE_TEXT lpPacket);
static void ReplyTicketNotifyReq( LPPKT_TKT_NOTIFY lpPacket );
static void ProcessNotifyList( LPCONVDATA Conv );
static void ReplyTerminateAnalyseReq( LPPACKETHEAD lpPacket );
static void CancelAnalysisStartup( void );
static void ReportDump(LPSTR buffer, WORD length);
static WORD FAR PASCAL SendTicket( void far *task, HANDLE hUser );

static PKT_RETRIEVE TicketRequest = {
{ sizeof(PKT_RETRIEVE), TICKET_RETRIEVE_REQ, 0, 0 },
1, 0, 0 };

static PACKETHEAD AnalyseAccepted =
{ sizeof(PACKETHEAD), ANALYSE_CONV_ACCEPT, 0, 0 };

static PACKETHEAD TktNotifyAccept =
{ sizeof(PACKETHEAD), TICKET_NOTIFY_ACCEPT, 0, 0 };

static PKT_REASON NoCanDo = {
{ sizeof(PKT_REASON), ANALYSE_CONV_REJECT, 0, 0 }, 0};

static PACKETHEAD AnalysisComplete =
{ sizeof(PACKETHEAD), CONV_ANALYSIS_COMPLETE, 0, 0 };

typedef struct {
TCB_COMMON TCBcommon;
WORD CAcnvid;
} SEND_TKT_TCB, far *LPSEND_TKT_TCB;

SEND_TKT_TCB SendTicketTCB;
MAKETTB( SendTicketTCB, SendTicket, DefCREATETCB, DefFREETCB);

/***********************************************/

BOOL FAR PASCAL fnReplyRetrieveTicket(
HANDLE hUser, WORD Id, void far *lpPacket)
{
LPPACKETHEAD Header = (LPPACKETHEAD) lpPacket;

CurrentCAcnvid = Id;
CurrentConv = CAdatabase[ CurrentCAcnvid ];

/* If the keystation has failed, free the memory claimed */
if ( ChannelStatus[CurrentConv->KeystationChannel] != CH_OPEN )
{
CancelAnalysisStartup();
return TRUE;
} switch ( Header->Type )
{
case TICKET_DATA:
unless ( NetCheckSendSpace(
ChannelHandle[CurrentConv->KeystationChannel],
sizeof(PACKETHEAD) ) )
return FALSE;
ReplyTicketData(hUser, Id, lpPacket);
break;

case TICKET_RETRIEVE_REJECT:
unless ( NetCheckSendSpace(
ChannelHandle[ DMGR_CHAN_HANDLE ],
sizeof( PKT_RETRIEVE ) ) &&
NetCheckSendSpace(
ChannelHandle[CurrentConv->KeystationChannel],
sizeof( PKT_REASON ) ) )
return FALSE;
```

```
ReplyTicketRetrieveReject(hUser, Id, lpPacket);
break;
default:
break;
}
return TRUE;
}

/*********************************************/

BOOL ReplyTicketRetrieveReject(HANDLE hUser, WORD Id, LPPKT_REASON lpPacket)
{
LPCATICKET p;

/* If the reason is busy we just try again */
if ( lpPacket->Reason == REASON_BUSY )
{
p = GetTicketPointer( CurrentConv->TicketIndex );
TicketRequest.Dcnvref = p->Ticket.Dcnvref;
UnlockTicket( CurrentConv->TicketIndex );
NetRequest( ChannelHandle[ DMGR_CHAN_HANDLE ],
CurrentConv->ConvTicketRetrieveHandle,
(FARPTR) &TicketRequest );
return TRUE;
}

/* Otherwise we must reject the analysis request. The ticket area
 * and conversation area not in use after all. Note that it is safe
 * to free the ticket, because we do not pass this way if the
 * Dcnvref in an analysis request was for a ticket we hold already. */
CancelAnalysisStartup();

/* Tell the requestor its NoGo, pass on the reason */
SendAnalyseReject( CurrentConv->KeystationChannel, CurrentConv->TheirID,
lpPacket->Reason );

return TRUE;
}

/*********************************************/

BOOL ReplyTicketData( HANDLE hUser, WORD Id, LPPKT_TICKETDATA lpPacket)
{
LPCATICKET p = GetTicketPointer( CurrentConv->TicketIndex );
static DATESTRUCT ConvDate;
LPSTR DestPtr, SrcPtr;
int i, DataSize;

OutputTicket = &(p->Ticket);
DestPtr = (LPSTR) OutputTicket + CurrentConv->NextDbPos;
SrcPtr = lpPacket->Data;

DataSize = ((LPSTR) lpPacket + lpPacket->Header.Length)
- (LPSTR) lpPacket->Data;

/* We have some ticket data. Copy the information from the packet
to the output ticket */
if (DataSize + CurrentConv->NextDbPos > sizeof(TW_TICKET))
InitiateShutdown( "Ticket data received larger than available space");

lmemcpy( DestPtr, SrcPtr, DataSize);

/* Save the position at which to store the next chunk of ticket */
CurrentConv->NextDbPos += DataSize;

/* If this is the last part of the ticket accept the analysis,
else wait for more */
if ( lpPacket->IsLastForThisTicket )
{
/* Initialise all the conversation data not yet done */
CurrentConv->SavedTicket = *(OutputTicket);
CurrentConv->NextDbPos = 0;
for ( i = 0; i < TKT_NOT_PER_CONV; i++ )
CurrentConv->NotifyRequestList[i][0] = TKT_TICKET;
CurrentConv->NextRowExpected = 0;
```

```
CurrentConv->NextColExpected = 0;
CurrentConv->PromptNotify = (LPTICKETFUN) NULL;

/* Put the new Dcnvref in the array */
TicketDcnvrefs[ CurrentConv->TicketIndex ] = OutputTicket->Dcnvref;

/* Get the conversation date from the ticket */
datetostruct( ( DATE ) (OutputTicket->StartTime / SECONDSPERDAY),
&ConvDate );
CurrentConv->SavedData.conversationdate = ConvDate;

/* No more replies are expected to the Ticket Retrieve Request */
InitScreen();
NetResetReply( CurrentConv->ConvTicketRetrieveHandle, CurrentCAcnvid);

/*Kprintf( "Accepting analysis conv %d, ticket index %d, Dcnvref %ld\n",
CurrentCAcnvid, CurrentConv->TicketIndex, OutputTicket->Dcnvref );
*/
/* Send an analysis accepted message */
NetReplyRequest( ChannelHandle[ CurrentConv->KeystationChannel ],
CurrentConv->AnalysisTextHandle, CurrentConv->TheirID,
(FARPTR) &AnalyseAccepted );

CurrentConv->Status = CA_CONV_IN_PROGRESS;
}
UnlockTicket( CurrentConv->TicketIndex );
return TRUE;
}

/***************************************/ void CancelAnalysisStartup( void )
{
LPCATICKET p;

p = GetTicketPointer( CurrentConv->TicketIndex );
p->IsInUse = FALSE;
p->IsBeingAnalysed = FALSE;
UnlockTicket( CurrentConv->TicketIndex );
NetResetReply( CurrentConv->ConvTicketRetrieveHandle, CurrentCAcnvid );
CurrentConv->TicketIndex = -1;
CurrentConv->Status = CA_FREE;
}

/***************************************/

BOOL FAR PASCAL fnReplyAnalysisMessages(
HANDLE hUser, WORD Id, void far *lpPacket)
{
LPPACKETHEAD Header = (LPPACKETHEAD) lpPacket;
LPCATICKET p;
long Dref;

CurrentCAcnvid = Id;
CurrentConv = CAdatabase[ CurrentCAcnvid ];

/* Those cases in which a ticket is locked break, the rest return direct */
switch ( Header->Type )
{
case ANALYSE_TEXT:
unless ( NotifyRequestSpace() >= TKT_NOT_PER_CONV )
return FALSE;
unless( NetCheckSendSpace(
ChannelHandle[ CurrentConv->KeystationChannel ],
sizeof( PKT_REASON ) ) )
return FALSE;
p = GetTicketPointer( CurrentConv->TicketIndex );
OutputTicket = &(p->Ticket);
*Ticket = CurrentConv->SavedTicket;
*AnalysisData = CurrentConv->SavedData;
ReplyAnalyseText(lpPacket);
break;

case TERMINATE_ANALYSE_REQ:
unless( CheckAvailableTCBs(1) && CheckAvailableFLINKs(1) )
return FALSE;
```

```
p = GetTicketPointer( CurrentConv->TicketIndex );
OutputTicket = &(p->Ticket);
*Ticket = CurrentConv->SavedTicket;
*AnalysisData = CurrentConv->SavedData;
ReplyTerminateAnalyseReq(lpPacket);
break;

case TICKET_NOTIFY_REQ:
unless ( NotifyRequestSpace() >= TKT_NOT_PER_CONV )
return FALSE;
unless( NetCheckSendSpace(
ChannelHandle[ CurrentConv->KeystationChannel ],
sizeof( PKT_REASON ) ) )
return FALSE;
p = GetTicketPointer( CurrentConv->TicketIndex );
OutputTicket = &(p->Ticket);
*Ticket = CurrentConv->SavedTicket;
*AnalysisData = CurrentConv->SavedData;
ReplyTicketNotifyReq( lpPacket );
break;

case MENU_NOTIFY_REQ:
p = GetTicketPointer( CurrentConv->TicketIndex );
Dref = p->Ticket.Dcnvref;
UnlockTicket( CurrentConv->TicketIndex );
return fnMenuNotifyReq( hUser, Id, Dref, lpPacket );

default:
return TRUE;
}
UnlockTicket( CurrentConv->TicketIndex );
return TRUE;
}

/*****************************************/ void ReplyAnalyseText( LPPKT_ANALYSE_TEXT lpPacket)
{
LPSTR InPoint = lpPacket->Text;
int i, Row, Col;
int Pos = CurrentConv->NextDbPos;
LPSTR OutPoint = AnalysisData->ConvText + Pos;
int TextLength = ((LPSTR) lpPacket + lpPacket->Header.Length)
- (LPSTR) InPoint;

/* Do this now because backing up may cause items to be deleted,
 * and special keys can cause a status change. */
CurrentConv->ChangedItems = 0;

if ( lpPacket->Key != KEY_UNKNOWN )
{
unless ( !Ticket->Flags.StartOnline ||
   ( (AnalysisData->LineFlag & CF_WRAPUP) != 0 &&
       Ticket->Status != CONFIRMED) )
return;

switch ( lpPacket->Key )
{
case KEY_CONFIRM:
/*Kprintf( "Confirm key received, " ); */
if ( !Ticket->Flags.IsExtracted )
{
/*  Kprintf( "status not extracted\n" ); */
   return;
}
else if ( (Ticket->Status & CONFIRMING) != 0 )
{
/*  Kprintf( "status already confirming\n" ); */
   return;
}
Ticket->Status = CONFIRMING;
unless ( TextLength == 0 )
{
lstrcpy( Ticket->DealerID, InPoint );
lstrcpy( OutputTicket->DealerID, InPoint );
```

```
}
break;
case KEY_CANCEL:
/*Kprintf( "Cancel key received, " ); */
if ( (Ticket->Status & CANCELLED) != 0 )
   {
/*   Kprintf( "status already cancelled\n" ); */
   return;
   }
Ticket->Status = CANCELLED;
break;
case KEY_WRONG:
/*Kprintf( "Wrong key received\n" ); */
if ( (Ticket->Status & WRONG) != 0 )
   {
/*   Kprintf( "status already wrong\n" ); */
   return;
   }
Ticket->Status = WRONG;
break;
default:
return;
   }
/*Kprintf( "changing ticket status\n" ); */
AnalysisData->TicketItemStatus[ t_status ] = st_extracted;
CopyToOutputTicket( t_status );

if ( CurrentConv->ChangedItems != 0 )
   {
/*   if ( CurrentConv->PromptNotify != (LPTICKETFUN) NULL )
(*(CurrentConv->PromptNotify))( OutputTicket, CurrentConv->PromptTicketHandle ); */ for ( TktNotifyIndex = 0; TktNotifyIndex < TKT_NOT_PER_CONV;
TktNotifyIndex++ )
ProcessNotifyList( CurrentConv );
   }
return;
   }

/* Check the row and column given against what we expect. If both are
the same copy after the current position. If the column given is zero
we accept a line one greater than the current one and copy after the
current position, allowing the copy process to increment the expected row. */ if ( CurrentConv->NextRowExpected == lpPacket->Row &&
CurrentConv->NextColExpected == lpPacket->Column )
   {
   if ( CurrentConv->BadPosDisplayed )
      {
      CurrentConv->BadPosDisplayed = FALSE;
      SendAnalysisInconsistent( REASON_GOOD );
      }

/*Kprintf( "Expected row/col %d %d, supplied %d %d, OK\n",
CurrentConv->NextRowExpected, CurrentConv->NextColExpected,
lpPacket->Row, lpPacket->Column );
*/
   CurrentConv->NextDbPos += TextLength;
   }
else if ( lpPacket->Column == 0 &&
lpPacket->Row == CurrentConv->NextRowExpected + 1 )
   {
   if ( CurrentConv->BadPosDisplayed )
      {
      CurrentConv->BadPosDisplayed = FALSE;
      SendAnalysisInconsistent( REASON_GOOD );
      }
/*Kprintf( "Expected row/col %d %d, supplied %d %d, OK\n",
CurrentConv->NextRowExpected, CurrentConv->NextColExpected,
lpPacket->Row, lpPacket->Column );
*/
   CurrentConv->NextDbPos += TextLength;
   }
else if ( lpPacket->Row > CurrentConv->NextRowExpected ||
lpPacket->Column > CurrentConv->NextColExpected )
```

```c
{
/* If the text position is after the expected one print an
error message, and carry on regardless from the current position. */
Kprintf( "***** Conversation %d bad text position *****\n",
CurrentCAcnvid );
Kprintf(
"Expected row/col %d %d, supplied %d %d, ** BAD POSITION **\n",
CurrentConv->NextRowExpected, CurrentConv->NextColExpected,
LpPacket->Row, LpPacket->Column );

unless ( CurrentConv->BadPosDisplayed )
{
CurrentConv->BadPosDisplayed = TRUE;
SendAnalysisInconsistent( REASON_BAD_TEXT_POSN );
}
CurrentConv->NextDbPos += TextLength;
} else{

/* The position is before the one expected. Back up and re-analyse
the whole conversation. First go back to the beginning of the
current line. We must check that we do not go back further than
the start of the buffer, the keystation may not have sent the
initial start of line byte. */ if ( CurrentConv->BadPosDisplayed )
{
CurrentConv->BadPosDisplayed = FALSE;
SendAnalysisInconsistent( REASON_GOOD );
}
/*Kprintf( "Expected row/col %d %d, supplied %d %d, backing up\n",
CurrentConv->NextRowExpected, CurrentConv->NextColExpected,
LpPacket->Row, LpPacket->Column );
*/
while ( (AnalysisData->ConvText[Pos] & CF_LINESTART)==0 && Pos>0)
Pos--;
/* Now go back further lines, if required. */
while ( CurrentConv->NextRowExpected > LpPacket->Row )
{
while (
(AnalysisData->ConvText[Pos] & CF_LINESTART)==0 && Pos>0)
Pos--;
CurrentConv->NextRowExpected--;
}
/* Go forwards to point to the column given. */
CurrentConv->NextColExpected = LpPacket->Column;
Pos += LpPacket->Column;

/* Set up the pointers for storing this and the next message. */
OutPoint = AnalysisData->ConvText + Pos;
CurrentConv->NextDbPos = Pos + TextLength;

/* Delete any items from the ticket that were added at or
after the new start position */
for (i = 0; i < t_max; i++)
if ( AnalysisData->LastInsertPos[i] >= Pos )
delfield( i );

/* Restart the analysis from the beginning */
for (i = 0; i < t_max; i++)
AnalysisData->TicketItemStatus[i] = st_unknown,
AnalysisData->LastInsertPos[i] = 0,
AnalysisData->LastQueryPos[i] = 0;

AnalysisData->Queries = 0;
AnalysisData->charpending = FALSE;
AnalysisData->qhead = 0;
AnalysisData->qtail = 0;
AnalysisData->qptr = 0;
AnalysisData->foundpay = FALSE;
AnalysisData->nopay = FALSE;
AnalysisData->nowrap = FALSE;
AnalysisData->BufPos = 0;
Ticket->Status = NO_DEAL;
CopyToOutputTicket( t_status );
}
```

```c
/* Add the text from the message to the conversation */
while ( TextLength > 0 )
{
char ch = *(InPoint++);

if ( (ch & CF_LINESTART) != 0 )
{
unless ( lpPacket->Row == 0 && lpPacket->Column == 0 )
CurrentConv->NextRowExpected++;
CurrentConv->NextColExpected = 0;
}
CurrentConv->NextColExpected++;
*(OutPoint++) = ch;
TextLength--;
EchoInput( ch );
}
*OutPoint = '\0';

if ( setjmp( mark ) != 0 )
{ if ( CurrentConv->ChangedItems != 0 )
   { if ( CurrentConv->PromptNotify != (LPTICKETFUN) NULL )
      {
/*      Kprintf("Prompt notify called for conv. %d\n", CurrentCAcnvid );*/
 (*(CurrentConv->PromptNotify))( OutputTicket,CurrentConv->PromptTicketHandle );
      }
/*    else
 Kprintf( "No prompt notify for conv. %d\n", CurrentCAcnvid );    */
      for ( TktNotifyIndex = 0; TktNotifyIndex < TKT_NOT_PER_CONV; TktNotifyIndex++ )
  ProcessNotifyList( CurrentConv );
   }
   return;
} parse();

/* Its bad trouble if we get here cos parse is supposed to jump out. */
Kprintf( "\n********* TROUBLE : parse() returned ***********\n" );
}

/*****************************************/ void ReplyTerminateAnalyseReq( LPPACKETHEAD lpPacket )
{
    /* Save their ID for the Analysis Complete */
    CurrentConv->TheirID = lpPacket->SenderID;

/* Dump the conversation to screen/logfile */
    /* ReportDump( AnalysisData->ConvText, CurrentConv->NextDbPos ); */

TerminateConv( CurrentCAcnvid );
}

/***********************************************/

/* Terminate the given conversation, either because the keystation has
failed, or because a terminate analyse request message has been sent.
This is not called unless TCBs and FLINKs have been checked.*/ void TerminateConv( int CAcnvid )
{
    LPCONVDATA Conv = CAdatabase[ CAcnvid ];
    LPCATICKET p = GetTicketPointer( Conv->TicketIndex );
    LPTW_TICKET Tkt = &(p->Ticket);
    LPSEND_TKT_TCB t =
    (LPSEND_TKT_TCB) TCBAllocate( (LPTTB) &TTB_SendTicketTCB );

Conv->Status = CA_STORING_TICKET;

/* If the status is confirming, set it to confirmed */
    if ( Tkt->Status == CONFIRMING )
    {
```

```c
      Tkt->Status = CONFIRMED;
      Tkt->ConfirmTime = Ktime( NULL );
      lmemcpy(Tkt->ConfirmDealerID,
         Tkt->DealerID, DEALERIDBYTES);
   }
   UnlockTicket( Conv->TicketIndex );

/* Queue a task to store the ticket in the data manager. */
   t->CAcnvid = CAcnvid;
   QueueChannelTCB( ChannelHandle[DMGR_CHAN_HANDLE], (LPTCB) t );
}

/*******************************************/

/* Task to send a ticket to the data manager. */

WORD FAR PASCAL SendTicket( void far *task, HANDLE hUser )
{
   PKT_STORE_REQ ResultTicket;
   LPSEND_TKT_TCB t = (LPSEND_TKT_TCB) task;
   LPCONVDATA Conv;
   LPCATICKET p;
   LPTW_TICKET Tkt;

unless( NetCheckSendSpace( ChannelHandle[hUser], sizeof(PKT_STORE_REQ) ) )
return AC_FAIL;
   t = (LPSEND_TKT_TCB) task;

Conv = CAdatabase[ t->CAcnvid ];
   p = GetTicketPointer( Conv->TicketIndex );
   Tkt = &(p->Ticket);
   ResultTicket.Header.Type = STORE_TICKET_REQ;
   ResultTicket.Header.Length = sizeof( PKT_STORE_REQ );

/* Copy ticket to the ticket data message */
   lmemcpy((LPSTR) &ResultTicket.Ticket, (LPSTR) Tkt,
     sizeof(DM_TICKET));
/*   Kprintf( "Sending ticket for conv %d, ticket index %d Dcnvref %ld\n",
      t->CAcnvid, Conv->TicketIndex, Tkt->Dcnvref );
*/
   UnlockTicket( Conv->TicketIndex );

NetRequest( ChannelHandle[ hUser ],
      Conv->StoreTicketHandle, (FARPTR) &ResultTicket );
   return AC_DONE;
}

/*******************************************/ void ReplyTicketNotifyReq( LPPKT_TKT_NOTIFY lpPacket )
{
WORD len;
TICKET_FIELD far *Array;
TICKET_FIELD far *EndOfPacket =
(TICKET_FIELD far *)( (LPSTR) lpPacket + lpPacket->Header.Length);
TICKET_FIELD far *SrcItemPtr = lpPacket->Items;
LPCONVDATA Conv = CurrentConv;

/* Look for a free notify request list */
for ( TktNotifyIndex = 0; TktNotifyIndex < TKT_NOT_PER_CONV;
TktNotifyIndex++ )
if ( Conv->NotifyRequestList[ TktNotifyIndex ][0] == TKT_TICKET )
goto IndexFound;

/* No free index, send a reject */
Kprintf( "Rejecting ticket notify request for Conv %d Their ID %X\n",
    CurrentCAcnvid, Conv->TheirNotifyID[ TktNotifyIndex ] );

NoCanDo.Header.Type = TICKET_REJECT;
NoCanDo.Reason = REASON_TOO_MANY_REQUESTS;
NetReplySend( ChannelHandle[ CurrentConv->KeystationChannel ],
lpPacket->Header.SenderID, (FARPTR) &NoCanDo );
return;

IndexFound:
Array = CurrentConv->NotifyRequestList[ TktNotifyIndex ];
Conv->TheirNotifyID[ TktNotifyIndex ] = lpPacket->Header.SenderID;
```

```c
if ( (len = ExpandItemList( lpPacket->Items[0], Array) ) == 0)
{
while ( SrcItemPtr < EndOfPacket )
Array[len++] = *(SrcItemPtr++);
}
/* Mark the end of the list */
Array[ len ] = TKT_TICKET;

/*
Kprintf( "Accept ticket notify request Conv %d NotifyIndex %d Their ID %X\n",
    CurrentCAcnvid, TktNotifyIndex,
    Conv->TheirNotifyID[ TktNotifyIndex ] );
*/

/* Send a Ticket Notify Accept */
NetReplyRequest( ChannelHandle[ Conv->KeystationChannel ],
Conv->TktNotifyHandle[ TktNotifyIndex ],
Conv->TheirNotifyID[ TktNotifyIndex ],
(FARPTR) &TktNotifyAccept );

/* Set up the changed list as everything, so all required initial
values are sent */
Conv->ChangedItems =
ExpandItemList( TKT_TICKET, Conv->NotifyActionList );
ProcessNotifyList( Conv );
Conv->ChangedItems = 0;
}

/*******************************************/

/* Reply function to cancel a ticket notify request */

BOOL FAR PASCAL fnTktNotifyCancel(
HANDLE hUser, WORD Id, LPPKT_ANALYSE_REQ lpPacket)
{
CurrentCAcnvid = Id & 0xFF;
CurrentConv = CAdatabase[ CurrentCAcnvid ];
TktNotifyIndex = Id >> 8;

/* Kprintf( "Cancelling ticket notify request for Conv %d NotifyIndex %d\n",
    CurrentCAcnvid, TktNotifyIndex );
*/

CurrentConv->NotifyRequestList[ TktNotifyIndex ][0] = TKT_TICKET;
return TRUE;
}

/*******************************************/

/* After analysing all available text, process the list of
changed items, notifying all who require it. We set up a data
area identical to that constructed on receipt of a Ticket
Snapshot Request. If the prompt system requires to be notified,
call the appropriate procedure. */ void ProcessNotifyList( LPCONVDATA Conv )
{
LPNOTIFY_DETAILS Details;
LPTICKSNAPREQ Request;
int i, j;
TICKET_FIELD field;
TICKET_FIELD far *RequestList = Conv->NotifyRequestList[ TktNotifyIndex ];
TICKET_FIELD far *ChangedList = Conv->NotifyActionList;
LPCATICKET p;
LPTW_TICKET ConvTicket;

if ( Conv->ChangedItems == 0 || RequestList[0] == TKT_TICKET )
return;

p = GetTicketPointer( Conv->TicketIndex );
ConvTicket = &(p->Ticket);

for ( i=0; i < NOTIFYQSIZE; i++ )
if ( !NotifyQueue[i]->IsInUse )
goto ElementFound;
```

```
/* We should never get here because we checked before accepting the
message for processing that there were enough free queue elements. */
Kprintf( "\nNotify queue list full ****************\n" );
return;

ElementFound:
Details = NotifyQueue[i];
Request = &Details->ReplyDetails.TkSnapReq;
Details->IsInUse = TRUE;
Details->MessageType = TICKET_SNAPSHOT_REQ;
Details->Channel = Conv->KeystationChannel;
Details->TheirID = Conv->TheirNotifyID[ TktNotifyIndex ];

Request->TicketCount = 1;
Request->NextTicket = 0;
Request->ItemCount = 0;
Request->NextItem = 0;
Request->Dcnvref = (long far *) Request->Data;
Request->Identifier = (TICKET_FIELD far *) (&Request->Dcnvref[1]);
Request->Dcnvref[0] = ConvTicket->Dcnvref;

for ( i = 0; i < Conv->ChangedItems; i++ )
{
field = ChangedList[i];
j = 0;
while ( RequestList[j] != TKT_TICKET )
{
if ( RequestList[j++] == field )
{
Request->Identifier[(Request->ItemCount)++] = field;
break;
}
}
}

UnlockTicket( Conv->TicketIndex );

if ( Request->ItemCount == 0 )
Details->IsInUse = FALSE;
}

/****************************************************/

BOOL FAR PASCAL fnReplyAnalyseConvRequest(
HANDLE hUser, WORD Id, LPPKT_ANALYSE_REQ lpPacket)
{
int Index;
LPCATICKET p;
BOOL BeingAnalysed;
TKTSTATUS Status;

unless ( NetCheckSendSpace( ChannelHandle[ DMGR_CHAN_HANDLE ],
sizeof( PKT_RETRIEVE ) ) &&
NetCheckSendSpace( ChannelHandle[ hUser ],
sizeof( PKT_REASON ) ) )
return FALSE;

/* If we have the ticket already, it must not be the subject of analysis,
 * and the status must not be confirmed. */
Index = GetTicketIndex( lpPacket->Dcnvref );
if ( Index >= 0 )
{
p = GetTicketPointer( Index );
BeingAnalysed = p->IsBeingAnalysed;
Status = p->Ticket.Status;
UnlockTicket( Index );
if ( BeingAnalysed )
{
SendAnalyseReject( hUser, lpPacket->Header.SenderID,
REASON_CONV_IN_PROGRESS );
return TRUE;
}
else if ( Status == CONFIRMED )
{
```

```c
SendAnalyseReject( hUser, lpPacket->Header.SenderID,
REASON_CONFIRMED );
return TRUE;
}
}

/* Look for a free conversation area. */
for ( CurrentCAcnvid = 0; CurrentCAcnvid<MaxConversations; CurrentCAcnvid++ )
{
CurrentConv = CAdatabase[ CurrentCAcnvid ];
if ( CurrentConv->TicketIndex < 0 )
goto FreeConversationFound;
}

/* We cannot accept this analysis, no free conversation area */
SendAnalyseReject( hUser, lpPacket->Header.SenderID,
REASON_TOO_MANY_REQUESTS );
return TRUE;

FreeConversationFound:
initconv( Index );

/* Save their ID and channel for the Analyse Accept */
CurrentConv->TheirID = lpPacket->Header.SenderID;
CurrentConv->KeystationChannel = hUser;

/* Zero the pointer used for storing the retrieved ticket */
CurrentConv->NextDbPos = 0;

/* Send an analysis accepted message if we have the ticket already. */ if ( Index >= 0 )
{
   int i;
   static DATESTRUCT ConvDate;

/* Initialise all the conversation data not yet done */
p = GetTicketPointer( Index );
OutputTicket = &p->Ticket;
CurrentConv->NextDbPos = 0;
CurrentConv->SavedTicket = *(OutputTicket);
for ( i = 0; i < TKT_NOT_PER_CONV; i++ )
CurrentConv->NotifyRequestList[i][0] = TKT_TICKET;
CurrentConv->NextRowExpected = 0;
CurrentConv->NextColExpected = 0;
CurrentConv->PromptNotify = (LPTICKETFUN) NULL;

/* Get the conversation date from the ticket */
datetostruct( ( DATE ) (OutputTicket->StartTime / SECONDSPERDAY),
&ConvDate );
CurrentConv->SavedData.conversationdate = ConvDate;

InitScreen();

/*Kprintf( "Accepting analysis conv %d, ticket index %d Dcnvref %ld\n",
CurrentCAcnvid, CurrentConv->TicketIndex,
OutputTicket->Dcnvref );
*/
UnlockTicket( Index );

NetReplyRequest( ChannelHandle[ CurrentConv->KeystationChannel ],
CurrentConv->AnalysisTextHandle, CurrentConv->TheirID,
(FARPTR) &AnalyseAccepted );
return TRUE;
}

/* Save the Dcnvref so we can ask for it again if we get a busy from the DM */
p = GetTicketPointer( CurrentConv->TicketIndex );
p->Ticket.Dcnvref = lpPacket->Dcnvref;
UnlockTicket( CurrentConv->TicketIndex );

/* Request the ticket from the data manager. */
TicketRequest.Dcnvref = lpPacket->Dcnvref;
NetRequest( ChannelHandle[ DMGR_CHAN_HANDLE ],
CurrentConv->ConvTicketRetrieveHandle, (FARPTR) &TicketRequest );
```

```c
return TRUE;
}

/*****************************************/ void SendAnalyseReject( HANDLE hUser, WORD Id, REASONCODE Why )
{
NoCanDo.Header.Type = ANALYSE_CONV_REJECT;
NoCanDo.Reason = Why;
NetReplySend( ChannelHandle[ hUser ], Id, (FARPTR) &NoCanDo );
}

/*****************************************/

BOOL FAR PASCAL fnReplyStoreTicket(
HANDLE hUser, WORD Id, void far *lpPacket)
{
LPCATICKET p;

/* We don't actually care what message it is, wind up anyway */
CurrentCAcnvid = Id;
CurrentConv = CAdatabase[ CurrentCAcnvid ];

if ( ChannelStatus[CurrentConv->KeystationChannel] == CH_OPEN )
unless ( NetCheckSendSpace(
ChannelHandle[CurrentConv->KeystationChannel],
sizeof( PACKETHEAD ) ) )
return FALSE;

/* The ticket is not being analysed, conversation area is not in use */
p = GetTicketPointer( CurrentConv->TicketIndex );
p->IsBeingAnalysed = FALSE;
UnlockTicket( CurrentConv->TicketIndex );
CurrentConv->TicketIndex = -1;

NetResetReply( CurrentConv->AnalysisTextHandle, CurrentCAcnvid );
NetResetReply( CurrentConv->StoreTicketHandle, CurrentCAcnvid );

/* Send Analysis Complete, if the keystation channel is open. */
unless ( ChannelStatus[CurrentConv->KeystationChannel] == CH_OPEN )
return TRUE;

NetReplySend( ChannelHandle[ CurrentConv->KeystationChannel ],
CurrentConv->TheirID, (FARPTR) &AnalysisComplete );

return TRUE;
}

/***********************************************************/
/* Module  : PHOVDU                              GJS/RCP  */
/* Routine : ReportDump()                                 */
/*           Report up to REPORT_LIMIT chars of a message */
/* NB      : Can't use Text[] because report() uses it.   */
/***********************************************************/
#define REPORT_LIMIT  4000
define BYTES_PER_LINE 16 void ReportDump(LPSTR buffer, WORD length)
{
  WORD printbytes ;          /* Number of bytes to dump           */
  WORD CurrentStart = 0;
  register WORD i;

while ( CurrentStart < length )
    {
      /* Reinitialise the print buffer at the start of each line */
      Kprintf("\nDUMP : ");/* Start text for each line           */ i = 0;
      while ( i < BYTES_PER_LINE && CurrentStart+i < length )
  Kprintf( "%2.2X ", (BYTE) buffer[ CurrentStart+(i++) ] );

i = 0;
      while ( i < BYTES_PER_LINE && CurrentStart+i < length )
      {
```

```c
if ( isprint(buffer[CurrentStart+i]))
   Kprintf( "%c", buffer[CurrentStart+i] );
else Kprintf( "." ) ;
i++ ;
      }

CurrentStart+=BYTES_PER_LINE;
      }

}

/****************************************************************
 *                                                              *
 * caserver.c - Conversation analysis server main program       *
 *                                                              *
 * Written by Roger H. Abbott                                   *
 *                                                              *
 * Copyright (C) 1988 Richards Computer Products Ltd            *
 *                                                              *
 ****************************************************************/ include <conio.h>/* for oput() */
include <process.h>/* for exit() */ include "tasks.h"
include "channel.h"
#include "cadata.h"
#include "tickmes.h"
#include "caserver.h"
#include "ovmem.h"
#include "kprintf.h"
#include "debug.h"
#include "date.h"
#include "frx.h"
#include "getfrx.h"
#include "kwin.h"
#include "srvems.h"
#include "camesage.h"
#include "cainit.h"
#include "caglob.h"
#include "lstring.h"
#include "ktime.h"
#include "camonit.h"

static void Reboot( void );
static WORD FAR PASCAL AliveProcedure(void far *task, HANDLE hUser);
static void EHdebug( WORD id, LPSTR s );

/*****************************************************/

/* Data and task routines for processing notify and snapshot requests */

TCBNotifyDetailsTCB;
TCBAliveTCB;

MAKETTB(NotifyDetailsTCB, ProcessNotifyDetails, DefCREATETCB, DefFREETCB);
MAKETTB(AliveTCB, AliveProcedure, DefCREATETCB, DefFREETCB);

/* The list of notify request structures, used for all types. */
LPNOTIFY_DETAILS NotifyQueue[ NOTIFYQSIZE ];

/* A common buffer area used to construct messages */
char Buffer[512];

/*****************************************************/

/* Only one working area is required, the saved areas are copied to
and from them. The areas are static as they are always referenced
by the global pointers AnalysisData and Ticket. */
static ANALYSISDATA WorkingData;
static TW_TICKET WorkingTicket;
```

```
PTW_TICKET Ticket = &WorkingTicket;
PANALYSISDATA AnalysisData = &WorkingData;

/* The database and the index and pointers to the current converation */
LPCONVDATA CAdatabase[ MAXCONVERSATIONS ];
int CurrentCAcnvid;
LPCONVDATA CurrentConv;
int TktNotifyIndex;

/* The actual number of conversations which can be analysed at once. This
is the number of elements of CAdatabase which are valid */
int MaxConversations = MAXCONVERSATIONS;

/* The maximum number of keystations allowed. */
int MaxKeystations = MAXKEYSTATIONS;

/* Variables to control debugging display of analysis */
short DefaultDisplayHandle;
short ConvDisplayHandle[ MAXCONVSDISPLAYED ];

/* The actual number of conversations which can be displayed at once. This
is the number of elements of ConvDisplayHandle which are valid */
int DisplayedConvs;

/* Pointers extracted from CAdatabase for the current analysis. */
LPTW_TICKET OutputTicket;

/* Ticket variables. */
int MaxTickets;
HANDLE TicketHandle;
long far *TicketDcnvrefs;

/* The channel handles and latest status words. */
HCHANNEL ChannelHandle[ KS1_CHAN_HANDLE + MAXKEYSTATIONS + 1];
CH_STATUS ChannelStatus[ KS1_CHAN_HANDLE + MAXKEYSTATIONS + 1];

/* Reply handles for unsolicited packets and startup. */
HREPLY AnalyseReqHandle, SnapshotReqHandle,
CASrchSnapshotReqHandle, CASrchNotifyReqHandle,
NewExtTktHandle, StartupReplyHandle;

BOOL WeAreBroker = FALSE;

static BOOL ClosingDown = FALSE;
int LockCount = 0;

/**********************************************/

/* Dummy procedures to be called on create and free a TCB */ void FAR PASCAL DefCREATETCB(void far *task)
{
    task;
} void FAR PASCAL DefFREETCB(void far *task)
{
    task;
}

/**********************************************/

/* Task to send healthy mesages to server and data manager. */

WORD FAR PASCAL AliveProcedure(void far *task, HANDLE hUser)
{
static PACKETHEAD AliveMessage = { sizeof(PACKETHEAD), 0, 0, 0 };

task;/* Ignore parameters */
hUser;

unless ( ChannelStatus[ SERV_CHAN_HANDLE ] == CH_OPEN &&
  ChannelStatus[ DMGR_CHAN_HANDLE ] == CH_OPEN )
    return AC_DONE;
```

```
if ( NetCheckSendSpace( ChannelHandle[ DMGR_CHAN_HANDLE ],
sizeof( PACKETHEAD ) ) )
    NetSend( ChannelHandle[ DMGR_CHAN_HANDLE ], (FARPTR) &AliveMessage );

if ( NetCheckSendSpace( ChannelHandle[ SERV_CHAN_HANDLE ],
sizeof( PACKETHEAD ) ) )
    NetSend( ChannelHandle[ SERV_CHAN_HANDLE ], (FARPTR) &AliveMessage );

return AC_DONE;
}

/************************************************************/

/* Display on the screen what's happened to a channel */ void EHdebug( WORD id, LPSTR s )
{
Kprintf( s );

if ( id == DMGR_CHAN_HANDLE )
Kprintf( " with Data Manager\n" );
else if ( id == SERV_CHAN_HANDLE )
Kprintf( " with Dealing Server\n" );
else
Kprintf( " with Keystation %d\n", id - KS1_CHAN_HANDLE + 1 );
}

/************************************************************/

/* Event hook procedure for all channels */

EH_ACTION FAR PASCAL EventHook( WORD Id, EH_CONTEXT context,
 WORD status, FARPTR packet )
{
int i;
switch (context) {
        case EC_CALL:
    /* Save the returned status so we can test if its opened */
    ChannelStatus[ Id ] = status;
    EHdebug( Id, "Call completed" );

/* If both data manager and server calls have completed, get
    the required information from both. */
    if ( ChannelStatus[ SERV_CHAN_HANDLE ] == CH_OPEN &&
    ChannelStatus[ DMGR_CHAN_HANDLE ] == CH_OPEN )
    {
    /* Kprintf( "Calling PmtInitPhase_1\n" ); */
    PmtInitPhase_1( CAinit );
    }
    /* Continue with default action, establish circuit or try again */
    break;
        case EC_LISTEN:
        /* This must be a keystation, no further action needed */
    ChannelStatus[ Id ] = status;
    EHdebug( Id, "Listen completed" );

/* Continue with default action, establish circuit or try again */
    break;
        case EC_HANGUP:
        /* Bad news, a failed circuit, assume the status is closed */
    ChannelStatus[ Id ] = CH_CLOSED;
    EHdebug( Id, "Session closed" );

if ( ClosingDown )
        {
    int OpenChannels = NetCountChannels();

Kprintf( "Open channels : %d\n", OpenChannels );
    if ( OpenChannels == 0 )
    {
        Kprintf("\nCalling NetTerminate");
        NetTerminate();
        Kprintf("\nCalling Reboot");
        Reboot();
    }
```

```c
break;
     }

/* If a keystation channel closes, attempt to re-establish */
else if ( Id >= KS1_CHAN_HANDLE )
{
/* Tidy up any keystation operations on this channel.
First cancel any notifies. */
for ( i = 0; i < NOTIFYQSIZE; i++ )
if ( NotifyQueue[i]->Channel == Id )
NotifyQueue[i]->IsInUse = FALSE;

/* Termiante any conversations in progress, if possible. */
for ( i = 0; i < MaxConversations; i++ )
if ( CAdatabase[i]->KeystationChannel == Id &&
     CAdatabase[i]->Status == CA_CONV_IN_PROGRESS )
   {
   if ( CheckAvailableTCBs(1) &&
CheckAvailableFLINKs(1) )
{
   TerminateConv( i );
   Kprintf( "Wrapping up conversation %d\n", i );
}
   else
   {
   Kprintf( "No task to wind up conv %d ****\n", i );
   CAdatabase[i]->Status == CA_FREE;
}
   }
/* Now issue another listen */
ChannelHandle[Id] =
NetResetChannel( ChannelHandle[Id], Id, "*               ");
}
 else
 {
/* If either the data manager or server fails, reboot */
InitiateShutdown( "Other server failure" );
break;
     }
 break;
     case EC_STATUS:
 break;
     case DEBUG_EVENT_RX:
 break;
     case DEBUG_EVENT_TX:
 break;
     default:
 break;
     } return ( EH_DEFAULT );
}

/***************************************/

BOOL OvMain(char far * far *envp)
{
   static FNAME CAServerName =
{' ',' ',' ',' ',' ',' ',' ',' ',' ',' ',' ',' ',' ',' ',' ',' '};
   static FNAME DataMgrName =
{' ',' ',' ',' ',' ',' ',' ',' ',' ',' ',' ',' ',' ',' ',' ',' '};
   static FNAME DealSrvName =
{' ',' ',' ',' ',' ',' ',' ',' ',' ',' ',' ',' ',' ',' ',' ',' '};

char far*tmpname;
int i, j;

/* Find our default screen handle and set up as many conversations
screens as possible, up to the maximum defined. Write at the bottom
of the screen so that initial diagnostic messages
will not be scrubbed by a ticket */
DefaultDisplayHandle = SetOutputPage( -1 );
InitDebugDisplay( MAXCONVSDISPLAYED );
SetTextPosition( 25, 1 );
```

```
   tmpname = Kgetenv("DEALSRV");
   lmemcpy(DealSrvName, tmpname, lstrlen(tmpname));
/* Kprintf("DEALSRV = \"%.16Fs\"\n", DealSrvName); */ tmpname = Kgetenv("DATAMGR");
   lmemcpy(DataMgrName, tmpname, lstrlen(tmpname));
/* Kprintf("DATAMGR = \"%.16Fs\"\n", DataMgrName); */ tmpname = Kgetenv("CASERVER");
   lmemcpy(CAServerName, tmpname, lstrlen(tmpname));
/* Kprintf("CASERVER = \"%.16Fs\"\n", CAServerName); */ tmpname = Kgetenv("FRXTIMEOUT");
   unless ( tmpname == (LPSTR) NULL || tmpname[0] == '\0' )
   {
      FRXtimeout = 0;
      i = 0;
      while ( tmpname[i] >= '0' && tmpname[i] <= '9' )
 FRXtimeout = 10*FRXtimeout + tmpname[i++] - '0';
      Kprintf( "FRX timeout %d seconds\n", FRXtimeout );
      FRXtimeout = FRXtimeout * 1000;
   }

AllocateStorage();

/* No use carrying on if allocate storage failed */
if ( ClosingDown )
return FALSE;

/* Clear all the monitor pages so we dont work with old info. */
for ( i = 0; i < MonLines; i++ )
for ( j = 0; j < MonCols; j++ )
FRXA.UMP.PackedInfo[i][j] = '\0';
for ( i = 1; i < 5; i++ )
lmemcpy( MonitorPageAddress[i], MonitorPageAddress[0],
sizeof( MonitorPage ) );

/* Set up channels for the server and data manager */
if ( (ChannelHandle[SERV_CHAN_HANDLE] =
NetChannel( SERV_CHAN_HANDLE, CAServerName, DealSrvName,
EventHook ) ) == NULL )
{
Kprintf( "Cannot allocate Server channel handle\n" );
return( FALSE );
} if ( (ChannelHandle[ DMGR_CHAN_HANDLE ] =
NetChannel( DMGR_CHAN_HANDLE, CAServerName, DataMgrName,
EventHook ) ) == NULL )
{
Kprintf( "Cannot allocate Data manager channel handle\n" );
return( FALSE );
}

/* Now one for each possible keystation */
for ( i = KS1_CHAN_HANDLE; i < KS1_CHAN_HANDLE + MaxKeystations; i++ )
if ( (ChannelHandle[ i ] =
NetChannel( i, CAServerName, "*              ",
EventHook ) ) == NULL )
{
Kprintf( "Cannot allocate keystation channel handle %d\n",
i+1-KS1_CHAN_HANDLE );
return( FALSE );
}
/* Mark the channel status words as free */
for ( i = 0; i < KS1_CHAN_HANDLE + MaxKeystations; i++ )
ChannelStatus[ i ] = CH_FREE;

/* Set up reply handles for all the unsolicited packets we can process. */
AnalyseReqHandle = NetRegisterReply( fnReplyAnalyseConvRequest, 0 );
NewExtTktHandle = NetRegisterReply( fnReplyNewExternalTicket, 0 );
SnapshotReqHandle = NetRegisterReply( fnReplyTicketSnapshotReq, 0 );
CASrchSnapshotReqHandle = NetRegisterReply( fnReplyCASrchSnapshotReq, 0 );
CASrchNotifyReqHandle = NetRegisterReply( fnReplyCASrchNotifyReq, 0 );
StartupReplyHandle = NetRegisterReply( fnReplyStartup, 0 );
```

```c
/* Now set the packet handlers for these replies */
NetSetPacketHandler( AnalyseReqHandle, ANALYSE_CONV_REQUEST );
NetSetPacketHandler( NewExtTktHandle, NEW_EXTERNAL_TICKET );
NetSetPacketHandler( SnapshotReqHandle, TICKET_SNAPSHOT_REQ );
NetSetPacketHandler( CASrchSnapshotReqHandle, CA_SRCH_SNAPSHOT_REQ );
NetSetPacketHandler( CASrchNotifyReqHandle, CA_SRCH_NOTIFY_REQ );

InitStartup();

/* Set the reply functions for each conversation (all solicited messages). */
for ( CurrentCAcnvid = 0; CurrentCAcnvid < MaxConversations;
CurrentCAcnvid++ )
{
CurrentConv = CAdatabase[ CurrentCAcnvid ];
CurrentConv->StoreTicketHandle =
NetRegisterReply( fnReplyStoreTicket, CurrentCAcnvid );
CurrentConv->ConvTicketRetrieveHandle =
NetRegisterReply( fnReplyRetrieveTicket, CurrentCAcnvid );
CurrentConv->AnalysisTextHandle =
NetRegisterReply( fnReplyAnalysisMessages, CurrentCAcnvid );
for ( i = 0; i < TKT_NOT_PER_CONV; i++ )
CurrentConv->TktNotifyHandle[i] =
NetRegisterReply( fnTktNotifyCancel,
CurrentCAcnvid + (1<<8) );
}

/* Kprintf( "Calling PmtInitPhase_0\n" ); */ unless( PmtInitPhase_0() )
return( FALSE );

/* Kprintf( "PmtInitPhase_0 returned TRUE\n" ); */

/* Establish sessions with the Dealing Server and Data Manager Server,
go no further until they are open. */

NetOpen( ChannelHandle[ SERV_CHAN_HANDLE ], CHT_ACTIVE );
NetOpen( ChannelHandle[ DMGR_CHAN_HANDLE ], CHT_ACTIVE );

if (!CheckAvailableTCBs( 1 ) || !CheckAvailableFLINKs( 1 ))
    return FALSE;
QueueRunningTask( TCBAllocate( (LPTTB) &TTB_NotifyDetailsTCB ) );

if (!CheckAvailableTCBs( 1 ) || !CheckAvailableFLINKs( 1 ))
    return FALSE;
QueueTimedTask(
    TCBAllocate( (LPTTB) &TTB_AliveTCB ), (long) ALIVETIMEPERIOD, 0 );

return TRUE;
}

/**************************************************/ void OvExit( void ) {
    NetClose(0);
}
/**************************************************/ void AllocateStorage( void )
{
int i,j;
static WORD max;

/* The notify queue elements are shorter, so do them first. */
for ( i = 0; i < NOTIFYQSIZE; i++ )
{
NotifyQueue[i] = (LPNOTIFY_DETAILS) fmalloc(sizeof(NOTIFY_DETAILS));
if ( NotifyQueue[i] == (LPNOTIFY_DETAILS) NULL )
{
InitiateShutdown( "Cannot allocate notify queue" );
return;
}
NotifyQueue[i]->IsInUse = FALSE;
}
```

```c
/* Now get the ticket areas in EMS memory and initialise to not in use */
MaxTickets = EMSmaxCount( sizeof( CATICKET ) );
if ( MaxTickets == 0 )
{
InitiateShutdown( "Cannot allocate any tickets in EMS memory" );
return;
}
TicketHandle = EMSallocate( MaxTickets, sizeof( CATICKET ) );
/* Kprintf( "EMS handle : %d, Tickets : %d\n", TicketHandle, MaxTickets );
*/
EMSsetname( TicketHandle, "CA-TIKTS" );
TicketDcnvrefs = (long far *) fmalloc( MaxTickets*sizeof(long));
if ( TicketDcnvrefs == (long far *) NULL )
{
InitiateShutdown( "Cannot allocate Dcnvref array" );
return;
} i = 0;
while ( i < MaxTickets )
{
LPCATICKET p = EMSLockRange( TicketHandle, i, &max );
LockCount++;
if ( p == (LPSTR) NULL )
{
InitiateShutdown( "EMSLockRange failed initialising" );
return;
}
while ( i <= max )
{
p->IsInUse = FALSE;
TicketDcnvrefs[i] = 0;
p->Ticket.Dcnvref = 0;
p++;
i++;
}
/*Kprintf( "EMSunlock called, LockCount %d\n", LockCount ); */
EMSunlock( TicketHandle, max );
LockCount--;
}

/* Try to allocate the maximum number of conversation text areas,
each with an associated text area. Mark the area as not in use. */
for ( i=0; i<MAXCONVERSATIONS; i++ )
{
CAdatabase[i] = (LPCONVDATA) fmalloc( sizeof(CONVDATA) );
if ( CAdatabase[i] == (LPCONVDATA) NULL )
{
MaxConversations = i;
break;
}
else
{
CAdatabase[i]->TicketIndex = -1;
CAdatabase[i]->Status = CA_FREE;
}
}

}

/*******************************************/

/* Add a ticket field name to the Notify Action List, unless there already */ void AddChange( TICKET_FIELD Item )
{
int i;

for ( i = 0; i < CurrentConv->ChangedItems; i++ )
if ( CurrentConv->NotifyActionList[i] == Item )
return;
CurrentConv->NotifyActionList[ (CurrentConv->ChangedItems)++ ] = Item;
}
```

```c
/************************************************/
/* Save the current state of the analysis so it can be restarted from here */ void SaveAnalysisState( void )
{
    CurrentConv->SavedTicket = *Ticket;
    CurrentConv->SavedData = *AnalysisData;
}

/************************************************/

/* Procedure to initialise at the beginning of a conversation.
 * Only the conversation area is initialised, not the ticket. */
void initconv( int Index )
{
static WORD max;
int i = 0;
LPCATICKET p;

/* If we have been sent and index, use it. The existing copy of the
ticket will be over-written if required. */
if ( Index >= 0 )
{
p = EMSLockRange( TicketHandle, Index, &max );
LockCount++;
goto FreeTicketFound;
}

Index = 0;
/* First look for a free ticket index */
while ( Index < MaxTickets )
{
p = EMSLockRange( TicketHandle, Index, &max );
LockCount++;
if ( p == (LPSTR) NULL )
{
InitiateShutdown( "EMSLockRange failed looking for ticket" );
return;
}
while ( Index <= max )
{
if ( !p->IsInUse ) goto FreeTicketFound;
Index++, p++;
}
/*Kprintf( "EMSunlock called, LockCount %d\n", LockCount ); */
EMSunlock( TicketHandle, max );
LockCount--;
}

/* If that fails look for one not being analysed. Since new tickets are
put at the end of the list, the first one found will probably be
the oldest. We cannot fail to find a suitable ticket, as IsBeingAnalysed
is cleared whenever a conversation area is freed. */
Index = 0;
while ( Index < MaxTickets )
{
p = EMSLockRange( TicketHandle, Index, &max );
LockCount++;
if ( p == (LPSTR) NULL )
{
InitiateShutdown( "EMSLockRange failed looking for ticket" );
return;
}
while ( Index <= max )
{
if ( !p->IsBeingAnalysed )
{
/************************************************************/
/**** If the ticket matches a search notify, send ticket discarded */
/************************************************************/
goto FreeTicketFound;
}
Index++, p++;
}
```

```
/*Kprintf( "EMSunlock called, LockCount %d\n", LockCount ); */
EMSunlock( TicketHandle, max );
LockCount--;
}

FreeTicketFound:
CurrentConv->TicketIndex = Index;
p->IsInUse = TRUE;
p->IsBeingAnalysed = TRUE;
/* Kprintf( "EMSunlock called, LockCount %d\n", LockCount ); */

LockCount--;
EMSunlock( TicketHandle, max );

CurrentConv->BadPosDisplayed = FALSE;
CurrentConv->NotOnFRXADisplayed = FALSE;

/* For convenience initialise the saved Analysis Data in the working area
and then copy it to the Saved Data area for the current CAcnvid. */

AnalysisData->MaxChars = MAXCONVSIZE;
AnalysisData->LastInsertPos = &CurrentConv->ConvLastInsertPos[0];
AnalysisData->LastQueryPos = &CurrentConv->ConvLastQueryPos[0];
AnalysisData->ConvText = &CurrentConv->TextBuffer[0];

for(i = 0; i < t_max; i++)
AnalysisData->TicketItemStatus[i] = st_unknown,
AnalysisData->LastInsertPos[i] = 0,
AnalysisData->LastQueryPos[i] = 0;

AnalysisData->Queries = 0;
AnalysisData->charpending = FALSE;
AnalysisData->qhead = 0;
AnalysisData->qtail = 0;
AnalysisData->qptr = 0;
AnalysisData->foundpay = FALSE;
AnalysisData->nopay = FALSE;
AnalysisData->nowrap = FALSE;
AnalysisData->BufPos = 0;

CurrentConv->SavedData = *AnalysisData;
}

/*************************************************/

/* Routine to get a pointer to a CA ticket area. Note that
the area starts with the ticket itself, so it is safe to coerce the
pointer to a pointer to a ticket. Every call of GetTicketPointer must
be balanced by a call of UnlockTicket. */

LPCATICKET GetTicketPointer( WORD index )
{
LPCATICKET p = EMSlock( TicketHandle, index );

if ( p == (LPCATICKET) NULL )
InitiateShutdown( "EMS lock failure in GetTicketPointer" );
LockCount++;
return p;
}

/*************************************************/

/* Find the index of a ticket with a given Dcnvref. Result -1 if not found.
This routine does not lock the ticket, but does use lock range for fast
searching */ int GetTicketIndex( long Dref )
{
    static WORD max;
    int i = 0;
    LPCATICKET p;

#if 0
    while ( i < MaxTickets )
    {
```

```
        p = EMSLockRange( TicketHandle, i, &max );
        LockCount++;
        if ( p == (LPSTR) NULL )
        {
    InitiateShutdown( "EMSLockRange failed in GetTicketIndex" );
    return -1;
        }
        while ( i <= max )
        {
    if ( p->IsInUse && p->Ticket.Dcnvref == Dref )
    {
/*      Kprintf( "EMSunlock called, LockCount %d\n", LockCount ); */
        EMSunlock( TicketHandle, max );
        LockCount--;
        return i;
    }
    i++, p++;
        }
/*Kprintf( "EMSunlock called, LockCount %d\n", LockCount ); */
        EMSunlock( TicketHandle, max );
        LockCount--;
    }
endif for ( i = 0; i < MaxTickets; i++ )
if ( TicketDcnvrefs[i] == Dref )
return i;
return -1;
}

/******************************************/ void UnlockTicket( WORD index )
{
/* Kprintf( "UnlockTicket called, LockCount %d\n", LockCount ); */
EMSunlock( TicketHandle, index );
LockCount--;
}

/******************************************/

/* Its such a bad problem we must restart from scratch */ void Reboot( void )
{
for (;;)
outp( 0x64, 0xFE );
}

/******************************************/

HCHANNEL GetChannelHandle(WORD hUser)
{
    return ChannelHandle[hUser];
}

/******************************************/

/* We are going to reboot, reset all reply handles to prevent
 * further processing
 */ void InitiateShutdown( LPSTR code )
{
int i, OpenChannels;

Kprintf( "\n\n ****** REBOOTING %s ******\n", code );

for ( CurrentCAcnvid = 0; CurrentCAcnvid < MaxConversations;
CurrentCAcnvid++ )
    {
    CurrentConv = CAdatabase[ CurrentCAcnvid ];
    NetResetReply( CurrentConv->StoreTicketHandle, 0 );
    NetResetReply( CurrentConv->ConvTicketRetrieveHandle, 0 );
    NetResetReply( CurrentConv->AnalysisTextHandle, 0 );
    }
```

```
NetResetReply( AnalyseReqHandle, 0 );
NetResetReply( NewExtTktHandle, 0 );
NetResetReply( SnapshotReqHandle, 0 );
NetResetReply( CASrchSnapshotReqHandle, 0 );
NetResetReply( CASrchNotifyReqHandle, 0 );

for ( i = 0; i<KS1_CHAN_HANDLE + MaxKeystations; i++ )
if ( NetStatus(ChannelHandle[i]) != CH_CLOSED )
    NetClose( ChannelHandle[i] );

/* Maybe no channels are open, in which case its no use waiting for one
to close before rebooting. */
OpenChannels = NetCountChannels();

Kprintf( "Open channels : %d\n", OpenChannels );
if ( OpenChannels == 0 )
{
   Kprintf("Calling NetTerminate\n");
   NetTerminate();

Kprintf("Calling Reboot\n");
   Reboot();
}
ClosingDown = TRUE;
}

/********************************************/

/****** Routines provided for the prompt system ******/

/********************************************/

/* Find a ticket with a given Dcnvref, lock it, provide a
 * pointer to it and return the index. */ int CAGetTicketIndex( Long Dcnvref, LPTW_TICKET far *ticket )
{
   int Index;

/* Kprintf( "CAGetTicketIndex called, lock count %d, handle %d\n",
   LockCount, TicketHandle );
*/

Index = GetTicketIndex( Dcnvref );
   if ( Index < 0 )
      return -1;

*ticket = &(GetTicketPointer( Index )->Ticket);
   return Index;
}

/* No further interest in the ticket locked by the above routine */ void CAFreeIndex( int Index )
{
/* Kprintf( "CAFreeIndex called, lock count %d, handle %d\n",
   LockCount, TicketHandle );
*/
   UnlockTicket( Index );
}

/********************************************/

/* Register interest in a analysis in progress so that a ticket
 * address is passed to a prompt function when a ticket changes */ int CARegisterInterest( WORD CAcnvid, LPTICKETFUN function, WORD hUser )
{
   LPCONVDATA Conv;
   LPCATICKET p;
   LPTW_TICKET ConvTicket;

/* Kprintf( "Prompt register interest called for conv %d\n", CAcnvid );
*/
   Conv = CAdatabase[ CAcnvid ];
```

```c
    Conv->PromptTicketHandle = hUser;
    Conv->PromptNotify = function;

p = GetTicketPointer( Conv->TicketIndex );
    ConvTicket = &(p->Ticket);

if ( Conv->PromptNotify != (LPTICKETFUN) NULL )
    {
/*      Kprintf( "Prompt notify called for conv. %d\n", CAcnvid );
*/
        (*(Conv->PromptNotify))( ConvTicket, Conv->PromptTicketHandle );
    }

UnlockTicket( Conv->TicketIndex );
    return CAcnvid;
}

/* No further interest in the ticket registered with the above routine */ void CAClearInterest( int handle )
{
/*  Kprintf( "Prompt interest cleared for conv %d\n", handle );
*/
    CAdatabase[ handle ]->PromptNotify = (LPTICKETFUN) NULL;
}

/*****************************************************************
 *                                                               *
 * comparse.c - Common parsing routines                          *
 *                                                               *
 * Written by Alan Stokes                                        *
 *                                                               *
 * Copyright (C) 1987 Richards Computer Products Ltd             *
 *                                                               *
 *****************************************************************/ include <string.h>
include <stdlib.h> include "cadata.h"
include "comparse.h"
#include "read.h"
#include "insert.h"
#include "period.h"
#include "pay.h"
#include "miscpars.h"
#include "datepars.h"
#include "caserver.h"

static void comment(void);
static void dealer(void);
static void counterparty(void);
static void wrapup(void);
static void convertdigit(void);

/* Convert a symbol of type S_DIGIT (i.e. ONE, TWO etc.) to a symbol
 * of type S_NUMBER (1, 2 etc.). This should only be called for small
 * numbers.
 */
static void convertdigit()
{
    (void) itoa(AnalysisData->symval, AnalysisData->symbuf, 10);
    AnalysisData->symbol = S_NUMBER;
}

/* Handle the common subset of parsing. Returns either the new deal type
 * if it should change, or NO_DEAL for no change. Individual parsing routines
 * may handle some of these symbols themselves.
 */
int commonparse()
{
    switch (AnalysisData->symbol)
    {
```

```
      case S_ABA:
/* Usually followed by a number; this is some sort of account/sorting
 * code, but has a tendency to be taken as an amount, so here we
 * deliberately ignore it.
 */
nextsym();
unless (AnalysisData->symbol == S_NUMBER)
    return (NO_DEAL);
/* If it is a number just ignore it */
break;
      case S_COUNTERPARTY:
/* Indicates that the counterparty is about to be named. */
counterparty();
break;
      case S_COMMENT:
/* Indicates the beginning of a comment line/lines */
comment();
break;
      case S_DEALER:
dealer();
break;
      case S_WRAP:
/* May be the start of the WRAP UP line */
wrapup();
break;
      case S_ENDLINE: case S_NOISE:
/* Indications that we are not in the middle of payment instructions
 */
AnalysisData->foundpay = FALSE;
break;
      case S_JUNK: case S_PLEASE: case S_AND:
      case S_N: case S_NY: case S_CREDIT:
      case S_BACK: case S_MY: case S_PAYMENT:
      case S_A: case S_STANDARD:
/* We are probably at the start of, or in the middle of, a
 * payment instruction.
 */
parsepay();
break;
      case S_SWAP:
/* This indicates deal type SWAP, but only if it is followed by
 * a currency (otherwise it is too frequent in payment instructions.
 * If it is SWAP LATER this means that payment instructions are not
 * to be exchanged.
 */
nextsym();
if (AnalysisData->symbol == S_LATER)
{
   killpay();
   break;
}
if (AnalysisData->symbol != S_CURRENCY)
    /* Ignore; leave the next symbol to be examined */
    return (NO_DEAL);
backsym();
/* Now fall through ... */
      case S_FWD:
/* Forcing word for a SWAP deal type */
return (SWAP);
      case S_DEP:
/* Forcing word for a DEP deal type */
return (DEPOSIT);
      case S_OUTRIGHT:
/* Forcing word for an OUT deal type */
return (OUTRIGHT);
      case S_CURRENCY:
/* This is complicated. CHF TO ... is a payment instruction.
 * Otherwise we may have a specification of the currency or
 * currencies, or possibly the amount of the deal.
 */
nextsym();
if (AnalysisData->symbol == S_TO)
{
   backsym();
   parsepay();
   break;
```

```c
}
else
    backsym();

if (AnalysisData->TicketItemStatus[t_curl] > st_assumed)
    /* We already know the currencies, probably an amount */
    checkamount(FALSE);
else
    /* Take it as the deal currencies */
    currencies();
break;
    case S_LEND: case S_BORROW:
/* These words indicate a deposit transaction; the parsing for
 * deposits will handle their meaning.
 */
return (DEPOSIT);
    case S_YOU:
/* If this is YOU BUY then it indicates the direction of the deal.
 */
nextsym();
if (AnalysisData->symbol == S_BUY ||
AnalysisData->symbol == S_SELL)
    /* Of course what this means depends on who said it */
    insertnum(t_buy, (AnalysisData->symbol == S_BUY) ^
    AnalysisData->speaking, st_extracted);
else
    return (NO_DEAL);
break;
    case S_PAY:
/* This might indicate the direction (I PAY YOU), or it might be
 * a payment instruction (PAY BBNY PLS). We can only make the
 * decision on the basis of how far advanced the deal is.
 */
if (know(t_buy) && know(t_amount))
    parsepay();
else
    insertnum(t_buy, AnalysisData->speaking, st_extracted);
break;
    case S_AMOUNT: case S_FOR:
/* Forcing words for the deal amount, but possibly indicates a
 * payment instruction.
 */
nextsym();
if (AnalysisData->symbol == S_NUMBER ||
AnalysisData->symbol == S_CURRENCY)
    if (checkamount(TRUE))
        break;
backsym();
parsepay();
break;
    case S_ME:
/* Some clot tends to write I MIO == 1 MIO, so we have a special
 * attempt to catch that. Otherwise this has no meaning.
 */
unless (strcmp(AnalysisData->symbuf, "I") == 0)
    break;
nextsym();
unless (AnalysisData->symbol == S_MIO ||
AnalysisData->symbol == S_YARD)
    return(NO_DEAL);
backsym();
AnalysisData->symval = 1;
/* Fall through to treat as a digit (ONE, TWO etc.) */
    case S_DIGIT:
/* A word such as ONE, TWO (up to TEN) is always an amount. We
 * convert this symbol to an ordinary number, then read it as a
 * forced amount.
 */
convertdigit();
checkamount(TRUE);
break;
    case S_SPOT:
/* May be SPOT AGST 10/3, i.e. the value dates; otherwise if
 * followed by a currency it forces the deal type to SPOT.
 */
```

```
   if (parsedates(FALSE))
      break;
   else
   {
      nextsym();
      if (AnalysisData->symbol == S_CURRENCY)
      {
         /* Leave the currency to be re-read by the spot parsing
          * routine.
          */
         backsym();
         return (SPOT);
      }
      else
         return (NO_DEAL);
   }
         default:
   break;
      }
      nextsym();
      return (NO_DEAL);
}

/* Handle COUNTERPARTY [IS] ...
 * The whole of the rest of the line is taken as
 * the counterparty; if it is null the counterparty field is deleted.
 */
static void counterparty()
{
   static TEXTPOS text;

/* If we know that the counterparty is a broker, ignore the
    * counterparty phrase if enetered at this end. */
   if ( Ticket->CpName[ANSWERBACKBYTES-1] == '*' &&
   AnalysisData->speaking && Ticket->Flags.StartOnline )
      return;

/* If we know that we are a broker, ignore the
    * counterparty phrase if enetered at the other end. */
   if ( WeAreBroker &&
      !(AnalysisData->speaking) && Ticket->Flags.StartOnline )
      return;

nextsym();
   unless (AnalysisData->symbol == S_IS)
      backsym();

if (skiptext(&text))
   {
      inserttext(t_counterparty, &text, st_extracted);
   }
   else
      delfield(t_counterparty);
}

/* Handle DEALER [IS] ...
 * If we are speaking the following characters are taken as the dealerID.
 * The current text is NOT deleted if the line is blank.
 */
static void dealer()
{
   static TEXTPOS text;

/* Ignore this unless we are speaking. */
   unless ( AnalysisData->speaking || !Ticket->Flags.StartOnline )
      return;

nextsym();
   unless (AnalysisData->symbol == S_IS)
      backsym();

if (skiptext(&text))
   {
      inserttext(t_dealer, &text, st_extracted);
   }
```

```
}

/* Handle COMMENT ...
 * The following text up to the end of the line is a comment.
 */
static void comment()
{
    static TEXTPOS text;

/* Ignore this unless we are in wrap-up or off-line. */
    unless ( (AnalysisData->LineFlag & CF_WRAPUP) != 0 ||
        !Ticket->Flags.StartOnLine )
   return;

if (skiptext(&text))
        inserttext(t_comment, &text, st_extracted);
    else
        delfield(t_comment);
}

/* Handle WRAP UP ...
 * The following text up to the end of the line is ignored.
 */
static void wrapup( void )
{
    static TEXTPOS text;

/* Ignore this unless we are in wrap-up or off-line. */
    unless ( (AnalysisData->LineFlag & CF_WRAPUP) != 0 ||
        !Ticket->Flags.StartOnLine )
    return;

/* Unless the next symbol is UP do no special processing,
     * but ignore the WRAP. */
    nextsym();
    unless (AnalysisData->symbol == S_UP)
    {
        backsym();
        return;
    }
    skiptext(&text);
}

/* Fill in a text field containing the remainder of the current line;
no parseing is done on the lines. The result is false if the text found
was empty. */
BOOL skiptext( TEXTPOS *text )
{
    int firstline = AnalysisData->symtext.Srow;
    BOOL found = FALSE;

nextsym();
    text->Srow = AnalysisData->symtext.Srow;
    text->Scol = AnalysisData->symtext.Scol;
    text->Spos = AnalysisData->symtext.Spos;

AnalysisData->nowrap = TRUE;
    until (AnalysisData->symbol == S_ENDLINE )
    {
        found = TRUE;
        nextsym();
    }
    AnalysisData->nowrap = FALSE;

backsym();
    text->Epos = AnalysisData->symtext.Epos;

return (found);
}

/*************************************************************
 *                                                            *
 * curinfo.c - Routines to provide currency information       *
 *                                                            *
 * Written by Roger Abbott                                    *
```

```
*                                                          *
* Copyright (C) 1987 Richards Computer Products Ltd        *
*                                                          *
***********************************************************/ include <string.h> include "analdata.h"
include "kprintf.h"
#include "curinfo.h"
#include "period.h"
#include "currency.h"
#include "frx.h"
#include "channel.h"
#include "ca_pmt.h"

/* These are the swiftcode currency codes.  They are in the order which gives
their value. */
DMCURRENCY SwiftcodeTable[MAXCURRENCIES];

/* FRXnumber contains the FRX page currency number corresponding to each
swiftcode. Zero means that the currency is not on the FRX pages. */
int FRXnumber[ MAXCURRENCIES ];

/* Value of a currency field which indicates USD */
char Dollar = 0;

/* DefSpot is only used in testing.  A spot rate from the test file is read
into here, and if present getspot() and getoutright() use it instead
of looking at FRXA. */
char DefSpot[ RATEBYTES+1 ];

static char Temp[20];

/* The number of currencies in the swiftcode vocabulary */
int PmtCurrencies = 0;

/* The base address of the prompt array of currency pointers */
static LPCA_CURRENCY_DATA far *PmtCurrArray;

int FindCAperiod( int CAP );
static void CopyCurrencyInfo( int i );
static void FAR PASCAL UpdateCurrency( int currency );

/*******************************************/

/* Copy the information about one currency from the prompt database
to the vocabulary */ void CopyCurrencyInfo( int i )
{
int j;
   for ( j = 0; j < SWIFTBYTES; j++ )
      SwiftcodeTable[i].SwiftCode[j] = PmtCurrArray[i]->swift[j];
   SwiftcodeTable[i].Is365Days = PmtCurrArray[i]->Is365Days;
   SwiftcodeTable[i].IsInverse = PmtCurrArray[i]->IsInverse;
   SwiftcodeTable[i].IsMoslem = PmtCurrArray[i]->IsMoslem;
   if ( i >= PmtCurrencies )
PmtCurrencies = i + 1;

}

/*******************************************/

/* Function called by the prompt system to update currency info */ void FAR PASCAL UpdateCurrency( int currency )
{
CopyCurrencyInfo( currency );
Kprintf( "Update received for currency %d\n", currency );
DumpCurrencyInfo();
}

/*******************************************/
```

```c
/* Initialise the currency information to that known without access
to the FRXA-E pages. This routine must not be called until the
prompt system has finished initialising, because it copies the
currency information. */ void InitCurInfo( void )
{
int i, CAcode;
LPCURRSTRUCT PmtCurInfo;

/* First of all clear all the information which can be obtained from
FRXA-E, in case we don't succeed in loading the pages. In this case
the procedure InitialiseFRX is not called and the analysis has to be
done without the information. */

/* Set no FRXA date or test spot rate. */
FRXdate = 0;
DefSpot[0] = '\0';

/* Initialise the data for all the currencies used in the analysis.
FRXnumber is set to zeroes (not present). */
for ( i=0; i<MAXCURRENCIES; i++ )
FRXnumber[i] = 0;

PmtCurInfo = PMTGetCurrencyData();
if (PmtCurInfo == (LPCURRSTRUCT) -1)
{
    Kprintf( "PmtCurInfo returned -1\n" );
    goto SkipCurrencyRead;
}

PmtCurrArray = PmtCurInfo->currencies;

if (PmtCurInfo->size <= 0 || PmtCurInfo->size > MAXCURRENCIES)
{
    Kprintf( "Bad number of currencies\n" );
    goto SkipCurrencyRead;
}

PmtCurrencies = PmtCurInfo->size;
Kprintf( "Loading %d swiftcodes into the vocabulary\n", PmtCurrencies );

for ( i = 0; i < PmtCurrencies; i++ )
CopyCurrencyInfo( i );
DumpCurrencyInfo();

/* Register the function to get currency updates */
PMTRegisterCurrencyFun( UpdateCurrency );

/* We jump to this label if reading DM currencies fails for any reason */
SkipCurrencyRead:

/* Find out which number currency is the Dollar */
CAcode = FindCAcode( "USD" );
if ( CAcode < 0 )
Kprintf( "*** Currency table does not include USD ***\n" );
else
Dollar = (char) CAcode;
}

/*****************************************************/

/* After the FRX pages have initialised successfully, fill out the table
indicating which (if any) FRX number corresponds to each Swiftcode.
Also update the information bits in SwiftcodeTable. */ void GetFRXcodes( void )
{
int CAcode, FRXcurrency;

for ( FRXcurrency = 1; FRXcurrency < 31; FRXcurrency++ )
{
if ( (CAcode = FindCAcode(GetSwiftcode(FRXcurrency))) >= 0 )
FRXnumber[ CAcode ] = FRXcurrency;
else
```

```c
{
Kprintf( "FRX page currency %.3Fs not found\n",
(LPSTR) GetSwiftcode(FRXcurrency) );
continue;
}

/* Add in the base days and other information from FRXB-E.
This code commented out because database info must have priority
SwiftcodeTable[ CAcode ].IsInverse =
ReciprocalQuotation( FRXcurrency );
SwiftcodeTable[ CAcode ].Is365Days =
Year365( FRXcurrency );
SwiftcodeTable[ CAcode ].IsMoslem =
MoslemWeekend[ FRXcurrency ];
*/
}
}

/***********************************************************/

/* Find the Converstion Analysis number of a swiftcode */ int FindCAcode( PSTR Pointer )
{
int CAcode;

for ( CAcode = 0; CAcode < PmtCurrencies; CAcode++ )
if (memcmp( SwiftcodeTable[CAcode].SwiftCode, Pointer, 3) == 0)
return( CAcode );
return( -1 );
}

/***********************************************************/

BOOL getspot(int cur1, int cur2, int quotecur, PSTR low, PSTR high)
{
int FRXcur1 = FRXnumber[cur1], FRXcur2 = FRXnumber[cur2];
int FirstChar;

/* For debugging, if DefSpot contains a string use it */ if ( DefSpot[0] != '\0' )
{
strcpy( low, DefSpot );
strcpy( high, DefSpot );
return( TRUE );
}

/* Check that information is available for both currencies. */
if ( FRXcur1 == 0 || FRXcur2 == 0 ) return( FALSE );

/* Make sure that one of the currencies is the dollar - no cross rates */
if ( cur1 == Dollar )
cur1 = cur2, cur2 = Dollar;
unless ( cur2 == Dollar )
return( FALSE );

/* Get the two halves of the quote */
FirstChar = GetSpotBid( FRXcur1, Temp, 20 );
if ( Temp[FirstChar] == 'U' ) return( FALSE );
strcpy( low, Temp+FirstChar );

/*
FirstChar = GetSpotAsk( FRXcur1, Temp, 20 );
if ( Temp[FirstChar] == 'U' ) return( FALSE );
strcpy( high, Temp+FirstChar );
*/

/* Just use the low quote, the high is probably thrown away */
strcpy( high, low );

/* If we get this far it all worked */
return( TRUE );
}

/***********************************************************/
```

```
BOOL getfwd(int cur1, int cur2, int quotecur,
int Period, PSTR Low, PSTR High)
{
int FRXcur1 = FRXnumber[cur1], FRXcur2 = FRXnumber[cur2];
int FirstChar;

/* Check that information is available for both currencies. */
if ( FRXcur1 == 0 || FRXcur2 == 0 ) return( FALSE );

/* Make sure that one of the currencies is the dollar - no cross rates */
if ( cur1 == Dollar )
cur1 = cur2, cur2 = Dollar;
unless ( cur2 == Dollar )
return( FALSE );

Period = FindCAperiod( Period );

/* Get the two halves of the quote */
FirstChar = GetFwdBid( FRXcur1, Temp, 20, Period );
if ( Temp[FirstChar] == 'U' ) return( FALSE );
strcpy( Low, Temp+FirstChar );
FirstChar = GetFwdAsk( FRXcur1, Temp, 20, Period );
if ( Temp[FirstChar] == 'U' ) return( FALSE );
strcpy( High, Temp+FirstChar );

/* If we get this far it all worked */
return( TRUE );
}

/**************************************************/

/* We really need only the big figures at this stage so the
spot rate will do. */

BOOL getoutright(int cur1, int cur2, int quotecur,
int Period, PSTR Low, PSTR High)
{
return( getspot( cur1, cur2, quotecur, Low, High ) );
}

/**************************************************/

/* Convert a period in the CA convention to one of those
used on pages FRXB-FRXD */ int FindCAperiod( int CAP )
{
if ( CAP < P_1M ) return( 0 );
else if ( CAP < P_4M ) return( CAP - 2 );
else if ( CAP < P_7M ) return( 3 );
else if ( CAP < P_1YR ) return( 4 );
return( 5 );
}

/**************************************************/ char far *CAFRXASpotRate(int currencynumber )
{
int FRXcur = FRXnumber[currencynumber];
int FirstChar;

/* Check that information is available. */
if ( FRXcur == 0 )
   return( (LPSTR) NULL );

FirstChar = GetSpotBid( FRXcur, Temp, 20 );
if ( Temp[FirstChar] == 'U' )
   return( (LPSTR) NULL );

return( (LPSTR) Temp+FirstChar );
}

/**************************************************/

/* Dump the information in the currency vocabulary */
```

```c
void DumpCurrencyInfo( void )
{
int i;
for ( i = 0; i < PmtCurrencies; i++ )
{
   if ( i%6 == 0 )
   Kprintf( "\n" );

Kprintf( "(%2.2d) %.3Fs", i, (LPSTR) SwiftcodeTable[i].SwiftCode );
   if ( SwiftcodeTable[i].Is365Days )
      Kprintf( " 5");
   else
      Kprintf( " 0");

if ( SwiftcodeTable[i].IsMoslem )
      Kprintf( "M");
   else
      Kprintf( " ");

if ( SwiftcodeTable[i].IsInverse )
      Kprintf( "I ");
   else
      Kprintf( "  ");
}
Kprintf( "\n");
}

/***************************************************************
 *                                                              *
 * date.c - Definitions of dates and date-handling procedures   *
 *                                                              *
 * Written by Alan Stokes/Roger H. Abbott                       *
 *                                                              *
 * Copyright (C) 1987 Richards Computer Products Ltd            *
 *                                                              *
 ***************************************************************/ include "analdata.h"
include "Ktime.h"
#include "date.h"
#include "dateproc.h"
#include "kprintf.h"

/* Number of days in each month (starting at March). This is required for
calculating good value dates and is not obtainable from the library. */
static int monthdays[12] =
{
31, 30, 31, 30, 31, 31, 30, 31, 30, 31, 31, 29
};

/****************************************************/

/* Compare two split dates; returns true/false */
BOOL samesplit(d1, d2)
SPLITDATE *d1, *d2;
{
    /* Check that both the component dates are the same */
    return ((d1->date1 == d2->date1) && (d1->date2 == d2->date2));
}

/****************************************************/

/* Convert a date to a date structure */ void datetostruct(DATE d, DATESTRUCT far *s)
{
static time_t time;
struct tm far *tmstruct;

/* Calculate the number of seconds as at midday on the date, so that
leap seconds will not cause trouble, whatever the library does with them. */
time = (time_t) d * SECONDSPERDAY + SECONDSPERDAY / 2;

/* Get that number of seconds as a library format structure. */
```

```c
tmstruct = Kgmtime( &time );
/* Copy the relevant parts of the library structure to our structure */
s->day = tmstruct->tm_mday;
s->month = tmstruct->tm_mon + 1;
s->year = tmstruct->tm_year + 1900;

}

/********************************************************/

/* Compare two date structures; the result is < 0 if s1 < s2 and so on. */
int datecomp( DATESTRUCT far *s1, DATESTRUCT far *s2 )
{
   int diff;

if ((diff = s1->year - s2->year) == 0)
      if ((diff = s1->month - s2->month) == 0)
 diff = s1->day - s2->day;

return (diff);
}

/********************************************************/

/* Return how many days there are in a month.  The date structure
passed gives the month and year we are considering. */
int daysinmonth(DATESTRUCT far *s)
{
   int month = s->month - 3;
   int days;

if (month < 0)
      month += 12;

days = monthdays[month];

if (month == 11)
   {
      /* February - have to check for a leap year */
      int year = s->year;

unless (year%4 == 0 && (year%100 != 0 || year%400 == 0))
 days--;
   } return (days);
}

/********************************************************/

/* Convert a date structure to a date */
DATE structtodate( DATESTRUCT far *s)
{
    static struct tm TimeStruct;
    struct tm *timeptr;
    time_t res;

timeptr = &TimeStruct;

/* Set the time to midday so leap seconds don't matter */
    timeptr->tm_sec = 0;
    timeptr->tm_min = 0;
    timeptr->tm_hour = 12;

/* Put the items from our structure into the library one */
    timeptr->tm_mday = s->day;
    timeptr->tm_mon = s->month - 1;
    timeptr->tm_year = s->year - 1900;

timeptr->tm_isdst = 0;
    res = Kmktime( timeptr );

return( (int) (res / SECONDSPERDAY) );
}
```

```c
/******************************************************/

/* Write a DATE as DyDDMonYY */ void writedate(d)
DATE d;
{
static time_t time;
static LPSTR string;

/* Calculate the number of seconds as at midday on the date, so that
leap seconds will not cause trouble, whatever the library does with them. */
time = (time_t) d * SECONDSPERDAY + SECONDSPERDAY / 2;
string = Kctime( &time );

Kprintf( "%.2Fs%.2Fs%.2Fs%.2Fs", (LPSTR) &string[0], (LPSTR) &string[8],
(LPSTR) &string[4], (LPSTR) &string[22] );
}

/******************************************************/

/* Write a date as Dayname dd Monthname yyyy */ void wrwdate( DATE d )
{
static time_t time;
static LPSTR string;

/* Calculate the number of seconds as at midday on the date, so that
leap seconds will not cause trouble, whatever the library does with them. */
time = (time_t) d * SECONDSPERDAY + SECONDSPERDAY / 2;
string = Kctime( &time );

Kprintf( "%.3Fs %.2Fs %.3Fs %.4Fs",
(LPSTR) &string[0], (LPSTR) &string[8],
(LPSTR) &string[4], (LPSTR) &string[20] );
}

/******************************************************/

/* Check that two dates are reasonably close (within 5 days of each other)
 */
BOOL similardate(d1, d2)
DATE d1, d2;
{
   if (d1 < d2)
      return (d2 - d1 < 5);
   else
      return (d1 - d2 < 5);
}

/******************************************************/

/* Return the day of the week for a given date */
int DayOfWeek( DATE Days )
{
static time_t time;
struct tm far *tmstruct;

/* Calculate the number of seconds as at midday on the date, so that
leap seconds will not cause trouble, whatever the library does with them. */
time = (time_t) Days * SECONDSPERDAY + SECONDSPERDAY / 2;

/* Get that number of seconds as a library format structure. */
tmstruct = Kgmtime( &time );

/* The day of the week is obtained from the library structure */
return( tmstruct->tm_wday );
}

/******************************************************************
*                                                                 *
* datepars.c - Routines to parse dates                            *
*                                                                 *
```

```
*   Written by Alan Stokes                                   *
*                                                            *
*   Copyright (C) 1987 Richards Computer Products Ltd        *
*                                                            *
*************************************************************/ include <ctype.h>
include <string.h> include "analdata.h"
include "datepars.h"
#include "read.h"
#include "date.h"
#include "number.h"
#include "miscpars.h"
#include "period.h"
#include "insert.h"

static BOOL readdate(BOOL, DATESTRUCT far *, BOOL *);
static BOOL makeyear(int *);
static BOOL readsplit(SPLITDATE *);
static BOOL parsedates2(BOOL, BOOL);

/* Attempt to read a date; this is a quite complicate sequence, eg SEPT 4
 * 1985, or 4/5. The date must be beyond today to be recognised.
 * If dayonly is true then we only expect the day of the month to be given.
 * force will be set true if we are convinced this is a date (eg if we find
 * the name of a month).
 */
static BOOL readdate(BOOL dayonly, DATESTRUCT far *res, BOOL *force)
{
   char ch;
   int startpos;
   int startcount = AnalysisData->symcount;
   BOOL thfound = FALSE;
   BOOL endreached = FALSE;

/* Initialise these values so we can tell if they have already been set up
    */
   res->day = -1;
   res->month = -1;
   res->year = -1;

/* If dayonly is specified we expect only a single number. */
   if (dayonly && AnalysisData->symbol != S_NUMBER)
      return (FALSE);

while (!endreached)
   {
      switch (AnalysisData->symbol)
      {
   default:
      /* Bad symbol - assume it is not part of the date */
      if (AnalysisData->symcount > startcount)
         backsym();
      endreached = TRUE;
      break;
   case S_MONTH:
      if (res->month < 0)
      {
         res->month = AnalysisData->symval;
         *force = TRUE;
      }
      else
         /* A second month has been found */
         return (FALSE);
      break;
   case S_TH:
      /* st, nd, rd, th etc.
       * This must occur only once and must be after a day (but this is
       * not completely checked).
       */
      if (thfound || res->day < 0)
      {
         if (AnalysisData->symcount > startcount)
```

```
            backsym();
                endreached = TRUE;
            }
            else
                thfound = TRUE;
            break;
        case S_NUMBER:
            /* This is quite complicated, because each number may hold one or
             * more components of the date (010187 is allowed, as is
             * 1/1/1987).
             */
            startpos = AnalysisData->numpos;
            ch = nextnumch(FALSE);
            until (ch == 0)
            {
                static int num;
                static int digits;

num = 0;
                digits = 0;

/* Skip leading garbage */
                until (isdigit(ch) || ch == 0)
           ch = nextnumch(FALSE);

if (ch == 0)
        /* Nothing useful found */
        break;

while (isdigit(ch))
                {
        digits++;
        num = 10 * num + ch - '0';
        ch = nextnumch(FALSE);

if ((digits == 2 && (res->day < 0 || res->month < 0)) ||
            digits == 4)
            /* Assume we have come to the end of this section of the
             * date.
             */
            break;
                }

/* Skip any drivel we now come to */
                until (isdigit(ch) || ch == 0)
        ch = nextnumch(FALSE);

/* Now work out which field we've found.  If possible we assume
    * the order day, month year; we go to some trouble to
    * recognise that 10/31/87 must be month, day, year.
    */
                if (res->day < 0 && 1 <= num && num <= 31)
        res->day = num;
                else if (res->month < 0 && 1 <= num && num <= 12)
        res->month = num;
                else if (res->month < 0 && 1 <= num && num <= 31 &&
        1 <= res->day && res->day <= 12)
                {
        /* This means we have found day and month in the wrong
         * order.
         */
        res->month = res->day;
        res->day = num;
                }
                else if (res->year < 0 && res->day >= 0 && res->month >=0 &&
        ch == 0 && makeyear(&num))
        res->year = num;
                else
                {
        /* The number doesn't seem to make sense as anything; assume
         * we have reached the end of the date. Move back to before
         * the offending number & then stop.
         */
        if (startpos == 0 && AnalysisData->symcount > startpos)
        {
            /* We do not understand this symbol, so dicard it. */
```

```
   AnalysisData->numpos = startpos;
   unnumch();
}
else
   AnalysisData->numpos = startpos;
endreached = TRUE;
break;
      }
      if (dayonly)
      {
/* We hyave read a single number; now stop. */
 unless (ch == 0)
    unnumch();
 endreached = TRUE;
 break;
      }
      startpos = AnalysisData->numpos - 1;
   }
   break;
      } if (endreached)
break;

if (res->day >= 0 && res->month >= 0 && res->year >= 0)
/* We have read everything we need */
break;

/* Otherwise keep reading */
      nextsym();
      if (AnalysisData->symbol == S_NUMBER)
      {
strcpy(AnalysisData->numbuf, AnalysisData->symbuf);
AnalysisData->numpos = 0;
      }
   }

/* We have extracted as much information as possible; we may want to
    * rearrange things and to fill in missing information.
    */
   if (res->day < 0)
      /* We cannot deduce this */
      return (FALSE);

if (res->month < 0)
   {
      /* If we do not know the month assume it is the current month, or
       * possibly next month.
       */
      int newmonth = AnalysisData->conversationdate.month;

if (res->day < AnalysisData->conversationdate.day)
      {
if (++newmonth > 12)
{
   newmonth = 1;
   res->year = AnalysisData->conversationdate.year + 1;
}
      }
      res->month = newmonth;
   } if (res->year < 0)
   {
      res->year = AnalysisData->conversationdate.year;
      if (datecomp(res, &(AnalysisData->conversationdate)) < 0)
(res->year)++;
   }

/* Check finally that what we have is a valid date */
   if (res->day > daysinmonth(res) || structtodate(res) <
structtodate(&(AnalysisData->conversationdate)) - 5)
      return (FALSE);
   else
      return (TRUE);
```

```c
}

/* Given a number which represents a year convert it to the actual
 * year number.
 */
static BOOL makeyear(year)
int *year;
{
   if (*year < 100)
   {
      /* Only two digits given; we have to work out the century. */
      int century = AnalysisData->conversationdate.year / 100;
      *year += 100 * century;
      if (*year < AnalysisData->conversationdate.year)
 /* Must have wrapped round to the next century */
   *year += 100;
   }

/* Return whether the year is now reasonable */
   return (AnalysisData->conversationdate.year <= *year &&
*year <= AnalysisData->conversationdate.year + 10);
}

/* Read a single split date, in the form 'cur date cur date'.  The two
 * currencies must be correct.
 */
static BOOL readsplit(SPLITDATE *split)
{
   DATE *field1, *field2;
   DATESTRUCT date;
   static BOOL dummy;

/* Check the first currency is acceptable */
   unless (AnalysisData->symbol == S_CURRENCY &&
   handlecur(AnalysisData->symval, FALSE, FALSE))
      return (FALSE);

/* Work out which of the two currencies we are referring to */
   if ( know(t_cur1) && AnalysisData->symval == Ticket->Currency1 )
      field1 = &split->date1;
   else if ( know(t_cur2) && AnalysisData->symval == Ticket->Currency2 )
      field1 = &split->date2;
   else
      /* Unknown currency */
      return (FALSE);

/* Read the first date */
   nextsym();
   strcpy(AnalysisData->numbuf, AnalysisData->symbuf);
   AnalysisData->numpos = 0;
   unless (readdate(FALSE, &date, &dummy))
      return (FALSE);
   /* We must not be in the middle of a number */
   if (AnalysisData->symbol == S_NUMBER &&
   AnalysisData->numbuf[AnalysisData->numpos] != 0)
      return (FALSE);
   *field1 = structtodate(&date);

/* Know get the second currency and work out what it means */
   nextsym();
   unless (AnalysisData->symbol == S_CURRENCY &&
   handlecur(AnalysisData->symval, FALSE, FALSE))
      return (FALSE);
   if ( know(t_cur1) && AnalysisData->symval == Ticket->Currency1 )
      field2 = &split->date1;
   else if ( know(t_cur2) && AnalysisData->symval == Ticket->Currency2 )
      field2 = &split->date2;
   else
      return (FALSE);

/* Added by RHA */
      if (field1 == field2) return( FALSE );

/* Read the second date */
   nextsym();
```

```
   strcpy(AnalysisData->numbuf, AnalysisData->symbuf);
   AnalysisData->numpos = 0;
   unless (readdate(FALSE, &date, &dummy))
       return (FALSE);
   if (AnalysisData->symbol == S_NUMBER &&
   AnalysisData->numbuf[AnalysisData->numpos] != 0)
       return (FALSE);
   *field2 = structtodate(&date);

return (TRUE);
}

/* Parse a single value date.  field is t_near or t_far (for an outright
 * deal).
 */
BOOL parsedate(BOOL Frce, FIELDNAME field)
{
   BOOL ok;
   static SPLITDATE split;
   static BOOL force;

ok = TRUE;
   force = Frce;
   AnalysisData->symcount = 0;

/* Look for the special case FROM xxxx > */
   nextsym();
   if (AnalysisData->symbol == S_RIGHTARROW )
      return FALSE;
   else
      backsym();

if (AnalysisData->symbol == S_CURRENCY)
   {
       if (readsplit(&split))
/* A split date is so funny looking that if it matched at all it is
 * bound to be right.
 */
force = TRUE;
       else
   ok = FALSE;
   }
   else
   {
       DATESTRUCT result;

strcpy(AnalysisData->numbuf, AnalysisData->symbuf);
       AnalysisData->numpos = 0;
       if (readdate(FALSE, &result, &force))
       {
/* Check that we are not in the middle of a number */
if (AnalysisData->symbol == S_NUMBER &&
AnalysisData->numbuf[AnalysisData->numpos] != 0)
   ok = FALSE;
else
   split.date1 = split.date2 = structtodate(&result);
       }
       else
   ok = FALSE;
   } if (ok)
   {
       /* Check the following symbol doesn't make a date impossible */
       nextsym();
       switch (AnalysisData->symbol)
       {
   case S_MIO: case S_YARD: case S_MTH:
   case S_WEEK: case S_YEAR: case S_PERCENT:
      ok = FALSE;
      break;
   default:
      backsym();
      break;
       }
```

```
} if (ok && !force && know(field))
{
    /* Check for consistency - only allow dates to change by 5 days from
     * what we already have (which will normally be the date we have
     * calculated for ourselves).
     */
    static SPLITDATE TicketDate, *oldsplit;
    oldsplit = &TicketDate;

if ( field == t_near )
    {
    TicketDate.date1 = Ticket->NearDate1;
    TicketDate.date2 = Ticket->NearDate2;
    }
    else
    {
    TicketDate.date1 = Ticket->FarDate1;
    TicketDate.date2 = Ticket->FarDate2;
    }
        if (!similardate(oldsplit->date1, split.date1) ||
    !similardate(oldsplit->date2, split.date2))
  ok = FALSE;
    }

/* The two halves of a split date must be fairly similar */
    if (ok && !similardate(split.date1, split.date2))
        ok = FALSE;

if (ok)
    {
        insertdate(field, &split, st_extracted);
        if (field == t_far && !know(t_period))
    insertnum(t_period, P_BROKEN, st_assumed);
    }
    else
        backphrase();

return (ok);
}

/* Routine to parse a single or double date.
 * The complexity here is called by the fact that VAL 5 JULY TO 6 JULY could
 * easily be written as just 5/6, which we will interpret as the single date 5
 * JUNE. This will then be rejected. If this happens we will try a second
 * time, this time setting the dayonly flag to read the first date.
 */
BOOL parsedates(BOOL force)
{
    AnalysisData->symcount = 0;

/* Look for the special case FROM xxxx > */
    nextsym();
    if (AnalysisData->symbol == S_RIGHTARROW )
        return FALSE;
    else
        backsym();

if (!parsedates2(force, FALSE))
    {
        if (!parsedates2(force, TRUE))
        {
    backphrase();
    return (FALSE);
        }
    }
    /* One or other call of parsedates2 returned TRUE */
    return (TRUE);
}

/* Routine to parse single or double dates. Dayonly is set if the first date
 * is expected to consist only of a day number.
 */
static BOOL parsedates2(BOOL Frce, BOOL dayonly)
```

```c
{
    /* We expect two halves of a date, possibly separated by AGST. The special
     * form SPOT AGST ... is allowed, in which case the default spot date is
     * used as the neard date.
     */
    BOOL nonear = TRUE, nofar = TRUE, samenum = FALSE;
    int lastsym;
    static SPLITDATE neard, fard;
    DATESTRUCT date;
    static BOOL force;

force = Frce;

backphrase();

/* Attempt to read the first date */
    switch (AnalysisData->symbol)
    {
        case S_CURRENCY:
    if (readsplit(&neard))
    {
        force = TRUE;
        nonear = FALSE;
        nextsym();
    }
    else
        return (FALSE);
    break;
        case S_SPOT:
    /* This is a valid neard date, so skip it and continue */
    nextsym();
    break;
        case S_NUMBER:
    strcpy(AnalysisData->numbuf, AnalysisData->symbuf);
    AnalysisData->numpos = 0;
    /* Fall through */
        case S_MONTH:
    if (readdate(dayonly, &date, &force))
    {
        neard.date1 = neard.date2 = structtodate(&date);

if (AnalysisData->symbol == S_NUMBER &&
            AnalysisData->numbuf[AnalysisData->numpos] != 0)
            /* Remember that we are in the middle of a number */
            samenum = TRUE;
        else
            nextsym();
        nonear = FALSE;
    }
    else
        return (FALSE);
    break;
    }

/* Remember where we are in case the second one fails */
    lastsym = AnalysisData->symcount;

/* Skip any separator between the dates */
    switch (AnalysisData->symbol)
    {
        case S_AND: case S_N: case S_AGAINST:
        case S_TO:
    force = TRUE;
    nextsym();
    samenum = FALSE;
    break;
        case S_JUNK:
    /* We are very tolerant of things going here */
    nextsym();
    samenum = FALSE;
    break;
    }

/* Now try to read the second date */
    switch (AnalysisData->symbol)
    {
```

```
      case S_CURRENCY:
if (readsplit(&fard))
{
   force = TRUE;
   nofar = FALSE;
   lastsym = AnalysisData->symcount;
   nextsym();
}
break;
      case S_NUMBER:
unless (samenum)
{
   strcpy(AnalysisData->numbuf, AnalysisData->symbuf);
   AnalysisData->numpos = 0;
}
/* Fall through */
      case S_MONTH:
      { static BOOL newforce;
BOOL ok = TRUE;

newforce = FALSE;
if (readdate(FALSE, &date, &newforce))
{  if (AnalysisData->symbol == S_NUMBER &&
AnalysisData->numbuf[AnalysisData->numpos] != 0)
      ok = FALSE;
   else if (newforce)
      force = TRUE;
}
else
   ok = FALSE;

if (ok)
{  fard.date1 = fard.date2 = structtodate(&date);
   nofar = FALSE;
   lastsym = AnalysisData->symcount;
   nextsym();
}
else
   if (samenum)
      /* The second date was the same symbol as the first and failed;
 * we deduce that both dates are wrong.
 */
      return (FALSE);

break;
      }
   }

/* Check the following symbol */
   switch (AnalysisData->symbol)
   {
      case S_WEEK: case S_MTH: case S_YEAR:
      case S_AGAINST: case S_MIO: case S_YARD:
 return (FALSE);
      default:
 /* Read back to the end of the last valid date */
 while (AnalysisData->symcount > lastsym)
    backsym();
 break;
   } if (nofar)
   {
      /* There wasn't a second date.  One date must have been given, and it is
       * probably actually the fard date.
       */
      if (nonear)
 return (FALSE);
      else
      {
 fard = neard;
 nonear = TRUE;
      }
   }

/* Check the dates for consistency & reasonableness */
```

```c
   if (nonear)
   {
      /* See if we can get the neard date from somewhere */
      if (know(t_near))
      {
         neard.date1 = Ticket->NearDate1;
         neard.date2 = Ticket->NearDate2;
      }
      else
         /* Use today's date */
         neard.date1 = neard.date2 =
            structtodate(&(AnalysisData->conversationdate));
   } unless (neard.date1 < fard.date1 && neard.date2 < fard.date2)
      return (FALSE);
   if (!nonear && !similardate(neard.date1, neard.date2))
      return (FALSE);
   if (!similardate(fard.date1, fard.date2))
      return (FALSE);

unless (force)
   {
      /* Unless forcing don't allow dates which are vastly different from the
       * known ones (which initially will be the calculated ones).
       */
      unless (nonear)
         if (know(t_near))
         {
            if (!similardate(Ticket->NearDate1, neard.date1) ||
                !similardate(Ticket->NearDate2, neard.date2))
               return (FALSE);
         }
         else
         {
            DATE goodnear =
               structtodate(&(AnalysisData->conversationdate));

if (!similardate(goodnear, neard.date1) ||
                !similardate(goodnear, neard.date2))
               return (FALSE);
         } if (know(t_far))
         if (!similardate(Ticket->FarDate1, fard.date1) ||
             !similardate(Ticket->FarDate2, fard.date2))
            return (FALSE);

}

/* If we get here we have finally worked out the dates */
   unless (nonear)
      insertdate(t_near, &neard, st_extracted);

insertdate(t_far, &fard, st_extracted);

unless (know(t_period))
      insertnum(t_period, P_BROKEN, st_assumed);

return (TRUE);
}

/***************************************************************
 *                                                              *
 * dateproc.c - Routines to handle dates                        *
 *                                                              *
 * Written by Roger Abbott (from Alan Stokes' BCPL)             *
 *                                                              *
 * Copyright (C) 1988 Richards Computer Products Ltd            *
 *                                                              *
 ***************************************************************/ include "kprintf.h"
include "analdata.h"
#include "dateproc.h"
#include "period.h"
```

```c
#include "read.h"
#include "insert.h"
#include "date.h"
#include "curinfo.h"
#include "frx.h"

/* Return whether a date is a good value date for two currencies */

BOOL GoodDate( int Cur1, int Cur2, SPLITDATE *Date )
{
if ( Holiday( Date->date1, Cur1 ) ||
Weekend( Date->date1, Cur1 ) ) return( FALSE );

if ( Holiday( Date->date2, Cur2 ) ||
Weekend( Date->date2, Cur2 ) ) return( FALSE );

return( TRUE );
}

/****************************************************/

/* Return the real value date for a currency if the nominal is Days */
DATE SplitDate( DATE Days, int Currency )
{
if ( Weekend( Days, Currency ) ) return( Days+1 );
else return( Days );
}

/****************************************************/

/* Routine to try and guess what the dates should be for the period and
 * currencies we have worked out.
 */ void guessdates()
{
int Per = P_SPOT;
BOOL GotNear = FALSE, GotFar = FALSE;
static SPLITDATE Near, Far;
static SPLITDATE TicketNear, TicketFar;

TicketNear.date1 = Ticket->NearDate1;
TicketNear.date2 = Ticket->NearDate2;
TicketFar.date1 = Ticket->FarDate1;
TicketFar.date2 = Ticket->FarDate2;

if ( know(t_period) ) Per = Ticket->Period;
if ( AnalysisData->TicketItemStatus[t_near] == st_extracted )
GotNear = TRUE;
if ( AnalysisData->TicketItemStatus[t_far] == st_extracted )
GotFar = TRUE;

if ( GotNear && GotFar ) return;

GetDates( Per, GoodCur(t_cur1), GoodCur(t_cur2), &Near, &Far );

if ( Per < P_BROKEN || know(t_far) )
{
SPLITDATE *NewNear, *NewFar;
if ( GotNear ) NewNear = &TicketNear;
else NewNear = &Near;

if ( GotFar || Per >= P_BROKEN ) NewFar = &TicketFar;
else NewFar = &Far;

if ( NewNear->date1 >= NewFar->date1 ||
NewNear->date2 >= NewFar->date2 ) return;
} unless ( GotNear ) insertdate( t_near, &Near, st_deduced );
if ( Per < P_BROKEN && !GotFar ) insertdate( t_far, &Far, st_deduced );

}

/* Routine to try and guess the period given the currencies and the dates. */
void guessperiod()
```

```
{
int First = P_ON, Deal, P;
int cur1 = GoodCur(t_cur1), cur2 = GoodCur(t_cur2);
static SPLITDATE Near, Far;
static SPLITDATE TicketNear, TicketFar;

if ( know(t_period) || !know(t_near) ||
AnalysisData->TicketItemStatus[t_far] == st_extracted )
return;

TicketNear.date1 = Ticket->NearDate1;
TicketNear.date2 = Ticket->NearDate2;
TicketFar.date1 = Ticket->FarDate1;
TicketFar.date2 = Ticket->FarDate2;

if ( know(t_deal) ) Deal = Ticket->DealType;
else Deal = NO_DEAL;

/* Attempt to deduce the period from the dates */
if ( Deal == OUTRIGHT ) First = P_1WK;

for ( P = First; P <= (P_BROKEN-1); P++ )
{
DATE Res;

GetDates( P, cur1, cur2, &Near, &Far );
Res = Far.date1 - TicketFar.date1;
if ( Res > 0 ) break;
if ( Res < 0 ) continue;

if ( samesplit( &TicketNear, &Near ) &&
TicketFar.date2 == Far.date2 )
{
insertnum( t_period, P, st_deduced );
break;
}
else unless ( P < P_SN ) break;
}
}
/*********************************************/

/* Return a currency for a field. If we don't know, return dollar. */ int GoodCur( FIELDNAME Field )
{
if ( Field == t_cur2 && know(t_deal) && Ticket->DealType == DEPOSIT )
Field = t_cur1;
if ( know(Field) ) return( (Field == t_cur1) ?
Ticket->Currency1 : Ticket->Currency2 );
else return( Dollar );
}

/*********************************************/

/* Return the near and far dates for two currencies and a given period */
void GetDates( PERIOD Per, int Cur1, int Cur2,
SPLITDATE *Near, SPLITDATE *Far )
{
DATE Date;
int Inc, i;

Date = structtodate( &(AnalysisData->conversationdate) );

switch ( Per )
{
case P_TT:
case P_ON:
Inc = 0;/* Overnight starts today */
break;
case P_TOM:
case P_TN:
Inc = 1;/* Tomorrow next starts tomorrow */
break;
default:
Inc = 2;/* All others start on spot date */
}
```

```
/* Calculate and store the near date by stepping from today the
appropriate number of times */
for ( i = 0; i < Inc; i++ )
Date = NextWorkingDay( Date, Cur1, Cur2 );

Near->date1 = SplitDate( Date, Cur1 );
Near->date2 = SplitDate( Date, Cur2 );

/* For broken dates the far is given, and for spot deals there is no far,
so stop now */
if ( Per >= P_BROKEN ) return;

/* For the rest we go on to calculate the far date */
switch ( Per )
{
case P_ON: case P_TN: case P_SN:
/* Next working day after near date required */
Date = NextWorkingDay( Date, Cur1, Cur2 );
break;

case P_1WK: case P_2WK: case P_3WK: case P_4WK:
/* Move on the appropriate number of weeks */
Date = AddWeeks( Date, Per - P_1WK + 1, Cur1, Cur2 );
break;

case P_30YR:
Date = AddYears( Date, 30, Cur1, Cur2 );
break;

case P_20YR:
Date = AddYears( Date, 20, Cur1, Cur2 );
break;

case P_1YR: case P_2YR: case P_3YR: case P_4YR: case P_5YR:
case P_6YR: case P_7YR: case P_8YR: case P_9YR: case P_10YR:
Date = AddYears( Date, Per - P_1YR + 1, Cur1, Cur2 );
break;

case P_1M: case P_2M: case P_3M: case P_4M:
case P_5M: case P_6M: case P_7M: case P_8M:
case P_9M: case P_10M: case P_11M:
Date = AddMonths( Date, Per - P_1M + 1, Cur1, Cur2 );
break;

default:
Kprintf( "Bad perion %d in GetDates\n", Per );
}

Far->date1 = SplitDate( Date, Cur1 );
Far->date2 = SplitDate( Date, Cur2 );
}

/*******************************************************/

/* Procedure to return the next working day after the day supplied */

DATE NextWorkingDay( DATE Day, int Cur1, int Cur2 )
{
Day++;
/* If necessary move on to the next working day */
while ( !GoodValue( Day, Cur1, Cur2 ) )
Day++;
return Day;
}

/*****************************************************/

/* Add a number of weeks to a date, stepping to a working day if needed */

DATE AddWeeks( DATE Date, int Inc, int Cur1, int Cur2 )
{
Date += 7 * Inc;
/* If necessary move on to the next working day */
while ( !GoodValue( Date, Cur1, Cur2 ) )
Date++;
return Date;
}
```

```
/*****************************************************/

/* Add a number of months to a given date, allowing for holidays
and the special rules about spot being near the end of the month */

DATE AddMonths( DATE Date, int Inc, int Cur1, int Cur2 )
{
int Month, Day, Lastday;
DATESTRUCT Neard, Fard;
BOOL SpotIsLast = FALSE;

/* Save the given date as a structure */
datetostruct( Date, &Neard );

/* Check if near date is the last working day of the month */
Date = NextWorkingDay( Date, Cur1, Cur2 );
datetostruct( Date, &Fard );
if ( Neard.month != Fard.month ) SpotIsLast = TRUE;

/* Arrive at the far date by adding on the number of months */
Fard = Neard;
Month = Inc + Fard.month - 1; /* Because the months are 1-12 */
Fard.year += Month/12;
Fard.month = Month%12 + 1;

/* Move forward to a working day */
Lastday = daysinmonth( &Fard );
Day = Fard.day;
Date = structtodate( &Fard );
while ( Day <= Lastday &&
(SpotIsLast || !GoodValue(Date, Cur1, Cur2)) )
Day++, Date++;

/* If we are into the next month go back */
if ( Day > Lastday )
{
Date -= ( Day - Lastday );
Day = Lastday;
while ( !GoodValue( Date, Cur1, Cur2 ) )
Day -= 1, Date -= 1;
}
return Date;
}

/*****************************************************/

/* Add a number of years to a given date, allowing for holidays etc. */

DATE AddYears( DATE Date, int Inc, int Cur1, int Cur2 )
{
/* Convert to a number of months and add them */
return AddMonths( Date, 12*Inc, Cur1, Cur2 );
}

/*****************************************************/

/* Return whether a given date is a holiday for a given currency */
BOOL Holiday( DATE Date, int Currency )
{
DATE *Pointer;

if ( (Currency = FRXnumber[Currency]) == 0 )
return( FALSE );

Pointer = HolidayList[ Currency ];
while ( *Pointer != NULL )
{
if ( *Pointer == Date ) return( TRUE );
Pointer++;
}
return( FALSE );
}

/*****************************************************/
```

```c
/* Return whether a date is at a weekend for a given currency. */
BOOL Weekend( DATE Days, int Currency )
{
int Day = DayOfWeek( Days );

if ( Day == SUNDAY ) return( TRUE );

if ( SwiftcodeTable[ Currency ].IsMoslem )
return( Day == FRIDAY );
else return( Day == SATURDAY );
}

/********************************************/

/* Return whether a date can be a spot or value date for two currencies */
BOOL GoodValue( DATE Days, int Cur1, int Cur2 )
{
int Day = DayOfWeek( Days );
BOOL W1 = Weekend( Days, Cur1 ), W2 = Weekend( Days, Cur2 );

/* No good if weekend for both or holiday for either */
if ( W1 && W2 ) return( FALSE );
if ( Holiday( Days, Cur1 ) || Holiday( Days, Cur2 ) ) return( FALSE );

/* If not a weekend for either its OK */
if ( !( W1 || W2 ) ) return( TRUE );

/* If a weekend for one OK if its Friday */
return( Day == FRIDAY );
}
/*********************************************************************
 *                                                                    *
 *  debug.c - Useful routines for debug mode                          *
 *                                                                    *
 *  Written by Alan Stokes/Roger Abbott                               *
 *                                                                    *
 *  Copyright (C) 1987 Richards Computer Products Ltd                 *
 *                                                                    *
 *********************************************************************/ include "cadata.h"
include "debug.h"
#include "read.h"
#include "date.h"
#include "curinfo.h"
#include "vocab.h"
#include "insert.h"
#include "kprintf.h"
#include "kwin.h"
#include "caserver.h"

static void showstatus(FIELDNAME);
static void showvalue(FIELDNAME);
static void describe(FIELDNAME);
static BOOL SetTicketCursor(FIELDNAME);
static int SetNotifyCursor( TICKET_FIELD field );
static void SelectTicketWindow( void );
static void SelectScrollWindow( void );

/* Variables to control debug display. This pre-defined pattern
indicates not called from testca. */

BOOL Optc = TRUE, Opts = FALSE, Optt = FALSE, Opta = FALSE;
BOOL Opto = TRUE, Optn = TRUE;
int ScrollAreaTop = 13;
static struct rccoord SavedCursor;

/* Where to put things on the screen in the ticket display area */
typedef struct
{
FIELDNAME field;
int x;
int y;
TICKET_FIELD TicketField;
} TKT_DISPLAY_CURSOR;
```

```c
static TKT_DISPLAY_CURSOR CursorOffsets[] =
{
    { t_deal, 0, 0, TKT_DEALTYPE },
    { t_status, 15, 0, TKT_STATUS },
    { t_period, 33, 0, TKT_PERIOD },
    { t_dealer, 52, 0, TKT_DEALER }, { t_amount, 0, 1, TKT_AMOUNT },
    { t_amountcur, 22, 1, TKT_AMOUNTCURR },
    { t_quotecur, 33, 1, TKT_QUOTECURR }, { t_low, 0, 2, TKT_LOWQUOTE },
    { t_high, 20, 2, TKT_HIGHQUOTE },
    { t_fwd, 40, 2, TKT_ACTUALDIFF }, { t_near, 0, 3, TKT_NEARDATE1 },
    { t_rate, 27, 3, TKT_DEALRATE },
    { t_quoter, 45, 3, TKT_QUOTER },
    { t_cur1, 59, 3, TKT_CURRENCY1 }, { t_far, 0, 4, TKT_FARDATE1 },
    { t_rate2, 27, 4, TKT_FARRATE },
    { t_buy, 45, 4, TKT_BUYER },
    { t_cur2, 59, 4, TKT_CURRENCY2 }, { t_mypay, 0, 5, TKT_OURPAY1VAL },
    { t_yourpay, 0, 6, TKT_THEIRPAY1VAL },
    { t_mypay2, 0, 7, TKT_OURPAY2VAL },
    { t_yourpay2, 0, 8, TKT_THEIRPAY2VAL },
    { t_counterparty, 0, 9, TKT_TRUECPVAL },
    { t_comment, 0, 10, TKT_COMMENT1VAL },
    { t_bigfigs, 0, 0 }/* Marks the end of the list */
};

/**************************************************/

/* Initialise the debugging display. The parameter is the maximum number
we want to display, which may be zero. If it is 1, then conversation 0 is
displayed, along with all other Kprintfs, on the default page for this
overlay. If more are required, then further page handles must be available. */ void InitDebugDisplay( int MaxConvsDisplayed )
{
int i;
if ( MaxConvsDisplayed == 0 )
{
DisplayedConvs = 0;
return;
}
else
{
ConvDisplayHandle[ 0 ] = DefaultDisplayHandle;
DisplayedConvs = 1;
for ( i = 1; i < MaxConvsDisplayed; i++ )
if ( (ConvDisplayHandle[ i ] = FindOutputPage()) != 0 )
DisplayedConvs++;
}
}

/**************************************************/

/* This procedure describes what a field contains */
static void describe(field)
FIELDNAME field;
{
    /* Assume that there is no query */
    SetTextColour( BRIGHT_WHITE, BLACK );
    switch (field)
    {
        case t_status:
            Kprintf("Status");
    break;
        case t_deal:
    Kprintf("Deal");
        break;
```

```
        case t_cur1:
Kprintf("Cur1");
        break;
     case t_cur2:
Kprintf("Cur2");
        break;
     case t_amount:
Kprintf("Amount");
        break;
     case t_amountcur:
Kprintf("IN ");
        break;
     case t_quotecur:
        if (OutputTicket->IsSuspect.QuoteCurr )
SetTextColour( BLACK, WHITE );
Kprintf("Base currency");
        break;
     case t_low:
        if (OutputTicket->IsSuspect.LowQuote )
SetTextColour( BLACK, WHITE );
Kprintf("Low quote");
        break;
     case t_high:
        if (OutputTicket->IsSuspect.HighQuote )
SetTextColour( BLACK, WHITE );
Kprintf("High quote");
        break;
     case t_rate:
        if (OutputTicket->IsSuspect.DealRate )
SetTextColour( BLACK, WHITE );
Kprintf("Rate    ");
        break;
     case t_rate2:
        if (OutputTicket->IsSuspect.FarRate )
SetTextColour( BLACK, WHITE );
Kprintf("Far rate");
        break;
     case t_fwd:
        if (OutputTicket->IsSuspect.ActualDiff )
SetTextColour( BLACK, WHITE );
Kprintf("Swap diff");
        break;
     case t_buy:
Kprintf("Buyer ");
        break;
     case t_quoter:
Kprintf("Quoter");
        break;
     case t_bigfigs:
Kprintf("BIG FIGS");
        break;
     case t_period:
Kprintf("Period");
        break;
     case t_mypay:
Kprintf("My Near pay");
        break;
     case t_yourpay:
Kprintf("Their Near pay");
        break;
     case t_mypay2:
Kprintf("My Far pay");
        break;
     case t_yourpay2:
Kprintf("Their Far pay");
        break;
     case t_comment:
Kprintf("Comment");
        break;
     case t_counterparty:
Kprintf("Counterparty");
        break;
     case t_dealer:
Kprintf("Dealer");
        break;
```

```
    case t_far:
        if (OutputTicket->IsSuspect.FarDate1 ||
OutputTicket->IsSuspect.FarDate2 )
SetTextColour( BLACK, WHITE );
Kprintf("Far date");
        break;
    case t_near:
        if (OutputTicket->IsSuspect.NearDate1 ||
OutputTicket->IsSuspect.NearDate2 )
SetTextColour( BLACK, WHITE );
Kprintf("Neardate");
        break;
    }
}

/*******************************************/ void DisplayStatus( int Status )
{
switch (Status)
{
case NO_DEAL:
Kprintf("No deal   ");
break;
case INCOMPLETE:
Kprintf("Incomplete");
break;
case EXTRACTED:
Kprintf("Extracted ");
break;
case CONFIRMING:
Kprintf("Confirming");
break;
case CONFIRMED:
Kprintf("Confirmed ");
break;
case CANCELLED:
Kprintf("Cancelled ");
break;
case WRONG:
Kprintf("Wrong     ");
break;
default:
Kprintf("          ");
break;
}
}

/*******************************************/ void DisplayDealType( int DealType )
{
    switch ( DealType )
    {
    case SPOT:
    Kprintf( "SPOT    " );
break;
    case SWAP:
    Kprintf( "SWAP    " );
break;
    case DEPOSIT:
    Kprintf( "DEPOSIT " );
break;
    case OUTRIGHT:
    Kprintf( "OUTRIGHT" );
break;
    default:
Kprintf("        ");
break;
    }
}

/*******************************************/ void DisplayParty( int Party )
```

```c
{
   switch ( Party )
   {
   case TKT_UNKNOWN:
   Kprintf( "Unkwn" );
break;
   case US:
   Kprintf( "US   " );
break;
   case THEM:
   Kprintf( "THEM " );
break;
   }
}

/*****************************//// void DisplayCurrency( int Currency )
{
if ( Currency == TKT_UNKNOWN )
Kprintf( "    " );
else
   Kprintf( "%.3Fs",
(LPSTR) SwiftcodeTable[ Currency ].SwiftCode );
}

/*****************************//// void DisplayAmountCurr( int AmountCurr )
{
 Kprintf("%d ", AmountCurr);
 switch ( AmountCurr )
 {
 case CURR1:
 if ( OutputTicket->Currency1 == TKT_UNKNOWN )
Kprintf( "    " );
else
Kprintf( "%.3Fs",
(LPSTR) SwiftcodeTable[ OutputTicket->Currency1 ].SwiftCode );
break;
 case CURR2:
 if ( OutputTicket->Currency2 == TKT_UNKNOWN )
Kprintf( "    " );
else
Kprintf( "%.3Fs",
(LPSTR) SwiftcodeTable[ OutputTicket->Currency2 ].SwiftCode );
 break;
  }
 }

/*****************************//// void DisplayQuoteCurr( int QuoteCurr )
{
Kprintf("%d ", QuoteCurr);
switch ( QuoteCurr )
{
case CURR2_PER_CURR1:
 if ( know(t_cur1) )
Kprintf( "%.3Fs/",
(LPSTR) SwiftcodeTable[ OutputTicket->Currency1 ].SwiftCode );
else
  Kprintf( "    /" );
  if ( know(t_cur2) )
  Kprintf( "%.3Fs",
(LPSTR) SwiftcodeTable[ OutputTicket->Currency2 ].SwiftCode );
else
  Kprintf( "    " );
  break;
 case CURR1_PER_CURR2:
  if ( know(t_cur2) )
  Kprintf( "%.3Fs/",
(LPSTR) SwiftcodeTable[ OutputTicket->Currency2 ].SwiftCode );
  else
  Kprintf( "    /" );
  if ( know(t_cur1) )
```

```c
Kprintf( "%.3Fs",
(LPSTR) SwiftcodeTable[ OutputTicket->Currency1 ].SwiftCode );
else
 Kprintf( "    " );
 break;
 }
}

/**********************************/ void DisplayDate( WORD Date1, WORD Date2 )
{
static struct rccoord Cursor;

if ( Date1 == 0 )
{
GetTextPosition( &Cursor );
SetTextPosition( Cursor.row, Cursor.col + 8);
}
else if ( Date1 == 0xFFFF )
Kprintf( "        ");
else
writedate( Date1 );

Kprintf( "/" );

if ( Date2 == 0 )
{
GetTextPosition( &Cursor );
SetTextPosition( Cursor.row, Cursor.col + 8);
}
else if ( Date2 == 0xFFFF )
Kprintf( "        ");
else
writedate( Date2 );
}

/**********************************/ void DisplayPeriod( int Period )
{
switch ( OutputTicket->Period )
{
case P_ON:
Kprintf( "Overnight" );
break;
case P_TN:
Kprintf( "Tom/next " );
break;
case P_SN:
Kprintf( "Spot/next" );
break;
case P_BROKEN:
Kprintf( "Broken   " );
break;
case P_TT:
Kprintf( "Today    " );
break;
case P_TOM:
Kprintf( "Tomorrow " );
break;
case P_SPOT:
Kprintf( "Spot     " );
break;
default:
if ( OutputTicket->Period < P_1M )
Kprintf( "%d weeks  ", OutputTicket->Period-P_1WK+1 );
else if ( OutputTicket->Period < P_1YR )
Kprintf( "%d months ", OutputTicket->Period-P_1M+1 );
else if ( OutputTicket->Period < P_20YR )
Kprintf( "%d years  ", OutputTicket->Period-P_1YR+1 );
else if ( OutputTicket->Period == P_20YR )
 Kprintf( "%d years  ", 20 );
 else if ( OutputTicket->Period == P_30YR )
 Kprintf( "%d years  ", 30 );
 else Kprintf( "Unknown  " );
```

```
break;
    }
}

/********************************/
/* Display the value of a field */
static void showvalue(field)
FIELDNAME field;
{
    switch ( field )
    {
    case t_status:
    DisplayStatus( OutputTicket->Status );
    break;
    case t_deal:
    DisplayDealType( OutputTicket->DealType );
    break;
    case t_quoter:
    DisplayParty( OutputTicket->Quoter );
    break;
    case t_buy:
    DisplayParty( OutputTicket->Buyer );
    break;
    case t_cur1:
    DisplayCurrency( OutputTicket->Currency1 );
    break;
    case t_cur2:
    DisplayCurrency( OutputTicket->Currency2 );
    break;
    case t_amount:
    Kprintf( "%14Fs", (LPSTR) OutputTicket->Amount );
    break;
    case t_amountcur:
    DisplayAmountCurr( OutputTicket->AmountCurr );
    break;
    case t_mypay:
    Kprintf( OutputTicket->OurPay1Val );
    break;
    case t_yourpay:
    Kprintf( OutputTicket->TheirPay1Val );
    break;
    case t_low:
    Kprintf( "%8Fs", (LPSTR) OutputTicket->LowQuote );
    break;
    case t_high:
    Kprintf( "%8Fs", (LPSTR) OutputTicket->HighQuote );
    break;
    case t_rate:
    Kprintf( "%8Fs", (LPSTR) OutputTicket->DealRate );
    break;
    case t_quotecur:
    DisplayQuoteCurr( OutputTicket->QuoteCurr );
    break;
    case t_near:
    DisplayDate( OutputTicket->NearDate1, OutputTicket->NearDate2 );
    break;
    case t_far:
    DisplayDate( OutputTicket->FarDate1, OutputTicket->FarDate2 );
    break;
    case t_bigfigs:
    Kprintf("%d", AnalysisData->BigFigs);
    break;
    case t_fwd:
    Kprintf( "%8Fs", (LPSTR) OutputTicket->ActualDiff );
    break;
    case t_rate2:
    Kprintf( "%8Fs", (LPSTR) OutputTicket->FarRate );
    break;
    case t_period:
    DisplayPeriod( OutputTicket->Period );
    break;
    case t_mypay2:
    Kprintf( OutputTicket->OurPay2Val );
    break;
    case t_yourpay2:
```

```
   Kprintf( OutputTicket->TheirPay2Val );
   break;
   case t_comment:
   /* If comment2 exists then that's the new one, else its 1. */
if ( OutputTicket->Comment2.Count != 0 )
   Kprintf( OutputTicket->Comment2Val );
else
   Kprintf( OutputTicket->Comment1Val );
break;
   case t_counterparty:
   Kprintf( OutputTicket->TrueCpVal );
   break;
   case t_dealer:
 Kprintf(OutputTicket->DealerID);
   break;
   }
}

/* Describe the current status of a field */
static void showstatus(field)
FIELDNAME field;
{
    switch (AnalysisData->TicketItemStatus[field])
    {
       case st_unknown:
 Kprintf("Unknown");
          break;
       case st_assumed:
 Kprintf("Assumed");
          break;
       case st_deduced:
 Kprintf("Deduced");
          break;
       case st_extracted:
 Kprintf("Extracted");
          break;
    }
}

/**************************************************/

/* Procedure to echo a change to a field on the screen. This goes into
the lower scrolling area. There are no newlines generated except for
the one at the very start. */
void echo(field, changed)
FIELDNAME field;
BOOL changed;
{
unless ( Optt && CurrentCAcnvid < DisplayedConvs )
return;
SetOutputPage( ConvDisplayHandle[ CurrentCAcnvid ] );

WriteScrollArea( '\n' );
    if (changed)
       Kprintf(">");
    else
       Kprintf("*");

describe(field);
    SetTextColour( WHITE, BLACK );
    Kprintf(" ");

if (know(field))
       showvalue(field);

Kprintf(" ");
    showstatus(field);

SetOutputPage( DefaultDisplayHandle );
  }

/**************************************************/

/* Procedure to echo a change to the output ticket on the screen.
When this is called the value is guaranteed to be the same as
in the working copy of the ticket. */
```

```
void EchoOutput( FIELDNAME field)
{
unless ( Opto && CurrentCAcnvid < DisplayedConvs )
return;
SetOutputPage( ConvDisplayHandle[ CurrentCAcnvid ] );

/* Save the cursor position and set for the field */
SelectTicketWindow();
if ( SetTicketCursor( field ) )
{
if ( field != t_comment )
{
describe(field);
Kprintf(" ");
SetTextColour( WHITE, BLACK );
showvalue(field);
}
else
{
describe( t_comment );
Kprintf( "1 " );
SetTextColour( WHITE, BLACK );
Kprintf( "%Fs#\n", OutputTicket->Comment1Val );
describe( t_comment );
Kprintf( "2 " );
SetTextColour( WHITE, BLACK );
Kprintf( "%Fs#", OutputTicket->Comment2Val );
}
} if ( know(t_quotecur) && (field == t_cur1 || field == t_cur2) )
{
SelectScrollWindow();
EchoOutput( t_quotecur );
return;
}

/* Restore the cursor */
SelectScrollWindow();

SetOutputPage( DefaultDisplayHandle );
}

/*******************************************/

/* Procedure to echo a Notify to the output ticket on the screen.
When this is called the value is guaranteed to be the same as
in the working copy of the ticket. */
void EchoNotify( LPTKTITEM Item )
{
int Index;

unless ( Optn && CurrentCAcnvid < DisplayedConvs )
return;
SetOutputPage( ConvDisplayHandle[ CurrentCAcnvid ] );

/* Save the cursor position and set for the field */
SelectTicketWindow();
if ( (Index = SetNotifyCursor( Item->Id )) >= 0 )
{
describe( CursorOffsets[ Index ].field );
Kprintf(" ");
SetTextColour( WHITE, BLACK );

switch ( Item->Id )
{
case TKT_STATUS :
DisplayStatus( *( (int far *) Item->Data ) );
break;
case TKT_DEALTYPE :
DisplayDealType( *( (int far *) Item->Data ) );
break;
case TKT_PERIOD :
DisplayPeriod( *( (int far *) Item->Data ) );
break;
```

```
case TKT_BUYER :
case TKT_QUOTER :
DisplayParty( *( (int far *) Item->Data ) );
break;
case TKT_CURRENCY1 :
case TKT_CURRENCY2 :
DisplayCurrency( *( (int far *) Item->Data ) );
break;
case TKT_AMOUNTCURR :
DisplayAmountCurr( *( (int far *) Item->Data ) );
break;
case TKT_QUOTECURR :
DisplayQuoteCurr( *( (int far *) Item->Data ) );
break;

case TKT_NEARDATE1 :
case TKT_FARDATE1 :
DisplayDate( *( (WORD far *) Item->Data ), 0 );
break;
case TKT_NEARDATE2 :
case TKT_FARDATE2 :
DisplayDate( 0, *( (WORD far *) Item->Data ) );
break;

case TKT_DEALER :
Kprintf( "%6Fs", (LPSTR) Item->Data );
break;
case TKT_AMOUNT :
Kprintf( "%14Fs", (LPSTR) Item->Data );
break;
case TKT_LOWQUOTE :
case TKT_HIGHQUOTE :
case TKT_DEALRATE :
case TKT_FARRATE :
case TKT_ACTUALDIFF :
Kprintf( "%8Fs", (LPSTR) Item->Data );
break;
case TKT_OURPAY1VAL :
case TKT_THEIRPAY1VAL :
case TKT_OURPAY2VAL :
case TKT_THEIRPAY2VAL :
case TKT_TRUECPVAL :
case TKT_COMMENT1VAL :
Kprintf( "%Fs#", (LPSTR) Item->Data );
break;
}
}

/* Restore the cursor */
SelectScrollWindow();

SetOutputPage( DefaultDisplayHandle );
}

/*******************************************/

/* Procedure to echo a change to a query status on the screen */
void EchoQuery( FIELDNAME field, BOOL On )
{
EchoOutput( field );
}

/*******************************************/

/* Set the cursor to the appropriate place in the ticket display area.
Return TRUE if the field is to be displayed, else FALSE. */

BOOL SetTicketCursor( FIELDNAME field )
{
int i = 0;

while ( CursorOffsets[i].field != t_bigfigs )
{
if ( CursorOffsets[i].field == field )
{
```

```c
SetCursor( CursorOffsets[i].x, CursorOffsets[i].y );
return( TRUE );
}
i++;
}
return( FALSE );
}

/********************************************/

/* Set the cursor to the appropriate place in the ticket display area.
Return TRUE if the field is to be displayed, else FALSE.
This routine uses a ticket field rather than out internal fields. */
int SetNotifyCursor( TICKET_FIELD field )
{
int i = 0;

/* The position is the same for the two components of a date */
if ( field == TKT_NEARDATE2 )
field = TKT_NEARDATE1;
if ( field == TKT_FARDATE2 )
field = TKT_FARDATE1;

while ( CursorOffsets[i].field != t_bigfigs )
{
if ( CursorOffsets[i].TicketField == field )
{
SetCursor( CursorOffsets[i].x, CursorOffsets[i].y );
return( 1 );
}
i++;
}
return( -1 );
}

/********************************************/

/* Display a symbol as it is read in. This routine writes to the lower
scrolling area. The calls to kprintf() cannot cause trouble as they
do not include any newline or return characters. */
void showsym()
{
VOCWORD *p = vocab;
int i;
PSTR Word;

unless ( Opts && CurrentCAcnvid < DisplayedConvs )
return;
SetOutputPage( ConvDisplayHandle[ CurrentCAcnvid ] );

if ( AnalysisData->symbol == S_JUNK ||
AnalysisData->symbol == S_PLEASE ||
AnalysisData->symbol == S_NOISE )
return;

if ( Optc && AnalysisData->symbol != S_ENDLINE) WriteScrollArea( '(' );
else if ( AnalysisData->symbol != S_ENDLINE ) WriteScrollArea( ' ' );

if ( AnalysisData->symbol == S_JUNK ) WriteScrollArea( '?' );
else if ( AnalysisData->symbol == S_ENDLINE )
{
if ( !Optc )
{
WriteScrollArea('\n');
if ( AnalysisData->speaking ) WriteScrollArea( '#' );
else WriteScrollArea( '%' );
}
}
else if ( AnalysisData->symbol == S_CURRENCY )
Kprintf( "%.3Fs",
(LPSTR) SwiftcodeTable[ AnalysisData->symval ].SwiftCode );
else if ( AnalysisData->symval == 0 || AnalysisData->symbol == S_MONTH )
{
/* The currencies should be last in the vocabulary */
while ( ( (int) p->symbol != AnalysisData->symbol ||
```

```c
(int) p->symval != AnalysisData->symval ) &&
p->symbol != S_CURRENCY )
p++;

if ( (int) p->symbol == AnalysisData->symbol )
{
Word = p->string;
for ( i=0; Word[i] != '!' && Word[i] != '\0'; i++ )
WriteScrollArea( Word[i] );
}
else Kprintf( (LPSTR) AnalysisData->symbuf );
}
else Kprintf( (LPSTR) AnalysisData->symbuf );

if ( Optc && AnalysisData->symbol != S_ENDLINE)
WriteScrollArea( ')' );

SetOutputPage( DefaultDisplayHandle );
}

/******************************************/

/* Put a character on the screen in the lower scrolling area */
void WriteScrollArea( int ch )
{
Kprintf( "%c", ch );
}

/***********************************************/

/* Echo a character received for a conversation. */
void EchoInput( int ch )
{
unless ( Optc && CurrentCAcnvid < DisplayedConvs )
return;
SetOutputPage( ConvDisplayHandle[ CurrentCAcnvid ] );

if ( (ch & CF_LINESTART) != 0 )
{
WriteScrollArea( '\n' );
if ( (ch & CF_THEIR) != 0 )
WriteScrollArea( '%' );
else
WriteScrollArea( '#' );
WriteScrollArea( ' ' );
}
else if ( ch >= ' ' || ch == '\n' )
WriteScrollArea( ch );
else switch ( ch )
{
case 1:
Kprintf( "#END#" );
break;
case 2:
Kprintf( "#TXFER#" );
break;
case 3:
Kprintf( "#INTERRUPT#" );
break;
case 4:
Kprintf( "#PRINT#" );
break;
case 5:
Kprintf( "#TEXT LOST#" );
break;
case 6:
Kprintf( "#CONNECTION LOST-CHACK LAST TEXT WITH CALLER#" );
break;
case 8:
Kprintf( "#CONNECTION LOST-CHACK LAST TEXT WITH CALLER"
"#KBD OFF#" );
break;
default:
break;
}
```

```
SetOutputPage( DefaultDisplayHandle );
}

/*****************************************/

/* Clear the ticket area and draw the boundary (if there is to be a static
ticket display) and start writing at the bottom of the screen */
void InitScreen( void )
{
static DATESTRUCT ConvDate;

unless ( CurrentCAcnvid < DisplayedConvs )
return;
SetOutputPage( ConvDisplayHandle[ CurrentCAcnvid ] );

unless( ScrollAreaTop < 2 )
{
SelectTicketWindow();
ClearWindow();
SetCursor( 0, ScrollAreaTop-1 );
Kprintf( " ----------------------------------------"
"----------------------------------------" );
/* Display the conversation date from the ticket */
SetCursor( 59, 1 );
SetTextColour( BRIGHT_WHITE, BLACK );
Kprintf( "Date " );
SetTextColour( WHITE, BLACK );
wrwdate( ( DATE ) (OutputTicket->StartTime / SECONDSPERDAY) );

/* Display the Dcnvref from the ticket */
SetCursor( 59, 2 );
SetTextColour( BRIGHT_WHITE, BLACK );
Kprintf( "Dcnvref  " );
SetTextColour( WHITE, BLACK );
Kprintf( "%ld", OutputTicket->Dcnvref );
}
SelectScrollWindow();
Kprintf( "\n" );
SetOutputPage( DefaultDisplayHandle );
}

/*****************************************************/ void ClearWindow( void )
{
ClearScreen( _GWINDOW );
}

/*****************************************************/ void SetCursor( int x, int y )
{
SetTextPosition( (short) y+1, (short) x+1 );
}

/**** Routines to select either the ticket or scroll area windows ****/

/* Note the Scroll Area Top is zero relative, like the cursor positions
for the ticket items */ void SelectTicketWindow( void )
{
GetTextPosition( &SavedCursor );
SetTextWindow( 1, 1, ScrollAreaTop, 80 );
} void SelectScrollWindow( void )
{
SetTextWindow( ScrollAreaTop+1, 1, 25, 80 );
SetTextPosition( SavedCursor.row, SavedCursor.col );
}

/****************************************************************
 *                                                               *
 *  deposit.c - Routines to handle deposit rates                 *
```

```c
 *                                                                    *
 * Written by Alan Stokes                                             *
 *                                                                    *
 * Copyright (C) 1987 Richards Computer Products Ltd                  *
 *                                                                    *
 **********************************************************************/ include <ctype.h>
include <string.h>
include "analdata.h"
#include "deposit.h"
#include "number.h"
#include "insert.h"
#include "read.h"
#include "deposit2.h"

static BOOL getdep(int *, int *, BOOL, BOOL, int, int);
static BOOL readfraction(int *, BOOL *, BOOL *, BOOL);
static int nextint(void);
static BOOL readdep(int *, int *);
static BOOL readdeps(int *, int *);

/* This 'function' clears all but the rightmost one in the binary
 * representation of n.  It really works, provided this is a 2s complement
 * machine.
 */
#define RIGHTMOSTONE(n)((n) & -(n))

/* Read a single deposit rate, converting it to an integer number of 32nds.
 * The format is [sign] <units> ['.' | '-'] [<num> '/' <denom>].
 * The units can be up to 100; the denominator must be a power of 2, up to 32.
 * If fraction is true the units may be omitted; low and high are used to
 * guess what the units should be.  If last is true then we check that at the
 * end we are not in the middle of a number.
 * Sign is set to the sign of the number, or 0 if none was found.
 */
static BOOL getdep(result, sign, last, fraction, low, high)
int *result;
int *sign;
BOOL last, fraction;
int low, high;
{
    char ch;
    int num;
    static BOOL newword, nounits;

nounits = FALSE;

/* Check for an initial sign (normally there isn't one) */
    ch = nextnumch(TRUE);
    if (ch == '+' || ch == '-')
    {
        *sign = (ch == '+' ? 1 : -1);
        ch = nextnumch(TRUE);
    }
    else
        *sign = 0;

/* Check that there is now a number and read it as the units. */
    if (!isdigit(ch))
        return (FALSE);
    else
    {
        unnumch();
        num = nextint();
        if (num < 0)
    return (FALSE);
        else
    *result = num;
    }

/* Now have a look to see if a fraction follows */
    ch = nextnumch(TRUE);
    if (ch == 0)
```

```
    {
        /* No number follows, so we have the complete rate. We just need to
         * convert it to 32nds.
         */
        if (*result <= 99)
        {
*result *= 32;
return (TRUE);
        }
        else
return (FALSE);
    }
    unnumch();

/* Try to read the fraction */
    newword = FALSE;
    unless (readfraction(result, &newword, &nounits, last))
    {
        /* Failed to read the fraction.  Try to discard it */
        unless (newword)
/* There must be a break between the units and the fraction */
return (FALSE);
        if (last)
backsym();
        else
AnalysisData->numpos = 0;

if (*result < 100)
*result *= 32;
        else
return (FALSE);
    }
    /* Try to work out what the units should have been if they weren't
     * specified.
     */
    if (nounits)
    {
        int abslow = abs(low), abshigh = abs(high);

if (!fraction)
/* Caller specified that units had to be given */
return (FALSE);

if (*result != abslow % 32 && *result != abshigh % 32)
        {
/* The fraction is the same as that of the high rate but not the low;
 * it is fairly safe to assume that it means the high rate so we use
 * that.
 */
*result += (abshigh & -0x1f);
if (high < 0)
    *sign = -1;
else
    *sign = 1;
        }
        else
        {
/* Assume otherwise that the low units are meant. */
*result += (abslow & -0x1f);
if (low < 0)
    *sign = -1;
else
    *sign = 1;
        }
    } return (TRUE);
}

/* Attempt to read the fractional part of a deposit rate. */
static BOOL readfraction(result, newword, nounits, last)
int *result;
BOOL *newword, *nounits;
BOOL last;
{
```

```
  char ch = nextnumch(TRUE);
  int num, denom;

if (ch == '/')
  {
      /* This means the number we have just read is not the units but the
       * numerator, and the units are missing.  This may not be allowed.
       */
      num = *result;
      *result = 0;   /* Set the units to 0 for consistency */
      *nounits = TRUE;
  }
  else
  {
      /* Skip the various separators that are allowed */
      if (ch == ' ')
*newword = TRUE;
      if (ch == ' ' || ch == '.' || ch == '-')
      {
ch = nextnumch(TRUE);
unless (isdigit(ch))
   /* Invalid fraction found */
   return (FALSE);
unnumch();
      }
      else
return (FALSE);

/* Read the numerator and the slash */
      num = nextint();
      ch = nextnumch(TRUE);
      unless (ch == '/')
      {
if (ch == ' ')
   /* We just read past the end of the previous symbol so go back */
   backsym();
return (FALSE);
      }
  }

/* At this point the numerator and slash have been read, so we have to read
   * the denominator.
   */
  ch = nextnumch(TRUE);
  if (!isdigit(ch))
     return (FALSE);
  else
  {
     unnumch();
     denom = nextint();
  } if (last)
  {
     /* Check this is the end of the number */
     do
     {
ch = nextnumch(TRUE);
if (isdigit(ch))
   return (FALSE);
     }
     until (ch == ' ' || ch == 0);

unnumch();
  }

/* Check that the fraction is valid. By checking that denom contains only
   * one set bit we show it is a power of 2.
   */
  unless (num > 0 && 2 <= denom && denom <= 32 &&
     denom == RIGHTMOSTONE(denom))
     return (FALSE);

/* Normally the numerator should be less than the denominator, but if it
   * isn't it may indicate the special case of eg 113/4 which means 11 3/4.
   */
```

```
    if (num >= denom)
    {
        if (!*nounits)
    return (FALSE);
        else
        {
    *result = num / 10;
    num = num % 10;
    unless (0 < num && num < denom)
        return (FALSE);
    *nounits = FALSE;/* Since we have implied some units */
        }
    }

/* Now convert to a number of 32nds */
    if (*result > 99)
        return (FALSE);
    else
    {
        *result = *result * 32 + num * (32 / denom);
        return (TRUE);
    }
}

/* Read a small integer as part of a deposit.  The result is -1 for failure */
static int nextint()
{
    int result = 0;
    char digit = nextnumch(TRUE);

if (digit == '0')
    {
        /* A leading 0 is only valid if it is the only digit */
        digit = nextnumch(TRUE);
        if (isdigit(digit))
    return (-1);
        else
        {
    unnumch();
    return (0);
        }
    } while (isdigit(digit))
    {
        if (result >= 1000)
    /* Only four digits are allowed */
    return (-1);
        result = result * 10 + digit - '0';
        digit = nextnumch(TRUE);
    }

/* Unread the terminating character */
    unnumch();
    return (result);
}

/* Read a single deposit rate, storing it as an integer in dep with the sign
 * in sign.
 */
static BOOL readdep(dep, sign)
int *dep;
int *sign;
{
    BOOL fraction = FALSE;/* Whether we accept fraction only */
    int low, high;

strcpy(AnalysisData->numbuf, AnalysisData->symbuf);
    AnalysisData->numpos = 0;

if (know(t_low) && know(t_high))
    {
        /* Since we know the quote we can accept a rate which is just a
         * fraction.
         */
```

```
      fraction = TRUE;
      low = deptoint(Ticket->LowQuote);
      high = deptoint(Ticket->HighQuote);
   }

/* Get a deposit which must not be part of anything else */
   return (getdep(dep, sign, TRUE, fraction, low, high));
}

/* Parse a single deposit rate and convert it to the standard form. */
BOOL parsedep(force)
BOOL force;
{
   BOOL ok = TRUE;
   static int num;
   static char dep[RATEBYTES + 1];
   static int sign;

AnalysisData->symcount = 0;

if (!readdep(&num, &sign))
      ok = FALSE;
   else
   {
      /* Convert the integer to a string in the standard form. */
      if (sign == -1)
      {
   if (num >= 10 * 32)
      /* Negative deposits only go down to -9 31/32 */
      ok = FALSE;
   else
      num = -num;
      } if (ok)
   inttodep(num, dep);
   }

/* Check the answer for reasonableness */
   if (ok && !force)
   {
      if (know(t_low) && know(t_high))
   /* Check the rate is one of the quoted ones */
   if (!(strcmp(dep, Ticket->LowQuote) == 0 ||
         strcmp(dep, Ticket->HighQuote) == 0 ||
         (know(t_rate) && strcmp(dep, Ticket->DealRate) == 0)))
      ok = FALSE;

if (ok)
      {
   /* Check the following symbol */
   nextsym();
   switch (AnalysisData->symbol)
   {
      case S_MONTH: case S_MIO: case S_YARD:
      case S_MTH: case S_WEEK: case S_YEAR:
      case S_TH: case S_AGAINST:
         ok = FALSE;
         break;
      default:
         backsym();
         break;
   }
      }
   } if (ok && force && !know(t_buy) && !know(t_low) && know(t_rate))
   {
      /* Attempt to deal with a quote where only the low rate was given (since
       * the spread is known by both ends). The quote will have been taken as
       * the rate. We assume that this time we are getting the actual rate,
       * and last time was a quote given by the othe side.
       */
      int difference = num - deptoint(Ticket->DealRate);

if (difference == 0)
```

```
    /* Same rate, so speaker is giving */
    insertnum(t_buy, !(AnalysisData->speaking), st_deduced);
        else if (0 < difference && difference <= 32)
    /* Allow a margin of up to 1% to mean the high rate */
    insertnum(t_buy, AnalysisData->speaking, st_deduced);
      } if (ok)
         insertstring(t_rate, dep, st_extracted);
      else
         backphrase();

return (ok);
}

/* Read a double sided deposit rate.  This is two single rates separated by
 * almost anything.  The units of the second rate may be omitted.  The rates
 * may quite possibly be quoted high-low rather than low-high.
 */
static BOOL readdeps(num1, num2)
int *num1, *num2;
{
    char ch, prevch;
    BOOL signok = FALSE;
    static int sign1, sign2;

strcpy(AnalysisData->numbuf, AnalysisData->symbuf);
    AnalysisData->numpos = 0;

if (getdep(num1, &sign1, FALSE, FALSE, 0, 0))
    {
        if (sign1 < 0)
   *num1 = -*num1;
    }
    else
        return (FALSE);

/* Now skip any separating symbols */
    ch = ' ';
    for (;;)
    {
        prevch = ch;
        ch = nextnumch(TRUE);
        if (ch == 0)
   /* No second part found */
   return (FALSE);
        else if (isdigit(ch))
   break;
        else if (ch != '+' && ch != '-')
   /* If we have at least one character which is not a sign separating
    * the deposit rates then a sign immediately before the second one
    * will be accepted.
    */
   signok = TRUE;
    }
    unnumch();

if (signok && (prevch == '+' || prevch == '-'))
       /* Go back once more so that the sign is read */
       unnumch();

/* Get the second part; if the units are missing use those from the first
     * number.
     */
    unless (getdep(num2, &sign2, TRUE, TRUE, *num1, *num1))
        return (FALSE);

/* Accept a sign on the second number if one was specified on the first
     * number; if there was no sign on this number but there was one on the
     * previous number use that sign for this number.
     */
    if ((sign2 == -1 && sign1 != 0) || (sign2 == 0 && sign1 == -1))
        *num2 = -*num2;

/* Check that both numbers are not too negative */
    if (*num1 <= -10 * 32 || *num2 <= -10 * 32)
```

```
        return (FALSE);

/* Reverse the two rates if they were quoted in the wrong order */
    if (*num1 > *num2)
    {
        int temp = *num1;
        *num1 = *num2;
        *num2 = temp;
    } return (TRUE);
}

/* Parse a deposit quote */
BOOL parsedeps()
{
    BOOL ok = TRUE;
    static int num1, num2;
    static char dep1[RATEBYTES + 1], dep2[RATEBYTES + 1];

AnalysisData->symcount = 0;

if (!readdeps(&num1, &num2))
        ok = FALSE;
    else
    {
        inttodep(num1, dep1);
        inttodep(num2, dep2);

/* Check the following symbol */
        nextsym();
        switch (AnalysisData->symbol)
        {
    case S_MONTH: case S_MIO: case S_YARD:
    case S_MTH: case S_WEEK: case S_YEAR:
    case S_TH: case S_AGAINST:
        ok = FALSE;
        break;
    default:
        backsym();
        break;
        }
    } if (ok)
    {
        insertnum(t_quoter, AnalysisData->speaking, st_extracted);
        insertstring(t_low, dep1, st_extracted);
        insertstring(t_high, dep2, st_extracted);
    }
    else
        backphrase();
    return (ok);
}

/****************************************************************
 *                                                              *
 * deposit2.c - Routines to manipulate deposit rates            *
 *                                                              *
 * Written by Alan Stokes                                       *
 *                                                              *
 * Copyright (C) 1987 Richards Computer Products Ltd            *
 *                                                              *
 ****************************************************************/ include <stdlib.h>
include <string.h>
include <ctype.h> include "deposit2.h"
include "macros.h"

static int strtonum(PSTR, int *);

/* Return whether a number is even */
#define EVEN(n)(((n) & 1) == 0)
```

```
/* Convert an integer number of 32nds to a string containing a deposit rate in
 * the standard form, ie ['-'] <units> [' ' <num> '/' <denom>].
 */
void inttodep(num, dep)
int num;
PSTR dep;
{
   int pos = 0;

if (num < 0)
   {
      dep[pos++] = '-';
      num = -num;
   }

/* Output the units */
   itoa(num / 32, dep + pos, 10);

num = num % 32;
   unless (num == 0)
   {
      /* Output the fractional part. */
      int denom = 32;

/* Convert to lowest terms */
      while (EVEN(num))
         num /= 2, denom /= 2;

pos = strlen(dep);

dep[pos++] = ' ';
      itoa(num, dep + pos, 10);
      pos = strlen(dep);

dep[pos++] = '/';
      itoa(denom, dep + pos, 10);
   }
}

/* Convert a string containing a deposit rate to an integer.  The string must
 * be in the standard format (preferably created by inttodep()).
 */
int deptoint(dep)
PSTR dep;
{
   static int pos;
   int result;
   BOOL neg = FALSE;

pos = 0;

if (dep[pos] == '-')
      pos++, neg = TRUE;
   result = strtonum(dep, &pos);
   result *= 32;

unless (dep[pos] == 0)
   {
      /* Fraction present */
      int num, denom;

pos++; /* Skip the space */
      num = strtonum(dep, &pos);

pos++; /* Skip the slash */
      denom = strtonum(dep, &pos);

result = result + num * (32 / denom);
   } if (neg)
      return (-result);
   else
      return (result);
}
```

```c
/* Convert as much of a string as is valid to a number, updating the position
 * within the string.
 */
static int strtonum(string, pos)
PSTR string;
int *pos;
{
   int result = 0;

while (isdigit(string[*pos]))
       result = result * 10 + string[(*pos)++] - '0';

return (result);
}

/****************************************************************
 *                                                              *
 * deppars.c - Routines for analysing a deposit deal            *
 *                                                              *
 * Written by Alan Stokes                                       *
 *                                                              *
 * Copyright (C) 1987 Richards Computer Products Ltd            *
 *                                                              *
 ****************************************************************/ include "analdata.h"
include "deppars.h"
#include "insert.h"
#include "read.h"
#include "datepars.h"
#include "period.h"
#include "miscpars.h"
#include "comparse.h"
#include "pay.h"
#include "deposit.h"

static void numparse(void);

/* Parse a deposit conversation.  If we return the result is the deal type to
 * be changed to.
 */
int depparse( void )
{
   for (;;)
   {
      BOOL readanother = TRUE;

/* This procedure is called from the outermost level without reading
       * any of the conversation, so save the current status as we can safely
       * re-enter the analysis from this point */
      SaveAnalysisState();

switch (AnalysisData->symbol)
      {
   case S_DEP:
      /* Forcing word for a quote or the deal currency */
      nextsym();
      if (AnalysisData->symbol == S_NUMBER)
         {
         unless (parsedeps())
      readanother = FALSE;
   }
      else
         {
         unless (AnalysisData->symbol == S_CURRENCY && currencies())
      readanother = FALSE;
   }
      break;
    case S_PAY:
       /* Usually followed by a rate, as in I PAY 7 3/4.  This indicates
        * the direction as well as forcing the rate.
        */
       insertnum(t_buy, AnalysisData->speaking, st_extracted);
       nextsym();
```

```
      unless (AnalysisData->symbol == S_NUMBER && parsedep(TRUE))
         readanother = FALSE;
      break;
   case S_LEND: case S_BORROW:
      /* These indicate the direction (and also force the deal type to
       * be deposit from anywhere else).
       */
      insertnum(t_buy, AnalysisData->speaking ==
      (AnalysisData->symbol == S_BORROW), st_extracted);
      break;
   case S_S: case S_B: case S_BUY:
   case S_SELL:
      /* A deal direction may follow.  If we get S/B we know we should
       * be in a forward deal.
       */
      AnalysisData->symcount = 0;
      nextsym();
      if (AnalysisData->symbol == S_SLASH ||
      AnalysisData->symbol == S_AND ||
      AnalysisData->symbol == S_N)
         /* Skip a separator */
         nextsym();

if (AnalysisData->symbol == S_S ||
      AnalysisData->symbol == S_B ||
      AnalysisData->symbol == S_BUY ||
      AnalysisData->symbol == S_SELL)
      {
         backphrase();
         return (SWAP);
      }

/* Unread the SELL AND ... */
      backphrase();

/* Check the first symbol.  S and B are not accepted on their own.
       */
      if (AnalysisData->symbol == S_S)
         /* Might be part of S/N */
         parseperiod();
      else if (AnalysisData->symbol != S_B)
      {
         /* Found the direction. */
         insertnum(t_buy, (AnalysisData->speaking ==
         (AnalysisData->symbol == S_BUY)),
         st_extracted);
         nextsym();
         unless ((AnalysisData->symbol == S_CURRENCY ||
         AnalysisData->symbol == S_NUMBER) &&
         checkamount(TRUE))
       readanother = FALSE;
      }
      break;
   case S_T: case S_O: case S_TN:
   case S_SN: case S_ONITE: case S_YEAR:
   case S_MTH: case S_WEEK:
      /* S_S is handled in the same way in the code above */
      parseperiod();
      break;
   case S_NUMBER:
      numparse();
      break;
   case S_VAL: case S_DATES:
      /* Forcing words for the value dates */
      nextsym();
      unless (parsedates(TRUE))
         readanother = FALSE;
      break;
   case S_MONTH:
      /* Probably the start of a date */
      parsedates(FALSE);
      break;
   case S_AT:
      /* Forcing word for the actual deal rate. */
      nextsym();
      if (AnalysisData->symbol == S_NUMBER)
```

```c
        parsedep(TRUE);
      else
        readanother = FALSE;
      break;
    case S_YOURS:
      parsepay();
    case S_MINE:
      break;
    default:
      {
        int result = commonparse();
        unless (result == NO_DEAL)
            return (result);
        readanother = FALSE;
        break;
      }
    } if (readanother)
    nextsym();
    }
}

/* Attempt to parse a number.  Various different interpretations are tried,
 * with the order depending on how far we think the conversation has
 * progressed.
 */
static void numparse()
{
   /* Flags used to ensure each interpretation is only tried once */
   BOOL triedquote = FALSE;
   BOOL trieddates = FALSE;
   BOOL triedperiod = FALSE;

unless (know(t_near) || know(t_low) || know(t_rate))
   {
      /* If we haven't got a quote yet or the dates then we expect either the
       * dates or the period, so that they know what to quote for.
       */
      if (parseperiod() || parsedates(FALSE))
    return;
      else
    triedperiod = trieddates = TRUE;
   } if (!know(t_buy) && (!know(t_low) || (know(t_quoter) &&
Ticket->Quoter == AnalysisData->speaking)))
   {
      /* If we don't know the direction then we can expect a quote (possibly a
       * repeat).  Of course we also expect a rate, but we don't expect to
       * confuse these two.  If a quote has already been made we only expect a
       * repeat from the same person.
       */
      if (parsedeps())
    return;
      else
    triedquote = TRUE;
   }

/* Now just try the others in approximate order of likelihood. */
   if (parsedep(FALSE) ||
       checkamount(FALSE) ||
       (!trieddates && parsedates(FALSE)) ||
       (!triedperiod && parseperiod()) ||
       (!triedquote && parsedeps()))
       return;
}

/****************************************************************
 *                                                              *
 * forward.c - Routines to handle forward rates                 *
 *                                                              *
 * Written by Alan Stokes                                       *
 *                                                              *
 * Copyright (C) 1987 Richards Computer Products Ltd            *
 *                                                              *
 ****************************************************************/
```

```c
include <string.h> include "analdata.h"
include "forward.h"
#include "read.h"
#include "number.h"
#include "number2.h"
#include "insert.h"
#include "curinfo.h"

static BOOL goodforward(PSTR);
static BOOL sameforward(PSTR, PSTR);
static BOOL assumeforwards(PSTR, PSTR, BOOL);
static int div10(PSTR);
static BOOL checkdiff(PSTR, PSTR, int);
static BOOL forwardsign(int *);

/* Parse a forward quote */
BOOL parseforwards(force)
BOOL force;
{
   BOOL ok = TRUE;
   static int sign1, sign2;
   BOOL signfound = TRUE;
   static char low[RATEBYTES + 1], high[RATEBYTES + 1];

AnalysisData->symcount = 0;

{
      /* Attempt to read the forwards */
      static char num[MAXWORDLEN + 1];

/* The only allowed format is just one number then another - eg 73/71
       * We have to allow one character for the sign which is inserted in
       * front of each rate.  Normally no signs are given (but if the first
       * number is greater than the second number we know they are both
       * negative). Signs are accepted if they appear on both numbers.
       */
      strcpy(AnalysisData->numbuf, AnalysisData->symbuf);
      if (nextnum(num, &sign1) && strlen(num) <= RATEBYTES - 1)
      {
   if (sign1 == 0)
      signfound = FALSE;
   strcpy(low, num);

/* Read the second part */
   if (nextnum(num, &sign2) && strlen(num) <= RATEBYTES - 1)
   {
      if (sign2 == 0)
         signfound = FALSE;
      strcpy(high, num);

unless (AnalysisData->numbuf[0] == 0 &&
      goodforward(low) && goodforward(high))
         ok = FALSE;
   }
   else
      ok = FALSE;
      }
      else
   ok = FALSE;
   } if (ok)
   {
      /* We must work out for ourselves the signs - if the second number
       * is not greter than the first we negate both.
       */
      unless (signfound && sign1 < sign2)
      {
   BOOL inorder = comparenum(low, high) <= 0;

/* If they are both marked with the same sign but are in order we
    * accept them.
    */
```

```
unless (signfound && sign1 == sign2 && inorder == (sign1 > 0))
{
   if (inorder)
      sign1 = sign2 = 1;
   else
      sign1 = sign2 = -1;
}
      } setsign(sign1, low);
      setsign(sign2, high);

/* Now check for reasonableness */
      unless (force)
      {
static char assumelow[RATEBYTES + 1], assumehigh[RATEBYTES + 1];

if (assumeforwards(assumelow, assumehigh, FALSE))
   /* Check that the new rates are similar to the old ones */
   unless (sameforward(low, assumelow) &&
   sameforward(high, assumehigh))
      ok = FALSE;

if (ok)
{
   nextsym();
   switch (AnalysisData->symbol)
   {
      case S_MTH: case S_WEEK: case S_YEAR:
      case S_AGAINST: case S_MIO: case S_YARD:
      case S_TH: case S_PERCENT:
 ok = FALSE;
 break;
      default:
 backsym();
 break;
   }
}
      }
   } if (ok)
   {
      insertnum(t_quoter, AnalysisData->speaking, st_extracted);
      insertstring(t_low, low, st_extracted);
      insertstring(t_high, high, st_extracted);
   }
   else
      backphrase();

return (ok);
}

/* Check that a number is a valid forward rate; the number should be unsigned.
 */
static BOOL goodforward(num)
PSTR num;
{
   int len = strlen(num);

if (len == 0)
      return (FALSE);
   else
   {
      if (num[0] == '0')
      {
 /* Leading zeros aren't allowed, but '0' on its own is, or '0.x'. */
 if (len != 1 && num[1] != '.')
    return (FALSE);
 else if ( len != 1 )
    /* Remove the leading 0 */
    memmove(num, num + 1, len--);
      }

/* The zero might have been the only digit */
      if (digits(num) == 0)
   return (FALSE);
```

```c
        /* If there is a trailing decimal point remove it */
        if (num[len - 1] == '.')
   num[--len] = 0;

/* If there are four or more digits no decimal point is expected
         * (decimal points are a rarety anyway, and only appear on small
         * numbers).
         */
        if (digits(num) > 3 && strchr(num, '.') != NULL)
   return (FALSE);
        else
   return (TRUE);
   }
}

/* Check that two signed forwards are nearly equal */
static BOOL sameforward(known, new)
PSTR known, new;
{
   if (checkdiff(known, new, 10))
        /* The difference is less than 10 */
        return (TRUE);
   else
   {
        int tenth = div10(known);/* 10% of known */ return (checkdiff(known, new, tenth));
   }
}

/* Return likely values for the forward rates if we can.  extracted selects
 * whether we should return values already in the ticket.
 */
static BOOL assumeforwards(low, high, extracted)
PSTR low, high;
BOOL extracted;
{
   /* See if we can return previous quotes */
   if (extracted && know(t_deal) && Ticket->DealType == SWAP &&
        know(t_high) && know(t_low))
   {
        strcpy(low, Ticket->LowQuote);
        strcpy(high, Ticket->HighQuote);
        return (TRUE);
   }

/* See if we know all the info about the quote */
   unless (know(t_cur1) && know(t_cur2) && know(t_quotecur) && know(t_period))
        return (FALSE);

/* Get the answer from FRXA. However for the moment no use is
      made if the information, so pretend its not there. */
/*   return( getfwd( Ticket->Currency1, Ticket->Currency2,
     Ticket->QuoteCurr, Ticket->Period,
low, high ));
*/
return( FALSE );
}

/* Return 1/10 the value of a string as an integer */
static int div10(string)
PSTR string;
{
   int result = 0;
   int maxdigit;
   PSTR pos = strchr(string, '.');
   int i;

if (pos == NULL)
      maxdigit = strlen(string);
   else
      maxdigit = pos - string;

for (i = 0; i < maxdigit-1; i++)
      result = result * 10 + string[i] - '0';
```

```
    return (result);
}
/* Check that the difference between two signed forwards is not greater than
 * some value; the code is similar to that of comparenum.
 */
static BOOL checkdiff(fwd1, fwd2, maxdiff)
PSTR fwd1, fwd2;
int maxdiff;
{
    int len1, len2, lead1, lead2, pos1, pos2;
    BOOL subtract;
    int diff = 0;
    static char num1[RATEBYTES + 1], num2[RATEBYTES + 1];
    PSTR ptr;
    int maxlead;

/* Make working copies of the numbers */
    strcpy(num1, fwd1);
    strcpy(num2, fwd2);

/* Extract the sign of the numbers, and decide whether we need to add or
     * subtracte them (we subtract the absolute values if they are the same
     * sign, and add them if they are different).
     */
    subtract = (getsign(num1) == getsign(num2));

len1 = strlen(num1);
    len2 = strlen(num2);

/* Calculate the number of leading digits in each number */
    ptr = strchr(num1, '.');
    if (ptr == NULL)
        lead1 = len1;
    else
        lead1 = ptr - num1;

ptr = strchr(num2, '.');
    if (ptr == NULL)
        lead2 = len2;
    else
        lead2 = ptr - num2;

/* Work out a suitable starting point within each number */
    maxlead = max(lead1, lead2);
    pos1 = lead1 - maxlead;
    pos2 = lead2 - maxlead;

while (pos1 < len1 || pos2 < len2)
    {
        char digit1, digit2;

if (pos1 < 0 || pos1 >= len1)
   digit1 = '0';
        else
   digit1 = num1[pos1];

if (pos2 < 0 || pos2 >= len2)
   digit2 = '0';
        else
   digit2 = num2[pos2];

/* Once we reach a decimal point we can stop, since we aren't interested
         * in fractional differences.
         */
        if (digit1 == '.' || digit2 == '.')
   break;

pos1++, pos2++;
        {
   int t;

if (subtract)
       t = digit1 - digit2;
   else
       t = digit1 - '0' + digit2 - '0';
```

```
   if (abs(diff) > 999)
      /* Small danger of overflowing here, so give up */
      return (FALSE);
   diff = diff * 10 + t;
      }
   } return (abs(diff) <= maxdiff);
}

/* Read a single forward rate. (eg AT 10) */
BOOL parseforward(force)
BOOL force;
{
   BOOL ok = TRUE;
   BOOL neg = FALSE;
   static int sign;
   static char fwd[RATEBYTES + 1];

AnalysisData->symcount = 0;

/* We only expect one part; try to read it. */
   {
      static char num[MAXWORDLEN + 1];

strcpy(AnalysisData->numbuf, AnalysisData->symbuf);
      if (nextnum(num, &sign) && strlen(num) <= RATEBYTES - 1 &&
      AnalysisData->numbuf[0] == 0)
   strcpy(fwd, num);
      else
   ok = FALSE;
   } if (ok)
   {
      if (!goodforward(fwd))
   ok = FALSE;
      else
      {
   if (sign == 0)
      /* We don't know what sign was intended (this is the normal case,
       * since dealers all know what the implied sign is). If we can't
       * find anything else we assume a positive forward (this should be
       * shown on the screen with a + sign so the dealer will notice if
       * it's wrong.
       */
      unless (forwardsign(&sign))
         sign = 1;

/* Incorporate the sign into the number */
   setsign(sign, fwd);

/* Check for reasonableness */
   unless (force)
   {
      if (know(t_low) &&
        !(compareforward(fwd, Ticket->LowQuote) == 0 ||
          compareforward(fwd, Ticket->HighQuote) == 0))
         ok = FALSE;
      else
      {
         static char assumelow[RATEBYTES + 1];
         static char assumehigh[RATEBYTES + 1];

if (assumeforwards(assumelow, assumehigh, TRUE))
      unless (sameforward(assumelow, fwd) ||
      sameforward(assumehigh, fwd))
         ok = FALSE;
      } if (ok)
      {
         /* Check the following symbol */
         nextsym();
         switch (AnalysisData->symbol)
```

```c
      {
case S_MONTH: case S_MIO: case S_YARD:
case S_MTH: case S_WEEK: case S_YEAR:
case S_TH: case S_PERCENT:
   ok = FALSE;
   break;
  default:
     backsym();
     break;
      }
   }
 }
      }
   } if (ok)
      insertstring(t_fwd, fwd, st_extracted);
   else
      backphrase();

return (ok);
}

/* Work out what the sign of a forward rate will probably be. */
static BOOL forwardsign(sign)
int *sign;
{
   static char low[RATEBYTES + 1], high[RATEBYTES + 1];
   static char signch;

if (!(know(t_cur1) && know(t_cur2) && know(t_quotecur)))
      return (FALSE);
   else if (know(t_fwd))
      /* Extracts the sign from the previous forward rate */
      signch = Ticket->ActualDiff[0];
   else if (assumeforwards(low, high, TRUE))
   {
      /* Work out what it should be from the expected quote */
      if (low[0] == high[0])
   signch = low[0];
      else
/* Different signs, so not very helpful */
return (FALSE);
   }
   else
   {
      /* ??? Try the 1 month expected rate */
      return (FALSE);
   } if (signch == '+')
      *sign = 1;
   else
      *sign = -1;

return (TRUE);
}

/************************************************************
 *                                                          *
 * frx.c  -  Extract information from Monitor pages FRXA-E  *
 * This is a cut down version including only those functions *
 * required by the current version of conversation analysis *
 *                                                          *
 * Written by Roger H. Abbott                               *
 *                                                          *
 * Copyright (C) 1988 Richards Computer Products Ltd        *
 *                                                          *
 ************************************************************/ include <string.h> include "analdata.h"
include "kprintf.h"
#include "frx.h"
#include "getfrx.h"
```

```c
#include "curinfo.h"
#include "date.h"

void ExtractHolidays(void);

/* Declaration of variables which are used by other modules.

The holiday information for all currencies is held in AllHolidays. The
dates are held as DATE types, in days since 1-1-70. Holidays holds
pointers into this array for all currencies, NULL means not known.
Each sub-list is null terminated. Currencies which are declared
equivalent on FRXE have the same pointer.
*/

MonitorPage FRXA, FRXB, FRXC, FRXD, FRXE;
DATE FRXdate;
DATE *HolidayList[NFRXcurrencies+1];
DATE AllHolidays[MaxHolidays];
BOOL MoslemWeekend[NFRXcurrencies+1];

/* Pointer to the unstructured pages for loading */
PUMP MonitorPageAddress[5] =
{ &FRXA.UMP, &FRXB.UMP, &FRXC.UMP, &FRXD.UMP, &FRXE.UMP };

/* Pointers to the structured versions for processing */
PSUP PSpotUpdatesPage = &FRXA.SUP;
PCP PCurrencyPage[3] = { &FRXB.CP, &FRXC.CP, &FRXD.CP };
PHP PHolidayPage = &FRXE.HP;

/***************************************************************/

/* This procedure is called after the initial loading of FRXA-E.
It applies the update lines on FRXA, oldest first, and then sets
up the array of CA currency/FRX currency number equivalences and
calls a routine to extract the holiday information. It returns
TRUE unless there was an error extracting information. */ void InitialiseFrx( void )
{
char CurrentCycleLetter = PSpotUpdatesPage->Updates[0].CycleNumber;
int i, UpdateLine, StartLine = 0, FRXcurrency;
PSTR Pointer;
static DATESTRUCT FRXBaseDate = { 1, 1, 1980 };

/* Look through the cycle numbers to find the line at which the number
changes to an earlier one (if any). If all the lines have the same number,
start at the first line. We do not need to check what the earlier number
is, the fact that it is on a later line means that it must be earlier. */ for ( UpdateLine=1; UpdateLine<7; UpdateLine++ )
{
if ( CurrentCycleLetter !=
PSpotUpdatesPage->Updates[UpdateLine].CycleNumber )
{
StartLine = UpdateLine;
break;
}
}

/* Apply the updates in the appropriate order */ for ( UpdateLine=StartLine; UpdateLine<7; UpdateLine++ )
ApplyUpdateLine( PSpotUpdatesPage->Updates[UpdateLine].Update );

for ( UpdateLine=0; UpdateLine<StartLine; UpdateLine++ )
ApplyUpdateLine( PSpotUpdatesPage->Updates[UpdateLine].Update );

/* Calculate and store the date from FRXA, leave it zero if no FRXA */
Pointer = SpotPointer(1);
for ( i=0; i<4; i++ ) FRXdate = 32*FRXdate + DecodeFRX( Pointer[i] );
/* Add in the offset from CA base date to 1-1-80 */
FRXdate += structtodate( &FRXBaseDate );

/* Initialise the holiday list pointers to "not available" and the
Moslem weekends to false. */
```

```c
for ( FRXcurrency = 1; FRXcurrency <= NFRXcurrencies; FRXcurrency++ )
HolidayList[ FRXcurrency ] = NULL,
MoslemWeekend[ FRXcurrency ] = FALSE;

/* Generate the list of holidays if the holiday page is valid. */
if ( PHolidayPage->Valid == 'V' )
ExtractHolidays();
}

/**********************************************************/

/* Extract the holiday information from FRXE and currency info */ void ExtractHolidays( void )
{
DATESTRUCT FixedDays[20], SpecificDay;
int Index, FRXcurrency, EquatedCurrency;
int BaseYear, FirstHoliday = 0, LastHoliday = 0;
char *cp = &(PHolidayPage->StartEndMonths[3]), WeekendType;
long FDbits;
int i, j;
BOOL sorted;

BaseYear = 10*( cp[0] - '0') + cp[1] - '0';

/* Extract the common dates */
for ( Index=0; Index<20; Index++ )
DecodeDate( PHolidayPage->CommonDates[Index], &(FixedDays[Index]),
BaseYear );

/* Extract the specific days for each currency */
cp = PHolidayPage->Holidays;
Index = 0;

while ( (WeekendType = cp[Index]) == 'X' || cp[Index] == 'Y' )
{
FRXcurrency = FindFRXcode( cp+Index+1 );
if ( FRXcurrency <= 0 )
{
Kprintf( "Holiday page currency %.3Fs not found after %c\n",
(LPSTR) cp+Index+1, WeekendType );
Index++;
/* Look for the next currency or end */
while ( cp[Index] != 'X' && cp[Index] != 'Y' &&
cp[Index] != ' ' ) Index++;
continue;
} if ( WeekendType == 'Y' )
MoslemWeekend[ FRXcurrency ] = TRUE;

/* Set the pointer to the start of the holidays */
HolidayList[ FRXcurrency ] = AllHolidays + LastHoliday;

/* Get the fixed holidays */
Index += 4;
for ( i=0; i<4; i++ )
FDbits = FDbits*32 + DecodeFRX( cp[Index+i] );

i = 0;
for ( j=19; j>=0; j--, i++ )
{
if ( FDbits%2 )
AllHolidays[ LastHoliday++ ] =
structtodate( FixedDays+j );
FDbits /= 2;
}

/* Get the individual dates */
Index += 4;
while ( cp[Index] != 'X'
&& cp[Index] != 'Y' && cp[Index] != ' ' )
{
DecodeDate( cp+Index, &SpecificDay, BaseYear );
AllHolidays[ LastHoliday++ ] = structtodate( &SpecificDay );
```

```
Index += 2;
}

/* Sort the holidays into ascending order */
reorder:
sorted = TRUE;
for ( i=FirstHoliday; i<(LastHoliday-2); i++ )
if ( AllHolidays[i+1] < AllHolidays[i] )
{
j = AllHolidays[i];
AllHolidays[i] = AllHolidays[i+1];
AllHolidays[i+1] = j;
sorted = FALSE;
}
if ( !sorted ) goto reorder;

/* Terminate the list for this currency, start that for the next */
AllHolidays[ LastHoliday++ ] = NULL;
FirstHoliday = LastHoliday;

/* Check that the holiday list is large enough */
if ( LastHoliday >= MaxHolidays )
{
Kprintf( "****** Holiday List too short ******\n" );
return;
}
}

/* Finally we have to apply the equivalences. Its much easier backwards. */
cp = PHolidayPage->HolidayEquates;
Index = 63;

NextEquivalence:

while ( cp[Index] == ' ' && Index > 0 ) Index--;
if ( Index <= 0 ) return;

Index -= 2;/* Point at first character */
FRXcurrency = FindFRXcode( cp+Index );
if ( FRXcurrency <= 0 )
{
Kprintf( "Holiday page currency %.3Fs not found (1), index=%d\n",
(LPSTR) cp+Index, Index );
return;
}
while ( cp[ --Index ] == '=' )
{
Index -= 3;
EquatedCurrency = FindFRXcode( cp+Index );
if ( EquatedCurrency <= 0 )
{
Kprintf( "Holiday page currency %.3Fs not found(2),"
"index=%d\n", (LPSTR) cp+Index, Index );
return;
}

/* Transfer the list pointer and Moslem bit as well */
HolidayList[ EquatedCurrency ] = HolidayList[ FRXcurrency ];
MoslemWeekend[ EquatedCurrency ] = MoslemWeekend[ FRXcurrency ];
}
goto NextEquivalence;

}

/*****************************************************/

/* Decode a two character date on FRXE into a date structure */ void DecodeDate( PSTR Pointer, DATESTRUCT far *DP, int BaseYear )
{
/* This may have to work next century */
if ( BaseYear < 80 ) BaseYear += 100;

DP->day = DecodeFRX( Pointer[0] );
DP->month = DecodeFRX( Pointer[1] )%12 + 1;
DP->year = DecodeFRX( Pointer[1] )/12 + BaseYear + 1900;
```

```c
}
/*******************************************************************/

/* Convert a character on an FRX page to 5 bit binary */ int DecodeFRX( char ch )
{
if (ch>='P' && ch<='W') return( ch-'P'+24 );
if (ch>='A' && ch<='N') return( ch-'A'+10 );
if (ch>='0' && ch<='9') return( ch-'0' );
return( 0 ); /* Default to 0 for all the rest */
}

/*******************************************************************/

/* Given a currency number, return its Type Flag character */ char GetTypeFlag( int Currency )
{
if ( Currency<1 || Currency>30 ) return( NULL );
return( PCurrencyPage[CalcPage(Currency)]->
CurrencyNames.Name[CalcLine(Currency)].TypeFlag );
}

/*******************************************************************/

/* Given a pointer to a swiftcode, find out its FRX currency number.
 * Return zero if not found. */ int FindFRXcode( PSTR swiftcode )
{
int FRXcurrency;

for ( FRXcurrency = 1; FRXcurrency <= NFRXcurrencies; FRXcurrency++ )
if ( memcmp( swiftcode, GetSwiftcode( FRXcurrency ), 3) == 0)
return( FRXcurrency );
return( 0 );
}

/*******************************************************************/

/* Given a FRX currency number, return a pointer to its Swiftcode */ char *GetSwiftcode( int Currency )
{
if ( Currency<1 || Currency>30 ) return( NULL );
return( PCurrencyPage[CalcPage(Currency)]->
CurrencyNames.Name[CalcLine(Currency)].Swiftcode );
}

/*******************************************************************/

/* Update the pages FRXA-FRXD from an update line. The parameter
is a pointer to the update line. This may be within FRXA itself or
may be in a buffer from the Monitor Page Update message. In any
case the routine for processing Monitor messages is responsible for
making any changes resulting directly from Monitor messages. */ void ApplyUpdateLine( char Line[] )
{
int Count = 0, Point = 0, i, j;
char *TargetLine;
int TargetColumn, TargetPage, TargetRow;

while ( Count<15 && Line[ Point ] != ' ' )
{
Count++;
if ( Line[ Point ] >= 'W' && Line[ Point ] <= 'Y' )
{
TargetPage = 0;
TargetRow = Line[ Point ] - 'W' + 2;
}
else
{
```

```
i = DecodeFRX( Line[ Point ] ) - 1;
TargetPage = i/10 + 1;
TargetRow = i%10 + 2;
}

TargetLine = MonitorPageAddress[ TargetPage ]->
PackedInfo[ TargetRow ];
TargetColumn = DecodeFRX( Line[ ++Point ] ) * 2;

/* Check that its all in bounds. */
if ( TargetPage < 0 || TargetPage > 3 ||
TargetRow < 1 || TargetRow > 13 ||
TargetColumn < 0 || TargetColumn > 62 )
{
Kprintf( "Bad FRXA update line ********\n" );
return;
}

TargetLine[ TargetColumn++ ] = Line[ ++Point ];
TargetLine[ TargetColumn ] = Line[ ++Point ];
Point++;

}
}
/**************************************************************/

/* Given a currency number, return a pointer to its Spot Rate */ char *SpotPointer( int Currency )
{
if ( Currency<1 || Currency>30 ) return( NULL );
return(PSpotUpdatesPage->
SpotRates[CalcSpotRow(Currency)].Rate[CalcSpotCol(Currency)]);
}

/**************************************************************/

/* Given a currency number, return a pointer to its Spot Spread */ char *SpotSpreadPointer( int Currency )
{
return( NULL );
}

/**************************************************************/

/* Find the pointer to the forward and deposit rate bid quotes */ char *FwdPointer( int Currency, int Period )
{
return( NULL );
}

/**************************************************************/

/* Find the pointer to the forward and deposit rate spreads */ char *FwdSpreadPointer( int Currency, int Period )
{
return( NULL );
}

/**************************************************************/

/* The second group of routines return the unpacked binary values
as long integers. By convention, a rate which is not available is
stored either as zero (on the spot rates page) or as the highest
number available (for forward and deposit rates).

The spot and forward routines return the appropriate unavailable
number if the currency number is 1 ( US Dollar ).

The value is also unavailable if the line is blank, and the same
values are returned. */

/**************************************************************/
```

```c
/* Return the spot bid rate as a long integer */ long BinSpot( int Currency )
{
char *Pointer = SpotPointer( Currency );
long Quote = 0;
int i;

if ( Currency<2 || Currency>30 ) return( 0 );

for ( i=0; i<4; i++ ) Quote = 32*Quote + DecodeFRX( Pointer[i] );
return( Quote );
}

/****************************************************************/

/* Return the spot spread as a long integer */ long BinSpotSpread( int Currency )
{
return( 0 );
}

/****************************************************************/

/* Return the forward bid price as a long integer */ long BinFwd( int Currency, int Period )
{
return( 131071 );
}

/****************************************************************/

/* Return the deposit rate as a long integer number of 32nds */ long BinDeposit( int Currency, int Period )
{
return( 3071 );
}

/****************************************************************/

/* Return the forward spread as a long integer */ long BinFwdSpread( int Currency, int Period )
{
return( 1023 );
}

/****************************************************************/

/* Return the deposit spread as a long integer */ long BinDepositSpread( int Currency, int Period )
{
return( 1023 );
}

/****************************************************************/

/* Return the spot bid rate */ int GetSpotBid( int Currency, char *String, int Length )
{
long LowQuote = BinSpot( Currency );

/* The spot rate is zero if not available */
if ( LowQuote == 0 ) return( RateUnknown( String, Length ) );

/* Put the rate into the string supplied by the user */
return( LongToChar( LowQuote, String, Length,
(7 - SpotDecPoint( Currency ))) );
}

/****************************************************************/
```

```
/* Return the spot ask rate */ int GetSpotAsk( int Currency, char *String, int Length )
{
return( RateUnknown( String, Length ) );
}

/***********************************************************/

/* Return the forward bid rate */ int GetFwdBid( int Currency, char *String, int Length, int Period )
{
return( RateUnknown( String, Length ) );
}

/***********************************************************/

/* Return the forward ask rate */ int GetFwdAsk( int Currency, char *String, int Length, int Period )
{
return( RateUnknown( String, Length ) );
}

/***********************************************************/

/* Return the deposit bid rate */ int GetDepositBid( int Currency, char *String, int Length, int Period )
{
return( RateUnknown( String, Length ) );
}

/***********************************************************/

/* Return the forward ask rate */ int GetDepositAsk( int Currency, char *String, int Length, int Period )
{
return( RateUnknown( String, Length ) );
}

/***********************************************************/

/* Convert a long integer to a right-justified string of digits.
The returned value is the index to the first character of the string,
the last character being in the last element. The supplied value Point
is the length of the string, this is used within the function as an index.
After is the number of digits after the decimal point. The returned
value is the index to to first character. If this is zero there may
not have been room for all the digits. */ int LongToChar( long Value, char *String, int Point, int After )
{
int i, j, LastChar, Negative = 0;

LastChar = Point;

/* If the value is negative note this and make it positive */
if ( Value < 0 )
{
Negative = 1;
Value = -Value;
}

/* Initialise the array to spaces */
for ( i=0; i<LastChar; i++ ) String[i] = ' ';

/* Terminate the string with a null byte */
String[ --Point ] = 0;

/* Turn the number into at least one digit */
if ( Value == 0 ) String[ --Point ] = '0';
else
```

```c
{
while ( Value>0 && Point>0 )
{
String[ --Point ] = (char) (Value%10) + '0';
Value = Value/10;
}
}

/* We have finished if there are no places after the point, as the point
is not needed at all in this case */
if ( After == 0 )
{
/* If the number was negative add the sign */
if ( Negative ) String[ --Point ] = '-';
return( Point );
}

/* The null is at index (LastChar-1) (last position ) and the last digit
is one place before that. Calculate the index where the D.P. must go. */
i = LastChar - 2 - After;

/* Add zeros to the start of the string until there is at least one digit
before the decimal point. This occurs when the digit is where the point
will go, as digits before the point are shifted left by one in a jiffy */
while ( Point > 1 ) String[ --Point ] = '0';

/* Shift the digits to the left of the point, add the point */
for ( j=0; j<i; j++ ) String[j] = String[j+1];
String[i] = '.';

/* Adjust the pointer to the first digit */
Point--;

/* If the number was negative add the sign */
if ( Negative ) String[ --Point ] = '-';
return( Point );
}

/************************************************************/

/* Convert a long integer expressing a number of (Den)nds to a right-justified
string of digits. The returned value is the index to the first character
of the string, the last character being in the last element. The supplied
value Point is the length of the string, this is used within the function
as an index. The returned value is the index to to first character.
If this is zero there may not have been room for all the digits. */ int LongToFraction( long Value, char *String, int Point, int Den )
{
return( 0 );
}

/************************************************************/

/* Put the string UNAV into the user's string for any rate not known */ int RateUnknown( char *String, int Length )
{
static char Reversed[5] = { 0, 'V', 'A', 'N', 'U' };
int i = 0;

while ( i<5 && Length>0 ) String[ --Length ] = Reversed[ i++ ];
return( Length );
}

/************************************************************
 *                                                          *
 * frx.c  -  Extract information from Monitor pages FRXA-E  *
 *                                                          *
 * Written by Roger H. Abbott                               *
 *                                                          *
 * Copyright (C) 1988 Richards Computer Products Ltd        *
 *                                                          *
 ************************************************************/
```

```c
include <string.h>
#include "kprintf.h"
#include "frx.h"
#include "getfrx.h"
#include "curinfo.h"
#include "date.h"

void ExtractHolidays(void);

/* Declaration of variables which are used by other modules.

The holiday information for all currencies is held in AllHolidays. The
dates are held as DATE types, in days since 1-1-70. Holidays holds
pointers into this array for all currencies, NULL means not known.
Each sub-list is null terminated. Currencies which are declared
equivalent on FRXE have the same pointer.
*/

MonitorPage FRXA, FRXB, FRXC, FRXD, FRXE;
DATE FRXdate;
DATE *HolidayList[NFRXcurrencies+1];
DATE AllHolidays[MaxHolidays];
BOOL MoslemWeekend[NFRXcurrencies+1];

/* Pointer to the unstructured pages for loading */
PUMP MonitorPageAddress[5] =
{ &FRXA.UMP, &FRXB.UMP, &FRXC.UMP, &FRXD.UMP, &FRXE.UMP };

/* Pointers to the structured versions for processing */
PSUP PSpotUpdatesPage = &FRXA.SUP;
PCP PCurrencyPage[3] = { &FRXB.CP, &FRXC.CP, &FRXD.CP };
PHP PHolidayPage = &FRXE.HP;

/*****************************************************************/

/* This procedure is called after the initial loading of FRXA-E.
It applies the update lines on FRXA, oldest first, and then sets
up the array of CA currency/FRX currency number equivalences and
calls a routine to extract the holiday information. It returns
TRUE unless there was an error extracting information. */ void InitialiseFrx( void )
{
char CurrentCycleLetter = PSpotUpdatesPage->Updates[0].CycleNumber;
int i, UpdateLine, StartLine = 0, FRXcurrency;
PSTR Pointer;
static DATESTRUCT FRXBaseDate = { 1, 1, 1980 };

/* Look through the cycle numbers to find the line at which the number
changes to an earlier one (if any). If all the lines have the same number,
start at the first line. We do not need to check what the earlier number
is, the fact that it is on a later line means that it must be earlier. */ for ( UpdateLine=1; UpdateLine<7; UpdateLine++ )
{
if ( CurrentCycleLetter !=
PSpotUpdatesPage->Updates[UpdateLine].CycleNumber )
{
StartLine = UpdateLine;
break;
}
}

/* Apply the updates in the appropriate order */ for ( UpdateLine=StartLine; UpdateLine<7; UpdateLine++ )
ApplyUpdateLine( PSpotUpdatesPage->Updates[UpdateLine].Update );

for ( UpdateLine=0; UpdateLine<StartLine; UpdateLine++ )
ApplyUpdateLine( PSpotUpdatesPage->Updates[UpdateLine].Update );

/* Calculate and store the date from FRXA, leave it zero if no FRXA */
Pointer = SpotPointer(1);
for ( i=0; i<4; i++ ) FRXdate = 32*FRXdate + DecodeFRX( Pointer[i] );
/* Add in the offset from CA base date to 1-1-80 */
FRXdate += structtodate( &FRXBaseDate );
```

```c
/* Initialise the holiday list pointers to "not available" and the
Moslem weekends to false. */
for ( FRXcurrency = 1; FRXcurrency <= NFRXcurrencies; FRXcurrency++ )
HolidayList[ FRXcurrency ] = NULL,
MoslemWeekend[ FRXcurrency ] = FALSE;

/* Generate the list of holidays if the holiday page is valid. */
if ( PHolidayPage->Valid == 'V' )
ExtractHolidays();
}

/**********************************************************/

/* Extract the holiday information from FRXE and currency info */ void ExtractHolidays( void )
{
DATESTRUCT FixedDays[20], SpecificDay;
int Index, FRXcurrency, EquatedCurrency;
int BaseYear, FirstHoliday = 0, LastHoliday = 0;
char *cp = &(PHolidayPage->StartEndMonths[3]), WeekendType;
long FDbits;
int i, j;
BOOL sorted;

BaseYear = 10*( cp[0] - '0') + cp[1] - '0';

/* Extract the common dates */
for ( Index=0; Index<20; Index++ )
DecodeDate( PHolidayPage->CommonDates[Index], &(FixedDays[Index]),
BaseYear );

/* Extract the specific days for each currency */
cp = PHolidayPage->Holidays;
Index = 0;

while ( (WeekendType = cp[Index]) == 'X' || cp[Index] == 'Y' )
{
FRXcurrency = FindFRXcode( cp+Index+1 );
if ( FRXcurrency <= 0 )
{
Kprintf( "\nHoliday page currency %.3Fs not found after %c\n",
(LPSTR) cp+Index+1, WeekendType );
Index++;
/* Look for the next currency or end */
while ( cp[Index] != 'X' && cp[Index] != 'Y' &&
cp[Index] != ' ' ) Index++;
continue;
} if ( WeekendType == 'Y' )
MoslemWeekend[ FRXcurrency ] = TRUE;

/* Set the pointer to the start of the holidays */
HolidayList[ FRXcurrency ] = AllHolidays + LastHoliday;

/* Get the fixed holidays */
Index += 4;
for ( i=0; i<4; i++ )
FDbits = FDbits*32 + DecodeFRX( cp[Index+i] );

i = 0;
for ( j=19; j>=0; j--, i++ )
{
if ( FDbits%2 )
AllHolidays[ LastHoliday++ ] =
structtodate( FixedDays+j );
FDbits /= 2;
}

/* Get the individual dates */
Index += 4;
while ( cp[Index] != 'X'
&& cp[Index] != 'Y' && cp[Index] != ' ' )
{
DecodeDate( cp+Index, &SpecificDay, BaseYear );
```

```
AllHolidays[ LastHoliday++ ] = structtodate( &SpecificDay );
Index += 2;
}

/* Sort the holidays into ascending order */
reorder:
sorted = TRUE;
for ( i=FirstHoliday; i<(LastHoliday-2); i++ )
if ( AllHolidays[i+1] < AllHolidays[i] )
{
j = AllHolidays[i];
AllHolidays[i] = AllHolidays[i+1];
AllHolidays[i+1] = j;
sorted = FALSE;
}
if ( !sorted ) goto reorder;

/* Terminate the list for this currency, start that for the next */
AllHolidays[ LastHoliday++ ] = NULL;
FirstHoliday = LastHoliday;

/* Check that the holiday list is large enough */
if ( LastHoliday >= MaxHolidays )
{
Kprintf( "\n****** Holiday List too short ******\n" );
return;
}
}

/* Finally we have to apply the equivalences. Its much easier backwards. */
cp = PHolidayPage->HolidayEquates;
Index = 63;

NextEquivalence:

while ( cp[Index] == ' ' && Index > 0 ) Index--;
if ( Index <= 0 ) return;

Index -= 2;/* Point at first character */
FRXcurrency = FindFRXcode( cp+Index );
if ( FRXcurrency <= 0 )
{
Kprintf( "\nHoliday page currency %.3Fs not found (1), index=%d\n",
(LPSTR) cp+Index, Index );
return;
}
while ( cp[ --Index ] == '=' )
{
Index -= 3;
EquatedCurrency = FindFRXcode( cp+Index );
if ( EquatedCurrency <= 0 )
{
Kprintf( "\nHoliday page currency %.3Fs not found(2),"
"index=%d\n", (LPSTR) cp+Index, Index );
return;
}

/* Transfer the list pointer and Moslem bit as well */
HolidayList[ EquatedCurrency ] = HolidayList[ FRXcurrency ];
MoslemWeekend[ EquatedCurrency ] = MoslemWeekend[ FRXcurrency ];
}
goto NextEquivalence;

}

/**********************************************************/

/* Decode a two character date on FRXE into a date structure */ void DecodeDate( PSTR Pointer, DATESTRUCT far *DP, int BaseYear )
{
/* This may have to work next century */
if ( BaseYear < 80 ) BaseYear += 100;

DP->day = DecodeFRX( Pointer[0] );
DP->month = DecodeFRX( Pointer[1] )%12 + 1;
```

```c
DP->year = DecodeFRX( Pointer[1] )/12 + BaseYear + 1900;
}

/*************************************************************/

/* Convert a character on an FRX page to 5 bit binary */ int DecodeFRX( char ch )
{
if (ch>='P' && ch<='W') return( ch-'P'+24 );
if (ch>='A' && ch<='N') return( ch-'A'+10 );
if (ch>='0' && ch<='9') return( ch-'0' );
return( 0 ); /* Default to 0 for all the rest */
}

/*************************************************************/

/* Given a currency number, return its Type Flag character */ char GetTypeFlag( int Currency )
{
if ( Currency<1 || Currency>30 ) return( NULL );
return( PCurrencyPage[CalcPage(Currency)]->
CurrencyNames.Name[CalcLine(Currency)].TypeFlag );
}

/*************************************************************/

/* Given a pointer to a swiftcode, find out its FRX currency number.
 * Return zero if not found. */ int FindFRXcode( PSTR swiftcode )
{
int FRXcurrency;

for ( FRXcurrency = 1; FRXcurrency <= NFRXcurrencies; FRXcurrency++ )
if ( memcmp( swiftcode, GetSwiftcode( FRXcurrency ), 3) == 0)
return( FRXcurrency );
return( 0 );
}

/*************************************************************/

/* Given a FRX currency number, return a pointer to its Swiftcode */ char *GetSwiftcode( int Currency )
{
if ( Currency<1 || Currency>30 ) return( NULL );
return( PCurrencyPage[CalcPage(Currency)]->
CurrencyNames.Name[CalcLine(Currency)].Swiftcode );
}

/*************************************************************/

/* Update the pages FRXA-FRXD from an update line. The parameter is a pointer to the update line. This may be within FRXA itself or
may be in a buffer from the Monitor Page Update message. In any
case the routine for processing Monitor messages is responsible for
making any changes resulting directly from Monitor messages. */ void ApplyUpdateLine( char Line[] )
{
int Count = 0, Point = 0, i, j;
char *TargetLine;
int TargetColumn, TargetPage, TargetRow;

while ( Count<15 && Line[ Point ] != ' ' )
{
Count++;
if ( Line[ Point ] >= 'W' && Line[ Point ] <= 'Y' )
{
TargetPage = 0;
TargetRow = Line[ Point ] - 'W' + 2;
}
else
```

```
{
i = DecodeFRX( Line[ Point ] ) - 1;
TargetPage = i/10 + 1;
TargetRow = i%10 + 2;
}

TargetLine = MonitorPageAddress[ TargetPage ]->
PackedInfo[ TargetRow ];
TargetColumn = DecodeFRX( Line[ ++Point ] ) * 2;

TargetLine[ TargetColumn++ ] = Line[ ++Point ];
TargetLine[ TargetColumn ] = Line[ ++Point ];
Point++;

}
}
/**************************************************/

/* Given a currency number, return a pointer to its Spot Rate */ char *SpotPointer( int Currency )
{
if ( Currency<1 || Currency>30 ) return( NULL );
return(PSpotUpdatesPage->
SpotRates[CalcSpotRow(Currency)].Rate[CalcSpotCol(Currency)]);
}

/**************************************************/

/* Given a currency number, return a pointer to its Spot Spread */ char *SpotSpreadPointer( int Currency )
{
if ( Currency<1 || Currency>30 ) return( NULL );
return(PSpotUpdatesPage->
SpotRates[CalcSpotRow(Currency)].Spread[CalcSpotCol(Currency)]);
}

/**************************************************/

/* Find the pointer to the forward and deposit rate bid quotes */ char *FwdPointer( int Currency, int Period )
{
if ( Currency<1 || Currency>30 ) return( NULL );
return( PCurrencyPage[ CalcPage( Currency ) ]->
ForwardRates[ CalcLine( Currency ) ].ForwardDeposit[ Period ] );
}

/**************************************************/

/* Find the pointer to the forward and deposit rate spreads */ char *FwdSpreadPointer( int Currency, int Period )
{
if ( Currency<1 || Currency>30 ) return( NULL );
return( PCurrencyPage[ CalcPage( Currency ) ]->
ForwardRates[ CalcLine( Currency ) ].Spread[ Period ] );
}

/**************************************************/

/* The second group of routines return the unpacked binary values
as long integers. By convention, a rate which is not available is
stored either as zero (on the spot rates page) or as the highest
number available (for forward and deposit rates).

The spot and forward routines return the appropriate unavailable
number if the currency number is 1 ( US Dollar ).

The value is also unavailable if the Line is blank, and the same
values are returned. */

/**************************************************/

/* Return the spot bid rate as a long integer */
```

```
long BinSpot( int Currency )
{
char *Pointer = SpotPointer( Currency );
long Quote = 0;
int i;

if ( Currency<2 || Currency>30 ) return( 0 );

for ( i=0; i<4; i++ ) Quote = 32*Quote + DecodeFRX( Pointer[i] );
return( Quote );
}

/************************************************************/

/* Return the spot spread as a long integer */ long BinSpotSpread( int Currency )
{
long Quote = 0;
char *Pointer = SpotSpreadPointer( Currency );
int i;

if ( Currency<2 || Currency>30 ) return( 0 );

for ( i=0; i<2; i++ ) Quote = 32*Quote + DecodeFRX( Pointer[i] );
return( Quote );
}

/************************************************************/

/* Return the forward bid price as a long integer */ long BinFwd( int Currency, int Period )
{
long Quote = 0;
char *Pointer = FwdPointer( Currency, Period );

if ( Currency<2 || Currency>30 || Pointer[0] == ' ' ) return( 131071 );

Quote = 32768*(DecodeFRX(Pointer[0])&7) + 1024*DecodeFRX(Pointer[1]) +
32*DecodeFRX(Pointer[2]) + DecodeFRX(Pointer[5]);
if ( Quote > 131071 ) Quote -= 262144;
return( Quote );
}

/************************************************************/

/* Return the deposit rate as a long integer number of 32nds */ long BinDeposit( int Currency, int Period )
{
long Quote = 0;
char *Pointer = FwdPointer( Currency, Period );

if ( Currency<1 || Currency>30 || Pointer[0] == ' ' ) return( 3071 );

Quote = 128*(DecodeFRX(Pointer[0])&24) + 32*DecodeFRX(Pointer[3]) +
DecodeFRX(Pointer[4]);
return( Quote - 1024 );
}

/************************************************************/

/* Return the forward spread as a long integer */ long BinFwdSpread( int Currency, int Period )
{
long Quote = 0;
char *Pointer = FwdSpreadPointer( Currency, Period );

if ( Currency<2 || Currency>30 || Pointer[0] == ' ' ) return( 1023 );

Quote = 32*DecodeFRX(Pointer[0]) + DecodeFRX(Pointer[3]);
return( Quote );
}
```

```c
/***************************************************/

/* Return the deposit spread as a long integer */ long BinDepositSpread( int Currency, int Period )
{
long Quote = 0;
char *Pointer = FwdSpreadPointer( Currency, Period );

if ( Currency<1 || Currency>30 || Pointer[0] == ' ' ) return( 1023 );

Quote = 32*DecodeFRX(Pointer[1]) + DecodeFRX(Pointer[2]);
return( Quote );
}

/***************************************************/

/* Return the spot bid rate */ int GetSpotBid( int Currency, char *String, int Length )
{
long LowQuote = BinSpot( Currency );

/* The spot rate is zero if not available */
if ( LowQuote == 0 ) return( RateUnknown( String, Length ) );

/* Put the rate into the string supplied by the user */
return( LongToChar( LowQuote, String, Length,
(7 - SpotDecPoint( Currency ))) );
}

/***************************************************/

/* Return the spot ask rate */ int GetSpotAsk( int Currency, char *String, int Length )
{
long LowQuote = BinSpot( Currency );
long HighQuote = BinSpotSpread( Currency );

/* The spot rates are zero if not available */
if ( LowQuote == 0 || HighQuote == 0 )
return( RateUnknown( String, Length ) );

/* Add the spread to get the full rate */
HighQuote += LowQuote;

/* Put the rate into the string supplied by the user */
return( LongToChar( HighQuote, String, Length,
(7 - SpotDecPoint( Currency ))) );
}

/***************************************************/

/* Return the forward bid rate */ int GetFwdBid( int Currency, char *String, int Length, int Period )
{
long LowQuote = BinFwd( Currency, Period );

if ( LowQuote == 131071 ) return( RateUnknown( String, Length ) );

/* Put the rate into the string supplied by the user */
return( LongToChar( LowQuote, String, Length, 0 ) );
}

/***************************************************/

/* Return the forward ask rate */ int GetFwdAsk( int Currency, char *String, int Length, int Period )
{
long LowQuote = BinFwd( Currency, Period );
long HighQuote = BinFwdSpread( Currency, Period );
```

```c
if ( LowQuote == 131071 || HighQuote == 1023 )
return( RateUnknown( String, Length ) );

/* Add the spread to get the full rate */
HighQuote += LowQuote;

/* Put the rate into the string supplied by the user */
return( LongToChar( HighQuote, String, Length, 0 ) );
}

/*************************************************************/

/* Return the deposit bid rate */ int GetDepositBid( int Currency, char *String, int Length, int Period )
{
long LowQuote = BinDeposit( Currency, Period );

if ( LowQuote == 3071 ) return( RateUnknown( String, Length ) );

/* Put the rate into the string supplied by the user */
return( LongToFraction( LowQuote, String, Length, 32 ) );
}

/*************************************************************/

/* Return the forward ask rate */ int GetDepositAsk( int Currency, char *String, int Length, int Period )
{
long LowQuote = BinDeposit( Currency, Period );
long HighQuote = BinDepositSpread( Currency, Period );

if ( LowQuote == 3071 || HighQuote == 1023 )
return( RateUnknown( String, Length ) );

/* Add the spread to get the full rate */
HighQuote += LowQuote;

/* Put the rate into the string supplied by the user */
return( LongToFraction( HighQuote, String, Length, 32 ) );
}

/*************************************************************/

/* Convert a long integer to a right-justified string of digits.
The returned value is the index to the first character of the string,
the last character being in the last element. The supplied value Point
is the length of the string, this is used within the function as an index.
After is the number of digits after the decimal point. The returned
value is the index to to first character. If this is zero there may
not have been room for all the digits. */ int LongToChar( long Value, char *String, int Point, int After )
{
int i, j, LastChar, Negative = 0;

LastChar = Point;

/* If the value is negative note this and make it positive */
if ( Value < 0 )
{
Negative = 1;
Value = -Value;
}

/* Initialise the array to spaces */
for ( i=0; i<LastChar; i++ ) String[i] = ' ';

/* Terminate the string with a null byte */
String[ --Point ] = 0;

/* Turn the number into at least one digit */
if ( Value == 0 ) String[ --Point ] = '0';
else
{
```

```c
while ( Value>0 && Point>0 )
{
String[ --Point ] = (char) (Value%10) + '0';
Value = Value/10;
}
}

/* We have finished if there are no places after the point, as the point
is not needed at all in this case */
if ( After == 0 )
{
/* If the number was negative add the sign */
if ( Negative ) String[ --Point ] = '-';
return( Point );
}

/* The null is at index (LastChar-1) (last position ) and the last digit
is one place before that. Calculate the index where the D.P. must go. */
i = LastChar - 2 - After;

/* Add zeros to the start of the string until there is at least one digit
before the decimal point. This occurs when the digit is where the point
will go, as digits before the point are shifted left by one in a jiffy */
while ( Point > i ) String[ --Point ] = '0';

/* Shift the digits to the left of the point, add the point */
for ( j=0; j<i; j++ ) String[j] = String[j+1];
String[i] = '.';

/* Adjust the pointer to the first digit */
Point--;

/* If the number was negative add the sign */
if ( Negative ) String[ --Point ] = '-';
return( Point );
}

/*************************************************************/

/* Convert a long integer expressing a number of (Den)nds to a right-justified
string of digits. The returned value is the index to the first character
of the string, the last character being in the last element. The supplied
value Point is the length of the string, this is used within the function
as an index. The returned value is the index to to first character.
If this is zero there may not have been room for all the digits. */ int LongToFraction( long Value, char *String, int Point, int Den )
{
int i, j, Whole, Num, LastChar, Negative = 0;

LastChar = Point;

/* If the value is negative note this and make it positive */
if ( Value < 0 )
{
Negative = 1;
Value = -Value;
}

/* Initialise the array to spaces */
for ( i=0; i<LastChar; i++ ) String[i] = ' ';

/* Terminate the string with a null byte */
String[ --Point ] = 0;

/* Split up the number into units and (Den)nds, then reduce the fraction */
Whole = (int) Value/Den;
Num = (int) Value%Den;
while ( (Num != 0) && (Num%2 == 0) )
{
Num /= 2;
Den /= 2;
}

/* If the fractional part is not zero output it, otherwise ensure
that the whole number part has at least one digit */
```

```c
if ( Num != 0 )
{
while ( Den>0 && Point>0 )
{
String[ --Point ] = (char) (Den%10) + '0';
Den = Den/10;
}
String[ --Point ] = '/';
while ( Num>0 && Point>0 )
{
String[ --Point ] = (char) (Num%10) + '0';
Num = Num/10;
}
String[ --Point ] = ' ';
}
else if ( Whole == 0 ) String[ --Point ] = '0';

while ( Whole>0 && Point>0 )
{
String[ --Point ] = (char) (Whole%10) + '0';
Whole = Whole/10;
}

/* If the number was negative add the sign */
if ( Negative && Point>0 ) String[ --Point ] = '-';
return( Point );
}

/*************************************************************/

/* Put the string UNAV into the user's string for any rate not known */ int RateUnknown( char *String, int Length )
{
static char Reversed[5] = { 0, 'V', 'A', 'N', 'U' };
int i = 0;

while ( i<5 && Length>0 ) String[ --Length ] = Reversed[ i++ ];
return( Length );
}

/*************************************************************
 *                                                           *
 * fwdpars.c - Routines to parse a forward deal              *
 *                                                           *
 * Written by Alan Stokes                                    *
 *                                                           *
 * Copyright (C) 1987 Richards Computer Products Ltd         *
 *                                                           *
 *************************************************************/ include "analdata.h"
include "fwdpars.h"
#include "read.h"
#include "forward.h"
#include "miscpars.h"
#include "insert.h"
#include "pay.h"
#include "datepars.h"
#include "period.h"
#include "comparse.h"
#include "fwdrates.h"

static int parsedirection(BOOL *);
static void numparse(void);

/* Procedure to parse a forward conversation.  If we return the result is the
 * new deal type to be used.
 */
int fwdparse( void )
{
   for (;;)
   {
```

```
    /* Whether we should read another symbol at the end of the
     * loop. */
    static BOOL readanother;
    readanother = TRUE;
    /* This procedure is called from the outermost level without reading
     * any of the conversation, so save the current status as we can safely
     * re-enter the analysis from this point */
    SaveAnalysisState();

switch (AnalysisData->symbol)
    {
case S_SWAP: case S_FWD:
    /* These are forcing words for a quote and/or the deal currencies,
     * as SWAP [10/20] [CHF/DEM].
     * Swap has a special meaning when it is SWAP LATER, which meansa
     * payment instructions are not being exchanged now.
     */
    if (AnalysisData->symbol == S_SWAP)
    {
        nextsym();
        if (AnalysisData->symbol == S_LATER)
        {
killpay();
break;
        }
    }
    else
        nextsym();

if (AnalysisData->symbol == S_NUMBER)
        if (parseforwards(TRUE))
nextsym();
    if (AnalysisData->symbol == S_CURRENCY)
        if (currencies())
nextsym();

readanother = FALSE;
    break;
case S_NUMBER:
    numparse();
    break;
case S_AT:
    /* Forcing word for the rate to deal at, or possibly the
    two actual rates if we know the difference. */
    nextsym();
    unless (AnalysisData->symbol == S_NUMBER)
    {
readanother = FALSE;
break;
}
    if ( !parseforward(TRUE) && know(t_fwd) )
backsym();
    else
    break;
case S_RATES:
    /* Forcing word for the two actual exchange rates to be used. We
     * have to be fairly tolerant of extra words, as in RATES ARE ...
     */
    nextsym();
    if (AnalysisData->symbol == S_JUNK)
        nextsym();
    if (AnalysisData->symbol != S_NUMBER) readanother = FALSE;
    else unless(parserates(TRUE)) readanother = FALSE;
    break;
case S_VAL: case S_DATES:
    /* Forcing words for the deal dates. */
    nextsym();
    unless (parsedates(TRUE))
        readanother = FALSE;
    break;
case S_MONTH:
    /* Probably the start of a date */
    parsedates(FALSE);
    break;
case S_S: case S_B: case S_BUY:
```

```
case S_SELL:
   /* Sell and buy, which is quite complicated to handle */
   {
      int result = parsedirection(&readanother);

if (result != NO_DEAL)
 return (result);
      break;
   }
case S_T: case S_O: case S_TN:
case S_SN: case S_ONITE: case S_YEAR:
case S_MTH: case S_WEEK:
   /* S_S is handled elsewhere in case it starts S/B and not S/N */
   parseperiod();
   break;
case S_YOURS: case S_PAY:
   parsepay();
   break;
case S_YOU:
case S_MINE:
   /* Normally in commonparse this signals a deal direction, but this
    * is not valid for a forward transaction so we just ignore it.
    */
   break;
default:
{
   int result = commonparse();
   if (result != NO_DEAL)
      return (result);
   readanother = FALSE;
   break;
}
   } if (readanother)
 nextsym();
   }
}

/* Handle Sell and buy, or some equivalent phrase. Notes that there is a
 * problem with S, which might start S/B or equally S/N. We only
 * accept this if both halves of the transaction are mentioned and
 * are opposites; if only one is mentioned this probably means
 * they have decided to do an outright deal.
 */
static int parsedirection(readanother)
BOOL *readanother;
{
   BOOL buy;
   BOOL almost = FALSE;
   int first = AnalysisData->symbol;
   BOOL ok;

/* This may look slightly silly, but in this context buy means
    * SELL AND BUY, so it is right.
    */
   buy = (AnalysisData->symbol == S_S ||
   AnalysisData->symbol == S_SELL);
   AnalysisData->symcount = 0;

nextsym();
   if (AnalysisData->symbol == S_SLASH ||
   AnalysisData->symbol == S_AND ||
   AnalysisData->symbol == S_N)
   {
      nextsym();
      /* This flag indicates that there is an attempt at a second
       * part, so even if it fails this does not indicate an
       * outright.
       */
      almost = TRUE;
   } switch (AnalysisData->symbol)
   {
```

```
      case S_S: case S_SELL:
ok = !buy;
break;
      case S_B: case S_BUY:
ok = buy;
break;
      default:
ok = FALSE;
break;
   } if (ok)
   {
      insertnum(t_buy, (buy == AnalysisData->speaking), st_extracted);
      nextsym();
      unless ((AnalysisData->symbol == S_NUMBER ||
      AnalysisData->symbol == S_CURRENCY) &&
      checkamount(TRUE))
   *readanother = FALSE;
   }
   else
   {
      /* Not valid. */
      backphrase();
      if (!almost && (AnalysisData->symbol == S_BUY ||
      AnalysisData->symbol == S_SELL))
   return (OUTRIGHT);

if (AnalysisData->symbol == S_S)
   parseperiod();
   } return (NO_DEAL);
}

/* Attempt to parse a number. Various different interpretations are tried,
 * with the order depending on how far we think the conversation has
 * progressed.
 */
static void numparse()
{
   /* Flags used to make sure we don't try any routine more than once. */
   BOOL triedquote = FALSE;
   BOOL triedrates = FALSE;
   BOOL trieddates = FALSE;
   BOOL triedperiod = FALSE;

unless (know(t_near) || know(t_low) ||know(t_rate))
   {
      if (parseperiod() || parsedates(FALSE))
   return;
      else
   triedperiod = trieddates = TRUE;
   }

/* If we haven't had a deal agreed (which would give rate and direction)
    * then we might get a quote. If a quote has already been made then
    * another one should be made by the same person, otherwise either person
    * might make it.
    */
   if (!know(t_buy) && !know(t_rate) && (!know(t_low) ||
   (know(t_quoter) &&
   Ticket->Quoter == AnalysisData->speaking)))
   {
      if (parseforwards(FALSE))
   return;
      else
   triedquote = TRUE;
   }

/* If the actual rate and amount are known a deal has been agreed and we
    * can expect someone to confirm what the rates are.
    */
   if (know(t_fwd) && know(t_amount))
   {
      if (parserates(FALSE))
```

```
    return;
        else
    triedrates = TRUE;
    }

/* We haven't any real idea what it can be, so just try the rest in rough
     * order of likelihood.
     */
    if (parseforward(FALSE) ||
        checkamount(FALSE) ||
        (!triedrates && parserates(FALSE)) ||
        (!trieddates && parsedates(FALSE)) ||
        (!triedperiod && parseperiod()) ||
        (!triedquote && parseforwards(FALSE)))
        return;
}

/*****************************************************************
 *                                                               *
 * fwdrates.c - Handle rates in a forward deal                   *
 *                                                               *
 * Written by Alan Stokes                                        *
 *                                                               *
 * Copyright (C) 1987 Richards Computer Products Ltd             *
 *                                                               *
 *****************************************************************/ include <string.h>
include "analdata.h"
#include "fwdrates.h"
#include "read.h"
#include "insert.h"
#include "number.h"
#include "number2.h"
#include "spot2.h"

static BOOL readrates(PSTR, PSTR);

/* Read the actual rates for a forward deal (ie the spot and outright rates
 * being used. Since this is clarifying what is already assumed by each end no
 * abbreviated forms are used for the two rates, and we just get two spot
 * rates after each other.  Each will either be in the form 1.2345 or 1.23 45.
 */
static BOOL readrates(nearrate, farrate)
PSTR nearrate, farrate;
{
    static char num[MAXWORDLEN + 1];
    static int dummy;

/* Try to read the first rate */
    strcpy(AnalysisData->numbuf, AnalysisData->symbuf);
    nextnum(num, &dummy);
    unless (strlen(num) <= RATEBYTES)
        return (FALSE);

strcpy(nearrate, num);
    if (digits(num) < 4 && AnalysisData->numbuf[0] == 0)
    {
        /* This is probably just the first half of the rate */
        if (nextnum(num, &dummy))
    unless (append(nearrate, num))
        return (FALSE);
    }

/* Now see if we can get another rate */
    if (AnalysisData->numbuf[0] == 0)
    {
        /* The first number symbol is exhausted.  Skip any separator and read
         * another number.
         */
        nextsym();
        if (AnalysisData->symbol == S_AND ||
            AnalysisData->symbol == S_N ||
            AnalysisData->symbol == S_AGAINST)
    nextsym();
```

```
      unless (AnalysisData->symbol == S_NUMBER)
   return (FALSE);
 strcpy(AnalysisData->numbuf, AnalysisData->symbuf);
      }

/* Process the second part of the number (in exactly the same way as the
       * first number).
       */
      nextnum(num, &dummy);
      unless (strlen(num) <= RATEBYTES)
          return (FALSE);

strcpy(farrate, num);
      if (digits(num) < 4 && AnalysisData->numbuf[0] == 0)
      {
          /* This is probably just the first half of the rate */
          if (nextnum(num, &dummy))
   unless (append(farrate, num))
       return (FALSE);
      }

/* Just check that we're at the end of the number now.
         If not, the rate was possibly in three parts. This is more
         likely than the start of a date cos that would probably be
         hearalded by VAL. */
      if (digits(num) < 4 && AnalysisData->numbuf[0] == 0)
      {
          if (nextnum(num, &dummy))
   unless (append(farrate, num))
       return (FALSE);
      }

/* Surely not a 4-part number !! */
      return (AnalysisData->numbuf[0] == 0);
 }

/* Parse the rates in a forward conversation */
 BOOL parserates(force)
 BOOL force;
 {
    BOOL ok = TRUE;
    static int bigfigs;
    BOOL bigfigsfound = FALSE;
    static char nearrate[RATEBYTES + 1], farrate[RATEBYTES + 1];

bigfigs = -1;
    AnalysisData->symcount = 0;

if (!(readrates(nearrate, farrate) && goodspot(nearrate) &&
    goodspot(farrate)))
        ok = FALSE;
    else if (!force && !(strlen(nearrate) >= 4 && strlen(farrate) >= 4))
        ok = FALSE;
    else
    {
        if (know(t_bigfigs))
        {
   bigfigs = AnalysisData->BigFigs;
   if (force && (getbigfigs(nearrate, &bigfigs) ||
   getbigfigs(farrate, &bigfigs)))
       bigfigsfound = TRUE;
        }
        else
        {
   if (getbigfigs(nearrate, &bigfigs) || getbigfigs(farrate, &bigfigs))
       bigfigsfound = TRUE;
        } unless (bigfigs != -1 && checkbigfigs(nearrate, bigfigs, FALSE) &&
   checkbigfigs(farrate, bigfigs, TRUE))
   ok = FALSE;
    } if (ok)
    {
```

```
   if (bigfigsfound)
      insertnum(t_bigfigs, bigfigs, st_extracted);
      insertstring(t_rate, nearrate, st_extracted);
      insertstring(t_rate2, farrate, st_extracted);
   }
   else
      backphrase();

return (ok);
}
/*****************************************************************
 *                                                               *
 * getfrx.c  Load FRXA-E and initialise fx data                  *
 *                                                               *
 * Written by Roger H. Abbott                                    *
 *                                                               *
 * Copyright (C) 1988 Richards Computer Products Ltd             *
 *                                                               *
 *****************************************************************/ include <stdio.h> include "analdata.h"
include "kprintf.h"
#include "getfrx.h"
#include "frx.h"
#include "curinfo.h"

/* The LoadFrxPages procedure has two versions. One loads the pages
from a file, the real version of LoadFrxPages will read them from Monitor */

PSTR FrxFiles[5] =
{ "FRXA.DAT", "FRXB.DAT", "FRXC.DAT", "FRXD.DAT", "FRXE.DAT" };

int LoadFrxPages( void )
{
FILE *stream;
char ch;
int i, Line, Column;

/* Open each file in turn and put it in the store. */
for ( i=0; i<5; i++ )
{
if ((stream=fopen( FrxFiles[i], "r")) == NULL)
{
Kprintf( "Can't open the file %s\n", (LPSTR) FrxFiles[i] );
return( FALSE );
}

/* Load the file. */
for ( Line=0; Line<MonLines; Line++ )
{
for ( Column=0; Column<MonCols; Column++)
{
if ((ch= (char) getc(stream)) == EOF)
{ fclose(stream);
Kprintf( "\nUnexpected end of file %s\n",
(LPSTR) FrxFiles[i] );
return( FALSE );
};
MonitorPageAddress[i]->PackedInfo[Line][Column] = ch;
}; /* End of column loop, look for newline */
if ((ch= (char) getc(stream)) != '\n')
{ fclose(stream);
Kprintf( "\nNo newline where expected %s\n",
(LPSTR) FrxFiles[i] );
return( FALSE );
};
}; /* End of line loop */
fclose(stream);
}; /* End of file loop */ return( TRUE );
} /* End of procedure LoadFrxPages() */
```

```
/************************************************************
 *                                                          *
 * initpars.c - Initial parsing (deal type unknown)         *
 *                                                          *
 * Written by Alan Stokes                                   *
 *                                                          *
 * Copyright (C) 1987 Richards Computer Products Ltd        *
 *                                                          *
 ************************************************************/ include "analdata.h"
include "initpars.h"
#include "insert.h"
#include "read.h"
#include "miscpars.h"
#include "comparse.h"
#include "period.h"
#include "datepars.h"
#include "curinfo.h"

/* Procedure to parse a conversation when the deal type is unknown. As soon
 * as we know the deal type the procedure returns with the deal type.
 */
int initparse()
{
    /* Sit in a loop interpreting each symbol */
    for (;;)
    {
    BOOL readanother = TRUE;

/* This procedure is called from the outermost level without reading
     * any of the conversation, so save the current status as we can safely
     * re-enter the analysis from this point */
    SaveAnalysisState();

switch (AnalysisData->symbol)
        {
    case S_SWAP: case S_FWD:
        /* Indicates a forward swap deal */
        return (SWAP);
    case S_SPOT:
        /* Might be dates (SPOT TO 1 JUL), otherwise indicates a spot
         * deal.
         */
        unless (parsedates(FALSE))
            return (SPOT);
        break;
    case S_TT: case S_TODAY: case S_TOM:
        /* Funny periods which are always for a spot deal. */
        return (SPOT);
    case S_CURRENCY:
        /* If we don't know any currencies yet this is probably an
         * indication of them, otherwise someone is indicating a deal
         * amount.
         */
        if (know(t_cur1))
            checkamount(FALSE);
        else
            currencies();
        break;
    case S_AMOUNT: case S_FOR:
        /* If it is sensible these are forcing words for the amount. */
        nextsym();
        unless ((AnalysisData->symbol == S_NUMBER ||
        AnalysisData->symbol == S_CURRENCY) &&
                    checkamount(TRUE))
    readanother = FALSE;
        break;
    case S_MINE: case S_YOURS:
        /* These are a reasonably good indicator of a spot deal at this
         * stage.
         */
        return (SPOT);
    case S_YOU:
        /* If this is a you buy/you sell then it indicates a deal is being
```

```c
 * agreed.
 */
nextsym();
if (AnalysisData->symbol == S_BUY ||
    AnalysisData->symbol == S_SELL)
        /* Either a deposit or a spot (forwards don't allow you ...);
 * if there is a period it can't be a spot, otherwise assume it
 * is.
 */
        {
        if (know(t_period))
   return (DEPOSIT);
        else
   return (SPOT);
}

/* Process the extra symbol */
        readanother = FALSE;
        break;
  case S_S: case S_B: case S_BUY:
  case S_SELL:
    /* This is complicated. If it is something like BUY AND SELL (or
     * B S) it is a forward; BUY or SELL on their own mean an ordinary
     * deal, which may be spot or deposit.
     */
    {
        int first = AnalysisData->symbol;

/* Save where we are for backtracking */
        AnalysisData->symcount = 0;

nextsym();
        /* Various separators are allowed for BUY AND SELL; skip them
 * if present.
        */
        if (AnalysisData->symbol == S_SLASH ||
        AnalysisData->symbol == S_AND ||
        AnalysisData->symbol == S_N)
   nextsym();

switch (AnalysisData->symbol)
        {
  case S_S: case S_B: case S_BUY:
  case S_SELL:
    /* We've found one. Go back and leave fwdparse() to work
     * out what it means.
     */
    backphrase();
    return (SWAP);
  default:
    /* Not BUY AND SELL. B and S on their own are
     * meaningless; otherwise an indication of a deal being
     * made.
     */
    backphrase();
    if (first == S_BUY || first == S_SELL)
if (know(t_period))
    return (DEPOSIT);
else
    return (SPOT);
        else
/* A B is ignored; for a single S we fall through to
 * the next routine (yes, I know this is horrible).
 */
if (first == S_B)
   break;
        }
    }
  /* case S_S: falls through from above */
  case S_T: case S_O: case S_ONITE:
  case S_TN: case S_SN: case S_YEAR:
  case S_MTH: case S_WEEK:
     /* This indicates the beginning of a period */
     parseperiod();
     break;
```

```c
    case S_VAL: case S_DATES:
       /* Forcing words for the value dates (more likely to be dates
        * than a single date, which is only for spot and usually done
        * late in the conversation if at all).
        */
       nextsym();
       unless (parsedates(TRUE))
          readanother = FALSE;
       break;
    case S_NUMBER:
       /* A number with no words we understood in front of it. At
        * this stage if it is a period we can continue, otherwise it
        * must be part of the deal information, so we should try and
        * work out the deal type.
        */
       if (parseperiod())
          break;
       /* fall through to code to guess deal type */
    case S_AT:
       if (know(t_period))
       {
          /* Can't be a spot, work out which of the others it is
     * (next likeliest is swap, unless that's impossible).
     */
          if (know(t_cur1) && Ticket->Currency1 == Dollar)
      return (DEPOSIT);
          else
      return (SWAP);
       }
       else
          return (SPOT);  /* The likeliest case */
    case S_COUNTERPARTY: case S_COMMENT: case S_DIGIT:
    case S_DEP: case S_OUTRIGHT: case S_ME: case S_WRAP:
       {
          /* These are handled in the ordinary way */
          int res = commonparse();
          if (res != NO_DEAL)
      return (res);  /* A new deal type was detected */

/* commonparse has already read a symbol */
          readanother = FALSE;
          break;
       }
    case S_JUNK: case S_ENDLINE:
    default:
       /* Ignore it, whatever it is */
       break;
         }
         /* Read the next symbol and continue */
         if (readanother) nextsym();
      }
}
/************************************************************************
 *                                                                      *
 * insert.c - Routines to insert and manipulate the ticket              *
 *                                                                      *
 * Written by Alan Stokes                                               *
 *                                                                      *
 * Copyright (C) 1987 Richards Computer Products Ltd                    *
 *                                                                      *
 ************************************************************************/ include <string.h> include "cadata.h"
include "caserver.h"
#include "insert.h"
#include "debug.h"
#include "pay.h"
#include "number.h"
#include "period.h"
#include "curinfo.h"
#include "spot2.h"
#include "dateproc.h"
#include "date.h"
#include "query.h"
```

```c
#include "read.h"
#include "ca_pmt.h"
#include "lstring.h"

static void deduce(FIELDNAME, BOOL);
static void commoninsert(FIELDNAME, FIELDSTATUS, int);
static void deducedir(FIELDNAME, int (*)(PSTR, PSTR));
static void depositdir(void);
static void CopyTktref(TKTREF far *tktref, LPSTR string, int MaxLen);

/* Common processing after a value has been inserted into the ticket */
static void commoninsert(field, newstatus, valchanged)
FIELDNAME field;
FIELDSTATUS newstatus;
int valchanged;
{
   AnalysisData->TicketItemStatus[field] = newstatus;

/* Display what we have done for debugging purposes */
   echo(field, valchanged);

/* If the position in the conversation is later than the last time
   the output ticket value was changed, then we have to transfer the
   value to the output ticket if it has changed. */
   if ( AnalysisData->BufPos > AnalysisData->LastInsertPos[ field ] &&
   valchanged )
CopyToOutputTicket( field );

/* If we have got a reasonable way into the conversation we can
    * try to see what deductions are available.
    */
   if (know(t_quoter))
   {
       if (newstatus != st_deduced)  /* (Avoids infinite recursion) */
 deduce(field, valchanged);
       check(field, valchanged);  /* Check the values in the ticket */
       setstatus();  /* See if we can change the ticket status */
   }
}

/* Copy the value in the working ticket into the output ticket.
This procedure is not called unless the text position is later than the
last time the same entry was changed and the working ticket value has
changed. Add to the list of changed entries. */
void CopyToOutputTicket( FIELDNAME field )
{
switch ( field )
{
case t_status:
OutputTicket->Status = Ticket->Status;
AddChange( TKT_STATUS );
break;
case t_deal:
OutputTicket->DealType = Ticket->DealType;
AddChange( TKT_DEALTYPE );
break;
case t_quoter:
OutputTicket->Quoter = Ticket->Quoter;
AddChange( TKT_QUOTER );
break;
case t_buy:
OutputTicket->Buyer = Ticket->Buyer;
AddChange( TKT_BUYER );
break;
case t_cur1:
OutputTicket->Currency1 = Ticket->Currency1;
AddChange( TKT_CURRENCY1 );

/* If needed, clear or send a big figures message */
   if ( CAFRXASpotRate( Ticket->Currency1 ) == (LPSTR) NULL &&
   Ticket->Currency1 != Dollar &&
      !CurrentConv->NotOnFRXADisplayed )
   {
   SendAnalysisInconsistent( REASON_NOT_ON_FRXA );
   CurrentConv->NotOnFRXADisplayed = TRUE;
   }
```

```c
else if ( CAFRXASpotRate( Ticket->Currency1 ) != (LPSTR) NULL &&
CurrentConv->NotOnFRXADisplayed )
{
SendAnalysisInconsistent( REASON_GOOD );
CurrentConv->NotOnFRXADisplayed = FALSE;
}
break;
case t_cur2:
OutputTicket->Currency2 = Ticket->Currency2;
AddChange( TKT_CURRENCY2 );
break;
case t_amountcur:
OutputTicket->AmountCurr = Ticket->AmountCurr;
AddChange( TKT_AMOUNTCURR );
break;
case t_quotecur:
OutputTicket->QuoteCurr = Ticket->QuoteCurr;
AddChange( TKT_QUOTECURR );
break;
case t_period:
OutputTicket->Period = Ticket->Period;
AddChange( TKT_PERIOD );
break;
case t_amount:
lstrcpy(OutputTicket->Amount, Ticket->Amount);
AddChange( TKT_AMOUNT );
break;
case t_low:
lstrcpy(OutputTicket->LowQuote, Ticket->LowQuote);
AddChange( TKT_LOWQUOTE );
break;
case t_high:
lstrcpy(OutputTicket->HighQuote, Ticket->HighQuote);
AddChange( TKT_HIGHQUOTE );
break;
case t_rate:
lstrcpy(OutputTicket->DealRate, Ticket->DealRate);
AddChange( TKT_DEALRATE );
if ( CurrentConv->NotOnFRXADisplayed )
{
SendAnalysisInconsistent( REASON_GOOD );
CurrentConv->NotOnFRXADisplayed = FALSE;
}
break;
case t_fwd:
lstrcpy(OutputTicket->ActualDiff, Ticket->ActualDiff);
AddChange( TKT_ACTUALDIFF );
break;
case t_rate2:
lstrcpy(OutputTicket->FarRate, Ticket->FarRate);
AddChange( TKT_FARRATE );
break;
case t_dealer:
lstrcpy(OutputTicket->DealerID, Ticket->DealerID);
AddChange( TKT_DEALER );
break;
case t_mypay:
OutputTicket->OurPay1 = Ticket->OurPay1;
CopyTktref( &OutputTicket->OurPay1,
OutputTicket->OurPay1Val, LINELEN );
AddChange( TKT_OURPAY1 );
AddChange( TKT_OURPAY1VAL );
if ( know(t_deal) && OutputTicket->DealType == DEPOSIT )
{
OutputTicket->OurPay2 = Ticket->OurPay1;
CopyTktref( &OutputTicket->OurPay2,
OutputTicket->OurPay2Val, LINELEN );
AddChange( TKT_OURPAY2 );
AddChange( TKT_OURPAY2VAL );
}
break;
case t_yourpay:
OutputTicket->TheirPay1 = Ticket->TheirPay1;
CopyTktref( &OutputTicket->TheirPay1,
OutputTicket->TheirPay1Val, LINELEN );
AddChange( TKT_THEIRPAY1 );
```

```c
AddChange( TKT_THEIRPAY1VAL );
if ( know(t_deal) && OutputTicket->DealType == DEPOSIT )
{
OutputTicket->TheirPay2 = Ticket->TheirPay1;
CopyTktref( &OutputTicket->TheirPay2,
OutputTicket->TheirPay2Val, LINELEN );
AddChange( TKT_THEIRPAY2 );
AddChange( TKT_THEIRPAY2VAL );
}
break;
case t_mypay2:
OutputTicket->OurPay2 = Ticket->OurPay2;
CopyTktref( &OutputTicket->OurPay2,
OutputTicket->OurPay2Val, LINELEN );
AddChange( TKT_OURPAY2 );
AddChange( TKT_OURPAY2VAL );
break;
case t_yourpay2:
OutputTicket->TheirPay2 = Ticket->TheirPay2;
CopyTktref( &OutputTicket->TheirPay2,
OutputTicket->TheirPay2Val, LINELEN );
AddChange( TKT_THEIRPAY2 );
AddChange( TKT_THEIRPAY2VAL );
break;
case t_comment:
/* For a new comment we must convert both to strings, as in general
both will have changed */
OutputTicket->Comment1 = Ticket->Comment1;
CopyTktref( &OutputTicket->Comment1,
OutputTicket->Comment1Val, LINELEN );
OutputTicket->Comment2 = Ticket->Comment2;
CopyTktref( &OutputTicket->Comment2,
OutputTicket->Comment2Val, LINELEN );
AddChange( TKT_COMMENT1 );
AddChange( TKT_COMMENT1VAL );
AddChange( TKT_COMMENT2 );
AddChange( TKT_COMMENT2VAL );
break;
case t_counterparty:
OutputTicket->TrueCp = Ticket->TrueCp;
CopyTktref( &OutputTicket->TrueCp,
OutputTicket->TrueCpVal, LINELEN );
OutputTicket->Flags.ViaBroker = TRUE;
AddChange( TKT_TRUECP );
AddChange( TKT_TRUECPVAL );
AddChange( TKT_FLAGS );
break;
case t_near:
/* The outside world is not interested in the near date
of an outright deal */
if ( know( t_deal ) && Ticket->DealType == OUTRIGHT )
return;
OutputTicket->NearDate1 = Ticket->NearDate1;
OutputTicket->NearDate2 = Ticket->NearDate2;
AddChange( TKT_NEARDATE1 );
AddChange( TKT_NEARDATE2 );
break;
case t_far:
if ( know( t_deal ) && Ticket->DealType == OUTRIGHT )
{
OutputTicket->NearDate1 = Ticket->FarDate1;
OutputTicket->NearDate2 = Ticket->FarDate2;
AddChange( TKT_NEARDATE1 );
AddChange( TKT_NEARDATE2 );
}

OutputTicket->FarDate1 = Ticket->FarDate1;
OutputTicket->FarDate2 = Ticket->FarDate2;
AddChange( TKT_FARDATE1 );
AddChange( TKT_FARDATE2 );
break;
default:
    /* Other items are not in the output ticket. */
return;
}
```

```c
/* We must update the position of last change, even in the unlikely case
that the value was actually the same. */
AnalysisData->LastInsertPos[ field ] = AnalysisData->BufPos;

EchoOutput( field );

/* If we set the near date for the external world, we
must echo this as well. */
if ( know(t_deal) && Ticket->DealType == OUTRIGHT && field == t_far)
EchoOutput( t_near );
}

/******************************************************/

/* Procedure to insert a new numeric value into the ticket with a new status.
 */
void insertnum(field, value, newstatus)
FIELDNAME field;
int value;
FIELDSTATUS newstatus;
{
   FIELDSTATUS oldstatus = AnalysisData->TicketItemStatus[field];
   /* We must register a change if the field was previously unknown. */
   BOOL valchanged = oldstatus == st_unknown;

/* If we are inserting into the ticket we have found something
    * useful, so we cannot be in a payment instruction
    */
   AnalysisData->foundpay = FALSE;

/* Now put the new value in if it has changed */
switch ( field )
   {
   case t_deal:
   if ( value != Ticket->DealType)
   {
   valchanged = TRUE;
   Ticket->DealType = value;
   }
   break;
   case t_quoter:
   if ( value != Ticket->Quoter)
   {
   valchanged = TRUE;
   Ticket->Quoter = value;
   }
   break;
   case t_buy:
   if ( value != Ticket->Buyer)
   {
   valchanged = TRUE;
   Ticket->Buyer = value;
   }
   break;
   case t_cur1:
   if ( value != Ticket->Currency1)
   {
   valchanged = TRUE;
   Ticket->Currency1 = value;
   }
   break;
   case t_cur2:
   if ( value != Ticket->Currency2)
   {
   valchanged = TRUE;
   Ticket->Currency2 = value;
   }
   break;
   case t_amountcur:
   if ( value != Ticket->AmountCurr)
   {
   valchanged = TRUE;
   Ticket->AmountCurr = value;
   }
   break;
```

```c
    case t_quotecur:
    if ( value != Ticket->QuoteCurr )
    {
    valchanged = TRUE;
    Ticket->QuoteCurr = value;
    }
    break;
    case t_bigfigs:
    if ( value != AnalysisData->BigFigs)
    {
    valchanged = TRUE;
    AnalysisData->BigFigs = value;
    }
    break;
    case t_period:
    if ( value != Ticket->Period)
    {
    valchanged = TRUE;
    Ticket->Period = value;
    }
    break;
    }

/* Now perform common processing if anything has changed,
the status may have changed even if the value hasn't */
if ( valchanged || newstatus != oldstatus )
commoninsert(field, newstatus, valchanged);
}

/* Procedure to insert a new string value into the ticket with a new status.
 */
void insertstring(field, value, newstatus)
FIELDNAME field;
PSTR value;
FIELDSTATUS newstatus;
{
    FIELDSTATUS oldstatus = AnalysisData->TicketItemStatus[field];
    /* We must register a change if the field was previously unknown. */
    BOOL valchanged = oldstatus == st_unknown;

/* If we are inserting into the ticket we have found something
     * useful, so we cannot be in a payment instruction
     */
    AnalysisData->foundpay = FALSE;

/* Now put the new value in if it has changed */
switch ( field )
    {
    case t_amount:
    if ( strcmp(Ticket->Amount, value) != 0 )
    {
    valchanged = TRUE;
    strcpy(Ticket->Amount, value);
    }
    break;
    case t_low:
    if ( strcmp(Ticket->LowQuote, value) != 0 )
    {
    valchanged = TRUE;
    strcpy(Ticket->LowQuote, value);
    }
    break;
    case t_high:
    if ( strcmp(Ticket->HighQuote, value) != 0 )
    {
    valchanged = TRUE;
    strcpy(Ticket->HighQuote, value);
    }
    break;
    case t_rate:
    if ( strcmp(Ticket->DealRate, value) != 0 )
    {
    valchanged = TRUE;
    strcpy(Ticket->DealRate, value);
    }
    break;
```

```c
    case t_fwd:
    if ( strcmp(Ticket->ActualDiff, value) != 0 )
    {
    valchanged = TRUE;
    strcpy(Ticket->ActualDiff, value);
    }
    break;
    case t_rate2:
    if ( strcmp(Ticket->FarRate, value) != 0 )
    {
    valchanged = TRUE;
    strcpy(Ticket->FarRate, value);
    }
    break;
    }
/* Now perform common processing if anything has changed,
the status may have changed even if the value hasn't */
if ( valchanged || newstatus != oldstatus )
commoninsert(field, newstatus, valchanged);
}

/* Procedure to insert a new text value into the ticket with a new status.
 */
void inserttext(FIELDNAME field, TEXTPOS *value, FIELDSTATUS newstatus)
{
FIELDSTATUS oldstatus = AnalysisData->TicketItemStatus[field];
static TKTREF TicketReference;

/* Convert the CA type of text reference to that required for the ticket. */
TicketReference.Row = value->Srow;
TicketReference.Col = value->Scol;
TicketReference.Count = value->Epos - value->Spos + 1;
TicketReference.DbPos = value->Spos;

/* If we are inserting into the ticket we have found something
     * useful, so we cannot be in a payment instruction
     */
    AnalysisData->foundpay = FALSE;

/* We assume that the value has changed */
    switch ( field )
        {
        case t_mypay:
Ticket->OurPay1 = TicketReference;
break;
        case t_yourpay:
Ticket->TheirPay1 = TicketReference;
break;
        case t_mypay2:
Ticket->OurPay2 = TicketReference;
break;
        case t_yourpay2:
Ticket->TheirPay2 = TicketReference;
break;
        case t_comment:
        /* If there are no comment lines yet, this comment becomes 1. */
if ( Ticket->Comment1.Count == 0 )
Ticket->Comment1 = TicketReference;
/* If there is only one comment already this one becomes 2. */
else if ( Ticket->Comment2.Count == 0 )
Ticket->Comment2 = TicketReference;
/* Otherwise the previous 2 becomes 1 and this one is 2. */
else
{
Ticket->Comment1 = Ticket->Comment2;
Ticket->Comment2 = TicketReference;
}
break;
        case t_counterparty:
Ticket->TrueCp = TicketReference;
break;
        case t_dealer:
        /* The dealer ID field in the ticket is the string value only,
        although the analysis has delivered it as a TEXTPOS reference. */
CopyTktref( &TicketReference, Ticket->DealerID, DEALERIDBYTES );
        }
```

```c
   /* Now perform common processing */
   commoninsert(field, newstatus, TRUE);
}

/* Procedure to insert a new date value into the ticket with a new status.
 */
void insertdate(field, value, newstatus)
FIELDNAME field;
SPLITDATE *value;
FIELDSTATUS newstatus;
{
    static SPLITDATE TicketDate;

FIELDSTATUS oldstatus = AnalysisData->TicketItemStatus[field];
    /* We must register a change if the field was previously unknown. */
    BOOL valchanged = oldstatus == st_unknown;

/* If we are inserting into the ticket we have found something
     * useful, so we cannot be in a payment instruction
     */
    AnalysisData->foundpay = FALSE;

/* Now put the new value in if it has changed */
switch ( field )
    {
    case t_near:
    /* Convert the date currently in the ticket into a split date
so that we can compare them */
TicketDate.date1 = Ticket->NearDate1;
TicketDate.date2 = Ticket->NearDate2;

if ( !samesplit(&TicketDate, value) )
    {
    valchanged = TRUE;
    Ticket->NearDate1 = value->date1;
    Ticket->NearDate2 = value->date2;
    }
    break;
    case t_far:
    TicketDate.date1 = Ticket->FarDate1;
TicketDate.date2 = Ticket->FarDate2;

if ( !samesplit(&TicketDate, value) )
    {
    valchanged = TRUE;
    Ticket->FarDate1 = value->date1;
    Ticket->FarDate2 = value->date2;
    }
    break;
     }

/* Now perform common processing if anything has changed,
the status may have changed even if the value hasn't */
if ( valchanged || newstatus != oldstatus )
commoninsert(field, newstatus, valchanged);
}

/* Make deductions from the value just inserted into the ticket. */
static void deduce(FIELDNAME field, BOOL valchanged)
{
    switch (field)
    {
        case t_amountcur:
    /* Normally the amount is specified in the currency the rate is
     * quoted in - ie for CHF, quoted per dollar, the amount currency is
     * usually the dollar, whereas for the GBP it is the pound.
     */
    if (AnalysisData->TicketItemStatus[t_quotecur] <= st_assumed)
       insertnum(t_quotecur, Ticket->AmountCurr, st_assumed);
    /* Fall through ... */
        case t_quotecur:
    unless (valchanged)
       break;
    /* Keep on falling ... */
        case t_low: case t_high: case t_fwd:
        case t_rate: case t_buy:
```

```c
/* We may be able to deduce the deal direction */
switch (Ticket->DealType)
{
   case SWAP:
      /* The rate field isn't any help for a swap, only the others.
*/
      unless (field == t_rate)
 /* Deduce the direction from the forward rate for the deal.
  */
 deducedir(t_fwd, compareforward);
      break;
   case SPOT:
   case OUTRIGHT:
      /* Deduce the direction from the rate selected */
      deducedir(t_rate, comparenum);
      break;
   case DEPOSIT:
      depositdir();
      break;
}
break;
      case t_cur1:
      case t_cur2:
unless (valchanged)
   break;

/* If we know what the currency is this should tell us which way
 * round it is quoted (for crosses the user has to specify it since
 * there aren't any conventions we can use.
 */
if (know(t_cur2) && Ticket->Currency2 == Dollar && know(t_cur1))
{
   int def;

if ( !SwiftcodeTable[ Ticket->Currency1 ].IsInverse )
      def = 2;
   else
      def = 1;

if (AnalysisData->TicketItemStatus[t_amountcur] < st_extracted)
      insertnum(t_amountcur, def, st_deduced);

if (AnalysisData->TicketItemStatus[t_quotecur] < st_extracted)
      insertnum(t_quotecur, def, st_deduced);
}

/* If possible we would also like to know what the big figures of the
 * spot rate are.
 */
if (know(t_cur1) &&
AnalysisData->TicketItemStatus[t_bigfigs] < st_extracted)
{
   static char spot[RATEBYTES + 1];
   static int bigfigs;

if (assumespot(spot) && getbigfigs(spot, &bigfigs))
      insertnum(t_bigfigs, bigfigs, st_assumed);
}
break;
      case t_near:
/* If the date changes we may be able to get the period */
if (valchanged)
   guessperiod();
break;
      case t_far:
/* If we get a new far date we can try to guess the period */
guessperiod();
break;
   }
}

/* Deduce the direction of a deal from the rate chosen, or the rate from the
 * direction.  The deal rate (which should be one of t_fwd or t_rate) is in
 * rate, and compare is a routine which will compare the rates.
 */
```

```
static void deducedir(rate, compare)
FIELDNAME rate;
int (*compare)(PSTR, PSTR);
{
   unless (know(t_low) && know(t_high) && know(t_quoter))
      return;

if (AnalysisData->TicketItemStatus[(int) rate] < st_extracted)
   {
      if (AnalysisData->TicketItemStatus[t_buy] == st_extracted)
      {
/* We know the direction, and can try to deduce the rate.
 * This depends on which way the transaction is going, and who made
 * the quote (since the person making the quote makes the gain from
 * the spread).
 */
BOOL low = (Ticket->Buyer == Ticket->Quoter);
PSTR result;

if (Ticket->AmountCurr != Ticket->QuoteCurr)
   /* But if we are dealing in the wrong currency then buying is
    * really selling the correct currency, and so changes the rate.
    */
   low = !low;

if (low)
   result = Ticket->LowQuote;
else
   result = Ticket->HighQuote;

insertstring(rate, result, st_deduced);
      }
   }
   else if (AnalysisData->TicketItemStatus[t_buy] < st_extracted)
   {
      /* We know the rate so we can deduce the direction. */
      BOOL buy;
      PSTR AcceptedRate;

if ( rate == t_fwd )
         AcceptedRate = Ticket->ActualDiff;
      else AcceptedRate = Ticket->DealRate;

/* See if the rate is the same as either part of the quote. */
      if ((*compare)(AcceptedRate, Ticket->LowQuote) == 0)
buy = TRUE;
      else if ((*compare)(AcceptedRate, Ticket->HighQuote) == 0)
buy = FALSE;
      else
/* Not the same as the quote - we can't do anything */
return;

/* If the amounbt is the wrong currency the sense of t_buy is reversed.
       */
      if (Ticket->AmountCurr != Ticket->QuoteCurr)
buy = !buy;

/* If the other party made the quote we again have to reverse the sense.
       */
      if ( Ticket->Quoter == THEM)
buy = !buy;

insertnum(t_buy, buy, st_deduced);
   }
}

/* Attempt to deduce the direction of a deposit transaction, or the rate to be
 * used. This is fairly simple since we don't need to worry about two
 * currencies, or how currencies are quoted.
 */
static void depositdir()
{
   /* We must have had a quote from someone to be able to deduce anything */
   unless (know(t_low) && know(t_high) && know(t_quoter))
      return;
```

```
   if (AnalysisData->TicketItemStatus[t_rate] < st_extracted)
   {
      /* See if we can work out the rate */
      if (AnalysisData->TicketItemStatus[t_buy] == st_extracted)
      {
if (Ticket->Buyer == Ticket->Quoter)
   insertstring(t_rate, Ticket->LowQuote, st_deduced);
else
   insertstring(t_rate, Ticket->HighQuote, st_deduced);
      }
   }
   else if (AnalysisData->TicketItemStatus[t_buy] < st_extracted)
   {
      /* See if we can get the direction */
      if (AnalysisData->TicketItemStatus[t_rate] == st_extracted)
      {
BOOL buy;
PSTR rate = Ticket->DealRate;

if (strcmp(rate, Ticket->LowQuote) == 0)
   buy = TRUE;
else if (strcmp(rate, Ticket->HighQuote) == 0)
   buy = FALSE;
else
   /* Don't understand it */
   return;

if ( Ticket->Quoter == THEM )
   buy = !buy;

insertnum(t_buy, buy, st_deduced);
      }
   }
}

/*****************************************************/

/* Set the ticket status depending on the values in the ticket.
This procedure is only called when adding items to the ticket
as a result of analysis. We assume that if the status reverts
to NO_DEAL or INCOMPLETE then it must be as a result of backing up,
and was therefore EXTRACTED at the most as it cannot have been
in Wrap-up. If the appropriate status is EXTRACTED we do not
change it if one of the special keys has been used to force a status.
i.e. the status must be one of NO_DEAL or INCOMPLETE. */ void setstatus( void )
{
   int status = NO_DEAL;
   int deal = Ticket->DealType;

/* First work out what the status would be on the basis of whats
    * known about the ticket. */ if ( know(t_deal) )
   switch (deal)
   {
      case SWAP:
if ((know(t_buy) && know(t_fwd)) || know(t_rate) || know(t_rate2))
{
   status = INCOMPLETE;
   if (know(t_cur1) && know(t_cur2) && know(t_far) &&
    know(t_near) && know(t_amount) && know(t_rate)
    && know(t_rate2) && know(t_buy))
      status = EXTRACTED;
}
break;
      case SPOT: case OUTRIGHT:
if (know(t_buy) && know(t_rate))
{
   status = INCOMPLETE;
   if (know(t_cur1) && know(deal == SPOT ? t_near : t_far) &&
    know(t_amount))
      status = EXTRACTED;
}
```

```
         break;
             case DEPOSIT:
         if (know(t_buy) && know(t_rate))
         {
            status = INCOMPLETE;
            if (know(t_cur1) && know(t_near) && know(t_far) && know(t_amount))
                status = EXTRACTED;
         }
         break;
      }

/* Now see if we have to change the status of our ticket and
       * the external ticket. */ if ( status != EXTRACTED ||
       Ticket->Status == NO_DEAL || Ticket->Status == INCOMPLETE )
      {
       Ticket->Status = status;
       AnalysisData->TicketItemStatus[ t_status ] = st_extracted;
       echo( t_status, TRUE );

/* If the position in the conversation is the same as or later
       than the last time the output ticket value was changed, then we
       have to transfer the value to the output ticket. This is because
       the status can change more than once at the same text position. */
       if ( AnalysisData->BufPos >=
        AnalysisData->LastInsertPos[ t_status ] )
    CopyToOutputTicket( t_status );

if ( status == EXTRACTED && !Ticket->Flags.IsExtracted )
       {
    Ticket->Flags.IsExtracted = TRUE;
    OutputTicket->Flags.IsExtracted = TRUE;
    AddChange( TKT_FLAGS );
       }
      }
    }

/*****************************************/

/* Return whether the value of a field is known */
BOOL know(field)
FIELDNAME field;
{
    return ( AnalysisData->TicketItemStatus[field] > st_unknown);
}

/*****************************************/

/* Remove a field from the ticket. */
void delfield( FIELDNAME field )
{
 unless ( know(field) )
 return;

unless ( field == t_comment )
 AnalysisData->TicketItemStatus[ field ] = st_unknown;

switch ( field )
    {
     case t_deal:
     Ticket->DealType = TKT_UNKNOWN;
     break;
     case t_quoter:
     Ticket->Quoter = TKT_UNKNOWN;
     break;
     case t_buy:
     Ticket->Buyer = TKT_UNKNOWN;
     break;
     case t_cur1:
     Ticket->Currency1 = TKT_UNKNOWN;
     break;
     case t_cur2:
     Ticket->Currency2 = TKT_UNKNOWN;
     break;
```

```c
    case t_amountcur:
    Ticket->AmountCurr = TKT_UNKNOWN;
    break;
    case t_quotecur:
        SetQuery(field, FALSE);
    Ticket->QuoteCurr = TKT_UNKNOWN;
    break;
    case t_period:
    Ticket->Period = TKT_UNKNOWN;
    break;
    case t_amount:
        Ticket->Amount[0] = '\0';
    break;
    case t_low:
       SetQuery(field, FALSE);
    Ticket->LowQuote[0] = '\0';
    break;
    case t_high:
        SetQuery(field, FALSE);
    Ticket->HighQuote[0] = '\0';
    break;
    case t_rate:
    SetQuery(field, FALSE);
    Ticket->DealRate[0] = '\0';
    break;
    case t_fwd:
       SetQuery(field, FALSE);
    Ticket->ActualDiff[0] = '\0';
    break;
    case t_rate2:
       SetQuery(field, FALSE);
    Ticket->FarRate[0] = '\0';
    break;
    case t_mypay:
Ticket->OurPay1.Count = 0;
break;
    case t_yourpay:
Ticket->TheirPay1.Count = 0;
break;
    case t_mypay2:
Ticket->OurPay2.Count = 0;
break;
    case t_yourpay2:
Ticket->TheirPay2.Count = 0;
break;
    case t_counterparty:
Ticket->TrueCp.Count = 0;
break;
    case t_comment:
    /* If there is a comment2 delete that, otherwise if
there is a comment1 delete that, else ignore */
if ( Ticket->Comment2.Count != 0 )
Ticket->Comment2.Count = 0;
else if ( Ticket->Comment1.Count != 0 )
Ticket->Comment1.Count = 0;
else
return;
break;
    case t_near:
    SetQuery(field, FALSE);
Ticket->NearDate1 = 0xFFFF;
Ticket->NearDate2 = 0xFFFF;
break;
    case t_far:
    SetQuery(field, FALSE);
Ticket->FarDate1 = 0xFFFF;
Ticket->FarDate2 = 0xFFFF;
break;
    default:
    /* Dont copy to output ticket */
return;
    }
    CopyToOutputTicket( field );
}

/****************************************************/
```

```
/* This procedure, given a TKTREF field, puts the text it refers to into a
 * string.
 */
void CopyTktref(TKTREF far *tktref, LPSTR string, int MaxLen)
{
   int Point = tktref->DbPos;
   int pos = 0;
   int Epos = tktref->DbPos + tktref->Count;

/* Copy as much of the text as we can */
   while ( Point < Epos && MaxLen > 0 )
   {
      string[pos] = AnalysisData->ConvText[Point++];
      if ( (string[pos] & CF_LINESTART) == 0 )
      pos++, MaxLen--;
   }
   string[pos] = '\0';
}

/*
 *
 * Kernel printf function
 *
 * $Header:   V:/caserver/overlay/ca/kprintf.c_v   1.2   18 Aug 1988 15:44:18   Graham $
 *
 * $Revision:   1.2 $
 *
 * $Date:   18 Aug 1988 15:44:18 $
 *
 *$Author:   Graham $
 *
 * $Logfile:   V:/caserver/overlay/ca/kprintf.c_v $
 *
 * $Workfile:   kprintf.c $
 *
 * $Log:   V:/caserver/overlay/ca/kprintf.c_v $
 *
 *    Rev 1.2   18 Aug 1988 15:44:18   Graham
 * Intermediate revision
 *
 *    Rev 1.0   25 May 1988 16:26:18   Graham
 * Initial revision.
 */
/*
 * Provides a 'printf' equivalent for the Server Overlays. The use of
 * 'far' data items is suported. In fact all pointer parameters to
 * this function MUST be far and the format string must specify the
 * far modifyer when pointer parameters are expected. e.g. for a
 * string the usual printf format string would be %s. This must be
 * changed to %Fs for far data pointers.
 */ include <stdarg.h>
include <stdio.h>
include <malloc.h>
#include <graph.h>
#include "Kwin.h"
#include "types.h"
#include "Kprintf.h"
#include "lstring.h"

staticcharbuffer[512];

void FAR CDECLKernelKprintf(LPSTR fmt, ...)
{
   WORDOverlay = CurrentOverlay;
   char*lfmt = alloca(lstrlen(fmt) + 1);
   char*lp = lfmt;
   va_list(args);

while (*lp++ = *fmt++);/* Copy FAR string to NEAR string*/
   va_start(args, fmt);
```

```c
/*
 * Now lets set up the correct window, coordinates and screen
 * colours for the display unless the current display page is the
 * same as the one for the current overlay
 */ if (CurrentPage != ActivePage[0])
        __SetActivePage(ActivePage[0]);

vsprintf(buffer, lfmt, args);
    va_end(args);
    _outtext(buffer);
}

/*
 * Kprintf
 *
 * Kernel function used for output from the overlays to the string. All
 * references to pointers must be specified as far by the format string
 */
void FAR CDECLKprintf(LPSTR fmt, ...)
{
    char*lfmt = alloca(lstrlen(fmt) + 1);
    char*lp = lfmt;
    va_list(args);
    while (*lp++ = *fmt++);/* Copy FAR string to NEAR string*/
    va_start(args, fmt);

/*
     * Now lets set up the correct window, coordinates and screen
     * colours for the display unless the current display page is the
     * same as the one for the current overlay
     */ if (CurrentPage != ActivePage[CurrentOverlay]) {
        __SetActivePage(ActivePage[CurrentOverlay]);
    } vsprintf(buffer, lfmt, args);
    va_end(args);
    _outtext(buffer);
}
/*
 * Test version of Ktime to call library time routines.
 * Also includes various other dummy routines for testing.
 */
include <stdlib.h> include "cadata.h"
include "types.h"
#include "macros.h"
#include "ktime.h"
#include "ca_pmt.h"
#include "lstring.h"
#include "channel.h"

typedef struct {
    WORDFirstDay;
    charswift[4];
    WORDDecimalPlaces : 3;
    WORDIs365Days: 1;
    WORDIsInverse: 1;
    WORDIsMoslem: 1;
} SHORT_CURRENCY_DATA;

static LPCA_CURRENCY_DATA CurrencyData[ 70 ];
static CURRSTRUCT CurrStruct = { 0,
70, (LPCA_CURRENCY_DATA far *) &CurrencyData[0] };
static SHORT_CURRENCY_DATA CurrencyArray[ 70 ] =
{
{ 0, "GBP", 0, 0, 1, 0 },
{ 0, "USD", 0, 0, 0, 0 },
```

```
    { 0, "FRF", 0, 0, 0, 0 },
    { 0, "CHF", 0, 0, 0, 0 },
    { 0, "ITL", 0, 0, 0, 0 },
    { 0, "NZD", 0, 0, 1, 0 },
    { 0, "NLG", 0, 0, 0, 0 },
    { 0, "AUD", 0, 0, 1, 0 },
    { 0, "INR", 0, 0, 1, 0 },
    { 0, "DEM", 0, 0, 0, 0 },
    { 0, "ZAR", 0, 0, 1, 0 },
    { 0, "IEP", 0, 0, 1, 0 },
    { 0, "JPY", 0, 0, 0, 0 },
    { 0, "BEC", 0, 0, 0, 0 },
    { 0, "GRD", 0, 0, 0, 0 },
    { 0, "FIM", 0, 0, 0, 0 },
    { 0, "HKD", 0, 0, 0, 0 },
    { 0, "SEK", 0, 0, 0, 0 },
    { 0, "NOK", 0, 0, 0, 0 },
    { 0, "DKK", 0, 0, 0, 0 },
    { 0, "CAD", 0, 0, 0, 0 },
    { 0, "ESP", 0, 0, 0, 0 },
    { 0, "XEU", 0, 0, 1, 0 },
    { 0, "ATS", 0, 0, 0, 0 },
    { 0, "PTE", 0, 0, 0, 0 },
    { 0, "SAR", 0, 0, 0, 1 },
    { 0, "OMR", 0, 0, 0, 0 },
    { 0, "AED", 0, 0, 0, 0 },
    { 0, "KWD", 0, 0, 0, 1 },
    { 0, "MYR", 0, 0, 0, 0 },
    { 0, "SGD", 0, 0, 0, 0 },
    { 0, "ANG", 0, 0, 0, 0 },
    { 0, "AOK", 0, 0, 0, 0 },
    { 0, "ARP", 0, 0, 0, 0 },
    { 0, "BEF", 0, 0, 0, 0 },
    { 0, "BGL", 0, 0, 0, 0 },
    { 0, "BHD", 0, 0, 0, 0 },
    { 0, "BMD", 0, 0, 0, 0 },
    { 0, "BRC", 0, 0, 0, 0 },
    { 0, "BWP", 0, 0, 0, 0 },
    { 0, "CLP", 0, 0, 0, 0 },
    { 0, "CNY", 0, 0, 0, 0 },
    { 0, "CSK", 0, 0, 0, 0 },
    { 0, "CYP", 0, 0, 0, 0 },
    { 0, "DOM", 0, 0, 0, 0 },
    { 0, "EGP", 0, 0, 0, 0 },
    { 0, "ESB", 0, 0, 0, 0 },
    { 0, "HUF", 0, 0, 0, 0 },
    { 0, "ILS", 0, 0, 0, 0 },
    { 0, "IQD", 0, 0, 0, 0 },
    { 0, "ISK", 0, 0, 0, 0 },
    { 0, "KRW", 0, 0, 0, 0 },
    { 0, "LBP", 0, 0, 0, 0 },
    { 0, "MXP", 0, 0, 0, 0 },
    { 0, "NGN", 0, 0, 0, 0 },
    { 0, "PAB", 0, 0, 0, 0 },
    { 0, "PHP", 0, 0, 0, 0 },
    { 0, "PKR", 0, 0, 0, 0 },
    { 0, "PLZ", 0, 0, 0, 0 },
    { 0, "QAR", 0, 0, 0, 0 },
    { 0, "SUR", 0, 0, 0, 0 },
    { 0, "TND", 0, 0, 0, 0 },
    { 0, "TRL", 0, 0, 0, 0 },
    { 0, "TWD", 0, 0, 0, 0 },
    { 0, "VEB", 0, 0, 0, 0 },
    { 0, "XDR", 0, 0, 0, 0 },
    { 0, "YUD", 0, 0, 0, 0 },
    { 0, "ZWD", 0, 0, 0, 0 },
    { 0, "FRD", 0, 0, 0, 0 },
    { 0, "DKD", 0, 0, 0, 0 }
};

/************* Prompt and currency routines *********/

LPCURRSTRUCT PMTGetCurrencyData( void )
{
int i;
```

```
for ( i = 0; i < 70; i++ )
CurrencyData[i] = (LPCA_CURRENCY_DATA) &CurrencyArray[i];

return( (LPCURRSTRUCT) &CurrStruct );
} void PMTRegisterCurrencyFun(LPCURRENCYUPDATE function)
{
return;
}

BOOL far pascal PmtInitPhase_0( void ) { return TRUE; } void FAR PASCAL PmtInitPhase_1(void(FAR PASCAL * FAR PASCAL function)(void))
{
(*function)();
return;
}

BOOL FAR PASCALfnMenuNotifyReq(
HANDLE hUser, WORD Id, long Dcnvref, LPPACKETHEAD packet)
{
hUser; Id; packet; return TRUE;
}

/***** Kernel versions of library time routines *******/ char far * Kctime(const time_t far *param)
{
static time_t T;
T = *param;
return (char far *) ctime( &T );
} time_t  Kmktime(struct tm far *param )
{
static struct tm T;
T = *param;
return mktime( &T );
} struct tm far * Kgmtime(const time_t far *param)
{
static time_t T;
T = *param;
return (struct tm far *) gmtime( &T );
} void Ktzset(void)
{
tzset();
} time_t Ktime( time_t far *param)
{
long T = time( NULL );
unless ( param == (LPSTR) NULL )
*param = T;
return T;
} char far *Kgetenv( const char far *param )
{
static char temp[ 20 ];
lstrcpy( temp, param );
return (LPSTR) getenv( temp );
}
/*
 *
 * $Header:   V:/caserver/overlay/ca/kwin.c_v   1.2   18 Aug 1988 15:45:24   Graham  $
 *
 * $Revision:   1.2  $
 *
 *$Date:    18 Aug 1988 15:45:24  $
 *
 * $Author:    Graham  $
```

```c
 *
 * $Logfile:   V:/caserver/overlay/ca/kwin.c_v  $
 *
 * $Workfile:  kwin.c  $
 *
 * $Log:   V:/caserver/overlay/ca/kwin.c_v  $
 *
 *    Rev 1.2   18 Aug 1988 15:45:24   Graham
 * Intermediate revision
 */
#include <macros.h>
#include <types.h>
#include "kwin.h"
#include "Kprintf.h"

shortActivePage[MAXTCB] = {0};
VIDEOPARAMSVideoMode[10] = {0};
shortNextDisplayPage = 1;/* Next allocatable
 * display page */
shortCurrentPage = 0;
shortMaxPages;

void__SetActivePage(short page)
{
   VIDEOPARAMS*p = &VideoMode[page];
   if (page < 0 || page > MaxPages) {
      KernelKprintf("Display page out of range %d\n", page);
      return;
   } unless (page == CurrentPage) {
      /* Save current cursor position for current screen */
      VideoMode[CurrentPage].cursor = _gettextposition();
      _setactivepage(CurrentPage = page);
      _wrapon(p->wrap);
      _settextcolor(p->foreground);
      _setbkcolor((long) p->background);
      _settextwindow(p->top, p->left, p->bottom, p->right);
      _settextposition(p->cursor.row, p->cursor.col);
   }
}

/*
 * InitWin
 *
 * Initialisation routine for the display page system of the Overlay
 * Kernel.
 */
voidFAR PASCAL InitWin(void)
{
   VIDEOPARAMS*vp = &VideoMode[0];/* Kernels window */
   struct videoconfigconfig;

_getvideoconfig(&config);

MaxPages = config.numvideopages;

_setvideomode(_DEFAULTMODE);

vp->wrap = _GWRAPON;
   vp->background = BLACK;
   vp->foreground = WHITE;
   vp->top = 1;
   vp->left = 1;
   vp->bottom = 24;
   vp->right = 80;
   vp->cursor.row = 1;
   vp->cursor.col = 1;
}

/*
 * SetTextWindow
 *
 * Sets up a text window for the currently active display page for
 * the overlay.
```

```c
*/
void FAR PASCAL SetTextWindow(short top, short left, short bottom, short right)
{
   short page = ActivePage[CurrentOverlay];
   VIDEOPARAMS *p = &VideoMode[page];

if (CurrentPage == page)
      _settextwindow(top, left, bottom, right);

p->top = top;
   p->left = left;
   p->bottom = bottom;
   p->right = right;
} void FAR PASCAL SetTextColour(short Foreground, short Background)
{
   short page=ActivePage[CurrentOverlay];

if (CurrentPage == page) {
      _settextcolor(Foreground);
      _setbkcolor((long) Background);
   }

VideoMode[page].foreground = Foreground;
   VideoMode[page].background = Background;
} void FAR PASCAL WrapOn(BOOL f)
{
   short page = ActivePage[CurrentOverlay];

if (CurrentPage == page)
      _wrapon(f);

VideoMode[page].wrap = f;
}

/*
 * GetTextPosition
 *
 * Gets the current cursor position within the current text window
 */
void FAR PASCAL GetTextPosition( struct rccoord far *Cursor )
{
    __SetActivePage( ActivePage[CurrentOverlay] );
    *Cursor = _gettextposition();
    return;
}

/*
 * SetTextPosition
 *
 * Sets the current cursor position within the current text window
 */
void FAR PASCAL SetTextPosition(short row, short col)
{
   short page = ActivePage[CurrentOverlay];

/* Only set the cursor position if for the current screen. */
   if (CurrentPage == page)
      _settextposition(row, col);

VideoMode[page].cursor.row = row;
   VideoMode[page].cursor.col = col;
}

/*
 * ClearScreen
 *
 * Clears the currently active display page
 */
void FAR PASCAL ClearScreen(short area)
{
```

```c
    __SetActivePage(ActivePage[CurrentOverlay]);
    _clearscreen(area);
}

/*
 * FindOutputPage
 *
 * Returns a handle for a new display page or -1 for failure.
 */
shortFAR PASCAL FindOutputPage(void)
{
    VIDEOPARAMS*vp = &VideoMode[NextDisplayPage];
    if (NextDisplayPage >= MaxPages) {/* Cannot allocate any more */
        KernelKprintf("Ran out of display pages MAX %d", MaxPages);
        return 0;
    } vp->wrap = _GWRAPON;
    vp->background = BLACK;
    vp->foreground = WHITE;
    vp->top = 1;
    vp->left = 1;
    vp->bottom = 24;
    vp->right = 80;
    vp->cursor.row = 1;
    vp->cursor.col = 1;

return (NextDisplayPage++);
}

/*
 * SetOutputPage
 *
 * Switch output page and return the old page handle
 * If -1 is passed as a parameter then the current page is not
 * changed but the current page handle is returned
 */
shortFAR PASCAL SetOutputPage(short newpage)
{
    shortcurrentpage = ActivePage[CurrentOverlay];

if (newpage == -1)
        return CurrentPage;

ActivePage[CurrentOverlay] = newpage;

return currentpage;
}

/*
 * SetDisplayPage
 *
 * Used by the kernel only.
 *
 * Sets the given page handle to be the currently displayed page.
 */
voidFAR PASCAL SetDisplayPage(short page)
{
    _setvisualpage(page);
} include <stdio.h>
include <malloc.h>
include "types.h"
include "qtw_stor.h"

static LPPKT_TICKETDATA Message;
static LPSTR Pointer;

void main( int argc, int argv )
{
int DataSize;
char ch = '0';
```

```c
Message =
(LPPKT_TICKETDATA) _fmalloc( sizeof(PKT_TICKETDATA) +
sizeof(TW_TICKET) );
Pointer = Message->Data;
for ( DataSize = 0; DataSize<10; DataSize++ )
*Pointer++ = ch++;

Message->Header.Length = Pointer - (LPSTR) Message;
DataSize = ((LPSTR) Message + Message->Header.Length)
- (LPSTR) Message->Data;
printf( "\nData size %d", DataSize );

}
/****************************************************************
 *                                                              *
 * miscpars.c - Useful routines for parsing                     *
 *                                                              *
 * Written by Alan Stokes                                       *
 *                                                              *
 * Copyright (C) 1987 Richards Computer Products Ltd            *
 *                                                              *
 ****************************************************************/ include "analdata.h"
include "miscpars.h"
#include "read.h"
#include "insert.h"
#include "amount.h"
#include "curinfo.h"

/* Check for a possible amount specification (this may include the currency as
 * well as the straight amount).
 */
BOOL checkamount(force)
BOOL force;
{
   int cur = -1;/* Holds the currency if one is found */ if (AnalysisData->symbol == S_CURRENCY)
   {
      cur = AnalysisData->symval;
      nextsym();
   } unless (AnalysisData->symbol == S_NUMBER && parseamount(force))
   {
      /* We have failed & must unread everything.  We can't backphrase
       * because parseamount will have corrupted symcount.
       */
      if (cur != -1)
backsym();
      return (FALSE);
   } if (cur == -1)
   {
      /* If there wasn.t a currency before the amount there may be one after
       */
      nextsym();
      if (AnalysisData->symbol == S_CURRENCY)
cur = AnalysisData->symval;
      else
backsym();
   } if (cur != -1)
      /* We have found a currency, so we can force it to be one of the
       * currencies in the ticket and make it the amount currency.
       */
      handlecur(cur, TRUE, TRUE);

return (TRUE);
}
```

```c
/* Handle a single currency found in the conversation. We may insert the
 * currency into the ticket. force specifies that any previous currency is to
 * be overwritten; amount specifies that the currency is the amount curency.
 * The result is TRUE if the currency given has been inserted into the ticket
 * or was already there.
 */
BOOL handlecur(cur, force, amount)
int cur;
BOOL force, amount;
{
   /* Whether this is a deposit deal (which has only one currency) */
   BOOL deposit = know(t_deal) && Ticket->DealType == DEPOSIT;

if (know(t_cur1) && cur == Ticket->Currency1)
   {
       /* Value is already in the ticket as currency 1. */
       if (amount)
 insertnum(t_amountcur, CURR1, st_extracted);
       return (TRUE);
   }
   else if (!deposit && know(t_cur1) && cur == Ticket->Currency2)
   {
       /* Already in the ticket as currency 2. */
       if (amount)
 insertnum(t_amountcur, CURR2, st_extracted);
       return (TRUE);
   }

/* Attempt to insert the currency. If it is the dollar it is only valid
    * for a deposit deal.
    */
   if (cur != Dollar || !know(t_deal) || deposit)
   {
       if (!force && know(t_cur1))
 /* There is already a currency which we can't overwrite */
 return (FALSE);

insertnum(t_cur1, cur, st_extracted);
       if (amount)
 insertnum(t_amountcur, 1, st_extracted);

return (TRUE);
   }

/* If we haven't succeeded so far give up. */
   return (FALSE);
}

/* We have found a currency specification. This could be CHF, or maybe
 * CHF/DEM. The currencies are inserted in the ticket; we return whether
 * we succeeded.
 */
BOOL currencies()
{
   int cur1 = AnalysisData->symval;
   int cur2 = Dollar;
   QUOTECURR quotecur = CURR1_PER_CURR2;
   BOOL found2 = FALSE;
   BOOL deposit = know(t_deal) && Ticket->DealType == DEPOSIT;

AnalysisData->symcount = 0;

unless (deposit)
   {
       /* Unless this is a deposit transaction there may be a second
        * currency.
        */
       nextsym();
       if (AnalysisData->symbol == S_AGAINST ||
       AnalysisData->symbol == S_SLASH)
 /* These may validly separate the two currencies, so skip them. */
 nextsym();

if (AnalysisData->symbol == S_CURRENCY)
       {
```

```
/* We have to reverse the order of the two currencies
 * (because CHF means CHF/USD, while DEM/CHF makes CHF currency 1.
 */
cur2 = cur1;
cur1 = AnalysisData->symval;
found2 = TRUE;
       }
      else
backsym();
   }

/* If the dollar is involved it is always currency 2. */
   if (cur1 == Dollar)
   {
      cur1 = cur2;
      cur2 = Dollar;
      quotecur = CURR2_PER_CURR1;
   } if (cur1 == cur2)
      /* This is nonsense, so assume it meant currency against dollar */
      cur2 = Dollar;

/* The currency can only be the dollar if this is (or may be) a deposit
    * deal.
    */
   if (cur1 != Dollar || !know(t_deal) || deposit)
   {
      if (deposit)
      {
insertnum(t_cur1, cur1, st_extracted);
insertnum(t_quotecur, CURR1_PER_CURR2, st_assumed);
insertnum(t_amountcur, CURR1, st_extracted );
      }
      else
      {
insertnum(t_cur1, cur1, st_extracted);
insertnum(t_cur2, cur2, st_extracted);

if (found2)
   /* If both currencies were given we are certain of the order. */
   insertnum(t_quotecur, quotecur, st_extracted);
      }
   } if (!found2 && know(t_low) && know(t_high))
   {
      /* At a fairly late stage in the conversation a single currency may
       * well be followed by an amount, but not before.
       */
      backphrase();
      checkamount(FALSE);
   } return (TRUE);
}

/*
 * network.c
 *
 * Network function entry points. This file provides the functions for the
 * kernels network functions.
 *
 * Currently the routines are DUMMIED until written
 *
 * AuthorG C Brooks
 *
 * Dated13 April 1988
 *
 * (c) Richards Computer Products Ltd 1988
 *
 */ include <memory.h>
include <dos.h>
```

```c
#include "types.h"
#include "macros.h"
#include "channel.h"
#include "tasks.h"
#include "Kprintf.h"

#define MAXREPLIES 150
#define MAXCHANNELS 20
#define MAXPACKETHANDLERS 30
#define TRUE 1
#define FALSE 0
#define BUFFERS 4
#define TASKCONTROLBLOCKS 4

/* Usage word values */
#define TBE_FREE 0
#define TBE_ALLOCATED 1
#define TBE_QUEUED_RUNNING 2
define TBE_QUEUED_CHANNEL 3 typedef struct PACKETHEAD
{
WORD Length ;
WORD Type ;
WORD ReceiverID ;
WORD SenderID ;
}
PACKETHEAD, *PPACKETHEAD, far *LPPACKETHEAD ;

typedef enum {
RS_FREE, RS_REGISTERED, RS_RESET
} REPLY_STATUS;

typedef struct {
LPREPLY_FUNCTION function;
int Id;/* The users ID */
REPLY_STATUS status;
} REPLY_ELEMENT;

typedef struct {
WORD MessageType;
HREPLY Handle;
REPLY_STATUS status;
} PACKETHANDLER_ELEMENT;

typedef struct {
int Id;/* The users ID */
EVENT_HOOK function;
CH_STATUS status;
} CHANNEL_ELEMENT;

typedef struct {
HCHANNEL MessageChannel;
BOOL IsInUse;
BYTE Message[ 512 ];
} MESSAGE_BUFFER;

/* Details of the channels, replies and packet handlers registered */
static CHANNEL_ELEMENT RegisteredChannels[ MAXCHANNELS+1 ];
static REPLY_ELEMENT RegisteredReplies[ MAXREPLIES+1 ];
static PACKETHANDLER_ELEMENT PacketHandlers[ MAXPACKETHANDLERS+1 ];
static void ExecuteRunningTasks( void );

static TCB TaskControlBlock[ TASKCONTROLBLOCKS ];

/* Details of messages sent for NetProcess to call reply functions. */
static MESSAGE_BUFFER MessageBuffer[ BUFFERS ];

#define DUMMY(name)Kprintf(#name " not implemented yet\n")

/*******************************************/ int FindFreeBuffer( void )
{
int i = 0;
```

```c
for ( i = 0; i < BUFFERS; i++ )
unless ( MessageBuffer[i].IsInUse )
return i;
return -1;
}

/*****************************************/ void CopyMessage( void far *From, void far *MessagePointer )
{
LPPACKETHEAD Header = (LPPACKETHEAD) From;
int Size = Header->Length;

movedata( FP_SEG( Header ), FP_OFF( Header ),
FP_SEG( MessagePointer ), FP_OFF( MessagePointer ), Size );
Header = (LPPACKETHEAD) MessagePointer;
}

/*****************************************/

BOOLFAR PASCAL NetInitialise(void)
{
NetTerminate();
return ( TRUE );
}

/*****************************************/ voidFAR PASCAL NetTerminate(void)
{
int i;
for ( i=1; i < MAXREPLIES; i++ )
RegisteredReplies[i].status = RS_FREE;
for ( i=1; i < MAXCHANNELS; i++ )
RegisteredChannels[i].status = CH_FREE;
for ( i=1; i < MAXPACKETHANDLERS; i++ )
PacketHandlers[i].status = RS_FREE;
for ( i = 0; i < BUFFERS; i++ )
MessageBuffer[i].IsInUse = FALSE;
for ( i=0; i < TASKCONTROLBLOCKS; i++ )
TaskControlBlock[i].common.Usage = TBE_FREE;
}

/*****************************************/

BOOLFAR PASCAL NetProcess(WORD n)
{
HANDLE handle;
HCHANNEL Channel;
WORD type;
FARPTR MessageAddress;
int i, BufferIndex;
LPPACKETHEAD Header;

/* Loop around processing, only exit if no messages to process.
Execute running tasks first, they may well send messages to process. */
for ( ;; )
{
ExecuteRunningTasks();

for ( BufferIndex = 0; BufferIndex < BUFFERS; BufferIndex++)
if ( MessageBuffer[ BufferIndex ].IsInUse )
goto MessageToProcess;

return FALSE;

MessageToProcess:
Channel = MessageBuffer[ BufferIndex ].MessageChannel;
MessageAddress = (FARPTR) MessageBuffer[ BufferIndex ].Message;
Header = (LPPACKETHEAD) MessageAddress;
handle = Header->ReceiverID;
type = Header->Type;

/* Check that the channel is open */
if ( RegisteredChannels[ Channel ].status != CH_OPEN )
```

```c
{
Kprintf( "Message channel %d not valid\n", Channel );
MessageBuffer[ BufferIndex ].IsInUse = FALSE;
continue;
}

/* If the ReceiverID is non-zero a reply handle is given, so use it.
If not look for a handler registered by SetPacketHandler. */
if ( handle == 0 )
{
for ( i = 1; i < MAXPACKETHANDLERS; i++ )
if ( type == PacketHandlers[ i ].MessageType &&
PacketHandlers[ i ].status == RS_REGISTERED )

{
handle = PacketHandlers[ i ].Handle;
goto HandleFound;
}
Kprintf( "No packet handler for message XX\n", type );
MessageBuffer[ BufferIndex ].IsInUse = FALSE;
continue;
}

HandleFound:
if ( (*RegisteredReplies[ handle ].function)
( RegisteredChannels[ Channel ].Id,
RegisteredReplies[ handle ].Id, MessageAddress ) )
MessageBuffer[ BufferIndex ].IsInUse = FALSE;
} /* End of infinite for loop */
}

/****************************************************/ intFAR PASCAL NetCountChannels(void)
{
HCHANNEL Free;
int Count = 0;

for ( Free = 1; Free < MAXCHANNELS; Free++ )
if ( RegisteredChannels[ Free ].status == CH_OPEN )
Count++;
return( Count );
}

/****************************************************/

/*
 * Channel control
 */
HCHANNELFAR PASCAL NetChannel(HANDLE hUser, FNAME n, FNAME m,
        EVENT_HOOK lpfnEventHook)
{
HCHANNEL Free;

for ( Free = 1; Free < MAXCHANNELS; Free++ )
if ( RegisteredChannels[ Free ].status == CH_FREE )
{
RegisteredChannels[ Free ].Id = hUser;
RegisteredChannels[ Free ].function = lpfnEventHook;
RegisteredChannels[ Free ].status = CH_OPENING;
return( Free );
}
    return ( NULL );
}

/****************************************************/

HANDLE FindChannelhUser( HCHANNEL Handle )
{
return RegisteredChannels[ Handle ].Id;
}

/****************************************************/
```

```
HCHANNELFAR PASCAL NetLoopBack(HCHANNEL h1, HCHANNEL h2)
{
   h1; h2;
   DUMMY(NetLoopBack);
   return (0);
}

/****************************************************/ voidFAR PASCAL NetOpen(HCHANNEL h, WORD w)
{
EH_CONTEXT context;

context = ( w == CHT_ACTIVE ) ? EC_CALL : EC_LISTEN;

if ( RegisteredChannels[ h ].status != CH_OPENING &&
RegisteredChannels[ h ].status != CH_CLOSED )
Kprintf( "NetOpen called with channel in wrong state\n" );
else
{
RegisteredChannels[ h ].status = CH_OPEN;
(*RegisteredChannels[ h ].function)(
RegisteredChannels[ h ].Id, context, CH_OPEN,
(FARPTR) NULL );
}
}

/****************************************************/ voidFAR PASCAL NetClose(HCHANNEL h)
{
unless ( RegisteredChannels[ h ].status == CH_OPEN )
return;

RegisteredChannels[ h ].status = CH_CLOSED;
(*RegisteredChannels[ h ].function)(
RegisteredChannels[ h ].Id, EC_HANGUP, 0, (FARPTR) NULL );
}

/****************************************************/

HCHANNELFAR PASCAL NetResetChannel(HCHANNEL hOld, WORD id, FNAME n)
{
RegisteredChannels[ hOld ].Id = id;
return ( hOld );
}

/****************************************************/

CH_STATUSFAR PASCAL NetStatus(HCHANNEL h)
{
   return ( RegisteredChannels[ h ].status );
}

/****************************************************/ voidFAR PASCAL NetDestroyChannel(HCHANNEL h)
{
RegisteredChannels[ h ].status = CH_FREE;
}

/****************************************************/ voidFAR PASCAL NetFlush(HCHANNEL h)
{
NetProcess( 1 );
}

/****************************************************/ voidFAR PASCAL NetBlock(HCHANNEL h, WORD mask)
{
   h; mask;
   DUMMY(NetBlock);
}
```

```c
/****************************************************/ voidFAR PASCAL NetUnblock(HCHANNEL h, WORD mask)
{
    h; mask;
    DUMMY(NetUnblock);
}

/****************************************************/

/*
 * Data transfer
 */

HREPLYFAR PASCAL NetRegisterReply(LPREPLY_FUNCTION lpfnReply,
    WORD userId)
{
HCHANNEL Free;

for ( Free = 1; Free < MAXREPLIES; Free++ )
if ( RegisteredReplies[ Free ].status == RS_FREE )
{
RegisteredReplies[ Free ].Id = userId;
RegisteredReplies[ Free ].function = lpfnReply;
RegisteredReplies[ Free ].status = RS_REGISTERED;
return( Free );
}
    Kprintf( "Too many replies registered\n" );
    return ( NULL );
}

/****************************************************/ voidFAR PASCAL NetDiscardReply(HREPLY h)
{
RegisteredReplies[ h ].status = RS_FREE;
}

/****************************************************/ voidFAR PASCAL NetSetPacketHandler(HREPLY h, WORD type)
{
int Free;

if ( RegisteredReplies[ h ].status == RS_FREE )
{
Kprintf( "Invalid handle in NetSetPacketHandler\n" );
return;
} for ( Free = 1; Free < MAXPACKETHANDLERS; Free++ )
if ( PacketHandlers[ Free ].status == RS_FREE )
{
PacketHandlers[ Free ].MessageType = type;
PacketHandlers[ Free ].Handle = h;
PacketHandlers[ Free ].status = RS_REGISTERED;
return;
}

Kprintf( "No room in NetSetPacketHandler\n" );
}

/****************************************************/ voidFAR PASCAL NetResetReply(HREPLY h, WORD id)
{
RegisteredReplies[ h ].status = RS_RESET;
}

/****************************************************/ voidFAR PASCAL NetDebug(HREPLY h, BOOL b)
{
    h; b;
    DUMMY(NetDebug);
}
```

```
/*****************************************/ voidFAR PASCAL NetDefaultDebug()
{
    DUMMY(NetDefaultDebug);
}

/*****************************************/ voidFAR PASCAL NetSend(HCHANNEL h, void far *lpPacket)
{
LPPACKETHEAD Header = (LPPACKETHEAD) lpPacket;
int Index = FindFreeBuffer();

if ( Index < 0 )
{
Kprintf( "** WARNING ** No space to send message\n" );
return;
}

MessageBuffer[ Index ].IsInUse = TRUE;
MessageBuffer[ Index ].MessageChannel = h;
Header->ReceiverID = 0;
Header->SenderID = 0;
CopyMessage( lpPacket, MessageBuffer[ Index ].Message );
}

/*****************************************/ voidFAR PASCAL NetReplySend(HCHANNEL h, WORD OtherId,
        void far *lpPacket)
{
LPPACKETHEAD Header = (LPPACKETHEAD) lpPacket;
int Index = FindFreeBuffer();

if ( Index < 0 )
{
Kprintf( "** WARNING ** No space to send message\n" );
return;
}

MessageBuffer[ Index ].IsInUse = TRUE;
MessageBuffer[ Index ].MessageChannel = h;
Header->ReceiverID = OtherId;
Header->SenderID = 0;
CopyMessage( lpPacket, MessageBuffer[ Index ].Message );
}

/*****************************************/ voidFAR PASCAL NetRequest(HCHANNEL h, HREPLY hr,
        void far *lpPacket)
{
LPPACKETHEAD Header = (LPPACKETHEAD) lpPacket;
int Index = FindFreeBuffer();

if ( Index < 0 )
{
Kprintf( "** WARNING ** No space to send message\n" );
return;
}

MessageBuffer[ Index ].IsInUse = TRUE;
MessageBuffer[ Index ].MessageChannel = h;
Header->ReceiverID = 0;
Header->SenderID = hr;
CopyMessage( lpPacket, MessageBuffer[ Index ].Message );
}

/*****************************************/ voidFAR PASCAL NetReplyRequest(
HCHANNEL h, HREPLY hr, WORD OtherId, void far *lpPacket)
{
LPPACKETHEAD Header = (LPPACKETHEAD) lpPacket;
int Index = FindFreeBuffer();
```

```c
if ( Index < 0 )
{
Kprintf( "** WARNING ** No space to send message\n" );
return;
}

MessageBuffer[ Index ].IsInUse = TRUE;
MessageBuffer[ Index ].MessageChannel = h;
Header->ReceiverID = OtherId;
Header->SenderID = hr;
CopyMessage( lpPacket, MessageBuffer[ Index ].Message );
}

/******************************************/ voidFAR PASCAL NetSendDebug(HCHANNEL h, void far *lpPacket,
        BOOL Debug)
{
   h; lpPacket; Debug;
   DUMMY(NetSendDebug);
}

/******************************************/ voidFAR PASCAL NetReplySendDebug(HCHANNEL h,
WORD OtherId, void far *lpPacket, BOOL Debug)
{
    h; OtherId; lpPacket; Debug;
    DUMMY(NetReplySendDebug);
}

/******************************************/

BOOLFAR PASCAL NetCheckSendSpace(HCHANNEL h, WORD size)
{
int i = FindFreeBuffer();

return (i >= 0);
}

/******** Task routines **************/ static void ExecuteRunningTasks( void )
{
int i;
for ( i=0; i<TASKCONTROLBLOCKS; i++ )
if (TaskControlBlock[i].common.Usage == TBE_QUEUED_RUNNING )
if ((TaskControlBlock[i].common.ttb->ActionProc)
((LPTCB)&TaskControlBlock[i],0)==AC_DONE)
TaskControlBlock[i].common.Usage = TBE_FREE;
}
/******************************************/
LPTCBTCBAllocate(void far *ttb)
{
int i;
for ( i=0; i<TASKCONTROLBLOCKS; i++ )
if (TaskControlBlock[i].common.Usage == TBE_FREE)
{
TaskControlBlock[i].common.ttb = ttb;
TaskControlBlock[i].common.Usage = TBE_ALLOCATED;
return (LPTCB) &TaskControlBlock[i];
}
return (LPTCB) NULL;
}
/******************************************/
voidDefaultFreeTCB(void far *task)
{
task; return;
}
voidDefaultCreateTCB(void far *task)
{
task; return;
}
/******************************************/
BOOLCheckAvailableTCBs(WORD n)
```

```
{
int i;
int count = 0;

for ( i=0; i < TASKCONTROLBLOCKS; i++ )
if ( TaskControlBlock[i].common.Usage == TBE_FREE )
count++;
return ( count >= n );
}
/*****************************************/
BOOLCheckAvailableFLINKs(WORD n)
{
n; return TRUE;
}
#if defined(CHANNEL_H)
/*****************************************/

/* To queue a channel TCB execute it repeatedly until done, then free */ voidQueueChannelTCB(HCHANNEL h, LPTCB t)
{
while ( (*t->common.ttb->ActionProc)( t, FindChannelhUser(h)) != AC_DONE )
/* SKIP */ ;
t->common.Usage = TBE_FREE;
}
/*****************************************/
voidQueueInactiveChannelTCB(HCHANNEL h, LPTCB t)
{
h; t; return;
}
voidActivateChannelTCB(HCHANNEL h, LPTCB t, BOOL IsActive)
{
h; t; IsActive; return;
}
endif WORDTCB_AS_ID(void far *task)
{
task; return 1;
}
void far *ID_AS_TCB(WORD id)
{
id; return (void far *) NULL;
}
/*****************************************/
voidQueueRunningTask(void far *task)
{
((LPTCB)task)->common.Usage = TBE_QUEUED_RUNNING;
}
/*****************************************/
voidQueueLazyTask(void far *task)
{
task; return;
}
HANDLEQueueTimedTask(void far *task, long Delay, WORD rpt)
{
task; Delay; rpt; return 1;
}
BOOLCheckFreeTimers(WORD n)
{
n; return TRUE;
}
voidCancelTimedTask(HTIMER h)
{
h; return;
}
voidRescheduleTimedTask(HTIMER h, long Delay)
{
h; Delay; return;
}
```

```c
/************************************************************
 *                                                          *
 * number.c - Routines for handling numeric symbols         *
 *                                                          *
 * Written by Alan Stokes                                   *
 *                                                          *
 * Copyright (C) 1987 Richards Computer Products Ltd        *
 *                                                          *
 ************************************************************/ include <string.h>
include <ctype.h> include "analdata.h"
include "number.h"
#include "read.h"

static BOOL adddigit(PSTR, int, int);
static BOOL insertdp(PSTR, int);
static void removedp(PSTR);

/* Read the next numeric character.
 * If JOIN is true then two consecutive numeric symbols are joined together
 * and we return a space between them.  At the end of a number we return
 * 0.
 */
char nextnumch(join)
BOOL join;
{
    if (AnalysisData->numpos < strlen(AnalysisData->numbuf))
        return (AnalysisData->numbuf[(AnalysisData->numpos)++]);

/* We have reached the end of this symbol */
    unless (join)
        /* This is also the end of how far we must read */
        return (0);

nextsym();
    unless (AnalysisData->symbol == S_NUMBER)
    {
        backsym();
        (AnalysisData->numpos)++;
        return (0);
    }

/* Start again on the new symbol */
    strcpy(AnalysisData->numbuf, AnalysisData->symbuf);
    AnalysisData->numpos = 0;
    return (' ');
}

/* Put back the last character, so nextnumch() will return the same value
 * a second time.
 */
void unnumch()
{
    if (AnalysisData->numpos > 0)
        (AnalysisData->numpos)--;
    else
    {
        backsym();
        strcpy(AnalysisData->numbuf, AnalysisData->symbuf);
        AnalysisData->numpos = strlen(AnalysisData->numbuf);
    }
}

/* Return the number of actual digits in a number */
int digits(number)
PSTR number;
{
    int result = 0;

for(; *number != 0; number++)
        if (isdigit(*number))
    result++;
```

```
    return (result);
}

/* Attempt to form a spot rate by concatenating num2 onto num1. The
 * result indicates whether a valid spot resulted.
 */
BOOL append(num1, num2)
PSTR num1, num2;
{
    int len1 = strlen(num1), len2 = strlen(num2);

/* Check that the result is not too long & does not contain more
     * than one decimal point.
     */
    if (len1 + len2 > RATEBYTES || (strchr(num1, '.') != NULL &&
 strchr(num2, '.') != NULL))
        return (FALSE);

strcat(num1, num2);
    return (TRUE);
}

/* Return the number of digits present after the decimal point in a
 * number. 0 is used to indicate that there is no decimal point in
 * the number.
 */
int DPpos(num)
PSTR num;
{
    PSTR result = strchr(num, '.');

if (result == NULL)
        return (0);
    else
        return (strlen(num) - (result - num) - 1);
}

/* Remove the decimal point (if there is one) from a number. */
static void removedp(num)
PSTR num;
{
    PSTR dppos = strchr(num, '.');

if (dppos != NULL)
        memmove(dppos, dppos + 1, strlen(dppos));
}

/* Insert a decimal point into a spot rate, checking that there is
 * enough room. Pos gives the number of digits to appear after the
 * decimal point.
 */
static BOOL insertdp(num, pos)
PSTR num;
int pos;
{
    int len = strlen(num);
    int startpos = len - pos;

if (pos == 0)
        /* By convention this indicates no dp is required. */
        return (TRUE);

if (len >= RATEBYTES)
        /* No room for any more */
        return (FALSE);

memmove(num + startpos + 1, num + startpos, pos + 1);
    num[startpos] = '.';
    return (TRUE);
}

/* Add a digit (ie a number in the range -9..+9) to a number at the
 * pos'th digit. Decimal points are not allowed in the number. The
 * result should not be negative. The length of the number may change
 * if there is a carry.
 */
```

```
static BOOL adddigit(number, digit, pos)
PSTR number;
int digit, pos;
{
    int i;

/* Move leftwards in the number, using digit as the carry */
    for (i = pos; i >= 0 && digit != 0; i--)
    {
        int sum = number[i] - '0' + digit;

if (sum > 9)
            digit = 1, sum -= 10;
        else if (sum < 0)
            digit = -1, sum += 10;
        else
            digit = 0;

number[i] = (char) (sum + '0');
    }

/* Now examine the carry out of the most significant digit */
    if (digit == 0)
        return (TRUE);
    else if (digit < 0)
        /* Negative answer */
        return (FALSE);
    else
    {
        /* We have a carry into the next digit, so we have to expand
         * the number.
         */
        int len = strlen(number);

if (len >= RATEBYTES)
            return (FALSE);

memmove(number + 1, number, len + 1);
        number[0] = (char) (digit + '0');
        return (TRUE);
    }
}

/* Compare two number strings, returning +1, -1 or 0 as the first is
 * higher than, the same as or lower than the second.  This is fairly
 * complex, since the numbers may have different numbers of digits,
 * may have decimal points and may have leading zeroes.
 */
int comparenum(num1, num2)
PSTR num1, num2;
{
    int len1 = strlen(num1), len2 = strlen(num2);
    int lead1, lead2, maxlead;
    PSTR ptr;
    int pos1, pos2;

/* Calculate the number of digits before the decimal point for
     * each number.
     */
    ptr = strchr(num1, '.');
    if (ptr == NULL)
        lead1 = len1;
    else
        lead1 = ptr - num1;

ptr = strchr(num2, '.');
    if (ptr == NULL)
        lead2 = len2;
    else
        lead2 = ptr - num2;

maxlead = max(lead1, lead2);

/* Set pos1 and pos2 to be corresponding positions within the two
     * numbers.  We artificially add leading and trailing zeroes to
```

```c
 * the numbers when necessary.
 */
 pos1 = lead1 - maxlead;
 pos2 = lead2 - maxlead;
 while (pos1 < len1 || pos2 < len2)
 {
    char digit1, digit2;

if (pos1 < 0 || pos1 >= len1)
       digit1 = '0';
    else
       digit1 = num1[pos1];

if (pos2 < 0 || pos2 >= len2)
       digit2 = '0';
    else
       digit2 = num2[pos2];

/* Decimal points are just skipped */
    if (digit1 == '.')
       pos1++;
    else if (digit2 == '.')
       pos2++;
    else
    {
       /* This is the normal case. We are working from the most
        * significant end so as soon as we find a difference we
        * know which number is greater.
        */
       pos1++, pos2++;
       if (digit1 != digit2)
          return (digit1 - digit2);
    }
 }

/* No difference has been detected */
 return (0);
}

/* Given a spot rate and the little figures of a rate, calculate what
 * the rate intended was (eg merge("2.5640", "20") would give
 * "2.5620"). The higher flag indicates that the new spot rate must
 * be higher than the old one; in the example given this would cause
 * the result to be "2.5720". The result is whether we succeeded.
 */
BOOL merge(spot, quote, higher)
PSTR spot, quote;
BOOL higher;
{
   static char answer[RATEBYTES + 1];
   int dp = DPpos(spot);

/* If the quote contains only a single digit and the spot rate
    * contains 5 or more digits assume that it should be a two-digit
    * quote with a zero as the first digit.
    */
   if (digits(quote) == 1 && digits(spot) > 4)
   {
      memmove(quote + 1, quote, strlen(quote) + 1);
      quote[0] = '0';
   }

/* Either, or both, of the parts may contain a decimal point. We
    * will accept it from either, but if it is present in both it
    * must be in the corresponding position in each (from the right hand end).
    */
   if (dp == 0)
      dp = DPpos(quote);
   else
   {
      int dp2 = DPpos(quote);
      if (dp2 != 0 && dp2 != dp)
         return (FALSE);
   }
```

```
/* It makes life easier if we can ignore the decimal points for a
 * while.
 */
removedp(spot);
removedp(quote);
strcpy(answer, spot);

{
    /* Now do the actual work. */
    int answerlen = strlen(answer), quotelen = strlen(quote);

/* Nextdigit is the position within the answer of the digit
     * after which quote will be copied.
     */
    int nextdigit = answerlen - quotelen - 1;
    int comparison;

if ( quotelen > answerlen ) return ( FALSE );

/* Copy the quote onto the answer in the right place */
    strcpy(answer + nextdigit + 1, quote);

/* We now need to decide whether the answer needs to be
     * adjusted up or down to get the real answer.
     */
    comparison = comparenum(answer, spot);
    unless (nextdigit == -1 || comparison == 0)
    {
if (higher)
{
    /* The answer must be greater than the original; if it
     * isn't increment the next digit up.
     */
    if (comparison < 0)
        unless (adddigit(answer, 1, nextdigit))
    return (FALSE);
}
else
{
    /* Decide whether to adjust the number up or down. We
     * try to get the result which is closest to the original
     * rate (so that if we have 2.5690 and the quote is 10
     * this is 2.5710, but if the quote is 60 it means
     * 2.5660).
     */
    static char testnum[RATEBYTES + 1];

strcpy(testnum, spot);
    if (comparison < 0)
    {
        /* The result is lower, we may need to increase it if
 * it is more than half a point lower.
 */
        if (adddigit(testnum, -5, nextdigit+1) &&
    comparenum(answer, testnum) < 0)
  unless (adddigit(answer, 1, nextdigit))
      return (FALSE);
    }
    else
    {
        /* The result is higher; if it is more than half a
 * point higher we decrease it.
 */
        if (adddigit(testnum, 5, nextdigit+1) &&
    comparenum(answer, testnum) > 0)
  unless (adddigit(answer, -1, nextdigit))
      return (FALSE);
    }
}
    }

/* Now put the decimal point back and overwrite spot with the
     * final answer.
     */
```

```
   strcpy(spot, answer);
   return (insertdp(spot, dp));
}

/* Insert a sign into an unsigned number, increasing its length by one. */
void setsign(sign, string)
int sign;
PSTR string;
{
   int len = strlen(string);

memmove(string + 1, string, len + 1);
   if (sign < 0)
      string[0] = '-';
   else
      string[0] = '+';
}

/* Given a signed number remove the sign and return what it was (as +1 or -1)
 */
int getsign(string)
PSTR string;
{
   int sign;

if (string[0] == '+')
      sign = 1;
   else
      sign = -1;

memmove(string, string + 1, strlen(string));

return (sign);
}

/* Compare two signed numbers (which are forwards) */
int compareforward(fwd1, fwd2)
PSTR fwd1, fwd2;
{
   static char num1[RATEBYTES + 1], num2[RATEBYTES + 1];
   static int sign1, sign2;

/* Extract the signs from the numbers */
   strcpy(num1, fwd1);
   sign1 = getsign(num1);

strcpy(num2, fwd2);
   sign2 = getsign(num2);

if (sign1 == sign2)
      {
if (sign1 > 0 )
return (comparenum(num1, num2));
else
return ( -comparenum(num1, num2));
}
   else
      /* We don't need to compare the numbers since the signs give the answer
       */
      return (sign1 - sign2);
}

/**************************************************************
 *                                                            *
 * number2.c - More routines to handle numbers                *
 *                                                            *
 * Written by Alan Stokes                                     *
 *                                                            *
 * Copyright (C) 1987 Richards Computer Products Ltd          *
 *                                                            *
 **************************************************************/ include <string.h>
include <ctype.h>
include "analdata.h"
```

```c
#include "number2.h"
#include "read.h"
#include "number.h"

/* Read a section of a number. We return whether we succeeded. Sign contains
 * the sign of the number as +/- 1, or 0 if no sign was detected.
 */
BOOL nextnum(string, sign)
PSTR string;
int *sign;
{
   for (;;)
   {
      int numbuflen = strlen(AnalysisData->numbuf);
      int firstdigit = 0;
      BOOL dpfound = FALSE, dpbreak = FALSE;
      int len, i;

*sign = 0;

/* If there are no remaining characters in the buffer attempt to refresh
       * it.
       */
      if (numbuflen == 0)
      {
   nextsym();
   if (AnalysisData->symbol != S_NUMBER)
   {
      /* If there is "/" before a number, ignore it */
      if (AnalysisData->symbol == S_SLASH )
      {
      nextsym();
   unless (AnalysisData->symbol == S_NUMBER )
   {
      backsym();
      backsym();
      return FALSE;
   }
      }
    else
      {
         backsym();
   return (FALSE);
      }
   }
   strcpy(AnalysisData->numbuf, AnalysisData->symbuf);
   numbuflen = strlen(AnalysisData->numbuf);
      }

/* Convert all commas in the buffer to full stops (this makes it easier,
       * since they are treated identically anyway).
       */
      {
   PSTR p = AnalysisData->numbuf;

while ((p = strchr(p, ',')) != NULL)
      *p = '.';
      } if (numbuflen > 1)
   switch (AnalysisData->numbuf[0])
   {
      case '+':
         *sign = 1;
         firstdigit = 1;
         break;
      case '-':
         *sign = -1;
         firstdigit = 1;
         break;
   }
      /* Calculate the length of the first section of the number, and check
       * for a decimal point.
       */
      len = numbuflen;
```

```
      for (i = firstdigit; i < len; i++)
switch (AnalysisData->numbuf[i])
{
   case '.':
      if (!dpfound)
      {
 dpfound = TRUE;
 break;
      }
      dpbreak = TRUE;
      /* Second decimal point - fall through to treat as a breaking
* character
*/
   case '-': case '/': case ';':
   case '+':
      /* These characters indicate the end of a section of number */
      len = i;
      break;
}

/* Copy the relevant part of numbuf into the result string */
      {
int resultlen = len - firstdigit;

strncpy(string, AnalysisData->numbuf + firstdigit, resultlen);
string[resultlen] = '\0';
      }

/* Now skip characters up to the next digit.  A decimal point counts as
       * a digit, unless the terminator was a decimal point.  We also accept a
       * sign as a digit, provided there is at least one non-sign before it
       * (otherwise it is just a separator).
       */
      {
BOOL signvalid = FALSE;
int pos = 0;

for (i = len; i < numbuflen; i++)
{
   char ch = AnalysisData->numbuf[i];

if (ch == '+' || ch == '-')
   {
      if (signvalid)
      {
 pos = i;
 break;
      }
   }
   else
      signvalid = TRUE;

if (isdigit(ch) || (!dpbreak && ch == '.'))
   {
      /* This is a valid break character */
      pos = i;
      break;
   }
}

/* Now convert numbuf to the following part of the number */
if (pos == 0)
   AnalysisData->numbuf[0] = '\0';
else
   strcpy(AnalysisData->numbuf, AnalysisData->numbuf + pos);
      }

/* If there are any digits in the part we have found then it is valid.
       * Otherwise we have to try again.
       */
      if (digits(string) != 0)
return (TRUE);
   }
}
```

```c
/*****************************************************************
 *                                                                *
 * outpars.c - Routines to parse an outright deal                 *
 *                                                                *
 * Written by Alan Stokes                                         *
 *                                                                *
 * Copyright (C) 1987 Richards Computer Products Ltd              *
 *                                                                *
 *****************************************************************/ include "analdata.h"
include "outpars.h"
#include "read.h"
#include "miscpars.h"
#include "date.h"
#include "datepars.h"
#include "spot.h"
#include "insert.h"
#include "pay.h"
#include "period.h"
#include "comparse.h"

static void numparse(void);

/* This routine parses an outright conversation.  If it returns the result is
 * the deal type to change to.
 */
int outparse( void )
{
   for (;;)
   {
      /* Whether we should read another symbol at the end of the
       * loop. */
      BOOL readanother = TRUE;

/* This procedure is called from the outermost level without reading
       * any of the conversation, so save the current status as we can safely
       * re-enter the analysis from this point */
      SaveAnalysisState();

switch (AnalysisData->symbol)
      {
   case S_SPOT:
      /* If followed by a currency forces deal type to spot */
      nextsym();
      if (AnalysisData->symbol == S_CURRENCY)
      {
         backsym();
         return (SPOT);
      }
      readanother = FALSE;
      break;
   case S_MONTH:
      parsedate(FALSE, t_far);
      break;
   case S_VAL: case S_DATES:
      /* Forcing words for the value date */
      nextsym();
      unless (parsedate(TRUE, t_far))
         readanother = FALSE;
      break;
   case S_OUTRIGHT:
      /* Used to force a quote and/or the currencies */
      nextsym();
      if (AnalysisData->symbol == S_NUMBER)
      {
         if (parsequote(TRUE))
      nextsym();
      }
      if (AnalysisData->symbol == S_CURRENCY)
      {
         if (currencies())
      nextsym();
      }
```

```
        readanother = FALSE;
        break;
    case S_S: case S_B: case S_BUY:
    case S_SELL:
        /* Probably gives deal direction; BUY AND SELL forces a swap deal.
         */
        AnalysisData->symcount = 0;
        nextsym();
        if (AnalysisData->symbol == S_SLASH ||
            AnalysisData->symbol == S_AND ||
            AnalysisData->symbol == S_N)
            /* Skip the separartor */
            nextsym();

if (AnalysisData->symbol == S_S ||
            AnalysisData->symbol == S_B ||
            AnalysisData->symbol == S_BUY ||
            AnalysisData->symbol == S_SELL)
        {
            /* This means it is probably a forward */
            backphrase();
            return (SWAP);
        }

/* Now handle as an ordinary direction */
        backphrase();

/* S & B are only accepted when in pairs for swaps */
        if (AnalysisData->symbol == S_S ||
            AnalysisData->symbol == S_B)
            break;
        /* Drop through to accept in the normal way */
    case S_MINE:
        insertnum(t_buy,
            AnalysisData->speaking ^ (AnalysisData->symbol==S_SELL),
            st_extracted);
        nextsym();

/* Very probably followed by an amount */
        unless ((AnalysisData->symbol == S_NUMBER ||
            AnalysisData->symbol == S_CURRENCY) &&
            checkamount(TRUE))
                readanother = FALSE;
        break;
    case S_YOURS:
        /* This could be YOUR FRF TO ..., or it could just be YOURS
         * (meaning YOU BUY).
         */
        unless (parsepay())
        {
            nextsym();
            insertnum(t_buy, !(AnalysisData->speaking), st_extracted);
            readanother = FALSE;
        }
        break;
    case S_NUMBER:
        numparse();
        break;
    case S_AT:
        /* Forcing word for a rate */
        nextsym();
        if (AnalysisData->symbol == S_NUMBER)
            parsespot(TRUE);
        else
            readanother = FALSE;
        break;
    case S_YEAR: case S_MTH: case S_WEEK:
        /* The shorter periods, eg T/N, are not valid for an outright
         * (since really we are only interested in the far date).
         */
        parseperiod();
        break;
    default:
    {
        int result = commonparse();
```

```
        if (result == NO_DEAL)
            readanother = FALSE;
        else
            return (result);
}
      } if (readanother)
nextsym();
   }
}

/* Handle a number encountered away from any forcing words */
static void numparse()
{
    BOOL triedquote = FALSE;
    BOOL triedperiod = FALSE;
    BOOL trieddate = FALSE;

unless (know(t_low) || know(t_high))
    {
        /* Before a quote has been made we will get the dates for which the
         * quote is required.
         */
        if (parseperiod() || parsedate(FALSE, t_far))
   return;
        else
   triedperiod = trieddate = TRUE;
     } if (!know(t_buy) && (!know(t_low) || (know(t_quoter) &&
Ticket->Quoter == AnalysisData->speaking)))
     {
        /* If no deal has been agreed and we haven't has a quote (or the person
         * speaking made the last quote) we expect a quote.
         */
        if (parsequote(FALSE))
   return;
        else
   triedquote = TRUE;
     }

/* Now try anything else in approximate order of likelihood. */
    if (parsespot(FALSE) ||
        checkamount(FALSE) ||
        (!trieddate && parsedate(FALSE, t_far)) ||
        (!triedperipd && parseperiod()) ||
        (!triedquote && parsequote(FALSE)))
        return;
}
/*
 * OvMem.c
 *
 *
 * G C Brooks
 *
 */ include "OvMem.h"

extern char far *_fmalloc(size_t size);
extern void _ffree(void far *p);

char far*fmalloc(size_t size)
{
    return(_fmalloc(size));
}

VOID ffree(void far *p)
{
    _ffree(p);
}
```

```c
/*****************************************************************
 *                                                               *
 * parse.c - Main routines for parsing a conversation            *
 *                                                               *
 * Written by Alan Stokes                                        *
 *                                                               *
 * Copyright (C) 1987 Richards Computer Products Ltd             *
 *                                                               *
 *****************************************************************/ include "cadata.h"
include "parse.h"
#include "read.h"
#include "initpars.h"
#include "insert.h"
#include "pay.h"
#include "period.h"
#include "spotpars.h"
#include "miscpars.h"
#include "fwdpars.h"
#include "deppars.h"
#include "outpars.h"
#include "dateproc.h"
#include "curinfo.h"

static void killsplit(FIELDNAME);

/* Remove any dates which are split (since this is a deposit deal, for which
 * split dates are illegal).  If split dates are found they are converted to
 * non-split dates (by taking the earlier of the two dates).
 */
static void killsplit(field)
FIELDNAME field;
{
    static SPLITDATE s;

unless (know(field))
        return;

if ( field == t_near )
    {
    s.date1 = Ticket->NearDate1;
    s.date2 = Ticket->NearDate2;
    }
    else
    {
    s.date1 = Ticket->FarDate1;
    s.date2 = Ticket->FarDate2;
    } s.date1 = s.date2 = min(s.date1, s.date2);

/* Insert the adjusted date with the same status as before */
    insertdate(field, &s, AnalysisData->TicketItemStatus[(int) field]);
}

/* Tidy up any inconsistencies in the ticket, assuming that the deal type is
 * changing to the given deal.
 */
void tidyticket(newdeal)
int newdeal;
{
int i;
static SPLITDATE Near, Far;

/* Make sure any changes to the output ticket are done. */
for (i = 0; i < t_max; i++)
AnalysisData->LastInsertPos[i] = 0,
AnalysisData->LastQueryPos[i] = 0;

/* Throw away all rates, since they are for an old deal type */
    delfield(t_low);
    delfield(t_high);
    delfield(t_rate);
    delfield(t_rate2);
    delfield(t_fwd);
```

```c
/* Throw away a few other things that are now probably wrong */
delfield(t_buy);
delfield(t_mypay);
delfield(t_mypay2);
delfield(t_yourpay);
delfield(t_yourpay2);

AnalysisData->nopay = FALSE;

/* Now throw away anything incorrect for the new deal type */
switch (newdeal)
{
    case SPOT:
delfield(t_far);
        if (know(t_cur1) && Ticket->Currency1 == Dollar)
    /* dollar/dollar is silly */
    delfield(t_cur1);
    unless (know(t_cur2))
    {
        insertnum(t_cur2, Dollar, st_assumed);
        unless ( know(t_quotecur) )
        insertnum(t_quotecur, CURR1_PER_CURR2, st_assumed);
        unless ( know(t_amountcur) )
        insertnum(t_amountcur, CURR2, st_assumed);
    }
    insertnum(t_deal, SPOT, st_assumed);
    insertnum(t_period, P_SPOT, st_assumed);
    guessdates();
    break;
        case DEPOSIT:
    if (Ticket->Period > P_BROKEN)
        delfield(t_period);
    /* Deposits are only for one currency, so split dates and cross rates
     * must be removed.
     */
    killsplit(t_near);
    killsplit(t_far);
    if (know(t_cur2) && Ticket->Currency2 != Dollar)
    {
        insertnum(t_cur2, Dollar, st_assumed);
        insertnum(t_quotecur, CURR1_PER_CURR2, st_assumed);
        insertnum(t_amountcur, CURR2, st_assumed);
    }
    if (know(t_cur1))
    {
    insertnum(t_quotecur, CURR1_PER_CURR2, st_assumed);
    insertnum(t_amountcur, CURR1, st_extracted );
    }
        else
        insertnum(t_cur1, Dollar, st_assumed);
    insertnum(t_deal, DEPOSIT, st_assumed);
    guessdates();
    unless (know(t_period))
    guessperiod();
    break;
        case SWAP:
            if (know(t_cur1) && Ticket->Currency1 == Dollar)
        /* dollar/dollar is silly */
        delfield(t_cur1);
    if (Ticket->Period > P_BROKEN)
        delfield(t_period);
    unless (know(t_cur2))
    {
        insertnum(t_cur2, Dollar, st_assumed);
        unless ( know(t_quotecur) )
        insertnum(t_quotecur, CURR1_PER_CURR2, st_assumed);
        unless ( know(t_amountcur) )
        insertnum(t_amountcur, CURR2, st_assumed);
    }
    insertnum(t_deal, SWAP, st_assumed);
    guessdates();
    unless (know(t_period))
    guessperiod();
    break;
        case OUTRIGHT:
            if (know(t_cur1) && Ticket->Currency1 == Dollar)
```

```
/* dollar/dollar is silly */
delfield(t_cur1);
if (Ticket->Period > P_BROKEN ||
                    Ticket->Period < P_1WK )
    delfield(t_period);
unless (know(t_cur2))
{
    insertnum(t_cur2, Dollar, st_assumed);
    unless ( know(t_quotecur) )
    insertnum(t_quotecur, CURR1_PER_CURR2, st_assumed);
    unless ( know(t_amountcur) )
    insertnum(t_amountcur, CURR2, st_assumed);
}

/* This an outright deal, but we may have set the dates already
as appropriate to a swap/deposit. If so we have to do a horrible
fudge to get the output ticket right, without changing the
working copy of the ticket. */ if ( AnalysisData->TicketItemStatus[t_period] == st_extracted)
{
/* First save the dates we really want */
Near.date1 = Ticket->NearDate1;
Near.date2 = Ticket->NearDate2;
Far.date1 = Ticket->FarDate1;
Far.date2 = Ticket->FarDate2;

/* Now remove both dates from the ticket, the deal type
is not OUTRIGHT yet so it will be done. */
delfield( t_near );
delfield( t_far );

/* Make sure the real dates are copied in. */
AnalysisData->LastInsertPos[t_near] = 0;
AnalysisData->LastInsertPos[t_far] = 0;

/* Now set the deal type and pretend we have just read
the period or dates. */
insertnum(t_deal, OUTRIGHT, st_assumed);
if (Ticket->Period != P_BROKEN)
guessdates();
else
{
insertdate( t_near, &Near, st_deduced );
insertdate( t_far, &Far, st_deduced );
}
}
else
insertnum(t_deal, OUTRIGHT, st_assumed);
break;
   } setstatus();
}

/* Routine to parse a complete conversation */
void parse( void )
{
    int deal;

/* Since everything assumes the next symbol has already been read we have
     * to start it up. If nextsym() does not return BufPos will be reset */
    if ( AnalysisData->BufPos == 0 )
    {
    /* Save the data already in case we don't finish reading the
* initial symbol. */
        SaveAnalysisState();

nextsym();
insertnum(t_quoter, !(AnalysisData->speaking), st_assumed);
    }

/* Perform parsing until we know the deal (we may be re-analysing) */
    if ( know(t_deal) )
    deal = Ticket->DealType;
```

```
   else
   {
   deal = initparse();

/* Clear out any minor inconsistencies now the deal type
   is known */
   tidyticket(deal);
   }
   /* Now sit in a loop calling the appropriate parse routine until it
    * decides the deal has changed, and then call another one. This loop
    * never finishes, since we have no concept of a conversation ending (cos
    * it could always be extended further).
    */
   for (;;)
   {
       int newdeal;

switch(deal)
       {
   case SPOT:
      newdeal = spotparse();
      break;
   case SWAP:
      newdeal = fwdparse();
      break;
    case DEPOSIT:
      newdeal = depparse();
      break;
    case OUTRIGHT:
      newdeal = outparse();
      break;
        } deal = newdeal;

/* If we specify a deal type the other person can be expected
    * to give us a quote for that deal */
       insertnum(t_quoter, !(AnalysisData->speaking), st_assumed);

tidyticket(deal);
   }
}

/************************************************************************
 *                                                                      *
 * pay.c - Payment instructions handling                                *
 *                                                                      *
 * Written by Alan Stokes                                               *
 *                                                                      *
 * Copyright (C) 1987 Richards Computer Products Ltd                    *
 *                                                                      *
 ************************************************************************/ include <string.h> include "analdata.h"
include "pay.h"
#include "pay2.h"
#include "read.h"
#include "miscpars.h"
#include "insert.h"
#include "curinfo.h"

static void removepay(FIELDNAME);
static BOOL foundend(BOOL, BOOL, BOOL);
static BOOL foundstart(BOOL, BOOL, BOOL, int, BOOL);
static BOOL paylikely(void);

/* Remove a single payment instruction from the ticket unless its status
 * is extracted, which means it was forced.
 */
static void removepay(field)
FIELDNAME field;
{
```

```c
    if (AnalysisData->TicketItemStatus[ field ] < st_extracted)
        delfield(field);
}

/* Remove any payment instructions we have already read and mark further
 * payment instructions unlikely (used after a dealer types SWAP LATER).
 */
void killpay()
{
    AnalysisData->nopay = TRUE;

removepay(t_mypay);
    removepay(t_mypay2);
    removepay(t_yourpay);
    removepay(t_yourpay2);
}

/* Parse a payment instruction.  Returns whether one was found or not.
 * This is based almost exclusively on rules of thumb and is not terribly
 * accurate; as a rough guide about half the payment instructions will be
 * recognisable (in a forward deal, which has four of them, the chances of
 * getting them all right are pretty slim).
 */
BOOL parsepay()
{
    BOOL firstfound = FALSE;

for (;;)
    {
        BOOL knowmy = FALSE;
        BOOL knowcur = FALSE;
        BOOL my;
        int cur;
        BOOL found = FALSE;

AnalysisData->symcount = 0;

switch (AnalysisData->symbol)
        {
    case S_NY: case S_JUNK:
        /* This is a symbol that no-one else understands.  If we are in an
         * appropriate stage of the conversation this may well be part of
         * a payment instruction.
         * We assume this is the start of a payment instruction if we are
         * not in the middle of one, or if the last one we thought we
         * found was on the previous line.
         */
        if (!(AnalysisData->foundpay) ||
        AnalysisData->symtext.Srow != AnalysisData->PayText.Srow)
        {
            if (paylikely())
            {
    AnalysisData->PayText = AnalysisData->symtext;
    AnalysisData->foundpay = TRUE;
    AnalysisData->foundny = FALSE;
            }
        }
        if (AnalysisData->foundpay && AnalysisData->symbol == S_NY)
            AnalysisData->foundny = TRUE;
        break;
    case S_A:
    {
        /* Possibly the start of A/C; if it is we alter things so that it
         * looks like a single symbol and pretend it was ACC.
         */
        int srow = AnalysisData->symtext.Srow;
        int scol = AnalysisData->symtext.Scol;
        int spos = AnalysisData->symtext.Spos;

nextsym();
        if (AnalysisData->symbol == S_SLASH)
            nextsym();
        if (AnalysisData->symbol == S_C)
        {
            AnalysisData->symtext.Srow = srow;
```

```
            AnalysisData->symtext.Scol = scol;
            AnalysisData->symtext.Spos = spos;
            AnalysisData->symbol = S_PAYMENT;

/* Now handle as if it was ACC */
            if (paylikely())
            {
    AnalysisData->foundny = FALSE;
    found = insertpay(&AnalysisData->symtext,
    FALSE, FALSE, FALSE, 0, FALSE);
            }
        }
        break;
    }
    case S_STANDARD:
    {
        /* Possibly the start of STANDARD INSTRUCTIONS. If so insert it.
         */
        int srow = AnalysisData->symtext.Srow;
        int scol = AnalysisData->symtext.Scol;
        int spos = AnalysisData->symtext.Spos;

nextsym();
        if (AnalysisData->symbol == S_INSTRUCTIONS)
        {
            AnalysisData->symtext.Srow = srow;
            AnalysisData->symtext.Scol = scol;
            AnalysisData->symtext.Spos = spos;
            AnalysisData->symbol = S_PAYMENT;

/* Now handle as if it was ACC */
            if (paylikely())
            {
    AnalysisData->foundny = FALSE;
    found = insertpay(&AnalysisData->symtext,
    FALSE, FALSE, FALSE, 0, FALSE);
            }
        }
        break;
    }
    case S_PAYMENT:
        /* DIRECT or ACC (A/C is treated in the same way above). These
         * words are complete payment instructions in themselves.
         */
        if (paylikely())
        {
            AnalysisData->foundny = FALSE;
            found = insertpay(&AnalysisData->symtext,
            FALSE, FALSE, FALSE, 0, FALSE);
        }
        break;
    case S_MY: case S_YOURS:
    {
        /* These are the start of the forcing sequence for a payment
         * instruction (MY cur TO ...).
         */
        BOOL ok = TRUE;

my = (AnalysisData->symbol == S_MY) == AnalysisData->speaking;
        nextsym();

if (AnalysisData->symbol == S_CURRENCY)
        {
            /* Provided the currency is meaningful this means we have found
    * a forced payment instruction.
    */
            cur = AnalysisData->symval;
            if (handlecur(AnalysisData->symval, FALSE, FALSE))
        knowcur = TRUE;
            else
        ok = FALSE;
        }
        else
        {
            if ((AnalysisData->symbol == S_JUNK ||
```

```
         AnalysisData->symbol == S_MY) && paylikely())
         {
/* Probably still a payment instruction, with the MY as part
 * of the text.
 */
backsym();
backsym();
         }
         else
ok = FALSE;
      } if (ok)
      found = foundstart(knowcur, knowcur, TRUE, cur, my);
   break;
}
case S_CURRENCY:
   /* This is quite probably the start of a payment instruction. */
   cur = AnalysisData->symval;
   if (handlecur(AnalysisData->symval, FALSE, FALSE))
   {
      if (paylikely())
 found = foundstart(FALSE, TRUE, FALSE, cur, my);
   }
   break;
case S_FOR:
{
   /* FOR ME or FOR YOU is an indicator of a payment instruction,
    * which may appear either at the start or the end of the payment
    * instrcution.
    */
   BOOL ok = TRUE;

nextsym();
   switch (AnalysisData->symbol)
   {
      case S_ME: case S_MINE: case S_MY:
 my = AnalysisData->speaking;
 break;
      case S_YOU: case S_YOURS:
 my = !(AnalysisData->speaking);
 break;
      default:
 ok = FALSE;
 break;
   } if (ok)
   {
      if (AnalysisData->foundpay)
      {
/* We've found what seems to be the start already so this
 * must be the end of the payment instrcution.
 */
backsym();
found = foundend(TRUE, TRUE, my);
nextsym();
      }
      else
      {
/* This isn't the end so it is probably the start */
if (paylikely())
   found = foundstart(TRUE, FALSE, TRUE, cur, my);
      }
   }
   break;
}
case S_N:
   /* See if this appears to be part of an abbreviation; otherwise
    * treat it as AND.
    */
   nextsym();
   if (AnalysisData->symbol == S_ENDLINE ||
   strlen(AnalysisData->symbuf) == 1)
   {
```

```c
        backsym();
        break;
    }
    backsym();

/* Fall through to treat as AND */
case S_AND:
    /* Normally this indicates the end of one payment instruction and
     * the start of another.
     */
    if (AnalysisData->foundpay)
    {
        int free = 0;

unless (know(t_mypay))
free++;
        unless (know(t_yourpay))
free++;
        if (know(t_deal) && Ticket->DealType == SWAP)
        {
unless (know(t_mypay2))
    free++;
unless (know(t_yourpay2))
    free++;
        }

/* Check that there is room for both payment instructions */
        if (free < 2)
        {
    /* There isn't; we deduce that we aren't in the middle of a
     * payment-instruction nor atthe start of one.
     */
    AnalysisData->foundpay = FALSE;
    break;
        }

/* Otherwise treat this as the end of a possible payment
         * instruction and the beginning of another one.
         */
        if (foundend(FALSE, FALSE, FALSE))
        {
    AnalysisData->symcount = 0;
    firstfound = TRUE;
        }
        else
break;
    }

/* We may just have read a complete definite payment instruction,
     * in which case this indicates the start of another one.
     */
    if (firstfound)
    {
        firstfound = FALSE;
        foundstart(FALSE, FALSE, FALSE, 0, FALSE);
        found = TRUE;
    }
    break;
case S_PLEASE:
    /* Pretty good indicator that we really were in a payment
     * instruction and have come to the end.
     */
    if (AnalysisData->foundpay)
        found = foundend(FALSE, FALSE, FALSE);
    break;
case S_PAY: case S_BACK:
    /* Start of a payment instruction, as in PAY BARCLAYS PLS */
    if (paylikely())
        found = foundstart(FALSE, FALSE, FALSE, 0, FALSE);
    break;
case S_CREDIT:
    /* This is probably also the start of a payment instruction, but
     * we include the word CREDIT in the instruction (for French-ish
     * banks like CREDIT LYON.
     */
```

```
        if (paylikely())
        {
           backsym();
           found = foundstart(FALSE, FALSE, FALSE, 0, FALSE);
        }
        break;
          } if (found)
          {
    firstfound = TRUE;
    nextsym();
    if (AnalysisData->symbol == S_AND ||
    AnalysisData->symbol == S_N)
        /* Probably followed by another payment instruction, so go round
         * again.
         */
        continue;
    else
    {
        backsym();
        return (TRUE);
    }
          } backphrase();
          return (FALSE);
        }
    }

/* We think we have found the end of a payment instruction whose start we
 * marked earlier; it extends up to but not including the current symbol.  If
 * knowmy is true then my indicates who the payment instruction is for.
 */
static BOOL foundend(force, knowmy, my)
BOOL force, knowmy, my;
{
    /* Go back to find where the previous symbol ended */
    backsym();
    AnalysisData->PayText.Epos = AnalysisData->symtext.Epos;
    nextsym();

AnalysisData->foundpay = FALSE;
    /* No longer in a payment instruction */ return (insertpay(&AnalysisData->PayText, force, FALSE, knowmy, 0, my));
}

/* We think we have found the start of a payment instruction, from this symbol
 * onwards.  We skipto the end of it and then insert the whole text.
 */
static BOOL foundstart(force, knowcur, knowmy, cur, my)
BOOL force, knowcur, knowmy;
int cur;
BOOL my;
{
    static TEXTPOS result;

if (skippay(&result, force))
    {
        insertpay(&result, force, knowcur, knowmy, cur, my);
        return (TRUE);
    }
    else
    {
        /* Can't seem to find one */
        if (force)
        {
/* A blank line after MY DOLLARS TO indicates a payment instruction
 * is to be deleted.
 */
insertpay(NULL, force, knowcur, knowmy, cur, my);
return (TRUE);
        }
        else
    return (FALSE);
```

```c
    }
}

/* Return whether we can reasonably expect a payment instruction at this stage
 * of the deal.
 */
static BOOL paylikely()
{
    if (AnalysisData->nopay)
        /* Dealer said SWAP LATER so payment instructions are very unlikely */
        return (FALSE);
    else
        return ( Ticket->Status >= INCOMPLETE );
}
/****************************************************************
 *                                                              *
 * pay2.c - More routines for handling payment instructions     *
 *                                                              *
 * Written by Alan Stokes                                       *
 *                                                              *
 * Copyright (C) 1987 Richards Computer Products Ltd            *
 *                                                              *
 ****************************************************************/ include <string.h>
include "analdata.h"
#include "pay2.h"
#include "read.h"
#include "insert.h"
#include "pay.h"
#include "curinfo.h"

/* Insert a text field as a payment instruction. We may know the party to
 * whom it refers and/or the currency. If we don't know these we have to
 * guess. If both are specified it may enable us to deduce the deal direction.
 * If FORCE is true we are fairly sure this really is a payment instruction.
 * If the currency is specified as well then we know this is in the standard
 * from so can be given status 'extracted'. The result is whether we actually
 * inserted it.
 * If the field is NULL then the appropriate payment instruction is deleted.
 */
BOOL insertpay(text, force, knowcur, knowmy, cur, my)
TEXTPOS *text;
BOOL force, knowcur, knowmy;
int cur;
BOOL my;
{
    BOOL farrate = FALSE;
    int deal;
    int curnum = -1;
    BOOL good = force;
    FIELDNAME field;
    FIELDSTATUS status;
    if (know(t_deal))
        deal = Ticket->DealType;
    else
        deal = NO_DEAL;

if (force && !knowcur)
        force = FALSE;

if (knowcur)
    {
        /* Work out which of the two deal currencies (if any) is involved */
        if (know(t_cur1) && cur == Ticket->Currency1)
            curnum = CURR1;
        else if (know(t_cur2) && cur == Ticket->Currency2)
            curnum = CURR2;
    }

/* For a spot or outright deal if the currency is known and the direction
     * is known we can work out whose payment instruction this is.
     */
    if (knowcur && curnum != -1 &&
        (deal == SPOT || deal == OUTRIGHT) &&
        know(t_buy) && know(t_amountcur))
    {
```

```
       BOOL realmy = (curnum == Ticket->AmountCurr) ==
Ticket->Buyer;

if (knowmy)
       {
 unless (realmy == my)
       /* Someone has said the wrong currency; ignore it */
       return (FALSE);
       }
       else
 knowmy = TRUE, my = realmy;
    }

/* If we don't yet know for who the payment instruction is we assume it's
     * for whoever spoke, but if that fails we try the other person.
     * This is very slightly recursive; however from now on we can assume that
     * we know which person it is for. This will not recurse more than once
     * because we make the call with knowmy == TRUE.
     */
    unless (knowmy)
    {
       if (insertpay(text, FALSE, knowcur, TRUE,
       cur, AnalysisData->speaking))
 return (TRUE);
       else
 return (insertpay(text, FALSE, knowcur, TRUE, cur,
 !(AnalysisData->speaking) ) );
    } if (!knowcur && AnalysisData->foundny)
    {
       /* If the symbol NY appeared this is probably a dollar payment
        * instruction.
        */
       if (know(t_cur1) && Ticket->Currency1 == Dollar)
 curnum = CURR1;
       else if (know(t_cur2) && Ticket->Currency2 == Dollar)
 curnum = CURR2;

if (curnum != -1)
 knowcur = TRUE, cur = Dollar;
    }

/* If we know all the currencies then if the payment instruction isn't for
     * any of them it must be wrong.
     */
    if (knowcur && curnum == -1 && know(t_cur1) &&
 (deal == DEPOSIT || know(t_cur2)))
       return (FALSE);

/* For a swap deal we have to work out whether this is a near or a far
     * payment instruction.
     */
    if (deal == SWAP)
    {
       BOOL knowfar = FALSE;
       if (knowcur && curnum != -1)
       {
 /* Try to deduce from the currency whether it is near or far */
 if (know(t_buy) && know(t_amountcur))
 {
    farrate = (curnum == Ticket->AmountCurr) ==
    (Ticket->Buyer == my);
    knowfar = TRUE;
 }
       } unless (knowfar)
       {
 /* Choose whichever of near or far are available. */
 if (my)
 {
    if (know(t_mypay))
    {
       if (know(t_mypay2))
```

```
      /* No room for another */
      return (FALSE);
            else
      farrate = TRUE;
         }
     }
     else
     {
        if (know(t_yourpay))
        {
           if (know(t_yourpay2))
     /* No room for another */
     return (FALSE);
           else
      farrate = TRUE;
        }
   }
         }
      } field = farrate ? (my ? t_mypay2 : t_yourpay2) :
       (my ? t_mypay : t_yourpay);

status = AnalysisData->TicketItemStatus[(int) field];
    if (text != NULL && deal == SWAP && knowcur &&
    st_unknown < status &&
   status < st_extracted)
      {
         /* If we know this is for a particular currency and we previously
          * guessed that a different payment instruction was for the same
          * currency we were wrong. Move the previous guess to the other
          * currency.
          */
         FIELDNAME otherfield = farrate ? (my ? t_mypay : t_yourpay) :
           (my ? t_mypay2 : t_yourpay2);

unless (know(otherfield))
            {
TKTREF Temp;
switch ( field )
{
case t_mypay:
 Temp = Ticket->OurPay1;
break;
case t_yourpay:
Temp = Ticket->TheirPay1;
break;
case t_mypay2:
 Temp = Ticket->OurPay2;
break;
case t_yourpay2:
Temp = Ticket->TheirPay2;
break;
} switch ( otherfield )
{
case t_mypay:
 Ticket->OurPay1 = Temp;
break;
case t_yourpay:
Ticket->TheirPay1 = Temp;
break;
case t_mypay2:
 Ticket->OurPay2 = Temp;
break;
case t_yourpay2:
Ticket->TheirPay2 = Temp;
break;
}
AnalysisData->TicketItemStatus[ otherfield ] = st_deduced;

delfield(field);
         }
     }
```

```c
   /* The field must be empty unless we are pretty sure we have a real payment
    * instruction.
    */
   unless (!know(field) || force || (good && status < st_extracted))
      return (FALSE);

if (text == NULL)
      delfield(field);
   else
   {
      FIELDSTATUS newstatus;

if (force)
 newstatus = st_extracted;
      else if (good || knowcur)
 newstatus = st_deduced;
      else
 newstatus = st_assumed;

inserttext(field, text, newstatus);
   }

/* If we have got a payment instruction then we can be pretty certain that
    * payment instructions are in fact allowed.
    */
   AnalysisData->nopay = FALSE;

/* We may be able to deduce the deal direction */
   if (deal == SPOT || deal == OUTRIGHT)
   {
      if (knowcur && knowmy && !know(t_buy) && know(t_amountcur))
      {
 BOOL buy = (curnum == Ticket->AmountCurr) == my;

insertnum(t_buy, buy, st_extracted);
      }
   } return (TRUE);
}

/* Skip through a payment instruction. We set result to indicate the area of
 * text we have skipped. We return FALSE if the payment instruction was null.
 */
BOOL skippay(result, force)
TEXTPOS *result;
BOOL force;
{
   BOOL found = FALSE;/* Whether any text found yet */
   BOOL done = FALSE;

AnalysisData->foundny = FALSE;
   /* Make end of line significant, so that we only read one line */
   AnalysisData->nowrap = TRUE;

nextsym();

/* TO at the very beginning is ignored (as in MY USD [TO] ... ) */
   if (AnalysisData->symbol == S_TO)
      nextsym();

/* Remember where the start was */
   result->Srow = AnalysisData->symtext.Srow;
   result->Scol = AnalysisData->symtext.Scol;
   result->Spos = AnalysisData->symtext.Spos;

/* Now scan for the end */
   until (done)
   {
      switch (AnalysisData->symbol)
      {
 case S_FOR:
   unless (force && !found)
   {
      /* Unless this is a forced payment instruction and we are at
 * the very beginning of it this probably marks the end.
```

```
*/
      nextsym();
      if (AnalysisData->symbol == S_ME ||
         AnalysisData->symbol == S_MINE ||
AnalysisData->symbol == S_MY ||
AnalysisData->symbol == S_YOU ||
AnalysisData->symbol == S_YOURS)
         {
  backsym();
  backsym();
  done = TRUE;
         }
         else
  backsym();
    }
    break;
 case S_MY: case S_YOURS:
    /* Again these indicate the end of the instruction except at the
     * very start of a forced one, if followed by a currency (MY USD
     * TO ...)
     */
    unless (force && !found)
    {
       nextsym();
       if (AnalysisData->symbol == S_CURRENCY)
          {
  backsym();
  backsym();
  done = TRUE;
          }
          else
  backsym();
    }
    break;
 case S_NY:
    AnalysisData->foundny = TRUE;
    break;
 case S_N:
    /* May be the same as AND, but might be an abbreviation */
    nextsym();
    if (AnalysisData->symbol == S_ENDLINE ||
    strlen(AnalysisData->symbuf) == 1)
       backsym();
    else
    {
       /* Treat as AND - ends the instruction */
       backsym();
       backsym();
       done = TRUE;
    }
    break;
 case S_PLEASE: case S_AND: case S_VAL:
 case S_DATES: case S_RATES: case S_MONTH:
    backsym();
    done = TRUE;
    break;
 case S_ENDLINE: case S_NOISE:
    done = TRUE;
    break;

} if (!done)
      {
/* Otherwise treat it as an ordinary symbol */
result->Epos = AnalysisData->symtext.Epos;
nextsym();
nextsym();
if (AnalysisData->symbol == S_SLASH)
   /* Skip the optional slash */
   nextsym();

if (AnalysisData->symbol != S_N)
{
backphrase();
```

```
return (FALSE);
}
else
    switch (first)
    {
case S_T:
period = P_TN;
break;
case S_O:
period = P_ON;
break;
case S_S:
period = P_SN;
break;
}
    break;
        case S_TN:
period = P_TN;
break;
        case S_SN:
period = P_SN;
break;
        case S_ONITE:
/* ON isn't allowed, because of its ambiguity */
period = P_ON;
break;
        case S_WEEK:
period = P_1WK;
break;
        case S_MTH:
period = P_1M;
break;
        case S_YEAR:
period = P_1YR;
break;
        case S_NUMBER:
/* Must specify a (small) number of weeks, months or years */
if ((num = readsmallnum()) == -1)
{
backphrase();
return FALSE;
} nextsym();
switch (AnalysisData->symbol)
{
case S_WEEK:
if (1 <= num && num <= 4)
    period = P_1WK + num - 1;
else
{
/* Get the spot date, add the number of weeks, set
the far date and the period as broken. Use date2
because it will be the Friday (Cur2 normally dollar) */
GetDates( SPOT,
GoodCur(t_cur1), GoodCur(t_cur2), &Near, &Far );
Date = AddWeeks( Near.date2, num,
GoodCur(t_cur1), GoodCur(t_cur2) );
Far.date1 = SplitDate( Date, GoodCur(t_cur1) );
Far.date2 = SplitDate( Date, GoodCur(t_cur2) );
period = P_BROKEN;
}
break;

case S_MTH:
if (1 <= num && num <= 12)
    /* NB 12 months gives the same result as 1 year because
     * of the way the periods are set up.
     */
    period = P_1M + num - 1;
else
{
found = TRUE;
    }
  }
```

```c
   AnalysisData->nowrap = FALSE;
   return (found);
}

/***************************************************************
 *                                                             *
 * period.c - Routines to handle periods                       *
 *                                                             *
 * Written by Alan Stokes/Roger Abbott                         *
 *                                                             *
 * Copyright (C) 1987 Richards Computer Products Ltd           *
 *                                                             *
 ***************************************************************/ include "analdata.h"
include "period.h"
#include "read.h"
#include "insert.h"
#include "dateproc.h"

/* Read a small decimal number, returning its value, or -1 if it was invalid.
 * 'Small' means less than 100
 */
static int readsmallnum( void )
{
   if (AnalysisData->symbuf[0] == '0')
      return (-1);
   else
   {
      int result = 0, i;

for (i = 0; AnalysisData->symbuf[i] != 0; i++)
      {
   if (result > 99)
      /* Too many digits */
      return (-1);
   else
      result = result * 10 + AnalysisData->symbuf[i] - '0';
      } return (result);
   }
}

/***************************************************************/

/* Routine to parse a period definition, setting the dates if possible. */
BOOL parseperiod( void )
{
PERIOD period;
int first = AnalysisData->symbol;
int num;
static SPLITDATE Near, Far;
DATE Date;

/* If on their own without a preceding number then single-letter
 * abbreviations are disallowed.
 */
if (AnalysisData->symbuf[1] == 0)
   switch (AnalysisData->symbol)
   {
      case S_WEEK:
      case S_MTH:
      case S_YEAR:
      return FALSE;
   }

AnalysisData->symcount = 0;

switch (AnalysisData->symbol)
   {
      default:
      return FALSE;

case S_T: case S_O: case S_S:
   /* These may be the beginning of T/N, O/N or S/N */
```

```c
/* Get the spot date, add the number of months, set
the far date and the period as broken. Use date2 */
GetDates( SPOT,
GoodCur(t_cur1), GoodCur(t_cur2), &Near, &Far );
Date = AddMonths( Near.date2, num,
GoodCur(t_cur1), GoodCur(t_cur2) );
Far.date1 = SplitDate( Date, GoodCur(t_cur1) );
Far.date2 = SplitDate( Date, GoodCur(t_cur2) );
period = P_BROKEN;
}
break;

case S_YEAR:
if (1 <= num && num <= 10)
    period = P_1YR + num - 1;
else if (num == 20)
    period = P_20YR;
else if (num == 30)
    period = P_30YR;
else
{
/* Get the spot date, add the number of weeks, set
the far date and the period as broken. */
GetDates( SPOT,
GoodCur(t_cur1), GoodCur(t_cur2), &Near, &Far );
Date = AddYears( Near.date2, num,
GoodCur(t_cur1), GoodCur(t_cur2) );
Far.date1 = SplitDate( Date, GoodCur(t_cur1) );
Far.date2 = SplitDate( Date, GoodCur(t_cur2) );
period = P_BROKEN;
}
break;

default:
backphrase();
return FALSE;
    } /* End switch on symbol after small number */
    }/* End switch on first symbol of possible period */

/* If we get this far we have detected a valid period. If it is P_BROKEN
we have already extracted the dates. Otherwise, it is one of the
standard manifest-defined periods which is handled by GetDates,
which we call via guessdates(), which inserts the dates for us. */ insertnum(t_period, period, st_extracted);

if (period != P_BROKEN)
guessdates();
else
{
insertdate( t_near, &Near, st_deduced );
insertdate( t_far, &Far, st_deduced );
} return TRUE;
}

/*>>WEB<< "ticket.web" <Ticket field size array source>*/ line 399 "ticket.web"
ifndef PASCAL
#define PASCALpascal
endif line 403
ifndef FALSE
#define FALSE0
#define TRUE1
#define NULL0
endif line 409
ifndef FAR
#define FARfar
#define NEARnear
```

```
#define LONGLong
define VOIDvoid line 415
typedef unsigned charBYTE;
typedef unsigned shortWORD;
typedef unsigned long DWORD;
typedef intBOOL;
typedef char*PSTR;
typedef char NEAR*NPSTR;
typedef char FAR *LPSTR;
typedef int FAR *LPINT;
endif line 425
if !defined(NOMINMAX) && !defined(max)
#define max(a,b)((a) > (b) ? (a) : (b))
#define min(a,b)((a) < (b) ? (a) : (b))
endif line 430
ifndef MAKELONG
#define MAKELONG(a, b)((long)(((unsigned)(a)) | ((unsigned long)((unsigned)(b))) << 16))
#define LOWORD(l)((WORD)(l))
define HIWORD(l)((WORD)(((DWORD)(l) >> 16) & 0xFFFF))
#define LOBYTE(w)((BYTE)(w))
#define HIBYTE(w)(((WORD)(w) >> 8) & 0xff)
endif line 187
if !defined (T_TKT_FIELD_TYPES)
define T_TKT_FIELD_TYPES line 190
define ADDRESSBYTES 4
#define ANSWERBACKBYTES 20
#define COUNTRYBYTES 2
#define DATEBYTES 6
#define DEALERIDBYTES 8
#define DEALERNAMEBYTES 32
#define FILENAMEBYTES 64
#define FLAGBYTES 2
#define INTERESTBYTES 14
#define KEYSTNBYTES 2
define PACKETBYTES 512 line 201
define PASSWORDBYTES 70
define TIMEBYTES 4 line 204
define AMOUNTBYTES14
#define RATEBYTES8
define LINELEN64 line 208
define STRING(x)typedef char STRING_##x [(x)+1];
STRING(ADDRESSBYTES)
STRING(ANSWERBACKBYTES)
STRING(AMOUNTBYTES)
STRING(RATEBYTES)
STRING(LINELEN)
STRING(DEALERIDBYTES)
STRING(FLAGBYTES)
STRING(KEYSTNBYTES)
#undef STRING
define STRING(x) STRING_##x line 220
typedef enum
{
TKT_UNKNOWN= -1, line 224
NO_DEAL= 0x01,
INCOMPLETE= 0x02,
```

```
EXTRACTED= 0x04,
CONFIRMING= 0x08,
CONFIRMED= 0x10,
CANCELLED= 0x20,
WRONG= 0x40, line 232
SPOT= 0x02,
OUTRIGHT= 0x04,
SWAP= 0x08,
DEPOSIT= 0x10, line 237
US= 0x01,
THEM= 0x00, line 240
CURR1= 0x01,
CURR2= 0x02, line 243
CURR1_PER_CURR2= 0x02, line 244
CURR2_PER_CURR1= 0x01, line 246 line 247
P_ON = 0, P_TN, P_SN,
P_1WK, P_2WK, P_3WK, P_4WK,
P_1M, P_2M, P_3M, P_4M, P_5M, P_6M, P_7M, P_8M, P_9M, P_10M, P_11M,
P_1YR, P_2YR, P_3YR, P_4YR, P_5YR, P_6YR, P_7YR, P_8YR, P_9YR, P_10YR,
P_20YR, P_30YR, P_BROKEN,
P_TT, P_TOM, P_SPOT, P_FF,
}
TKTVAL, TKTSTATUS, DEALTYPE, PARTY, CURRENCY, AMTCURR, QUOTECURR, PERIOD;

#line 256
typedef struct
{
WORD Row:10;
WORD Col:6;

#line 260
WORD Count;

#line 261
WORD DbPos;

#line 262
} TKTREF, *PTKTREF, far *LPTKTREF ;

#line 264
typedef struct
{
WORD LowQuote:1;
WORD HighQuote:1;
WORD DealRate:1;
WORD FarRate:1;
WORD ActualDiff:1;
WORD NearDate1:1;
WORD NearDate2:1;
WORD FarDate1:1;
WORD FarDate2:1;
WORD QuoteCurr: 1;
}
SUSPECT;

#line 279
typedef struct TicketBitfields
{
WORD IsTraining : 1 ;
WORD StartOnline : 1 ;
```

```
WORD UseFrom : 1 ;
WORD ViaBroker : 1 ;
WORD IsExtracted : 1 ;
}
TKTFLAGS, *PTKTFLAGS, far *LPTKTFLAGS ;

#line 290
extern unsigned char TicketFieldSizes[];
endif line 165
if !defined(T_TKT_FIELD_NAMES)
#define T_TKT_FIELD_NAMES
#line 169
#define TKT(field, x, y)TKT_##field,
#define TKTS(field, x, y)TKT_##field,
#define TKTGRP(field)TKT_##field,
typedef enum
{
#include "TktFlds.DEF"
TKT_last, line 175
} TICKET_FIELD;
#undef TKT
#undef TKTS
#undef TKTGRP
endif line 447
define TKT(p,q,size) sizeof(size),
#define TKTS(p,q,size) sizeof(size),
#define TKTGRP(x)0,
unsigned char TicketFieldSizes[] =
{
#include "TktFlds.DEF"
};
#undef TKT
#undef TKTS
#undef TKTGRP
/****************************************************************
 *                                                              *
 * query.c - Routines for checking the ticket                   *
 *                                                              *
 * Written by Roger Abbott from the BCPL of Alan Stokes         *
 *                                                              *
 * Copyright (C) 1988 Richards Computer Products Ltd            *
 *                                                              *
 ****************************************************************/ include <string.h> include "cadata.h"
include "caserver.h"
#include "kprintf.h"
#include "query.h"
#include "date.h"
#include "dateproc.h"
#include "number.h"
#include "period.h"
#include "insert.h"
#include "curinfo.h"
#include "debug.h"
#include "qtw_anal.h"

define CharZero (int)'0' static void CheckFwd(void);
static void CheckDates(void);
static void CheckDate(void);
static void CheckQuote(void);
static BOOL AddFwd(char *Fwd,char *Spot,char *Res,int Sign);
static void QueryNear( BOOL On );
```

```
static PKT_REASON QueryMessage = {
{ sizeof(PKT_REASON), ANALYSIS_INCONSISTENT, 0, 0 }, 0 };

/* Check that a new value in the ticket is valid */
void check(field, valchanged)
FIELDNAME field;
int valchanged;
{
unless ( know(t_deal) ) return;

switch ( Ticket->DealType )
{
case SWAP:
switch ( field )
{
case t_deal:
CheckFwd();
CheckDates();
CheckQuote();
break;
case t_fwd: case t_rate: case t_rate2:
unless ( valchanged ) break;
CheckFwd();
break;
case t_period:
unless ( valchanged ) break;
case t_far: case t_near:
CheckDates();
break;
case t_cur1: case t_cur2:
unless ( valchanged ) break;
CheckDates();
case t_quotecur:
CheckQuote();
break;
}
break;

case SPOT:
switch ( field )
{
case t_deal:
CheckDate();
CheckQuote();
break;
case t_period:
unless ( valchanged ) break;
case t_near:
CheckDate();
break;
case t_cur1: case t_cur2:
unless ( valchanged ) break;
CheckDate();
case t_quotecur:
CheckQuote();
break;
}
break;

case DEPOSIT:
switch ( field )
{
case t_deal:
SetQuery( t_quotecur, FALSE );
CheckDates();
break;
case t_period: case t_cur1:
unless ( valchanged ) break;
case t_far: case t_near:
CheckDates();
break;
}
break;

case OUTRIGHT:
switch ( field )
```

```
{
case t_deal:
CheckDates();
CheckQuote();
break;
case t_period:
unless ( valchanged ) break;
case t_far: case t_near:
CheckDates();
break;
case t_cur1: case t_cur2:
unless ( valchanged ) break;
CheckDates();
case t_quotecur:
CheckQuote();
break;
}
break;
}
}

/*****************************************************/ void SendAnalysisInconsistent( REASONCODE Why )
{
int i = 0;

QueryMessage.Reason = Why;
NetReplySend( ChannelHandle[ CurrentConv->KeystationChannel],
CurrentConv->TheirID, (FARPTR) &QueryMessage );
}

/*****************************************************/

/* Activate/deactivate a query on a particular field */ void SetQuery( FIELDNAME Field, BOOL On )
{
BOOL OldOn;

/* Avoid multiple set/clear on re-analysis of the same text. */
if ( AnalysisData->BufPos > AnalysisData->LastQueryPos[ Field ] )
AnalysisData->LastQueryPos[ Field ] = AnalysisData->BufPos;
else
return;

switch ( Field )
{
case t_low:
OldOn = Ticket->IsSuspect.LowQuote;

if ( On && !OldOn )
/* Set the new query unless it's a duplicate */
{
AnalysisData->Queries += 1;
Ticket->IsSuspect.LowQuote = TRUE;
AddChange( TKT_ISSUSPECT );
SendAnalysisInconsistent( REASON_SUSPECT_LOWQUOTE );
}
else if ( !On && OldOn )
/* Remove query if it was set */
{
AnalysisData->Queries -= 1;
Ticket->IsSuspect.LowQuote = FALSE;
AddChange( TKT_ISSUSPECT );
SendAnalysisInconsistent( REASON_GOOD );
}
break;

case t_high:
OldOn = Ticket->IsSuspect.HighQuote;

if ( On && !OldOn )
/* Set the new query unless it's a duplicate */
{
AnalysisData->Queries += 1;
```

```
Ticket->IsSuspect.HighQuote = TRUE;
AddChange( TKT_ISSUSPECT );
SendAnalysisInconsistent( REASON_SUSPECT_HIGHQUOTE );
}
else if ( !On && OldOn )
/* Remove query if it was set */
{
AnalysisData->Queries -= 1;
Ticket->IsSuspect.HighQuote = FALSE;
AddChange( TKT_ISSUSPECT );
SendAnalysisInconsistent( REASON_GOOD );
}
break;

case t_rate:
OldOn = Ticket->IsSuspect.DealRate;

if ( On && !OldOn )
/* Set the new query unless it's a duplicate */
{
AnalysisData->Queries += 1;
Ticket->IsSuspect.DealRate = TRUE;
AddChange( TKT_ISSUSPECT );
SendAnalysisInconsistent( REASON_SUSPECT_DEALRATE );
}
else if ( !On && OldOn )
/* Remove query if it was set */
{
AnalysisData->Queries -= 1;
Ticket->IsSuspect.DealRate = FALSE;
AddChange( TKT_ISSUSPECT );
SendAnalysisInconsistent( REASON_GOOD );
}
break;

case t_rate2:
OldOn = Ticket->IsSuspect.FarRate;

if ( On && !OldOn )
/* Set the new query unless it's a duplicate */
{
AnalysisData->Queries += 1;
Ticket->IsSuspect.FarRate = TRUE;
AddChange( TKT_ISSUSPECT );
SendAnalysisInconsistent( REASON_SUSPECT_FARRATE );
}
else if ( !On && OldOn )
/* Remove query if it was set */
{
AnalysisData->Queries -= 1;
Ticket->IsSuspect.FarRate = FALSE;
AddChange( TKT_ISSUSPECT );
SendAnalysisInconsistent( REASON_GOOD );
}
break;

case t_fwd:
OldOn = Ticket->IsSuspect.ActualDiff;

if ( On && !OldOn )
/* Set the new query unless it's a duplicate */
{
AnalysisData->Queries += 1;
Ticket->IsSuspect.ActualDiff = TRUE;
AddChange( TKT_ISSUSPECT );
SendAnalysisInconsistent( REASON_SUSPECT_ACTUALDIFF );
}
else if ( !On && OldOn )
/* Remove query if it was set */
{
AnalysisData->Queries -= 1;
Ticket->IsSuspect.ActualDiff = FALSE;
AddChange( TKT_ISSUSPECT );
SendAnalysisInconsistent( REASON_GOOD );
}
break;
```

```
case t_near:
/* The outside world is not interested in the near
date of an outright deal */
if ( know( t_deal ) && Ticket->DealType == OUTRIGHT )
return;

OldOn = Ticket->IsSuspect.NearDate1;

if ( On && !OldOn )
/* Set the new query unless it's a duplicate */
{
AnalysisData->Queries += 1;
Ticket->IsSuspect.NearDate1 = TRUE;
Ticket->IsSuspect.NearDate2 = TRUE;
AddChange( TKT_ISSUSPECT );
SendAnalysisInconsistent( REASON_SUSPECT_NEARDATE1 );
}
else if ( !On && OldOn )
/* Remove query if it was set */
{
AnalysisData->Queries -= 1;
Ticket->IsSuspect.NearDate1 = FALSE;
Ticket->IsSuspect.NearDate2 = FALSE;
AddChange( TKT_ISSUSPECT );
SendAnalysisInconsistent( REASON_GOOD );
}
break;

case t_far:
OldOn = Ticket->IsSuspect.FarDate1;

if ( On && !OldOn )
/* Set the new query unless it's a duplicate */
{
AnalysisData->Queries += 1;
Ticket->IsSuspect.FarDate1 = TRUE;
Ticket->IsSuspect.FarDate2 = TRUE;
AddChange( TKT_ISSUSPECT );
SendAnalysisInconsistent( REASON_SUSPECT_FARDATE1 );
}
else if ( !On && OldOn )
/* Remove query if it was set */
{
AnalysisData->Queries -= 1;
Ticket->IsSuspect.FarDate1 = FALSE;
Ticket->IsSuspect.FarDate2 = FALSE;
AddChange( TKT_ISSUSPECT );
SendAnalysisInconsistent( REASON_GOOD );
}
break;

case t_quotecur:
OldOn = Ticket->IsSuspect.QuoteCurr;

if ( On && !OldOn )
/* Set the new query unless it's a duplicate */
{
AnalysisData->Queries += 1;
Ticket->IsSuspect.QuoteCurr = TRUE;
AddChange( TKT_ISSUSPECT );
SendAnalysisInconsistent( REASON_SUSPECT_QUOTECURR );
}
else if ( !On && OldOn )
/* Remove query if it was set */
{
AnalysisData->Queries -= 1;
Ticket->IsSuspect.QuoteCurr = FALSE;
AddChange( TKT_ISSUSPECT );
SendAnalysisInconsistent( REASON_GOOD );
}
break;

default:
Kprintf(
"\nQuery field %d has no bit in IsSuspect", Field );
```

```
break;
}
OutputTicket->IsSuspect = Ticket->IsSuspect;
EchoOutput( Field );
}

/****************************************************/

/* Check that the two forward (swap) rates agree with the quote */
void CheckFwd( void )
{
PSTR Base = Ticket->DealRate;
PSTR Check = Ticket->FarRate;
BOOL On;
int Sign;
static char Fwd[ RATEBYTES+1 ], Res[ RATEBYTES+1 ];

unless ( know(t_fwd) && know(t_rate) && know(t_rate2) ) return;

strcpy( Fwd, Ticket->ActualDiff );
Sign = getsign( Fwd );

if ( strlen( Base ) > strlen( Check ) )
{
PSTR t = Base;
Base = Check;
Check = t;
Sign = -Sign;
}

/* Attempt to calculate the expected rate */
unless ( AddFwd( Fwd, Base, Res, Sign ) ) return;

On = (comparenum( Check, Res ) != 0);
SetQuery( t_rate, On );
SetQuery( t_rate2, On );
}

/****************************************************/

/* Check that the near and far dates are what we expect */ void CheckDates( void )
{
BOOL Qnear = FALSE, Qfar = FALSE;
BOOL Outright = Ticket->DealType == OUTRIGHT;
int Cur1, Cur2;
static SPLITDATE Near, Far, TicketNear, TicketFar;

unless ( know(t_period) && Ticket->Period < P_BROKEN &&
AnalysisData->TicketItemStatus[t_far] == st_extracted &&
know(t_near) ) return;

Cur1 = GoodCur( t_cur1 );
Cur2 = GoodCur( t_cur2 );
GetDates( Ticket->Period, Cur1, Cur2, &Near, &Far );

TicketNear.date1 = Ticket->NearDate1;
TicketNear.date2 = Ticket->NearDate2;
TicketFar.date1 = Ticket->FarDate1;
TicketFar.date2 = Ticket->FarDate2;

unless ( Outright ||
AnalysisData->TicketItemStatus[ t_near ] < st_extracted )
{
if ( !samesplit( &TicketNear, &Near) )
Qnear = TRUE;
} if ( Ticket->Period == P_BROKEN )
{
unless ( GoodDate( Cur1, Cur2, &TicketFar ) )
Qfar = TRUE;
}
else{
unless ( samesplit( &TicketFar, &Far ) )
```

```c
Qfar = TRUE;
}

SetQuery( t_near, Qnear );
SetQuery( t_far, Qfar );
}

/****************************************************/

/* Check for a spot that the value date is correct */ void CheckDate( void )
{
static SPLITDATE Near, Far, TicketNear;

unless ( AnalysisData->TicketItemStatus[ t_near ] == st_extracted ) return;

GetDates( Ticket->Period, GoodCur( t_cur1 ),
GoodCur( t_cur2 ), &Near, &Far );

TicketNear.date1 = Ticket->NearDate1;
TicketNear.date2 = Ticket->NearDate2;

SetQuery( t_near, !samesplit( &TicketNear, &Near ) );
}

/****************************************************/

/* Check that a quote against the dollar is the right way round */ void CheckQuote( void )
{
BOOL Q = FALSE;

if ( AnalysisData->TicketItemStatus[ t_quotecur ] == st_extracted
&& know( t_cur1 ) && know( t_cur2 ) &&
Ticket->Currency2 == Dollar )
{
int QuoteCur;

if ( SwiftcodeTable[ Ticket->Currency1 ].IsInverse )
QuoteCur = CURR2_PER_CURR1;
else
QuoteCur = CURR1_PER_CURR2;

/* Check it's OK, but if not sure assume the user got it right */
unless ( QuoteCur == Ticket->QuoteCurr ) Q = TRUE;
}

SetQuery( t_quotecur, Q );
}

/****************************************************/

/* Add a difference to a base to give a result (currently used only
to check forward (swap) deals */

BOOL AddFwd( PSTR Fwd, PSTR Spot, PSTR Res, int Sign )
{
int DP = DPpos( Fwd );
int Len = strlen( Spot );
int Carry = 0, Rpos, Fpos;

strcpy( Res, Spot );
if ( DP > 0 )
/* Add appropriate zeroes at the end of the spot rate */
{
int Start = Len;
Len += DP;
if ( Len > RATEBYTES ) return( FALSE );/* Sorry, no room */ for ( ; Start < Len; Start++ ) Res[ Start ] = '0';
Res[ Start ] = '\0';
}

/* Move from left to right, adding the numbers */
```

```
Rpos = Len - 1;
Fpos = strlen( Fwd ) - 1;
while ( Fpos >= 0 || Carry != 0 )
{
int Sum, Digit;

if ( Fwd[ Fpos ] == '.' )
{
Fpos -= 1;
continue;
} if ( Res[ Rpos ] == '.' ) Rpos -= 1;

if ( Rpos < 0 ) Sum = 0;
else Sum = (int) ( Res[ Rpos ] - '0' );
Sum += Carry;

if ( Fpos < 0 ) Digit = 0;
else Digit = (int) ( Fwd[ Fpos ] - '0' );
if ( Sign < 0 ) Sum -= Digit;
else Sum += Digit;

if ( Sum < 0 ) Carry = -1, Sum += 10;
else if ( Sum > 9 ) Carry = 1, Sum -= 10;
else Carry = 0;

if ( Rpos < 0 )
/* Add digits in front if possible */
{
if ( Len == RATEBYTES ) return( FALSE );
memmove( Res+1, Res, Len );
Len += 1;
Rpos = 0;
}

Res[ Rpos ] = (char) ( Sum + CharZero );
Fpos -= 1;
Rpos -= 1;
}

Res[ Len ] = '\0';
return( TRUE );
}

/*****************************************************************
 *                                                               *
 * read.c - Definition of symbols and low-level reading routines *
 *                                                               *
 * Written by Alan Stokes                                        *
 *                                                               *
 * Copyright (C) 1987 Richards Computer Products Ltd             *
 *                                                               *
 *****************************************************************/ include <stddef.h>
include <ctype.h>
include <string.h>
include <setjmp.h> include "cadata.h"
include "read.h"
#include "vocab.h"
#include "debug.h"
#include "Kprintf.h"

extern jmp_buf mark;

static int qmove(int, int);
static void nextch(void);
static BOOL numberp(char);
static BOOL letterp(char);
static void readsym(void);
static BOOL readnum(void);
```

```c
static BOOL readchars(BOOL (*verify)(char));
static BOOL readword(void);

/* Move a pointer a small number of places forward or backward in the
 * queue.
 */
static int qmove(ptr, offset)
int ptr, offset;
{
   ptr += offset;
   if (ptr < 0)
      ptr += QUEUESIZE;
   else if (ptr >= QUEUESIZE)
      ptr -= QUEUESIZE;
   return (ptr);
}

/* Reads the next character.  The result is put in convch.
 */
static void nextch()
{
int i;
char ch, OldFlag = AnalysisData->LineFlag;
BOOL system = (OldFlag & CF_SYS) != 0;

for (;;)
{
/* If we are at the start of a new line, get the flag byte. */
if ( Ticket->AnalysedCol == 0 )
{
/* Check that we are on a flag byte, if not its an
internal error, unless we at the end of the text. */
AnalysisData->LineFlag = ch =
AnalysisData->ConvText[AnalysisData->BufPos];
if ( ch == 0 )
/* No more characters, jump out. */
longjmp( mark, 1 );

(AnalysisData->BufPos)++;
system = (ch & CF_SYS) != 0;
}

AnalysisData->convch = ch =
AnalysisData->ConvText[AnalysisData->BufPos];
if ( ch == 0 )
/* No more characters, jump out. */
longjmp( mark, 1 );
if ( (ch & CF_LINESTART) != 0 )
{
/* There is another line.
 * Unless nowrap is set an end of line while one party
 * remains in control is just white space.  If a line
 * extends all the way to the end we assume that it has
 * been wrapped automatically. */ if (AnalysisData->nowrap || (ch & CF_WRAPUP) != 0 ||
(OldFlag & CF_THEIR) != (ch & CF_THEIR) ||
!Ticket->Flags.StartOnline)
AnalysisData->convch = '\n';
else if (Ticket->AnalysedCol == MAXLINELEN)
AnalysisData->convch = '\0';
else
AnalysisData->convch = ' ';

Ticket->AnalysedCol = 0;
OutputTicket->AnalysedCol = 0;
(Ticket->AnalysedRow)++;
OutputTicket->AnalysedRow = Ticket->AnalysedRow;

if (!system && AnalysisData->convch != 0)
break;
else
continue;
}
else
{
```

```
(Ticket->AnalysedCol)++;
OutputTicket->AnalysedCol = Ticket->AnalysedCol;
(AnalysisData->BufPos)++;
if ( !system )
break;
}
}
}

/* Verify that a character is a letter */
static BOOL letterp(ch)
char ch;
{
   return (isupper(ch));
}

/* Verify that a character is a numeric */
static BOOL numberp(ch)
char ch;
{
   switch (ch)
   {
      case '0': case '1': case '2': case '3':
      case '4': case '5': case '6': case '7':
      case '8': case '9': case '.': case ',':
      case ';': case '/': case '-': case '+':
 return (TRUE);
      default:
 return (FALSE);
   }
}

/* Read a complete word into SYMBUF.  The characters which are valid to form
 * part of the word are given by the verify function.  The result is whether
 * a valid word was found.
 */
static BOOL readchars( BOOL (*verify)(char) )
{
   int pos = 0;

for (;;)
   {
      if (pos < MAXWORDLEN)
 AnalysisData->symbuf[pos] = AnalysisData->convch;
      AnalysisData->symtext.Epos = AnalysisData->BufPos - 1;
      nextch();
      if (!(*verify)(AnalysisData->convch))
 break;
      pos++;
   }
   /* Check that the word was valid */
   if (pos < MAXWORDLEN)
   {
      AnalysisData->symbuf[pos+1] = '\0';
      return (TRUE);
   }
   else
   {
      AnalysisData->symbuf[0] = '\0';
      return (FALSE);
   }
}

/* Read in a word and identify it */
static BOOL readword()
{
   if (readchars(letterp))
   {
      VOCWORD *p = lookup(AnalysisData->symbuf);

if (p == NULL)
 AnalysisData->symbol = S_JUNK;
      else
      {
 AnalysisData->symbol = p->symbol;
```

```c
   AnalysisData->symval = p->symval;
      }
   }
   else
      AnalysisData->symbol = S_JUNK;
   return (TRUE);
}

/* Read in a number.  A number which is followed by a single E, or two
 * or more Es at the start of a word must be ignored.
 */
static BOOL readnum()
{
   int i;

/* If it started with a digit but doesn't continue correctly return
    * it as a junk word */
   AnalysisData->symbol = S_JUNK;
   if (!readchars(numberp))
      return (TRUE);

/* Check there is at least one digit somewhere */
   for (i=0; !isdigit(AnalysisData->symbuf[i]); i++)
   {
      if (AnalysisData->symbuf[i] == 0)
      {
/* We have reached the end with no digits found; prima facie evidence
 * of a bad number, but there is an exception */
if (strcmp(AnalysisData->symbuf, "+") == 0)
{
   AnalysisData->symbol = S_AND;
   return (TRUE);
}
return (FALSE);
      }
   } while (AnalysisData->convch == ' ')
      nextch();

/* Now check for following Es */
   if (AnalysisData->convch == 'E')
   {
      int error = FALSE;
      char ch;

/* Have a look at the next character; do not actually read it
       * yet because we may want to ignore it.
       */
      ch = AnalysisData->ConvText[AnalysisData->BufPos];
      if (ch == 'E' || ch == ' ' || AnalysisData->convch == '\0')
 error = TRUE;
      do
 nextch();
      while (AnalysisData->convch == 'E');

if (error)
 return (FALSE);
   }

AnalysisData->symbol = S_NUMBER;
   return (TRUE);
}

/* Read a symbol from the input stream */
static void readsym()
{
   for (;;)
   {
      if (!(AnalysisData->charpending))
      {
 nextch();
 AnalysisData->charpending = TRUE;
      }
```

```
        while (AnalysisData->convch == ' ')
    nextch();

AnalysisData->symtext.Srow = Ticket->AnalysedRow;
        AnalysisData->symtext.Scol = Ticket->AnalysedCol-1;
        AnalysisData->symtext.Spos = AnalysisData->symtext.Epos =
        AnalysisData->BufPos-1;

AnalysisData->speaking =
        (AnalysisData->LineFlag & CF_THEIR) == 0;

switch (AnalysisData->convch)
        {
    case 'A': case 'B': case 'C': case 'D':
    case 'E': case 'F': case 'G': case 'H':
    case 'I': case 'J': case 'K': case 'L':
    case 'M': case 'N': case 'O': case 'P':
    case 'Q': case 'R': case 'S': case 'T':
    case 'U': case 'V': case 'W': case 'X':
    case 'Y': case 'Z':
       if (readword())
           return;
       break;
    case '0': case '1': case '2': case '3':
    case '4': case '5': case '6': case '7':
    case '8': case '9': case '.': case ',':
    case '+': case '-':
       if (readnum())
           return;
       break;
    case '\n':
       AnalysisData->symbol = S_ENDLINE;
       AnalysisData->symbuf[0] = AnalysisData->convch;
       AnalysisData->symbuf[1] = 0;
       AnalysisData->charpending = FALSE;
       return;
    case '/':
       AnalysisData->symbol = S_SLASH;
       AnalysisData->symbuf[0] = AnalysisData->convch;
       AnalysisData->symbuf[1] = 0;
       AnalysisData->charpending = FALSE;
       return;
    case '>':
       AnalysisData->symbol = S_RIGHTARROW;
       AnalysisData->symbuf[0] = AnalysisData->convch;
       AnalysisData->symbuf[1] = 0;
       AnalysisData->charpending = FALSE;
       return;
    default:
       /* Anything else is just ignored */
       AnalysisData->charpending = FALSE;
       break;
       }
    }
}

/* This procedure, given a TEXTPOS field, puts the text it refers to into a
 * string.
 */
void copytext(TEXTPOS *text, PSTR string, int MaxLen)
{
    int Point = text->Spos;
    int pos = 0;

while ( Point <= text->Epos && MaxLen > 0 )
    {
       /* Copy as much of the text as we can */
       string[pos] = AnalysisData->ConvText[Point++];
       if ( (string[pos] & CF_LINESTART) == 0 )
       pos++, MaxLen--;
       string[pos] = '\0';
    }
}

/* Procedure to read the next symbol, either from the circular buffer or from
```

```
 * the input text.
 */
void nextsym()
{
   /* See if there's anything in the queue */
   if (AnalysisData->qptr != AnalysisData->qhead)
   {
      AnalysisData->qptr = qmove(AnalysisData->qptr, 1);
      AnalysisData->symbol =
      AnalysisData->queue[AnalysisData->qptr].symbol;
      AnalysisData->symval =
      AnalysisData->queue[AnalysisData->qptr].symval;
      AnalysisData->symtext =
      AnalysisData->queue[AnalysisData->qptr].symtext;
      copytext(&(AnalysisData->symtext), AnalysisData->symbuf, MAXWORDLEN);
      AnalysisData->speaking =
      AnalysisData->queue[AnalysisData->qptr].speaking;
   }
   else
   {
      readsym();
      /* Save the symbol in the queue */
      AnalysisData->qhead = qmove(AnalysisData->qhead, 1);
      AnalysisData->qptr = AnalysisData->qhead;
      if (AnalysisData->qhead == AnalysisData->qtail)
   AnalysisData->qtail = qmove(AnalysisData->qtail, 1);
      AnalysisData->queue[AnalysisData->qptr].symbol =
      AnalysisData->symbol;
      AnalysisData->queue[AnalysisData->qptr].symval =
      AnalysisData->symval;
      AnalysisData->queue[AnalysisData->qptr].symtext =
      AnalysisData->symtext;
      AnalysisData->queue[AnalysisData->qptr].speaking =
      AnalysisData->speaking;
      showsym();
   }

(AnalysisData->symcount)++;
}

/* Go back to the previous symbol in the circular buffer */
void backsym()
{
   AnalysisData->qptr = qmove(AnalysisData->qptr, -1);
   AnalysisData->symbol =
   AnalysisData->queue[AnalysisData->qptr].symbol;
   AnalysisData->symval =
   AnalysisData->queue[AnalysisData->qptr].symval;
   AnalysisData->symtext =
   AnalysisData->queue[AnalysisData->qptr].symtext;
   copytext(&(AnalysisData->symtext), AnalysisData->symbuf, MAXWORDLEN);
   AnalysisData->speaking =
   AnalysisData->queue[AnalysisData->qptr].speaking;
   (AnalysisData->symcount)--;
}

/* Move back over the symbols just mistakenly read */
void backphrase()
{
   while (AnalysisData->symcount > 0)
      backsym();
}

/*****************************************************************
 *                                                               *
 * readconv.c - Read a conversation from a file into the text area *
 *                                                               *
 * Written by Alan Stokes/Roger Abbott                           *
 *                                                               *
 * Copyright (C) 1987 Richards Computer Products Ltd             *
 *                                                               *
 *****************************************************************/ include <stdio.h>
include <ctype.h>
```

```c
#include "cadata.h"
#include "readconv.h"
#include "date.h"
#include "vocab.h"
#include "read.h"
#include "curinfo.h"
#include "debug.h"

define CharZero (int)'0' static int Heading( DATESTRUCT *Date );

/* The file pointer is a global item */
FILE *convfile;

extern int VeryEnd;

/* Procedure to read a complete conversation into the conversation data
 * area
 */
int readconv( int First, PSTR Buffer, int BufferSize,
DATESTRUCT *Date, int *TheEnd )
{
   int ch = First, i, convbufferpos = 0;
   char Flag = 0;
   BOOL Speaking, oldspeaking;
   VOCWORD *vp;

/* Look for the next printing character or EOF */
while ( ch != EOF && ch <= (int)' ' ) ch = getc(convfile);

/* If there is a heading read it */
   if ( ch == '$' ) ch = Heading( Date );

if (ch == '*')
   Speaking = TRUE;
   else
   {
      Speaking = FALSE;
      ungetc(ch, convfile);
   } for (;;)
   {
       Flag |= CF_LINESTART;
       if (!Speaking && !Opta)
 Flag |= CF_THEIR;
       Buffer[convbufferpos++] = Flag;
       Buffer[convbufferpos] = '\0';

/* Read all the characters of the line */
       for (;;)
   --{-
 ch = getc(convfile);
 if (ch == '\n' || ch == EOF || ch == '$' )
    break;
 Buffer[convbufferpos++] = (char) ch;
 Buffer[convbufferpos] = '\0';
       } if (convbufferpos >= BufferSize - MAXLINELEN - 1)
{
/* Just skip the rest and pretend we reached the end */
while ( ch != EOF && ch != '$' ) ch = getc(convfile);
} if (ch == EOF || ch == '$')
       {
*TheEnd = convbufferpos;
return( ch );
       } ch = getc(convfile);
       oldspeaking = Speaking;
       if (ch == '*')
```

```
       Speaking = TRUE;
           else
               {
       Speaking = FALSE;
       ungetc(ch, convfile);
           }
           if ( (oldspeaking != Speaking) && !Opta)
        Flag = CF_TX;
        else
        Flag = 0;
           }
       }

/********************************************************/ static int Heading( DATESTRUCT *Date )
{
int ch, i;
BOOL speaking, oldspeaking;
VOCWORD *vp;
static char Month[ 20 ];

/* Set the conversation date if there is one, which must be the
first heading item */
ch = getc(convfile);
ungetc( ch, convfile );
unless ( ch >= '0' && ch <= '9' )
goto ReadSpot;

Date->day = 0;
Date->year = 0;
EchoInput( '\n' ); EchoInput( '$' );

/* The day is a number */
for (;;)
{
ch = getc(convfile);
if ( ch >= '0' && ch <= '9' )
{
EchoInput( ch );
Date->day = 10*Date->day + ch - CharZero;
}
else break;
}
while ( ch == ' ' )
{
EchoInput( ch );
ch = getc(convfile);
}

/* The month must be upper case letters (at least 3) */
i = 0;
while ( ch != '\n' && ch != ' ' && ch != EOF )
{
EchoInput( ch );
ch = toupper( ch );
Month[ i++ ] = ( char) ch;
ch = getc(convfile);
}
Month[ i ] = 0;
vp = lookup( Month );
if ( vp->symbol == S_MONTH )
Date->month = vp->symval;
else Date->month = 1;

/* Read the year if there is one */
if ( ch == ' ' )
{
for (;;)
    {
    EchoInput( ch );
    ch = getc(convfile);
    if ( ch >= '0' && ch <= '9' )
    Date->year =
    10*Date->year+ch-CharZero;
```

```c
else break;
}
if ( Date->year < 1900 )
Date->year +=1900;
}
else Date->year = 1985;

ReadSpot:
/* Look for the next printing character or EOF */
while ( ch != EOF && ch <= (int)' ' )
ch = getc(convfile);

/* If the next character is another $ read the spot rate */
if ( ch == '$' )
{
EchoInput( '\n' ); EchoInput( '$' );
i = 0;
ch = getc(convfile);
while ( (ch >= '0' && ch <= '9' ) || ch == '.' )
{
EchoInput( ch );
if ( i < RATEBYTES ) DefSpot[i++] = (char) ch;
ch = getc(convfile);
}
DefSpot[i] = '\0';

/* Look for the next printing character or EOF */
while ( ch != EOF && ch <= ' ' )
ch = getc(convfile);
} return( ch );
}

/*****************************************************************
 *                                                               *
 * spot.c - Routines to read spot quotes & rates                 *
 *                                                               *
 * Written by Alan Stokes                                        *
 *                                                               *
 * Copyright (C) 1987 Richards Computer Products Ltd             *
 *                                                               *
 *****************************************************************/ include <string.h>
include <ctype.h> include "analdata.h"
include "spot.h"
#include "number.h"
#include "read.h"
#include "spot2.h"
#include "insert.h"
#include "number2.h"

static BOOL readquote(PSTR, PSTR);
static BOOL readspot(PSTR);
static BOOL HaveBigFigs;

/* Attempt to read a number as a spot quote.  The two parts are put
 * into low & high.  The result was whether we were successful.
 */
static BOOL readquote(PSTR low, PSTR high)
{
    static char num[MAXWORDLEN + 1];
    static int numdigits;
    static BOOL nodp;
    static int dummy;
    BOOL (*assume)(PSTR);

if (Ticket->DealType == SPOT)
        assume = assumespot;
    else
        assume = assumeout;
```

```
/* Get the first part of the number */
strcpy(AnalysisData->numbuf, AnalysisData->symbuf);
nextnum(num, &dummy);
unless (strlen(num) <= RATEBYTES)
    return (FALSE);

numdigits = digits(num);
nodp = (strchr(num, '.') == NULL);

if (numdigits < 4)
{
    /* This cannot be a full rate.  It must be the first part of a
     * number of the form 1.23 45-67 or 89-90.
     */
    if (!nodp || (numdigits > 2 && know(t_bigfigs) &&
    samebigfigs(num, AnalysisData->BigFigs)))
    {
/* We have just read the big figures, so we expect a number
 * of the form 1.23 45-67.  The next bit should be the rest
 * of the low rate.
 */
strcpy(low, num);
unless (nextnum(num, &dummy) && append(low, num))
    return (FALSE);

/* This should be followed by the high rate, either as just
 * the little figures or (exceptionally) the complete rate
 */
strcpy(high, low);
unless (nextnum(num, &dummy) && merge(high, num, TRUE))
    return (FALSE);
    }
    else
    {
/* This is probably the little figures, eg 70-80.  We need
 * to guess what the current big figures are to get the
 * complete values.
 * If the big figures are not available, and another small
 * number follows, it is a quote which we cannot
 * expand.
 */
if ( (*assume)(low) )
{
HaveBigFigs = TRUE;
unless ( merge(low, num, FALSE) )
return FALSE;
}
else{
HaveBigFigs = FALSE;
strcpy(low, num);
}

/* Now we should have the high rate */
 if ( HaveBigFigs )
 {
strcpy(high, low);
unless (nextnum(num, &dummy) && merge(high, num, TRUE))
return FALSE;
}
 else{
 unless (nextnum(num, &dummy) )
 return FALSE;
if ( digits(num) <=2 )
strcpy(high, num );
else return FALSE;
}
    }
}
    else if (numdigits == 4 && nodp && AnalysisData->numbuf[0] == 0)
    {
        /* This is a very special case, a single four digit number with
         * no decimal point, eg 6575.  This probably means 65-75.
         */
        static char secondpart[3];
        strcpy(secondpart, num+2);
```

```
      num[2] = 0;

unless ((*assume)(low) && merge(low, num, FALSE))
    return (FALSE);
          strcpy(high, low);
          unless (merge(high, secondpart, TRUE))
    return (FALSE);
      }
      else
      {
         /* Assume what we have is the complete low rate.  We just need
          * to get the high rate (which will almost certainly just be
          * the little figures).
          */
         strcpy(low, num);

strcpy(high, low);
         unless (nextnum(num, &dummy) && merge(high, num, TRUE))
    return (FALSE);
      }

/* We have read in the two rates now.  However, we must not be in
       * the middle of a number at this point (this would happen eg for
       * 01-03-85).
       */
      return (AnalysisData->numbuf[0] == 0);
}

/* Routine to parse a spot quote */
BOOL parsequote(BOOL force)
{
    static BOOL ok;
    static int bigfigs;
    static BOOL bigfigsfound;
    static char low[RATEBYTES+1], high[RATEBYTES+1];

/* Assume its not a quote of little figs only */
    HaveBigFigs = TRUE;

ok = TRUE;
    bigfigs = -1;
    bigfigsfound = FALSE;
    AnalysisData->symcount = 0;

if (!(readquote(low, high) && goodspot(low) && goodspot(high)))
       ok = FALSE;
    else if ( HaveBigFigs )
    {
       /* We have read two valid rates. We have to check that the big
        * figures are what we expect for the rate.
        */
       if (know(t_bigfigs))
       {
bigfigs = AnalysisData->BigFigs;
if (AnalysisData->TicketItemStatus[t_bigfigs] == st_assumed ||
force)
      /* We are not certain that the figures we already have
       * are correct, so if the quote specified the big figures
       * we will use them.
       */
      if (getbigfigs(low, &bigfigs) || getbigfigs(high, &bigfigs))
         bigfigsfound = TRUE;
      }
      else
if (getbigfigs(low, &bigfigs) || getbigfigs(high, &bigfigs))
    bigfigsfound = TRUE;

unless (bigfigs != -1 && checkbigfigs(low, bigfigs, FALSE) &&
          checkbigfigs(high, bigfigs, FALSE))
ok = FALSE;
    } if (ok)
    {
       if (bigfigsfound && HaveBigFigs )
```

```c
    insertnum(t_bigfigs, bigfigs, st_extracted);

insertnum(t_quoter, AnalysisData->speaking, st_extracted);
      insertstring(t_low, low, st_extracted);
      insertstring(t_high, high, st_extracted);
   }
   else
      backphrase();
   return (ok);
}

/* Read a one-sided spot rate (as in AT 1.2345). */
static BOOL readspot(PSTR spot)
{
   static char num[MAXWORDLEN+1];
   static int numdigits;
   static int dummy;
   BOOL (*assume)(PSTR);

if (Ticket->DealType == SPOT)
      assume = assumespot;
   else
      assume = assumeout;

/* Read in the first part of the number */
   strcpy(AnalysisData->numbuf, AnalysisData->symbuf);
   nextnum(num, &dummy);
   unless (strlen(num) <= RATEBYTES)
      return (FALSE);

numdigits = digits(num);
   if (numdigits < 4)
   {
      /* This is probably either the big figures of a rate (1.23 45)
       * or the little figures (45), but it might just be the
       * complete rate.
       * We take it as the first part of the rate if it has a decimal
       * point or if it has more than two digits and matches the expected big
       * figures.
       */
      if (strchr(num, '.') != NULL || (numdigits > 2 &&
       know(t_bigfigs) && samebigfigs(num, AnalysisData->BigFigs)))
      {
strcpy(spot, num);

/* If there is another part, separated by a space, we use that;
 * otherwise assume we have the complete rate.
 */
if (AnalysisData->numbuf[0] == 0 && nextnum(num, &dummy))
   unless (append(spot, num))
      return (FALSE);
      }
      else
/* This is probably just the little figures, so we get the bigfigures
 * from elsewhere.
 */
unless ((*assume)(spot) && merge(spot, num, FALSE))
   return (FALSE);
   }
   else
      /* This must be the complete rate */
      strcpy(spot, num);

/* We must not now be halfway through a number */
   return (AnalysisData->numbuf[0] == 0);
}

/* Routine to parse the spot deal rate */
BOOL parsespot( BOOL force)
{
   static BOOL ok;
   static int bigfigs;
   static BOOL bigfigsfound;
   static char spot[RATEBYTES+1];
```

```
   ok = TRUE;
   bigfigs = -1;
   bigfigsfound = FALSE;
   AnalysisData->symcount = 0;

if (readspot(spot) && goodspot(spot))
   {
      if (know(t_bigfigs))
      {
bigfigs = AnalysisData->BigFigs;
if (force && getbigfigs(spot, &bigfigs))
   bigfigsfound = TRUE;
      }
      else
if (getbigfigs(spot, &bigfigs))
   bigfigsfound = TRUE;

if (bigfigs == -1)
ok = FALSE;
      else
/* The rate should agree with the big figures.  NB checkbigfigs
 * may insert a decimal point in the appropriate place.
 */
unless (bigfigsfound || checkbigfigs(spot, bigfigs, FALSE))
   unless (force)
      ok = FALSE;
   }
   else
      ok = FALSE;

/* Now check the reasonableness of the rate */
   if (ok && !force)
   {
      if (digits(spot) < 4)
ok = FALSE;
      else if (know(t_low) && strcmp(spot, Ticket->LowQuote) != 0 &&
      strcmp(spot, Ticket->HighQuote) != 0)
ok = FALSE;
      else
      {
/* Check the following symbol */
nextsym();
switch (AnalysisData->symbol)
{
   case S_MONTH: case S_MIO: case S_YARD:
   case S_TH: case S_PERCENT: case S_CURRENCY:
   case S_WEEK: case S_MTH: case S_YEAR:
      ok = FALSE;
      break;
   default:
      backsym();
      break;
}
      }
   } if (ok)
   {
      if (bigfigsfound)
insertnum(t_bigfigs, bigfigs, st_extracted);
      insertstring(t_rate, spot, st_extracted);
   }
   else
      backphrase();

return (ok);
}

/***************************************************************
 *                                                              *
 * spot2.c - Routines for handling spot rates                   *
 *                                                              *
 * Written by Alan Stokes                                       *
 *                                                              *
 * Copyright (C) 1987 Richards Computer Products Ltd            *
 *                                                              *
 ***************************************************************/
```

```c
include <string.h>
include <ctype.h> include "analdata.h"
include "spot2.h"
#include "curinfo.h"
#include "insert.h"

/* Check that a number is a good spot rate.  This may involve
 * altering the number to bring it into the standard form.
 */
BOOL goodspot(string)
PSTR string;
{
    int len = strlen(string);
    BOOL dp = FALSE;
    int i;

if (string[0] == '0')
    {
        /* It may only start with a zero if it is of the form 0.12 ...
         * If it does, we strip the leading zero.
         */
        if (len > 1 && string[1] == '.')
            memmove(string, string+1, len--);
        else
            return (FALSE);
    } for (i = 0; i < len; i++)
    {
        char ch = string[i];

if (ch == '.')
        {
            if (dp)
                /* Second decimal point found - no good */
                return (FALSE);
            else
                /* Remember we have seen a decimal point */
                dp = TRUE;
        }
        else
            unless (isdigit(ch))
                return (FALSE);
    } return (TRUE);
}

/* Return a reasonable approximation to the spot rate if possible
 * (this is usually used for getting the big figures).  We return
 * FALSE if we can't find such a rate.
 */
BOOL assumespot(result)
PSTR result;
{
    static char dummy[20];
    /* If a quote has already been made use that. */
    if (know(t_deal) && Ticket->DealType == SPOT && know(t_low))
    {
        strcpy(result, Ticket->LowQuote);
        return (TRUE);
    }

/* We now try to return the FRXA rate.  Possibly we should also
       look at the rate if one has been agreed. */
    unless (know(t_cur1) && know(t_cur2) && know(t_quotecur))
        return (FALSE);

return( getspot( Ticket->Currency1, Ticket->Currency2,
        Ticket->QuoteCurr, result, dummy ));
}

/* Return a reasonable approximation to the outright rate if possible
```

```
* (this is usually used for getting the big figures).  We return
* FALSE if we can't find such a rate.
*/
BOOL assumeout( PSTR result )
{
static char dummy[20];

/* If a quote has already been made use that. */
    if (know(t_deal) && Ticket->DealType == OUTRIGHT && know(t_low))
    {
        strcpy(result, Ticket->LowQuote);
        return (TRUE);
    }

/* We now try to return the FRXA rate. */
    unless (know(t_cur1) && know(t_cur2) && know(t_quotecur) && know(t_period))
        return (FALSE);

return( getoutright( Ticket->Currency1, Ticket->Currency2,
    Ticket->QuoteCurr, Ticket->Period, result, dummy ));
}

/* The following routines use the big figures for a spot quote
 * (normally abbreviated as bigfigs).  These are stored as a single
 * word, with the low byte containing the number formed by the first
 * two digits, while the high byte contains the position of the
 * decimal point.
 */

/* Extract the bigfigs from a number.  We return -1 if we couldn't
 * find the necessary info.
 */
BOOL getbigfigs(string, result)
PSTR string;
int *result;
{
    int pos;
    int figures = 0;
    int dppos = -1;
    int digits = 0;

for (pos = 0; string[pos] != 0; pos++)
    {
        char ch = string[pos];

if (ch == '.')
    dppos = pos;
        else if (digits < 2)
        {
    figures = figures * 10 + (ch - '0');
    digits++;
        }
    } if (dppos == -1 || digits < 2)
        return (FALSE);
    else
    {
        *result = figures | (dppos << 8);
        return (TRUE);
    }
}

/* Check that a number string matches a bigfigs.  If the number does
 * not contain a decimal point but has correct big figures the
 * decimal point is inserted in the appropriate place.  If outright is
 * true it indicates the rate is an outright rate. and so may be
 * significantly different from the spot rate.
 */
BOOL checkbigfigs(string, bigfigs, outright)
PSTR string;
int bigfigs;
BOOL outright;
{
```

```
  int figures = bigfigs & 0xff;
  int dppos = bigfigs >> 8;
  int stringfigures, stringdppos;
  int len = strlen(string);

if (strchr(string, '.') == NULL)
  {
      /* The string does not contain a decimal point, so just check
       * the figures.
       */
      if (string[0] == '0' || len < 2)
          return (FALSE);
      stringfigures = (string[0] - '0') * 10 + (string[1] - '0');
      stringdppos = dppos;

/* We have to cope with the fact that 9.99 is similar to 10.00,
       * but with vastly different big figures.
       */
      if (stringfigures < figures && figures == 99)
      {
          stringfigures *= 10;
          stringdppos++;
      }
      else if (stringfigures > figures && figures == 10)
      {
          figures *= 10;
          stringdppos--;
      }

/* Insert the dp is there is room */
      if (len >= RATEBYTES)
          return (FALSE);
      else
      {
          len++;
          memmove(string+stringdppos+1, string+stringdppos,
              len - stringdppos);
          string[stringdppos] = '.';
      }

/* Check the numbers are similar */
      unless (outright || abs(stringfigures - figures) <= 1)
          return (FALSE);
  }
  else
  {
      /* There is a decimal point */
      static int stringbigfigs;

unless (getbigfigs(string, &stringbigfigs))
          return (FALSE);
      stringfigures = stringbigfigs & 0xff;
      stringdppos = stringbigfigs >> 8;

if (stringfigures < figures && figures == 99)
      {
          stringfigures *= 10;
          stringdppos--;
      }
      else if (stringfigures > figures && figures == 10)
      {
          figures *= 10;
          stringdppos++;
      } unless (stringdppos == dppos && (outright ||
          abs(stringfigures - figures) <= 1))
          return (FALSE);
  } return (TRUE);
}

/* Check that a short stub (a few digits from the start of a spot
 * rate) has big figures in agreement with what we expect.
```

```
*/
BOOL samebigfigs(stub, bigfigs)
PSTR stub;
int bigfigs;
{
   int stubfigs;

/* Extract the expected leading digits */
   bigfigs = bigfigs & 0xff;

/* Calculate the actual figures on the stub */
   if (strlen(stub) < 2 || stub[0] == '0')
      /* Not suitable */
      return (FALSE);
   stubfigs = (stub[0] - '0') * 10 + (stub[1] - '0');

/* If there is a difference then try to make them the same
    * magnitude.
    */
   if ( abs(bigfigs - stubfigs) > 1 )
   {
   if (stubfigs < bigfigs)
stubfigs *= 10;
else if (bigfigs < stubfigs)
bigfigs *= 10;
   }
   return (abs(bigfigs - stubfigs) <= 1);
}

/*****************************************************************
 *                                                               *
 * spotpars.c - Routines to parse a spot deal                    *
 *                                                               *
 * Written by Alan Stokes                                        *
 *                                                               *
 * Copyright (C) 1987 Richards Computer Products Ltd             *
 *                                                               *
 *****************************************************************/ include "analdata.h"
include "spotpars.h"
#include "insert.h"
#include "period.h"
#include "read.h"
#include "miscpars.h"
#include "pay.h"
#include "comparse.h"
#include "spot.h"
#include "datepars.h"

static BOOL numparse(void);

/* Handle a number in a spot conversation with no preceding forcing words.
 * We try the possibilities in order of likelihood, depending on the
 * stage of the conversation.
 */
static BOOL numparse()
{
   BOOL triedquote = FALSE;

if ((!know(t_buy) && (!know(t_low) || (know(t_quoter) &&
      Ticket->Quoter == AnalysisData->speaking)))
   {
      if (parsequote(FALSE))
return (TRUE);
      triedquote = TRUE;
   } if (parsespot(FALSE))
      return (TRUE);
   if (checkamount(FALSE))
      return (TRUE);
   if (parsedate(FALSE, t_near))
      return (TRUE);

unless (triedquote)
```

```c
      if (parsequote(FALSE))
  return (TRUE);

return (FALSE);
}

/* Procedure to parse a spot conversation.  The result is the deal type
 * to change to.
 */
int spotparse( void )
{
   for (;;)
   {
      /* Whether we should read another symbol at the end of the
       * loop. */
      BOOL readanother = TRUE;

/* This procedure is called from the outermost level without reading
       * any of the conversation, so save the current status as we can safely
       * re-enter the analysis from this point */
      SaveAnalysisState();

switch (AnalysisData->symbol)
      {
   case S_TODAY:
      insertnum(t_period, P_TT, st_extracted);
      break;
   case S_TOM:
      insertnum(t_period, P_TOM, st_extracted);
      break;
   case S_TT:
      /* This usually means TODAY, but is not enough to override
       * anything else.
       */
      if (AnalysisData->TicketItemStatus[t_period] < st_deduced)
         insertnum(t_period, P_TT, st_extracted);
      break;
   case S_MONTH:
      parsedate(FALSE, t_near);
      break;
   case S_VAL: case S_DATES:
      /* The value date is about to appear */
      nextsym();
      if (AnalysisData->symbol == S_SPOT)
      {
         /* VAL SPOT [date] is the forcing word to set period to SPOT */
         insertnum(t_period, P_SPOT, st_extracted);
         nextsym();
      }
      unless (parsedate(TRUE, t_near))
         readanother = FALSE;
      break;
   case S_SPOT:
      /* Forces the quote and/or the currencies */
      nextsym();
      if (AnalysisData->symbol == S_NUMBER)
         if (parsequote(TRUE))
     nextsym();
      if (AnalysisData->symbol == S_CURRENCY)
         if (currencies())
     nextsym();
      readanother = FALSE;
      break;
   case S_S: case S_B: case S_BUY:
   case S_SELL:
   {
      int first = AnalysisData->symbol;

AnalysisData->symcount = 0;
      nextsym();
      if (AnalysisData->symbol == S_SLASH ||
          AnalysisData->symbol == S_AND ||
          AnalysisData->symbol == S_N)
         nextsym();

if (AnalysisData->symbol == S_S ||
```

```
     AnalysisData->symbol == S_B ||
     AnalysisData->symbol == S_BUY ||
     AnalysisData->symbol == S_SELL)
     {
         /* BUY AND SELL indicates a swap deal */
         backphrase();
         return (SWAP);
     } backphrase();
     /* S or B are not allowed in spot conversations */
     if (AnalysisData->symbol == S_S ||
     AnalysisData->symbol == S_B)
         break;
     /* Fall through to treat as indicator of direction */
 }
 case S_MINE:
     insertnum(t_buy,
 AnalysisData->speaking ^ (AnalysisData->symbol == S_SELL),
st_extracted);
     nextsym();
     if (AnalysisData->symbol == S_NUMBER ||
     AnalysisData->symbol == S_CURRENCY)
         if (checkamount(TRUE))
  break;
     readanother = FALSE;
     break;
 case S_YOURS:
     /* This could be an indication of the deal direction, but equally
      * it could indicate a payment instruction (YOUR FRF TO ...)
      */
     if (parsepay())
         break;
     nextsym();
     insertnum(t_buy, !(AnalysisData->speaking), st_extracted);
     readanother = FALSE;
     break;
 case S_NUMBER:

if (numparse())
        break;
    if (parseperiod())
    {
        nextsym();
        return (SWAP);
    }
    break;
 case S_AT:
    /* Forces the next number to be taken as the deal rate */
    nextsym();
    if (AnalysisData->symbol == S_NUMBER)
        parsespot(TRUE);
    else
        readanother = FALSE;
    break;
 default:
 {
    int res = commonparse();
    if (res != NO_DEAL)
       return (res);
    readanother = FALSE;
    break;
 }
     } if (readanother)
 nextsym();
     }
 }
/*
```

```
/****************************************************************
**
* Dealing ART (ART 3)  Phase 1 MS Windows Server*
* EMS memory allocation routines.*
**
* Written by Duncan G. Booth*
* $Author:   Duncan  $ (Last modified)*
* $Revision:   1.0  $*
**
* Copyright (C) Richards Computer Products Ltd. 1987*
**
****************************************************************
*/
#pragma pack(1)
#include <stdio.h>
#include <dos.h>
#include <stdlib.h>
#include "dgb.h"
#include "types.h"
#include "srvems.h"

#define PAGESIZE 16384
#define MAXMAPPAGES 64 /* Maximum number of mappable pages that EMS can handle. */
define EMSMAGIC 897 typedef struct PAGETABLE {
    HANDLE MappedHandle;
    WORD MappedPage;
    WORD Locks;
    LPSTR PageBase;
    WORD PageNo;
} PAGETABLE, *PPAGETABLE;

typedef struct EMSHANDLE {
    WORD BlockSize;
    WORD BPP;
    WORD Pages;
    WORD EMShandle;
} EMSHANDLE, *PEMSHANDLE;

typedef struct MPA {
    WORD Seg;
    WORD PageNo;
} MPA, *PMPA, far *LPMPA;

static BOOL Init = FALSE;
WORD EMS_error = 0;/* Set on every error - never cleared. */
static EMSHANDLE HandleTable[4] = {0};
static PPAGETABLE MapTable = NULL;
static PPAGETABLE EndMapTable = NULL;
static PPAGETABLE LRUpage = NULL;
static WORD MapTableSize = 0;

static union REGS regs;
static struct SREGS segregs;
static char EmmDevName[] = "EMMXXXX0";

/*
****************************************************************
* Prototypes for local functions.*
****************************************************************
*/
static WORD near pascal   _EMS_version_number(void);
static WORD near pascal   _EMS_GetMPA(LPMPA MappablePageArray);
static WORD near pascal   _EMS_GetFreePageCount(void);
static void near pascal   _EMS_free(HANDLE hMem);
static HANDLE near pascal _EMS_alloc(WORD NumPages);
static BOOL near pascal   _EMS_setname(HANDLE hMem, LPSTR name);
static BOOL near pascal   MapPage(HANDLE h, WORD logpage, WORD physpage);
static BOOL near pascal   UnMapPage(WORD physpage);

static void cdecl  EMSfatal(char *msg);
static void near pascal  InitialiseEMS(void);

WORD far pascal EMSmaxCount (WORD size)
```

```
{
   if (!Init) InitialiseEMS();
   {
      WORD bpp = PAGESIZE / size;
      WORD Pages = _EMS_GetFreePageCount();
      long count = (long) bpp * Pages;
      if (count > 65535) return 65535;
      return (WORD) count;
   }
}

HANDLE far pascal EMSallocate (WORD count, WORD size)
{
   int i;
   if (!Init) InitialiseEMS();
   for (i = 0; i < HIGH(HandleTable); i++) if (HandleTable[i].EMShandle == 0)
   {
      PEMSHANDLE p = &HandleTable[i];
      p->BlockSize= size;
      p->BPP= PAGESIZE / size;
      p->Pages= (count + p->BPP - 1) / p->BPP;
      p->EMShandle= _EMS_alloc (p->Pages);
      if (p->EMShandle == 0) return 0;
      return i + EMSMAGIC;
   }
   return 0;
}

BOOL far pascal EMSsetname (HANDLE hUser, LPSTR name)
{
   PEMSHANDLE p = &HandleTable[hUser - EMSMAGIC];
   if (hUser < EMSMAGIC || hUser > EMSMAGIC + HIGH(HandleTable))
      EMSfatal("EMSsetname: Invalid handle");
   return _EMS_setname (p->EMShandle, name);
} void far *far pascal EMSlock (HANDLE hUser, WORD index)
{
   EMSlockRange (hUser, index, NULL);
} void far pascal EMSunlock (HANDLE hUser, WORD index)
{
   PEMSHANDLE p = &HandleTable[hUser - EMSMAGIC];
   WORD page;
   PPAGETABLE pPT;
   if (hUser < EMSMAGIC || hUser > EMSMAGIC + HIGH(HandleTable))
      EMSfatal("EMSunlock: Invalid handle");

page = index / p->BPP;
   if (page >= p->Pages)
      EMSfatal("EMSunlock: index out of range");
   for (pPT = MapTable; pPT->MappedPage != page || pPT->MappedHandle != p->EMShandle; pPT++)
   {
      if (pPT < EndMapTable) continue;
      EMSfatal("EMSunlock: Page not mapped or locked!");
   }
   if (pPT->Locks == 0)
      EMSfatal("EMSunlock: Page not locked");
   pPT->Locks--;
} void far pascal EMSfree (HANDLE hUser)
{
   PEMSHANDLE p = &HandleTable[hUser - EMSMAGIC];
   PPAGETABLE pPT;
   if (hUser < EMSMAGIC || hUser > EMSMAGIC + HIGH(HandleTable))
      EMSfatal("EMSsetname: Invalid handle");

if (p->EMShandle == 0)
      EMSfatal("EMSfree: Bad handle (or already free)");

for (pPT = MapTable; pPT < EndMapTable; pPT++)
   {
```

```
        if (pPT->MappedHandle == p->EMShandle)/* Page is mapped */
        {
    if (pPT->Locks != 0)
        EMSfatal("EMSfree: Handle has locks");
    MapPage(p->EMShandle, 0xFFFF, pPT->PageNo);
    pPT->MappedHandle = 0;
        }
    }
    _EMS_free(p->EMShandle);/* Free the handle */
    p->EMShandle = 0;/* So it may be re-used. */
} void far * far pascal EMSLockRange (HANDLE hUser, WORD index, WORD far *maxindex)
{
    PEMSHANDLE p = &HandleTable[hUser - EMSMAGIC];
    WORD page;
    PPAGETABLE pPT;
    if (hUser < EMSMAGIC || hUser > EMSMAGIC + HIGH(HandleTable))
        EMSfatal("EMSlock: Invalid handle");

page = index / p->BPP;
    if (page >= p->Pages)
        EMSfatal("EMSlock: index out of range");

for (pPT = MapTable; !(pPT->MappedPage == page && pPT->MappedHandle == p->EMShandle); pPT++)
    {
        if (pPT < EndMapTable) continue;

/* If we get in here - there are no free or matching pages so
         * pick an unused page instead.
         */
        pPT = LRUpage;
        for (;;)
        {
    if (++pPT == EndMapTable) pPT = MapTable;
    if (pPT->Locks == 0) break;
    if (pPT == LRUpage) return NULL;/* Too many pages locked */
        }
        LRUpage = pPT;/* Remember where to start next search */

/* Map the page */
        pPT->MappedHandle = p->EMShandle;
        pPT->MappedPage = page;
        unless (MapPage (pPT->MappedHandle = p->EMShandle, pPT->MappedPage = page, pPT->PageNo))
    EMSfatal("EMSlock: Cannot map page");
        break;
    }

/* pPT points to the page mapped into memory. */
    pPT->Locks += 1;
    if (maxindex != NULL)
        *maxindex = ((index + p->BPP)/p->BPP) * p->BPP - 1;

return pPT->PageBase + ((index % p->BPP) * p->BlockSize);
}

/*
 ***************************************************************
 * Low level EMS functions.*
 ***************************************************************
 */ define LOWORD(l)((WORD)(l))
define HIWORD(l)((WORD)(((DWORD)(l) >> 16) & 0xFFFF))
define EMM_INT 0x67 static WORD near pascal _EMS_version_number ()
{
    int i;
    LPSTR lpDevName;
    regs.h.ah = 0x35;/* Read pointer at interrupt vector 0x67 */
    regs.h.al = EMM_INT;
    intdosx (®s, ®s, &segregs);
    lpDevName = (LPSTR) ((long) segregs.es << 16) + 10;
```

```
   for (i = 0; i < 8; i++) if (EmmDevName[i] != lpDevName[i])
      return 0 ;

regs.h.ah = 0x46;/* Get version call */
   int86 (EMM_INT, ®s, ®s);
   if (regs.h.ah == 0)
      return regs.h.al;
   EMS_error = regs.h.ah;
   return 0;
} static WORD near pascal _EMS_GetMPA (LPMPA pMap)
{
   if (pMap == NULL)
      regs.x.ax = 0x5801;/* Get number of entries in array */
   else
   {
      regs.x.ax = 0x5800;/* Get mappable page address array */
      regs.x.di = LOWORD (pMap);
      segregs.es = HIWORD (pMap);
   }
   int86x (EMM_INT, ®s, ®s, &segregs);
   if (regs.h.ah != 0)
   {
      EMS_error = regs.h.ah;
      return 0;
   }
   return regs.x.cx;
} static WORD near pascal _EMS_GetFreePageCount()
{
   regs.h.ah = 0x42;/* Get unallocated page count */
   int86 (EMM_INT, ®s, ®s);
   if (regs.h.ah != 0)
   {
      EMS_error = regs.h.ah;
      return 0;
   }
   return regs.x.bx;
} static void near pascal _EMS_free (HANDLE h)
{
   regs.x.ax = 0x4500;
   regs.x.dx = h;
   int86 (EMM_INT, ®s, ®s);
   if (regs.h.ah != 0)
   {
      EMS_error = regs.h.ah;
   }
} static HANDLE near pascal _EMS_alloc (WORD NumPages)
{
   regs.x.ax = 0x4300;/* Allocate pages */
   regs.x.bx = NumPages;
   int86 (EMM_INT, ®s, ®s);
   if (regs.h.ah != 0)
   {
      EMS_error = regs.h.ah;
      return 0;
   }
   return regs.x.dx;
} static BOOL near pascal _EMS_setname (HANDLE hMem, LPSTR name)
{
   regs.x.ax = 0x5301;/* Assign name to handle */
   regs.x.dx = hMem;
   regs.x.si = LOWORD (name);
   segregs.ds = HIWORD (name);
   int86x (EMM_INT, ®s, ®s, &segregs);
   if (regs.h.ah != 0)
   {
```

```c
        EMS_error = regs.h.ah;
        return FALSE;
    }
    return TRUE;
}

/* Map a single page into the given page slot. */
static BOOL near pascal MapPage (HANDLE h, WORD logpage, WORD physpage)
{
    regs.h.ah = 0x44;/* Map/unmap single page */
    regs.h.al = (BYTE) physpage;
    regs.x.bx = logpage;
    regs.x.dx = h;
    int86 (EMM_INT, ®s, ®s);
    if (regs.h.ah != 0)
    {
        EMS_error = regs.h.ah;
        return FALSE;
    }
    return TRUE;
} static BOOL near pascal UnMapPage (WORD physpage)
{
    return MapPage(0, 0xffff, physpage);
}

/*
 ***************************************************************
 * Other support functions.*
 ***************************************************************
 */
static void cdecl EMSfatal(char *msg)
{
    printf("%s (%d)\n", msg, EMS_error);
    exit(1);
} static void near pascal InitialiseEMS()
{
    int i;
    int verno;
    Init = TRUE;
    /* Check that EMS exists. */
    {
        verno = _EMS_version_number();
        if (verno == 0) EMSfatal("No EMS driver loaded");
        printf("EMS version %d.%d\n", verno/16, verno&0xf);
        if (verno < 0x39)
        {
    EMSfatal("Wrong EMS version");
        }
    }

/* Build list of mappable pages. */
    if (verno >= 0x40)
    {
        WORD PageCount;
        PPAGETABLE p;
        MPA mpa[MAXMAPPAGES];

PageCount = _EMS_GetMPA (NULL);

if (PageCount == 0) EMSfatal("Can't get page array");
        if (PageCount > MAXMAPPAGES) EMSfatal("Too many pages!");
        _EMS_GetMPA (mpa);

for (i = 0; i < PageCount && mpa[i].Seg < 0xC000; i++)
/*SKIP*/;

MapTableSize = PageCount - 1;

printf ("EMS found %d out of %d usable pages\n", MapTableSize, PageCount);
        if ((MapTable = malloc (MapTableSize * sizeof(PAGETABLE))) == NULL)
    EMSfatal("Cannot allocate PAGETABLE");
```

```
        EndMapTable = &MapTable[MapTableSize];
        LRUpage = EndMapTable - 1;

for (p = MapTable; p < EndMapTable; p++, i++)
        {
    p->MappedHandle = 0;
    p->MappedPage = 0;
    p->Locks = 0;
    p->PageBase = (LPSTR) ((long) mpa[i].Seg << 16);
    p->PageNo = mpa[i].PageNo;
        }
    }
    else /* Old version of EMS - just use the page frame. */
    {
        printf("Old EMS - Map table fixed at 4\n");
        MapTableSize = 4;
        if ((MapTable = malloc (MapTableSize * sizeof(PAGETABLE))) == NULL)
    EMSfatal("Cannot allocate PAGETABLE");

EndMapTable = &MapTable[MapTableSize];
        LRUpage = EndMapTable - 1;

regs.x.ax = 0x4100;/* Get Page frame base address */
        int86 (EMM_INT, ®s, ®s);
        if (regs.h.ah != 0)
        {
    EMS_error = regs.h.ah;
    EMSfatal("Cannot get page frame!");
        } printf("Page frame at %04x\n", regs.x.bx);
        for (i = 0; i < 4; i++)
        {
    MapTable[i].PageBase = (LPSTR) ((long) (regs.x.bx + (i << 10)) << 16);
    MapTable[i].PageNo = i;
        }
    }
} include <stdio.h>
include <malloc.h> include "types.h"
include "qtw_stor.h"

static LPPKT_TICKETDATA Message;
static LPSTR Pointer;

void main( int argc, int argv )
{
int DataSize;
char ch = '0';

Message =
(LPPKT_TICKETDATA) _fmalloc( sizeof(PKT_TICKETDATA) +
sizeof(TW_TICKET) );
Pointer = (LPSTR) Message->Data;
for ( DataSize = 0; DataSize<10; DataSize++ )
*Pointer++ = ch++;

Message->Header.Length = Pointer - (LPSTR) Message;
Pointer = (LPSTR) Message;
DataSize = (Pointer + Message->Header.Length)
- (LPSTR) Message->Data;
printf( "\nData size %d", DataSize );

}
include <stdio.h>
include <malloc.h> include "types.h"
include "qtw_stor.h"
static LPPKT_TICKETDATA Message;
static LPSTR Pointer;
```

```c
void main( int argc, int argv )
{
int DataSize;
char ch = '0';

Message =
(LPPKT_TICKETDATA) _fmalloc( sizeof(PKT_TICKETDATA) +
sizeof(TW_TICKET) );
Pointer = Message->Data;
for ( DataSize = 0; DataSize<10; DataSize++ )
*Pointer++ = ch++;

Message->Header.Length = Pointer - (LPSTR) Message;
DataSize = ((LPSTR) Message + Message->Header.Length)
- (LPSTR) Message->Data;
printf( "\nData size %d", DataSize );

}
include <stdio.h>
include <malloc.h> include "types.h"
include "qtw_stor.h"

static LPPKT_TICKETDATA Message;
static LPSTR Pointer;

void main( int argc, int argv )
{
int DataSize;
char ch = '0';

Message =
(LPPKT_TICKETDATA) _fmalloc( sizeof(PKT_TICKETDATA) +
sizeof(TW_TICKET) );
Pointer = (LPSTR) Message->Data;
for ( DataSize = 0; DataSize<10; DataSize++ )
*Pointer++ = ch++;

Message->Header.Length = Pointer - (LPSTR) Message;
DataSize = ((LPSTR) &((LPSTR) Message)[Message->Header.Length])
- (LPSTR) Message->Data;
printf( "\nData size %d", DataSize );

}
include <stdio.h>
include <malloc.h> include "types.h"
include "qtw_stor.h"

static LPPKT_TICKETDATA Message;
static LPSTR Pointer;

void main( int argc, int argv )
{
int DataSize;
char ch = '0';

Message =
(LPPKT_TICKETDATA) _fmalloc( sizeof(PKT_TICKETDATA) +
sizeof(TW_TICKET) );
Pointer = (LPSTR) Message->Data;
for ( DataSize = 0; DataSize<10; DataSize++ )
*Pointer++ = ch++;

Message->Header.Length = Pointer - (LPSTR) Message;
DataSize = &((LPSTR) Message)[Message->Header.Length]
- (LPSTR) Message->Data;
printf( "\nData size %d", DataSize );

}
/****************************************************************
 *                                                              *
 * testca.c - Test program for conversation analysis            *
 *                                                              *
```

```
*  Written by Roger H. Abbott                                          *
*                                                                      *
*  Copyright (C) 1988 Richards Computer Products Ltd                   *
*                                                                      *
************************************************************************/ include <stdio.h>
include <process.h>
#include <assert.h>
#include <setjmp.h>
#include <conio.h>
#include <stdlib.h>
include <string.h> include "cadata.h"
include "qtw_anal.h"
#include "qtw_stor.h"
#include "sendfrx.h"
#include "sendglob.h"
#include "ovmem.h"
#include "kprintf.h"
#include "tickmes.h"
#include "caserver.h"
#include "debug.h"
#include "date.h"
#include "frx.h"
#include "curinfo.h"
#include "readconv.h"
#include "kwin.h"
#include "ktime.h"
#include "lstring.h"
#include "srvems.h"
#include "qkt_dart.h"

/* This number says how many tickets are held by the data manager */
#define STOREDTICKETS 10
static int StoredTickets = STOREDTICKETS;

/* This group of data items is statically declared for the test program */ static DATESTRUCT DefaultConversationDate;
static char convbuffer[ 2000 ];
static int ConvBuffSize = 2000;

static PKT_TIME NewTime = {
{ sizeof(PKT_TIME), DATE_TIME, 0, 0 ), 0 };

LPPKT_TICKETDATA TicketDataMessage;
LPPKT_ANALYSE_REQ AnalyseRequestMessage;
LPPACKETHEAD TerminateAnalysis;
LPPKT_ANALYSE_TEXT AnalyseTextMessage;
LPTW_TICKET DbTicket;

/* Variables for controlling passing text to the analysis. */
static int ConvPointer, CurrentEnd, VeryEnd, ConvChunkSize;
static int FirstChar = 0, TicketNumber = 1, i, Line, Column;
static BOOL AnalysisInProgress = FALSE;
static char ch;

/* Info for sending tickets */
int TicketsToSend = 0;
HANDLE TickSendChannel;
WORD TickSendID;
HREPLY CommonReplyHandle;

/* Info for sending analysis messages ( text and terminate analysis ) */
static HANDLE ConvSendChannel;
static WORD ConvSendID;
static LPSTR DestPtr;

static LPSTR OurProgName = (LPSTR) "\n** OvMain called by TESTCA **\n";
static LPSTR far *HowCalled = (void far *) &OurProgName;

/***************************************************/
```

```c
static PKT_TKT_NOTIFY NotifyRequest = {
{ (sizeof(PACKETHEAD)+sizeof(TICKET_FIELD)),
TICKET_NOTIFY_REQ, 0, 0 ), TKT_TICKET };

static PKT_REASON ReasonPacket = {
{ sizeof(PKT_REASON), STORE_TICKET_REPLY, 0, 0 },
REASON_GOOD };

static PKT_NUMBER TicketCount = {
{ sizeof(PKT_NUMBER), TICKET_COUNT_REPLY, 0, 0 },
0 };

/****************************************/

/* These procedures either apply only to testing or will be in other
servers. */
static void InitTicket( LPTW_TICKET Ticket );
static void TypeUsage( void );
static void StartAnalysis( void );
static void ListTickets( void );
static void CheckReplyFunctions( void );

/* Things required by the kernel and put here for testing */
WORD CurrentOverlay;

/****************************************/

/* Send a ticket */ void SendTicket( HANDLE hUser, WORD TheirID, BOOL LastTicket )
{
LPSTR Ptr, EndPtr, TktPtr;
int i;

Ptr = (LPSTR) DbTicket;
   EndPtr = Ptr + sizeof( TW_TICKET );
   TktPtr = TicketDataMessage->Data;

/* Send 450 bytes in the first message */
   for ( i=0; i<450; i++ )
   *TktPtr++ = *Ptr++;
   TicketDataMessage->Header.Length = TktPtr - (LPSTR) TicketDataMessage;
   TicketDataMessage->Header.Type = TICKET_DATA;
   TicketDataMessage->IsLastTicket = LastTicket;
   TicketDataMessage->IsLastForThisTicket = FALSE;
   TicketDataMessage->StartNumber = TicketNumber;
   NetReplySend( ChannelHandle[ hUser ], TheirID, TicketDataMessage );

/* Now send the rest */
   TktPtr = TicketDataMessage->Data;
   while ( Ptr < EndPtr )
   *TktPtr++ = *Ptr++;
   TicketDataMessage->Header.Length = TktPtr - (LPSTR) TicketDataMessage;
   TicketDataMessage->Header.Type = TICKET_DATA;
   TicketDataMessage->IsLastTicket = LastTicket;
   TicketDataMessage->IsLastForThisTicket = TRUE;
   TicketDataMessage->StartNumber = TicketNumber;
   NetReplySend( ChannelHandle[ hUser ], TheirID, TicketDataMessage );
}

/****************************************/

/* Procedures to handle all the messages we expect */ void ProcRetrieveReq( HANDLE hUser, LPPKT_RETRIEVE lpPacket )
{
LPSTR Ptr, EndPtr, TktPtr;
int i, Count = lpPacket->Number;
WORD TheirID = lpPacket->Header.SenderID;

if ( Count == 1 )
   {
   /* In response to analyse conv request. Use requested Dcnvref */
   InitTicket( DbTicket );
   DbTicket->Dcnvref = lpPacket->Dcnvref;
```

```
SendTicket( hUser, TheirID, TRUE );
}
else
{
TicketsToSend = Count;
TickSendChannel = hUser;
TickSendID = TheirID;
}
}

/*****************************************************/ void ProcAnalAccept( HANDLE hUser, LPPACKETHEAD lpPacket )
{
   /* Conversation analysis accepted. Store the channel and ID for
   subsequent sends, and keep sending to the end. */
   ConvSendChannel = hUser;
   ConvSendID = lpPacket->SenderID;

/* Request ticket notification */
   NetReplyRequest( ChannelHandle[ ConvSendChannel ], CommonReplyHandle,
   ConvSendID, &NotifyRequest );

}

/*****************************************************/ void ProcAnalComplete( HANDLE hUser, LPPACKETHEAD lpPacket )
{
Kprintf( "\n***** END of CONVERSATION *****  SPACE to continue ..." );
do  i = getch(); while (i != ' ' );
}

/*****************************************************/ void ProcTicketData( LPPKT_TICKET_DATA lpPacket )
{
int len;
LPTKTITEM Ptr = lpPacket->Data;
LPTKTITEM EndOfMessage =
(LPTKTITEM) ( (LPSTR) lpPacket + lpPacket->Header.Length );

while ( Ptr < EndOfMessage )
{
EchoNotify( Ptr );
len = TicketFieldSizes[ Ptr->Id ];
Ptr = (LPTKTITEM) &Ptr->Data[len];
}
}

/*****************************************************/ void ProcSnapReply( LPPKT_SRCH_SNAP_REPLY lpPacket )
{
long far *EndOfPacket = (long far *)((LPSTR)lpPacket+lpPacket->Header.Length);
long far *DrefPtr = lpPacket->Dcnvrefs;
int i = 0;

Kprintf( "Matching Dcnvrefs :" );
while (DrefPtr < EndOfPacket)
{
if ( (i++)%6 == 0 )
Kprintf( "\n" );
Kprintf( "%10ld ", *DrefPtr++ );
}
Kprintf( "\n" );
}

/*****************************************************/

/* The common reply function for all messages sent by the CA server */

BOOL FAR PASCAL CommonReplyFunction(
HANDLE hUser, WORD Id, void far *lpPacket)
{
```

```c
LPPACKETHEAD Packet = (LPPACKETHEAD) lpPacket;
LPPKT_STORE_REQ StorePacket = (LPPKT_STORE_REQ) lpPacket;

switch ( Packet->Type )
{
case TICKET_RETRIEVE_REQ:
ProcRetrieveReq( hUser, lpPacket );
break;
case ANALYSE_CONV_ACCEPT:
ProcAnalAccept( hUser, lpPacket );
break;
case STORE_TICKET_REQ:
NetReplySend( ChannelHandle[ hUser ],
StorePacket->Header.SenderID,
(FARPTR) &ReasonPacket );
break;
case CONV_ANALYSIS_COMPLETE:
ProcAnalComplete( hUser, lpPacket );
break;
case TICKET_DATA_REPLY:
ProcTicketData( lpPacket );
break;
case TICKET_COUNT_REQ:
TicketCount.Number = StoredTickets;
NetReplySend( ChannelHandle[ hUser ],
StorePacket->Header.SenderID,
(FARPTR) &TicketCount );
break;
case CA_SRCH_SNAPSHOT_REPLY:
ProcSnapReply( lpPacket );
break;
default:
/* See if its a message recognised by another module */
ProcMonViewReq( hUser, lpPacket );
SendGlob( hUser, Packet->SenderID, lpPacket );
break;
}
return TRUE;
}

/*******************************************/ void main(argc, argv)
int argc;
PSTR argv[];
{
/* Find a default window for the server and start on the bottom line,
so text is not over-written when a ticket display is initialised */
CurrentOverlay = 1;
InitWin();
SetOutputPage(FindOutputPage());
SetTextPosition( 25, 1 );

/* If there is a single ? argument, or none at all, type the info */
if ( (argc == 2 && argv[1][0] == '?') || argc < 2 )
TypeUsage(), exit(0);

convfile = fopen(argv[argc-1], "r");
if ( convfile == NULL)
Kprintf( "\nFile %s not found.\n", (LPSTR) argv[argc-1] ),
TypeUsage(), exit(0);

/* If any options are specified default all to FALSE, otherwise
default to -c -o */
if ( argc > 2 )
Optn = Optt = Optc = Opts = Opto = Opta = FALSE;
else
{
Optn = Optt = Opts = FALSE;
Optc = Opto = TRUE;
}
ConvChunkSize = 0;

/* Sort out which options the user wants. Defaults to the presets */
for ( i = 1; i < argc-1; i++ )
{
```

```
if ( argv[i][0] != '-' && argv[i][0] != '/' )
continue;
else if ( argv[i][1] >= '0' && argv[i][1] <= '9' )
ConvChunkSize = argv[i][1] - '0';
else if ( tolower(argv[i][1]) == 't' ) Optt = TRUE;
else if ( tolower(argv[i][1]) == 'o' ) Opto = TRUE, Optn = FALSE;
else if ( tolower(argv[i][1]) == 'c' ) Optc = TRUE;
else if ( tolower(argv[i][1]) == 's' ) Opts = TRUE;
else if ( tolower(argv[i][1]) == 'a' ) Opta = TRUE;
else if ( tolower(argv[i][1]) == 'n' ) Optn = TRUE, Opto = FALSE;
else if ( tolower(argv[i][1]) == 'e' )
Optt = Optc = Opts = Opto = TRUE, Optn = FALSE;
else if ( tolower(argv[i][1]) == 'd' )
{
PSTR s = &argv[i][2];
StoredTickets = 0;
while ( *s >= '0' && *s <= '9' )
StoredTickets = 10*StoredTickets + *(s++) - '0';
}
}
/* If no static ticket display, scroll the whole area. */
unless ( Opto || Optn )
ScrollAreaTop = 0;

/* Allocate space for the messages. */
DbTicket = (LPTW_TICKET) fmalloc( sizeof( TW_TICKET ) + 10);
TicketDataMessage = (LPPKT_TICKETDATA) fmalloc( 520 );
AnalyseRequestMessage =
(LPPKT_ANALYSE_REQ) fmalloc( sizeof( PKT_ANALYSE_REQ ) );
TerminateAnalysis =
(LPPACKETHEAD) fmalloc( sizeof( PACKETHEAD ) );
AnalyseTextMessage =
(LPPKT_ANALYSE_TEXT) fmalloc( sizeof( PKT_ANALYSE_TEXT ) + 100 );

unless( NetInitialise() )
{
Kprintf( "\nCannot initialise the network\n" );
return;
}

/* Call OvMain to allocate ticket space etc. */
unless ( OvMain( HowCalled ) )
{
Kprintf( "\nOvMain returned FALSE\n" );
exit( 0 );
}

/* Set up the reply handles */
CommonReplyHandle = NetRegisterReply( CommonReplyFunction, 0 );
NetSetPacketHandler( CommonReplyHandle, TICKET_RETRIEVE_REQ );
NetSetPacketHandler( CommonReplyHandle, STORE_TICKET_REQ );
NetSetPacketHandler( CommonReplyHandle, TICKET_COUNT_REQ );
InitMon( CommonReplyHandle );
InitGlob( CommonReplyHandle );

/* Lets have some idea how much space we need */
Kprintf( "\nSize of TW_TICKET   : %d, Size of data area : %d\n"
"Size of CONVDATA     : %d, Number of conversations : %d\n"
"Number of tickets    : %d, Size of DM_TICKET : %d\n",
sizeof( TW_TICKET ), sizeof( ANALYSISDATA ),
sizeof( CONVDATA ), MaxConversations,
MaxTickets, sizeof( DM_TICKET ) );

/* Do the initialisation */
NetProcess( 2 );

/* Send all the tickets asked for */
for ( i = 0; i < TicketsToSend; i++ )
{
InitTicket( DbTicket );
DbTicket->DealType = SPOT;
DbTicket->Currency1 = 0;
DbTicket->Currency2 = 1;
DbTicket->AmountCurr = CURR1;
DbTicket->QuoteCurr = CURR1;
```

```
TicketNumber++;
SendTicket( TickSendChannel, TickSendID, ( i == (TicketsToSend-1) ));
NetProcess( 2 );
}

/* Send the monitor pages which should be asked for. */
unless ( SendFRX() )
goto Quit;

/* Display the FRX date, if there is one */
if ( FRXdate == 0 )
Kprintf( "\nNo FRX data available." );
else
{
datetostruct( FRXdate, &(DefaultConversationDate) );
Kprintf( "\nFRXA conversation date : " );
wrwdate(structtodate( &(DefaultConversationDate) ) );
}

/* Step to the first printing character or EOF */
while ( FirstChar != EOF && FirstChar <= (int)' ' )
FirstChar = getc( convfile );
/* From now on the program is message driven */ while ( FirstChar != EOF )
{
int Row = -1, Col = 0;
char ch;

StartAnalysis();
NetProcess( 1 );

/* Keep sending AnalyseText until we reach the end of the conversation,
pretending that the conversation ends part way through, by releasing
ConvChunkSize characters at a time. */

ConvPointer = 0;

while ( ConvPointer < VeryEnd )
{
/*For now use a different algorithm. Send up to 15 or a start of line.

if ( ConvChunkSize != 0 )
CurrentEnd = ConvPointer + ConvChunkSize;
else
CurrentEnd = ConvPointer + 71;
if ( CurrentEnd > VeryEnd )
CurrentEnd = VeryEnd;

i = 0;
DestPtr = AnalyseTextMessage->Text;
while ( ConvPointer < CurrentEnd )
    *DestPtr++ = convbuffer[ ConvPointer++ ];
*/
i = 0;
AnalyseTextMessage->Row = Row;
AnalyseTextMessage->Column = Col;
DestPtr = AnalyseTextMessage->Text;
while ( ConvPointer < VeryEnd && i < 15 )
{
ch = convbuffer[ ConvPointer++ ];
*DestPtr++ = ch;
i++; Col++;
if ( (ch & CF_LINESTART) != 0 )
{
Row++, Col = 1;
if ( i == 1 )
{
AnalyseTextMessage->Row++;
AnalyseTextMessage->Column = 0;
}
break;
}
}
```

```c
    AnalyseTextMessage->Header.Length =
DestPtr - (LPSTR) AnalyseTextMessage;
    AnalyseTextMessage->Header.Type = ANALYSE_TEXT;
    AnalyseTextMessage->Key = KEY_UNKNOWN;

/* Analyse text will not cause any return messages */
    NetReplySend( ChannelHandle[ ConvSendChannel ],
ConvSendID, AnalyseTextMessage );
    NetProcess( 1 );
    }

TerminateAnalysis->Length = 8;
    TerminateAnalysis->Type = TERMINATE_ANALYSE_REQ;
    NetReplyRequest( ChannelHandle[ ConvSendChannel ], CommonReplyHandle,
ConvSendID, TerminateAnalysis );
    NetProcess( 2 );
    } /* End of conversation loop */

Kprintf( "\n***** END of FILE *****" );

/* Send a date a time packet setting the time/date to the future. */
    /*
    NewTime.Time = Ktime( NULL ) + 604800L;
    NetSend( ChannelHandle[ ConvSendChannel ], (FARPTR) &NewTime );
    NetProcess( 1 );
    */
    ListTickets();

/* Call reply functions with appropriate messages. Testing is by codeview */
    CheckReplyFunctions();

Kprintf( "\nClosing file and freeing EMS memory .. \n" );
    fclose(convfile);

Quit:

EMSfree( TicketHandle );
    exit(0);
}

/*****************************************/

/* This procedure gets the analysis going by sending an Analyse Request. */ void StartAnalysis( void )
{
static time_t Now;

/* Clear the default spot rate, so that the FRXA rate will be used
    unless there is one in the conversation header */
    DefSpot[0] = '\0';

/* Initialise the conversation date to now. */
    Ktime( &Now );
    datetostruct( (DATE) (Now / SECONDSPERDAY), &DefaultConversationDate );

/* Read a conversation and store the first character of the next.
    This may change the date and give an assumed spot rate to override
    that on FRXA. */
    FirstChar = readconv( FirstChar, convbuffer, ConvBuffSize,
    &DefaultConversationDate, &VeryEnd );

Kprintf( "\nConversation date used : " );
    wrwdate(structtodate( &(DefaultConversationDate) ) );
    Kprintf( " Given spot rate : " );
    if ( DefSpot[0] == '\0' ) Kprintf( "None" );
    else Kprintf( "%s", DefSpot );

AnalyseRequestMessage->Header.Length = sizeof( PKT_ANALYSE_REQ );
    AnalyseRequestMessage->Header.Type = ANALYSE_CONV_REQUEST;
    AnalyseRequestMessage->Dcnvref = TicketNumber++;
    AnalyseRequestMessage->MaxSize = VeryEnd + 10;
    NetRequest( ChannelHandle[KS1_CHAN_HANDLE],
    CommonReplyHandle, AnalyseRequestMessage );
}
```

```c
/*******************************************************/ void TypeUsage( void )
{
Kprintf( "\nUsage: testca ? -c -s -t -e -<digit> convfile\n"
"? Display this information\n"
"-c Display conversation. # start of line sent, %% received\n"
"-s Display symbols, in brackets () if -c also specified\n"
"-t Display information extracted. > new value, * new status\n"
"-o Display ticket in static area at top of screen from ticket\n"
"-d<number> Get <number> tickets from the DMGR (default 10)\n"
"-e Display everything except notified ticket items\n" );

Kprintf( "-O Analyse the whole conversation at one go (Default)\n"
"-n Display notified ticket items in static area at top of screen\n"
"-a Captured conversations (Flags.StartOnline = FALSE)\n"
"-<digit> Make conversation available in <digit> sized chunks\n\n"
"Display is -c -o if no options, otherwise default is no display\n\n"
);
}

/*******************************************************/

/* Initialising the ticket should be done by the Data Manager.
For the moment we do it here, this code will be transferred. */ void InitTicket( LPTW_TICKET Ticket )
{
char ch = 0;
int i = sizeof( TW_TICKET );
LPSTR Ptr = (LPSTR) Ticket;

/* Fill the whole ticket with zeroes so we can see the contents. */
while ( i > 0 )
*Ptr++ = ch, i--;

Ticket->AnalysedRow = 0;
    Ticket->AnalysedCol = 0;
    Ticket->Dcnvref = TicketNumber;
    *( (WORD far *) &Ticket->Flags) = 0;
    Ticket->Flags.StartOnline = !Opta;
    Ticket->CpAddress[0] = '\0';
    Ticket->CpName[0] = '\0';
    Ticket->StartDealerID[0] = '\0';
    if ( (TicketNumber & 1) == 0 )
    lstrcpy( Ticket->DealerID, "ROGER" );
    else
    lstrcpy( Ticket->DealerID, "GILES" );
    Ticket->ConfirmDealerID[0] = '\0';
    Ticket->Keystation = 0;
    Ticket->StartTime =
    SECONDSPERDAY * structtodate( &DefaultConversationDate ) +
( SECONDSPERDAY / 2 );
    Ticket->ConfirmTime = 0;
    Ticket->TrueCp.Count = '\0';
    Ticket->Status = NO_DEAL;
    Ticket->DealType = NO_DEAL;
    Ticket->Quoter = TKT_UNKNOWN;
    Ticket->Buyer = TKT_UNKNOWN;
    Ticket->Currency1 = TKT_UNKNOWN;
    Ticket->Currency2 = TKT_UNKNOWN;
    Ticket->Amount[0] = '\0';
    Ticket->AmountCurr = TKT_UNKNOWN;
    Ticket->QuoteCurr = TKT_UNKNOWN;
    Ticket->LowQuote[0] = '\0';
    Ticket->HighQuote[0] = '\0';
    Ticket->DealRate[0] = '\0';
    Ticket->FarRate[0] = '\0';
    Ticket->ActualDiff[0] = '\0';
    Ticket->NearDate1 = 0xFFFF;
    Ticket->NearDate2 = 0xFFFF;
    Ticket->FarDate1 = 0xFFFF;
    Ticket->FarDate2 = 0xFFFF;
    Ticket->Period = TKT_UNKNOWN;
    Ticket->OurPay1.Count = 0;
```

```
    Ticket->TheirPay1.Count = 0;
    Ticket->OurPay2.Count = 0;
    Ticket->TheirPay2.Count = 0;
    Ticket->Comment1.Count = 0;
    Ticket->Comment2.Count = 0;

Ticket->IsSuspect.LowQuote = FALSE;
    Ticket->IsSuspect.HighQuote = FALSE;
    Ticket->IsSuspect.DealRate = FALSE;
    Ticket->IsSuspect.FarRate = FALSE;
    Ticket->IsSuspect.ActualDiff = FALSE;
    Ticket->IsSuspect.NearDate1 = FALSE;
    Ticket->IsSuspect.NearDate2 = FALSE;
    Ticket->IsSuspect.FarDate1 = FALSE;
    Ticket->IsSuspect.FarDate2 = FALSE;
    Ticket->IsSuspect.QuoteCurr = FALSE;

Ticket->OurPay1Val[0] = '\0';
    Ticket->TheirPay1Val[0] = '\0';
    Ticket->OurPay2Val[0] = '\0';
    Ticket->TheirPay2Val[0] = '\0';
    Ticket->Comment1Val[0] = '\0';
    Ticket->Comment2Val[0] = '\0';
    Ticket->TrueCpVal[0] = '\0';
}

/****************************************************/

/* At the end of the test, display the saved tickets */ void ListTickets( void )
{
static WORD max;
int i, j;
LPCATICKET p;

FIELDNAME field;

/* Switch on the display */
Opto = TRUE;
CurrentCAcnvid = 0;
i = StoredTickets - 5;
if ( i < 0 ) i = 0;
while ( i < MaxTickets )
{
p = EMSLockRange( TicketHandle, i, &max );
while ( i <= max )
{
if ( p->IsInUse )
{
OutputTicket = &p->Ticket;
InitScreen();
for ( field = 0; field < t_max; field++ )
EchoOutput( field );
Kprintf( "\nSPACE to continue ..." );
do  j = getch(); while (j != ' ' );
}
i++; p++;
}
EMSunlock( TicketHandle, max );
}
Kprintf( "\nAll tickets displayed\n" );
}

/****************************************************/

/* Call reply functions so that we can see with codeview what they do
with the messages */ void CheckReplyFunctions( void )
{
LPPKT_TKT_REQ Request = (LPPKT_TKT_REQ) Buffer;
LPPKT_TICKET_DATA SrchReq = (LPPKT_TICKET_DATA) Buffer;

TICKET_FIELD far *DestPtr;
static WORD max;
```

```
int i = 0, j;
LPCATICKET p;
FIELDNAME field;

/* Show ticket data message contents */
Optn = TRUE; Opto = FALSE;

/* A ticket snapshot request for tickets 1 and 2, asking for the
two currencies and the deal rate */
Kprintf( "Ticket snapshots for convs 1 and 2, currencies and deal rate\n" );
p = GetTicketPointer( 0 );
OutputTicket = &p->Ticket;
InitScreen();
UnlockTicket( 0 );

DestPtr = (TICKET_FIELD far *)(Request->Dcnvrefs + 2);

Request->Number = 2;
Request->Dcnvrefs[0] = StoredTickets + 1;
Request->Dcnvrefs[1] = StoredTickets + 2;
*(DestPtr++) = TKT_CURRENCY1;
*(DestPtr++) = TKT_CURRENCY2;
*(DestPtr++) = TKT_DEALRATE;
Request->Header.Length = (LPSTR) DestPtr - (LPSTR) Request;
Request->Header.Type = TICKET_SNAPSHOT_REQ;
NetRequest( ChannelHandle[KS1_CHAN_HANDLE],
    CommonReplyHandle, Request );

NetProcess( 2 );
Kprintf( "***** SPACE to continue ...\n" );
do i = getch(); while (i != ' ');

/* A ticket snapshot request for ticket 3 and 1000, asking for the
whole ticket */
Kprintf( "Ticket snapshots for 3 and 1000, whole ticket\n" );
p = GetTicketPointer( 0 );
OutputTicket = &p->Ticket;
InitScreen();
UnlockTicket( 0 );

DestPtr = (TICKET_FIELD far *)(Request->Dcnvrefs + 2);

Request->Number = 2;
Request->Dcnvrefs[0] = StoredTickets + 3;
Request->Dcnvrefs[1] = StoredTickets + 1000;
*(DestPtr++) = TKT_TICKET;
Request->Header.Length = (LPSTR) DestPtr - (LPSTR) Request;
Request->Header.Type = TICKET_SNAPSHOT_REQ;
NetRequest( ChannelHandle[KS1_CHAN_HANDLE],
    CommonReplyHandle, Request );

NetProcess( 2 );
Kprintf( "***** SPACE to continue ...\n" );
do i = getch(); while (i != ' ');

/* A Search snapshot request for SPOT so most are found, two replies
will be needed */
Kprintf( "Search snapshot for SPOT deals\n" );
SrchReq->Data[0].Id = TKT_DEALTYPE;
*( (DEALTYPE far *) SrchReq->Data[0].Data) = SPOT;
SrchReq->Header.Length = (LPSTR) SrchReq->Data[0].Data + sizeof(DEALTYPE)
- (LPSTR) SrchReq;
Request->Header.Type = CA_SRCH_SNAPSHOT_REQ;
NetRequest( ChannelHandle[KS1_CHAN_HANDLE],
    CommonReplyHandle, SrchReq );

NetProcess( 2 );
Kprintf( "***** SPACE to continue ...\n" );
do i = getch(); while (i != ' ');

/* A Search snapshot request for 2 currencies, one message.
This relies on the size of the data item in TKTITEM being two bytes. */
Kprintf( "Search snapshot for currencies 0 and 1\n" );
DestPtr = &(SrchReq->Data[0].Id);
*(DestPtr++) = TKT_CURRENCY1;
*(DestPtr++) = 0;
```

```
*(DestPtr++) = TKT_CURRENCY2;
*(DestPtr++) = 1;
SrchReq->Header.Length = (LPSTR) DestPtr - (LPSTR) SrchReq;
SrchReq->Header.Type = CA_SRCH_SNAPSHOT_REQ;
NetRequest( ChannelHandle[KS1_CHAN_HANDLE],
    CommonReplyHandle, SrchReq );
NetProcess( 2 );
Kprintf( "***** SPACE to continue ...\n" );
do i = getch(); while (i != ' ' );

/* A Search snapshot request for dealer GILES. */
Kprintf( "Search snapshot for dealer GILES\n" );
DestPtr = &(SrchReq->Data[0].Id);
*(DestPtr++) = TKT_DEALER;
lstrcpy( (LPSTR) DestPtr, (LPSTR) "GILES" );
SrchReq->Header.Length = (LPSTR) DestPtr - (LPSTR) SrchReq +
TicketFieldSizes[ TKT_DEALER ];
SrchReq->Header.Type = CA_SRCH_SNAPSHOT_REQ;
NetRequest( ChannelHandle[KS1_CHAN_HANDLE],
    CommonReplyHandle, SrchReq );
NetProcess( 2 );
}
include <stdio.h>
#include "dateproc.h"
#include "date.h"

DATE date, newdate;
DATESTRUCT ds;

void main()
{
date = 5800; /* Does not work before 1/3/72 */
while ( date < 10000 )
{
datetostruct( date, &ds );
newdate = structtodate( &ds );
printf( "\n%6u %2u/%2u/%2u %6u  ", date, ds.day, ds.month, ds.year, newdate );
wrwdate( date );
date++;
}
}

/**************************************************************
 *                                                            *
 * testfrx.c  Test harness for FRXA-E handling routines       *
 *                                                            *
 * Written by Roger H. Abbott                                 *
 *                                                            *
 * Copyright (C) 1988 Richards Computer Products Ltd          *
 *                                                            *
 **************************************************************/ include <stdio.h>
include "frx.h"
#include "curinfo.h"
#include "getfrx.h"
#include "date.h"

/* Define procedures declared in this file */
extern int main(int argc,char * *argv);
void DisplayInformation(void);
void LongQuote(long Low,long High);
void DisplayHeaders(void);
void DisplayCurrencies(void);
void TypePagesUnstructured(void);

/* Variables used by more than one procedure */

BOOL Opto = FALSE, Optu=FALSE, Opth = FALSE,
Optc=FALSE, Optb=FALSE, Opts=TRUE;

/*************************************************************/ main(argc, argv)
int argc;
```

```c
char **argv;
{
int i, FirstChar;
char SpotVector[20];

/* Sort out which options the user wants. Defaults to the presets */
for ( i = 1; i < argc; i++ )
{
if ( argv[i][0] == '?' )
{
printf( "\nUsage: testfrx ? -u -c -b -s\n"
"? Display this information\n"
"-u Display the whole monitor pages as on a screen\n"
"-h Display the headers and other fixed information\n"
"-c Display currency info as packed characters\n"
"-b Display currency info as signed binary numbers\n"
"-o Display holidays\n"
"-s Do not display currency info as strings\n"
"-e Display everything\n\n"
"By default the items are displayed as "
"strings (no options)\n\n"
"Update line range is 1-7. 0 means display original data,\n"
"a non-octal digit means exit\n" );
return( 0 );
}
else if ( argv[i][0] != '-' && argv[i][0] != '/' )
continue;
else if ( argv[i][1] == 'u' ) Optu = TRUE;
else if ( argv[i][1] == 'c' ) Optc = TRUE;
else if ( argv[i][1] == 'b' ) Optb = TRUE;
else if ( argv[i][1] == 'h' ) Opth = TRUE;
else if ( argv[i][1] == 'o' ) Opto = TRUE;
else if ( argv[i][1] == 's' ) Opts = FALSE;
else if ( argv[i][1] == 'e' )
Optu = Opth = Optc = Optb = Opts = Opto = TRUE;
}

InitCurinfo();
LoadFrxPages();

/* Initial information */
DisplayInformation();

/* Carry out the initialisation */
InitialiseFrx();
GetFRXcodes();

/* Display the initialised information */
printf( "\nDate on FRXA: " );
writedate( FRXdate );
putchar( '\n' );
DisplayInformation();

printf( "\nCA currency No., Swiftcode, FRX number, spot rate and info\n");
for ( i=0; i<Nswiftcodes; i++ )
{
FirstChar = GetSpotBid( FRXnumber[i], SpotVector, 20 );
printf( "%4u %.3s %4u %12s ", i,
SwiftcodeTable[i].SwiftCode, FRXnumber[i],
SpotVector+FirstChar );
if ( SwiftcodeTable[i].IsInverse ) printf( "Reciprocal " );
if ( SwiftcodeTable[i].IsMoslem ) printf( "Moslem " );
if ( SwiftcodeTable[i].Is365Days ) printf( "365 day year " );
putchar( '\n' );
if ( Opto )
{
DATE *HolIndex = HolidayList[ FRXnumber[i] ];
int Count = 0;
while ( *HolIndex != 0 )
{
writedate( *HolIndex );
HolIndex++;
putchar( ' ' );
if ( ((++Count)%8) == 0 ) putchar( '\n' );
}
```

```c
putchar( '\n' );
}
}
return( 0 );
} /* End of procedure main() */

/****************************************************/

/* The display information procedure us called initially and
after updates have been applied */ void DisplayInformation()
{
if ( Optu ) TypePagesUnstructured();
if ( Opth ) DisplayHeaders();
if ( Optc || Optb || Opts ) DisplayCurrencies();
}

/****************************************************/

/* Output a two-part quote as binary numbers */ void LongQuote( Low, High )
long Low, High;
{
char DecString[20];
int FirstChar;

/* Print the digit strings without a decimal point */
FirstChar = LongToChar( Low, DecString, 20, 0 );
printf( DecString+FirstChar );
FirstChar = LongToChar( High, DecString, 20, 0 );
printf( "/%s ", DecString+FirstChar );
}

/****************************************************/

/* This routine displays the headers and other information which
cannot be altered by the update lines. (Obviously, Monitor messages
can change anything). */ void DisplayHeaders()
{
int Column, Line, Page;

/* Spot and Updates Page */ printf( "\nSpot Update Page Header Line:\n%.64s\n\nPage names:\n%.64s",
PSpotUpdatesPage->HeaderLine, PSpotUpdatesPage->PageNames );

printf( "\n\nCycle numbers: " );
for ( Line=0; Line<3; Line++ )
{
putchar( PSpotUpdatesPage->SpotRates[ Line ].SpotRowCycle );
putchar( PSpotUpdatesPage->SpotRates[ Line ].UpdateRowCycle );
putchar( PSpotUpdatesPage->SpotRates[ Line ].UpdateRowNumber );
putchar( ' ' );
};

printf( "\n\nUpdate lines:\n" );
for ( Line=0; Line<7; Line++ )
printf( "Cycle %c %.62s\n",
PSpotUpdatesPage->Updates[ Line ].CycleNumber,
PSpotUpdatesPage->Updates[ Line ].Update );

/* Currency Pages */ printf( "\nFixed information on currency pages:" );

for ( Page=0 ; Page<3; Page++ )
{
printf( "\n\nHeader line of currency page %u:\n%.64s",
Page, PCurrencyPage[ Page ]->HeaderLine );
printf( "\nPeriods: " );
for ( Column=0; Column<6; Column++ )
```

```c
printf( "%.3s ",
PCurrencyPage[Page]->CurrencyNames.Period[Column] );
}
}

/****************************************************************/

/* This procedure displays details of each of the 30 currencies in the
formats determinded by the option switches */ void DisplayCurrencies()
{
char ch, *Pointer, *LowPointer, *HighPointer, DecString[20];
long LowQuote, HighQuote;
int i, j, Currency, FirstChar, Period;

printf( "\n\nCURRENCY DETAILS" );

for ( Currency=1; Currency<31; Currency++ )
{
printf( "\n\nCurrency number: %u Swiftcode: %.3s",
Currency, GetSwiftcode( Currency ) );
printf( " Flag character: %c\n", GetTypeFlag( Currency ) );
printf( ReciprocalQuotation( Currency ) ?
"Reciprocal quote, " : "Normal quote, " );
printf( Year365( Currency ) ?
"365 day year, " : "360 day year, " );
printf( "decimal point position %u", SpotDecPoint( Currency ) );

if ( Currency == 1 )
{
Pointer = SpotPointer(1);
printf( "\nDate code: %.4s", Pointer );
LowQuote = 0;
for ( i=0; i<4; i++ )
LowQuote = 32*LowQuote + DecodeFRX( Pointer[i] );
FirstChar = LongToChar( LowQuote,
DecString, HIGH(DecString), 0 );

/* Print the digit string without the decimal point */
printf( " Days since 1-1-80: %s ", DecString+FirstChar );
}
else{
printf( "\nSpot rate and spread: ");

if ( Optc )
printf( "%.4s/%.2s ",
SpotPointer( Currency ),
SpotSpreadPointer( Currency ) );

if ( Optb )
{
/* Get the spot and spread as long integers */
LowQuote = BinSpot( Currency );
HighQuote = BinSpotSpread( Currency );
LongQuote( LowQuote, HighQuote );
}

/* Now for the real test of the FRX extraction routines,
print the full rates with the decimal point */ if ( Opts )
{
FirstChar =
GetSpotBid( Currency, DecString, HIGH(DecString));
printf( " = %s", DecString+FirstChar );
FirstChar =
GetSpotAsk( Currency, DecString, HIGH(DecString));
printf( "/%s", DecString+FirstChar );
}

} /* End of spot for currencies except the dollar */

/* Forward and deposit rates apply to all currencies */
if ( Optc )
{
```

```
printf( "\n\nForwardDeposit/Spread code fields:\n" );
for ( Period=0; Period<6; Period++ )
printf( "%.6s/%.4s ",
FwdPointer( Currency, Period ),
FwdSpreadPointer( Currency, Period ) );
} if ( Optb )
{
printf( "\n\nForward rates and spreads:\n" );
for ( Period=0; Period<6; Period++ )
{
LowQuote = BinFwd( Currency, Period );
HighQuote = BinFwdSpread( Currency, Period );
LongQuote( LowQuote, HighQuote );
}
}

/* Now for the real test, print out the strings */
if ( Opts )
{
printf( "\n\nForward quotes returned as strings:\n" );
for ( Period=0; Period<6; Period++ )
{
FirstChar =
GetFwdBid( Currency, DecString, HIGH(DecString),
Period );
printf( DecString+FirstChar );
FirstChar =
GetFwdAsk( Currency, DecString, HIGH(DecString),
Period );
printf( "/%s ", DecString+FirstChar );
}
} if ( Optb )
{
printf( "\n\nDeposit rates and spreads:\n" );
for ( Period=0; Period<6; Period++ )
{
LowQuote = BinDeposit( Currency, Period );
HighQuote = BinDepositSpread( Currency, Period );
LongQuote( LowQuote, HighQuote );
}
}

/* Now for the real test, print out the strings */
if ( Opts )
{
printf( "\n\nDeposit rates returned as strings:\n" );
for ( Period=0; Period<6; Period++ )
{
FirstChar = GetDepositBid( Currency,
DecString, HIGH(DecString), Period );
printf( DecString+FirstChar );
FirstChar = GetDepositAsk( Currency,
DecString, HIGH(DecString), Period );
printf( ", %s\n", DecString+FirstChar );
}
}
}
}
/****************************************************/

/* Print out the unstructured data from memory to be sure we got it right */ void TypePagesUnstructured()
{
int Page, Line, Column;

/* Print out the addresses of the arrays to check. */
printf( "\nAddresses of arrays:\n" );
for (Page = 0; Page<5; Page++ ) printf( "%d ", MonitorPageAddress[Page] );

for ( Page=0; Page<5; Page++ )
{
```

```c
printf( "\nUnstructured memory copy of FRX page %u\n", Page );
for ( Line=0; Line<MonLines; Line++ )
{
for ( Column=0; Column<MonCols; Column++)
putchar( MonitorPageAddress[Page]->PackedInfo[Line][Column] );

/* Print a newline. */
putchar( '\n' );
}; /* End of line loop */
}; /* End of file loop */
}

/**********************************************************************
 *                                                                    *
 * tickmes.c - Ticket message processing                              *
 *                                                                    *
 * Written by Roger H. Abbott                                         *
 *                                                                    *
 * Copyright (C) 1988 Richards Computer Products Ltd                  *
 *                                                                    *
 **********************************************************************/ include <string.h> include "cadata.h"
include "caserver.h"
#include "tickmes.h"
#include "Kprintf.h"
#include "srvems.h"
#include "date.h"
#include "tasks.h"
#include "qtw_stor.h"
#include "camonit.h"
#include "lstring.h"

/ The items implied by special ticket field identifiers / static TICKET_FIELD ShortTicketItems[] = {
TKT_ACTUALDIFF,
TKT_AMOUNT,
TKT_AMOUNTCURR,
TKT_BUYER,
TKT_CURRENCY1,
TKT_CURRENCY2,
TKT_DCNVREF,
TKT_DEALRATE,
TKT_DEALTYPE,
TKT_FARDATE1,
TKT_FARDATE2,
TKT_FARRATE,
TKT_HIGHQUOTE,
TKT_ISSUSPECT,
TKT_LOWQUOTE,
TKT_NEARDATE1,
TKT_NEARDATE2,
TKT_OURPAY1,
TKT_OURPAY2,
TKT_PERIOD,
TKT_QUOTECURR,
TKT_STATUS,
TKT_THEIRPAY1,
TKT_THEIRPAY2,
TKT_TICKET
};
static TICKET_FIELD ReviewTicketItems[] = {
TKT_ACTUALDIFF,
TKT_AMOUNTCURR,
TKT_BUYER,
TKT_CURRENCY1,
TKT_CURRENCY2,
TKT_DCNVREF,
TKT_DEALER,
TKT_DEALRATE,
TKT_DEALTYPE,
```

```
TKT_FARDATE1,
TKT_HIGHQUOTE,
TKT_LOWQUOTE,
TKT_NEARDATE1,
TKT_PERIOD,
TKT_QUOTECURR,
TKT_STARTTIME,
TKT_STATUS,
TKT_TICKET
};

static PKT_REASON TktReject = {
{ sizeof(PKT_REASON), TICKET_REJECT, 0, 0 },
REASON_BAD_DCNVREF };

static int NotifyTestStart = 0;

int TicketFieldOffset( TICKET_FIELD field );
BOOL ProcessNotifyElement( int i );
void ProcessTkSnapReq( LPNOTIFY_DETAILS Details );
void ProcessSrchSnapReq( LPNOTIFY_DETAILS Details );

/******************************************/

BOOL FAR PASCAL fnReplyTicketSnapshotReq(
HANDLE hUser, WORD Id, LPPKT_TKT_REQ lpPacket)
{
LPTICKSNAPREQ Request;
int i;
TICKET_FIELD field, far *SrcItemPtr, far *EndOfPacket;

SrcItemPtr =
(TICKET_FIELD far *) (lpPacket->Dcnvrefs + lpPacket->Number);
EndOfPacket =
(TICKET_FIELD far *) ((LPSTR) lpPacket + lpPacket->Header.Length);

/* First some elementary checks on the request */
if ( EndOfPacket <= SrcItemPtr || lpPacket->Number <= 0 )
{
unless ( NetCheckSendSpace( ChannelHandle[ hUser ],
sizeof( PKT_REASON) ) )
return FALSE;
NetReplySend( ChannelHandle[ hUser ],
lpPacket->Header.SenderID, (FARPTR) &TktReject );
return TRUE;
}

/* Look for a free queue element */
for ( i=0; i < NOTIFYQSIZE; i++ )
if ( !NotifyQueue[i]->IsInUse )
{
NotifyQueue[i]->IsInUse = TRUE;
NotifyQueue[i]->MessageType = TICKET_SNAPSHOT_REQ;
NotifyQueue[i]->Channel = hUser;
NotifyQueue[i]->TheirID = lpPacket->Header.SenderID;

Request = &NotifyQueue[i]->ReplyDetails.TkSnapReq;
Request->TicketCount = lpPacket->Number;
Request->NextTicket = 0;
Request->ItemCount = 0;
Request->NextItem = 0;
Request->Dcnvref = (long far *) Request->Data;
Request->Identifier =
(TICKET_FIELD far *) (Request->Dcnvref + Request->TicketCount);

for ( i = 0; i < Request->TicketCount; i++ )
Request->Dcnvref[i] = lpPacket->Dcnvrefs[i];

/* Check for the special items TKT_xxx, meaning multiple items.
   If not, copy the list */
if ( (Request->ItemCount =
ExpandItemList( *SrcItemPtr, Request->Identifier) ) == 0)
{
while ( SrcItemPtr < EndOfPacket )
{
```

```
Request->Identifier[(Request->ItemCount)++] =
*(SrcItemPtr++);
    }
  }
  return TRUE;
}
return FALSE;
}

/*******************************************/

BOOL FAR PASCAL fnReplyCASrchSnapshotReq(
HANDLE hUser, WORD Id, LPPKT_TICKET_DATA lpPacket)
{
LPTICKSRCHREQ Request;
int i;
CURRENCY Curr1 = TKT_UNKNOWN;
CURRENCY Curr2 = TKT_UNKNOWN;
LPTKTITEM SrcItemPtr = lpPacket->Data;
LPTKTITEM EndOfPacket =
(LPTKTITEM) ((LPSTR) lpPacket + lpPacket->Header.Length);
LPTKTITEM DestPtr;

for ( i=0; i < NOTIFYQSIZE; i++ )
  if ( !NotifyQueue[i]->IsInUse )
  {
  NotifyQueue[i]->IsInUse = TRUE;
  NotifyQueue[i]->MessageType = CA_SRCH_SNAPSHOT_REQ;
  NotifyQueue[i]->Channel = hUser;
  NotifyQueue[i]->TheirID = lpPacket->Header.SenderID;

Request = &NotifyQueue[i]->ReplyDetails.TkSrchReq;
  DestPtr = (LPTKTITEM) Request->Data;
  Request->TicketIndex = 0;

/* The data is copied as is from the message to the stored request */ while ( SrcItemPtr < EndOfPacket )
  {
  TICKET_FIELD Identifier = SrcItemPtr->Id;
  int len = TicketFieldSizes[ Identifier ];

DestPtr->Id = Identifier;
  lmemcpy( DestPtr->Data, SrcItemPtr->Data, len );
  if ( Identifier == TKT_CURRENCY1 )
  Curr1 = *( (CURRENCY far *) SrcItemPtr->Data );
  if ( Identifier == TKT_CURRENCY2 )
  Curr2 = *( (CURRENCY far *) SrcItemPtr->Data );
  SrcItemPtr = (LPTKTITEM) &SrcItemPtr->Data[ len ];
  DestPtr = (LPTKTITEM) &DestPtr->Data[ len ];
  }
  Request->Length = (LPSTR) DestPtr - (LPSTR) Request->Data;
  Request->BothCurrencies =
    ( Curr1 != TKT_UNKNOWN && Curr2 != TKT_UNKNOWN && Curr1 != Curr2 );
  return TRUE;
  }
  return FALSE;
  }

/*******************************************/

BOOL FAR PASCAL fnReplyCASrchNotifyReq(
  HANDLE hUser, WORD Id, void far *lpPacket)
  {
      Kprintf("fnReplyCASrchNotifyReq\n");
  return( TRUE );
  }

/*******************************************/

BOOL FAR PASCAL fnReplyCASrchCancel(
  HANDLE hUser, WORD Id, void far *lpPacket)
  {
      Kprintf("fnReplyCASrchCancel\n");
  return( TRUE );
```

```
}

/***********************************************/

BOOL FAR PASCAL fnReplyNewExternalTicket(
HANDLE hUser, WORD Id, void far *lpPacket)
{
    Kprintf("fnReplyNewExternalTicket\n");
return( TRUE );
}

/***********************************************/

/* If the field is shorthand for a list, copy the items into an array
and return the number if items copied. If not, return 0. */

WORD ExpandItemList( TICKET_FIELD field, TICKET_FIELD far *Array )
{
WORD res = 0;
TICKET_FIELD Item;

if ( field == TKT_TICKET )
for ( Item = 0; Item < TKT_TICKET; Item++ )
Array[res++] = Item;

else if ( field == TKT_SHORT_TICKET )
while ( ShortTicketItems[ res ] != TKT_TICKET )
Array[res] = ShortTicketItems[res], res++;

else if ( field == TKT_REVIEW )
while ( ReviewTicketItems[ res ] != TKT_TICKET )
Array[res] = ReviewTicketItems[res], res++;

return res;
}

/***********************************************/

BOOL CheckTicketMatch(
LPTW_TICKET pTicket, LPTKTITEM Criteria, int Length )
{
LPTKTITEM EndPtr = (LPTKTITEM) ((LPSTR) Criteria + Length);

while ( Criteria < EndPtr )
{
unless ( CheckItemMatch( pTicket, Criteria ))
return FALSE;
Criteria =
(LPTKTITEM) &Criteria->Data[TicketFieldSizes[Criteria->Id]];
}
return TRUE;
}

/***********************************************/

BOOL CheckItemMatch( LPTW_TICKET pTicket, LPTKTITEM Item )
{
LPSTR tp = (LPSTR) pTicket + TicketFieldOffset( Item->Id );
LPSTR ip = (LPSTR) Item->Data;
int il = TicketFieldSizes[ Item->Id ], i;
long tTime, iTime;

/* There are five types of field to consider.
 * (i) Strings, which need only match up to the null,
 * (ii) currencies which need special treatment because
 * they can match either way
 * (iii) bitfields which match if any of the specified bits is set,
 * (iv) times which are checked to be the same day and
 * (v) the rest which must match exactly. */ switch ( Item->Id )
{
/* (i) Strings */
case TKT_STARTDEALER:case TKT_DEALER:
```

```
case TKT_CONFIRMDEALER:case TKT_CPADDRESS:
case TKT_CPNAME:case TKT_CPFLAG:
case TKT_CPKEYSTATION:case TKT_AMOUNT:
case TKT_OTHERNEARAMT:case TKT_OTHERFARAMT:
case TKT_LOWQUOTE:case TKT_HIGHQUOTE:
case TKT_DEALRATE:case TKT_FARRATE:
case TKT_ACTUALDIFF:case TKT_TRUECPVAL:
case TKT_OURPAY1VAL:case TKT_THEIRPAY1VAL:
case TKT_OURPAY2VAL:case TKT_THEIRPAY2VAL:
case TKT_COMMENT1VAL:case TKT_COMMENT2VAL:
return( lstrcmp( tp, ip ) == 0 );

/* (ii) Currencies */
case TKT_CURRENCY1:
case TKT_CURRENCY2:
return( *((CURRENCY far *) ip) == pTicket->Currency1 ||
*((CURRENCY far *) ip) == pTicket->Currency2 );

/* (iii) Bitfields */
case TKT_STATUS:case TKT_DEALTYPE:
for ( i = 0; i < iL ; i++ )
if ( (ip[i] & tp[i]) != 0 )
return TRUE;
return FALSE;

/* (iv) Times */
case TKT_STARTTIME:case TKT_CONFIRMTIME:
tTime = *( (long far *) tp );
iTime = *( (long far *) ip );
return( tTime/SECONDSPERDAY == iTime/SECONDSPERDAY );

default:
return( lmemcmp( tp, ip, iL ) == 0 );
}
}

/******************************************/

/* Calculate the offset in bytes of the start of an ticket field */ int TicketFieldOffset( TICKET_FIELD field )
{
int Offset = 0;
TICKET_FIELD i = 0;

while ( i < field )
Offset += TicketFieldSizes[ i++ ];
return Offset;
}

/******************************************/

/* Copy an item from a ticket to a ticket item */
LPTKTITEM TicketFetch(
LPTKTITEM DestPtr, TICKET_FIELD field, LPTW_TICKET pTicket )
{
int len = TicketFieldSizes[ field ];
LPSTR SrcPtr = (LPSTR) pTicket + TicketFieldOffset( field );

DestPtr->Id = field;
lmemcpy( (LPSTR) DestPtr->Data, SrcPtr, len );
return (LPTKTITEM) &DestPtr->Data[ len ];
}

/******************************************/

/* Find out how many free notify queue elements there are, processing
first to free any up if possible. */ int NotifyRequestSpace( void )
{
int i = 0, Count = 0;

for ( ; i < NOTIFYQSIZE; i++ )
unless ( NotifyQueue[i]->IsInUse )
```

```
Count++;
return Count;
}

/***********************************************/

/* General task to process the NOTIFY_DETAILS queue. */

WORD FAR PASCAL ProcessNotifyDetails(void far *task, HANDLE hUser)
{
int i;
unless ( KeystationListensIssued )
      return AC_AFTERTASK;

#if 0
for ( i = NotifyTestStart; i < NOTIFYQSIZE; i++ )
if ( ProcessNotifyElement(i) )
{
NotifyTestStart = ( i == (NOTIFYQSIZE-1) ) ? 0 : i+1;
return AC_AFTERTASK;
}
for ( i = 0; i < NotifyTestStart; i++ )
if ( ProcessNotifyElement(i) )
{
NotifyTestStart = i+1;
return AC_AFTERTASK;
}
endif for ( i = 0; i < NOTIFYQSIZE; i++ )
ProcessNotifyElement(i);

return AC_AFTERTASK;
}

/***********************************************/

/* Process a notify queue element if possible. Return TRUE if we did. */

BOOL ProcessNotifyElement( int i )
{
if ( NotifyQueue[i]->IsInUse && NetCheckSendSpace(
ChannelHandle[ NotifyQueue[i]->Channel ], 512 ) )
switch ( NotifyQueue[i]->MessageType )
{
case TICKET_SNAPSHOT_REQ:
ProcessTkSnapReq( NotifyQueue[i] );
return TRUE;
case CA_SRCH_SNAPSHOT_REQ:
ProcessSrchSnapReq( NotifyQueue[i] );
return TRUE;
default:
return FALSE;
}
return FALSE;
}

/***********************************************/

/* Send one message as part or all of a reply to a ticket snapshot request */ void ProcessTkSnapReq( LPNOTIFY_DETAILS Details )
{
LPTICKSNAPREQ Request = &Details->ReplyDetails.TkSnapReq;
LPCATICKET p;
LPTW_TICKET pTicket;
int Index, i;
LPPKT_TICKET_DATA Reply = (LPPKT_TICKET_DATA) &Buffer[0];
LPTKTITEM DestPtr = Reply->Data;
TICKET_FIELD field;

Reply->Header.Type = TICKET_DATA_REPLY;
Reply->Dcnvref = Request->Dcnvref[ Request->NextTicket ];
Index = GetTicketIndex( Reply->Dcnvref );
Reply->IsLast = ( Request->TicketCount == 1 );
```

```c
if ( Index >= 0 )
{
/* Add data items until the message can hold no more or
all the items have been added. Note that we may have sent
some data already */
p = GetTicketPointer( Index );
pTicket = &(p->Ticket);
field = Request->Identifier[ Request->NextItem ];

while ( Request->NextItem < Request->ItemCount &&
((int) TicketFieldSizes[ field ] +
sizeof(TICKET_FIELD)) <
(512 - ((LPSTR) DestPtr - (LPSTR) Reply)) )
{
DestPtr = TicketFetch( DestPtr, field, pTicket );
field = Request->Identifier[++(Request->NextItem)];
/* If this is the end of the list, reset to pointer
to the start and step to the next ticket. */
if ( Request->NextItem == Request->ItemCount )
{
Request->NextItem = 0;
(Request->NextTicket)++;
(Request->TicketCount)--;
goto ReplyFinished;
}
}
ReplyFinished:
UnlockTicket( Index );
}
else
{
Request->NextItem = 0;
(Request->NextTicket)++;
(Request->TicketCount)--;
}

Reply->IsLastForThisTicket = ( Request->NextItem == 0 );
Reply->Header.Length = (LPSTR) DestPtr - (LPSTR) Reply;
NetReplySend( ChannelHandle[ Details->Channel ], Details->TheirID, Reply );

/* We have finished when the ticket count reduces to zero. */
if (Request->TicketCount == 0)
Details->IsInUse = FALSE;
}

/*********************************************/

/* Send one message as part or all of a reply to a search snapshot request */ void ProcessSrchSnapReq( LPNOTIFY_DETAILS Details )
{
LPTICKSRCHREQ Request = &Details->ReplyDetails.TkSrchReq;
LPPKT_SRCH_SNAP_REPLY Reply = (LPPKT_SRCH_SNAP_REPLY) &Buffer[0];
LPCATICKET p;
int Index = 0;/* Into the Dcnvref array */
long far *DestPtr = Reply->Dcnvrefs;
static WORD max;

Reply->Header.Type = CA_SRCH_SNAPSHOT_REPLY;
Reply->IsFirst = (Request->TicketIndex == 0 );

/* Go through the whole ticket array looking for any that match */
while ( Request->TicketIndex < MaxTickets && Index < 100)
{
p = EMSLockRange( TicketHandle, Request->TicketIndex, &max );
LockCount++;
while ( Request->TicketIndex <= max )
{
if ( p->IsInUse )
{
/* Find out if it matches the criteria. */
if ( CheckTicketMatch( &p->Ticket,
(LPTKTITEM) Request->Data, Request->Length))
{
DestPtr[Index++] = p->Ticket.Dcnvref;
```

```c
        }
    }
    (Request->TicketIndex)++;
    if ( Request->TicketIndex == MaxTickets || Index >= 100)
        break;
    p++;
    }
    /*Kprintf( "EMSunlock called, LockCount %d\n", LockCount ); */
    EMSunlock( TicketHandle, max );
    LockCount--;
        }

Reply->IsLast = ( Request->TicketIndex == MaxTickets );
    Reply->Header.Length = (LPSTR) &DestPtr[Index] - (LPSTR) Reply;
    NetReplySend( ChannelHandle[ Details->Channel ], Details->TheirID,
    Reply );

/* Finished when TicketIndex = number of tickets stored. */
    if (Request->TicketIndex == MaxTickets)
    Details->IsInUse = FALSE;
}

/*************************************************************
 *                                                           *
 *  vocab.c - Definitions and procedures for the vocabulary  *
 *                                                           *
 *  Written by Alan Stokes/Roger Abbott                      *
 *                                                           *
 *  Copyright (C) 1987/88 Richards Computer Products Ltd     *
 *                                                           *
 *************************************************************/ include <string.h> include "analdata.h"
include "vocab.h"
#include "read.h"
#include "curinfo.h"

static int match(PSTR, PSTR);

/* This is a listing of all the words understood by CA, along with their
 * meaning.
 *
 * The ordering of the currency entries is important. The first entry must
 * be the swiftcode, which will be looked for in the swiftcode table. Entries
 * are only needed if alternative names are to be recognised. Any 3-letter
 * word not in the dictionary will be looked for in the Swiftcode table.
 *
 * The currency numbers (symval) serve to bind the swiftcode with its
 * alternative representations. The real currency number is obtained from the
 * Swiftcode Table.
 */
VOCWORD vocab[] =
{
    { S_SPOT, 0, "SPOT"},
    { S_SPOT, 0, "SP"},
    { S_TODAY, 0, "TODAY"},
    { S_TOM, 0, "TOMORROW"},
    { S_TT, 0, "TT!"},
    { S_SWAP, 0, "SWAP"},
    { S_SWAP, 0, "SWP"},
    { S_SWAP, 0, "SW!"},
    { S_FOR, 0, "FOR!"},
    { S_FWD, 0, "FORWARD"},
    { S_FWD, 0, "FWD"},
    { S_DEP, 0, "DEPOSIT"},
    { S_DEP, 0, "DEP"},
    { S_DEP, 0, "DP!"},
    { S_OUTRIGHT, 0, "OUTRIGHT"},
    { S_OUTRIGHT, 0, "OUTRITE"},
    { S_OUTRIGHT, 0, "OUTRT"},
    { S_OUTRIGHT, 0, "RITE"},
    { S_BUY, 0, "TAKE"},
    { S_BUY, 0, "BUY"},
```

```
{ S_BUY, 0, "NEED" },
{ S_PAY, 0, "PAY" },
{ S_CREDIT, 0, "CREDIT" },
{ S_CREDIT, 0, "CR!" },
{ S_BACK, 0, "BACK" },
{ S_SELL, 0, "GIVE" },
{ S_SELL, 0, "SELL" },
{ S_LEND, 0, "LEND" },
{ S_BORROW, 0, "BORROW!" },
{ S_MIO, 0, "MIO" },
{ S_MIO, 0, "MILL" },
{ S_MIO, 0, "MLN" },
{ S_YARD, 0, "YARD" },
{ S_YARD, 0, "YRD" },
{ S_YARD, 0, "YD" },
{ S_PERCENT, 0, "PERCENT" },
{ S_PERCENT, 0, "PCT" },
{ S_AMOUNT, 0, "AMOUNT" },
{ S_AMOUNT, 0, "AMT" },
{ S_AMOUNT, 0, "IN!" },
{ S_TO, 0, "TO!" },
{ S_VAL, 0, "VAL" },
{ S_VAL, 0, "MAT" },
{ S_DATES, 0, "FROM" },
{ S_DATES, 0, "DAT" },
{ S_DATES, 0, "DARTE" },
{ S_AGAINST, 0, "AGAINST" },
{ S_AGAINST, 0, "AG" },
{ S_AGAINST, 0, "AGNST" },
{ S_AND, 0, "AND" },
{ S_T, 0, "T!" },
{ S_O, 0, "O!" },
{ S_S, 0, "S!" },
{ S_N, 0, "N!" },
{ S_B, 0, "B!" },
{ S_A, 0, "A!" },
{ S_C, 0, "C!" },
{ S_F, 0, "F!" },
{ S_TN, 0, "TN!" },
{ S_SN, 0, "SN!" },
{ S_ONITE, 0, "ONITE" },
{ S_RATES, 0, "RATES" },
{ S_ME, 0, "I!" },
{ S_ME, 0, "WE!" },
{ S_ME, 0, "ME!" },
{ S_ME, 0, "US!" },
{ S_YOU, 0, "YOU!" },
{ S_YOU, 0, "YU!" },
{ S_YOU, 0, "U!" },
{ S_YOURS, 0, "YOUR" },
{ S_YOURS, 0, "UR" },
{ S_YOURS, 0, "YUR" },
{ S_YOURS, 0, "YRS" },
{ S_YOURS, 0, "THEIR" },
{ S_MY, 0, "OUR" },
{ S_MY, 0, "MY!" },
{ S_NOISE, 0, "AGRE" },
{ S_NOISE, 0, "OK!" },
{ S_NOISE, 0, "YES!" },
{ S_MINE, 0, "MINE" },
{ S_WEEK, 0, "WEEK" },
{ S_WEEK, 0, "WK" },
{ S_MTH, 0, "MONTH" },
{ S_MTH, 0, "M!" },
{ S_MTH, 0, "MTH" },
{ S_MTH, 0, "MOS!" },
{ S_MTH, 0, "MO!" },
{ S_YEAR, 0, "YEAR" },
{ S_YEAR, 0, "YR!" },
{ S_YEAR, 0, "Y!" },
{ S_PAYMENT, 0, "ACCOUNT" },
{ S_PAYMENT, 0, "ACC" },
{ S_PAYMENT, 0, "AC!" },
{ S_PAYMENT, 0, "DIRECT" },
{ S_STANDARD, 0, "STAND" },
{ S_INSTRUCTIONS, 0, "INSTRUC" },
```

```
{ S_UP, 0, "UP!" },
{ S_WRAP, 0, "WRAP!" },
{ S_COMMENT, 0, "COMMENT!"},
{ S_COMMENT, 0, "CO!"},
{ S_COUNTERPARTY, 0, "COUNTERPARTY!"},
{ S_DEALER, 0, "DEALER!"},
{ S_IS, 0, "IS!"},
{ S_ABA, 0, "ABA!"},
{ S_NY, 0, "NY"},
{ S_NY, 0, "YORK!"},
{ S_AT, 0, "AT"},
{ S_DIGIT, 1, "ONE"},
{ S_DIGIT, 2, "TWO"},
{ S_DIGIT, 3, "THREE"},
{ S_DIGIT, 4, "FOUR"},
{ S_DIGIT, 5, "FIVE"},
{ S_DIGIT, 6, "SIX"},
{ S_DIGIT, 7, "SEVEN"},
{ S_DIGIT, 8, "EIGHT"},
{ S_DIGIT, 9, "NINE"},
{ S_DIGIT, 10, "TEN"},
{ S_TH, 0, "TH!"},
{ S_TH, 0, "ST!"},
{ S_TH, 0, "ND!"},
{ S_TH, 0, "RD!"},
{ S_PLEASE, 0, "PLS"},
{ S_PLEASE, 0, "PLEASE"},
{ S_PLEASE, 0, "PSE!"},
{ S_PLEASE, 0, "PSLE"},
{ S_PLEASE, 0, "PL!"},
{ S_PLEASE, 0, "THANKS"},
{ S_PLEASE, 0, "THKS"},
{ S_PLEASE, 0, "TK"},
{ S_PLEASE, 0, "TX!"},
{ S_LATER, 0, "OUTSIDE"},
{ S_LATER, 0, "LATER"},
{ S_MONTH, 1, "JANUARY"},
{ S_MONTH, 2, "FEBRUARY"},
{ S_MONTH, 3, "MARCH"},
{ S_MONTH, 4, "APRIL"},
{ S_MONTH, 5, "MAY"},
{ S_MONTH, 6, "JUNE"},
{ S_MONTH, 7, "JULY"},
{ S_MONTH, 8, "AUGUST"},
{ S_MONTH, 9, "SEPTEMBER"},
{ S_MONTH, 10, "OCTOBER"},
{ S_MONTH, 11, "NOVEMBER"},
{ S_MONTH, 12, "DECEMBER"},
{ S_CURRENCY, 0, "USD"},
{ S_CURRENCY, 0, "USDOL"},
{ S_CURRENCY, 0, "DOL"},
{ S_CURRENCY, 0, "DOLLAR"},
{ S_CURRENCY, 0, "DL"},
{ S_CURRENCY, 0, "DS"},
{ S_CURRENCY, 1, "GBP"},
{ S_CURRENCY, 1, "STERLING"},
{ S_CURRENCY, 1, "STG"},
{ S_CURRENCY, 1, "CBL"},
{ S_CURRENCY, 1, "CABLE"},
{ S_CURRENCY, 1, "PDS"},
{ S_CURRENCY, 1, "POUND"},
{ S_CURRENCY, 2, "FRF"},
{ S_CURRENCY, 2, "FF!"},
{ S_CURRENCY, 2, "FFR"},
{ S_CURRENCY, 2, "FFC"},
{ S_CURRENCY, 2, "PARIS!"},
{ S_CURRENCY, 2, "FRC"},
{ S_CURRENCY, 3, "CHF"},
{ S_CURRENCY, 3, "CH!"},
{ S_CURRENCY, 3, "SWF"},
{ S_CURRENCY, 3, "SF"},
{ S_CURRENCY, 3, "ZURICH"},
{ S_CURRENCY, 3, "SWISS"},
{ S_CURRENCY, 4, "ITL"},
{ S_CURRENCY, 4, "LIR"},
```

```
{ S_CURRENCY, 4, "LIT"},
{ S_CURRENCY, 5, "NZD"},
{ S_CURRENCY, 5, "NZ!"},
{ S_CURRENCY, 5, "KIWI"},
{ S_CURRENCY, 5, "WELLY"},
{ S_CURRENCY, 5, "ZEALAND"},
{ S_CURRENCY, 6, "NLG"},
{ S_CURRENCY, 6, "FL!"},
{ S_CURRENCY, 6, "HFL"},
{ S_CURRENCY, 6, "DFL"},
{ S_CURRENCY, 6, "GUILDER"},
{ S_CURRENCY, 7, "AUD"},
{ S_CURRENCY, 7, "AUS"},
{ S_CURRENCY, 7, "AUSSIE"},
{ S_CURRENCY, 7, "OZ"},
{ S_CURRENCY, 8, "INR"},
{ S_CURRENCY, 8, "IND"},
{ S_CURRENCY, 8, "RUP"},
{ S_CURRENCY, 9, "DEM"},
{ S_CURRENCY, 9, "DM"},
{ S_CURRENCY, 9, "MARK"},
{ S_CURRENCY, 10, "ZAR"},
{ S_CURRENCY, 10, "RAND"},
{ S_CURRENCY, 11, "IEP"},
{ S_CURRENCY, 11, "IRISH"},
{ S_CURRENCY, 12, "JPY"},
{ S_CURRENCY, 12, "YEN"},
{ S_CURRENCY, 13, "BEC"},
{ S_CURRENCY, 13, "CONV"},
{ S_CURRENCY, 14, "GRD"},
{ S_CURRENCY, 14, "DR"},
{ S_CURRENCY, 14, "DRACHMA"},
{ S_CURRENCY, 15, "FIM"},
{ S_CURRENCY, 15, "FMK"},
{ S_CURRENCY, 15, "FINLAND"},
{ S_CURRENCY, 16, "HKD"},
{ S_CURRENCY, 16, "HK!"},
{ S_CURRENCY, 17, "SEK"},
{ S_CURRENCY, 17, "SKR"},
{ S_CURRENCY, 17, "STOCK"},
{ S_CURRENCY, 17, "SWEDEN"},
{ S_CURRENCY, 18, "NOK"},
{ S_CURRENCY, 18, "NKR"},
{ S_CURRENCY, 18, "OSLO"},
{ S_CURRENCY, 18, "NORWAY"},
{ S_CURRENCY, 19, "DKK"},
{ S_CURRENCY, 19, "DKR"},
{ S_CURRENCY, 19, "COP"},
{ S_CURRENCY, 19, "DANISH"},
{ S_CURRENCY, 20, "CAD"},
{ S_CURRENCY, 20, "CDA"},
{ S_CURRENCY, 20, "CDN"},
{ S_CURRENCY, 21, "ESP"},
{ S_CURRENCY, 21, "PTS"},
{ S_CURRENCY, 21, "PTA"},
{ S_CURRENCY, 21, "SPAIN"},
{ S_CURRENCY, 22, "XEU"},
{ S_CURRENCY, 22, "ECU"},
{ S_CURRENCY, 23, "ATS"},
{ S_CURRENCY, 23, "ASCH"},
{ S_CURRENCY, 23, "OSCH"},
{ S_CURRENCY, 23, "OES"},
{ S_CURRENCY, 23, "SCHILLING"},
{ S_CURRENCY, 24, "PTE"},
{ S_CURRENCY, 24, "ESC"},
{ S_CURRENCY, 25, "SAR"},
{ S_CURRENCY, 25, "SAUDI"},
{ S_CURRENCY, 26, "OMR"},
{ S_CURRENCY, 26, "OMAN"},
{ S_CURRENCY, 27, "AED"},
{ S_CURRENCY, 28, "KWD"},
{ S_CURRENCY, 28, "KD!"},
{ S_CURRENCY, 28, "KUWAIT"}
```

```c
};

/* This is where we put a currency */
VOCWORD CurrencyEntry = { 0, 0, "XXX" };

/* Decide whether a word matches a known word from the vocabulary.  If
 * known ends in ! then the match must be exact (with the known word
 * without the !); otherwise an abbreviation (of at least 3 chars) or
 * an extension (up to twice the length) of the known word is allowed.
 */
static int match(word, known)
PSTR word, known;
{
   int wlen = strlen(word), klen = strlen(known);
   int i;

if (known[klen-1] == '!')
      return (wlen == klen-1 && memcmp(word, known, wlen) == 0);
   else
   {
      if (wlen > klen * 2 || (wlen < klen && wlen < 3))
   return (0);
      return (memcmp(word, known, min(wlen, klen)) == 0);
   }
}

/* Given a C string returns NULL if the string is not a recognisable word,
 * otherwise returns a pointer to its VOCWORD entry.
 */
VOCWORD *lookup(word)
PSTR word;
{
   VOCWORD *p = vocab;
   int i = HIGH(vocab), CAcode;
   BOOL found = FALSE;

for (; i > 0; p++, i--)
      if (match(word, p->string))
   {
   found = TRUE;
   break;
   }

/* If we found a match and it is not a currency return the pointer. */
   if ( found && p->symbol != S_CURRENCY )
   return( p );

/* If we found a match and it is a currency move back to the first
   entry with the same value, which should be the swiftcode, then
   replace the word with the swiftcode. */
   if ( found && p->symbol == S_CURRENCY )
   {
while ( (p-1)->symval == p->symval &&
(p-1)->symbol == S_CURRENCY )
p--;

strcpy( word, p->string );
   }

/* Not found in the vocabulary, or a currency replaced by its swiftcode.
   See if it is a swiftcode loaded from the Data Manager. */
   unless ( strlen( word ) == 3 &&
   (CAcode = FindCAcode( word ) ) >= 0 )
return( NULL );

CurrencyEntry.symbol = S_CURRENCY;
   CurrencyEntry.symval = (char) CAcode;
   strcpy( CurrencyEntry.string, word );
   return( &CurrencyEntry );
}
```

What is claimed is:

1. In a video communication trading system network capable of providing textual data messages to a plurality of subscriber terminals throughout said network for selectively conducting trading conversations therebetween, at least a portion of said plurality of subscriber terminals comprising subscriber keystations, each of said subscriber keystations comprising a video display means for providing a textual video display of trading data input to said network, said trading system network including a message switching interface network for routing video conversational textual data trading messages throughout said trading system network; the improvement comprising at least one conversation analyzing keystation terminal controller interface means operatively connected between at least one of said subscriber keystations and said message switching interface network for routing trading data input by said one subscriber keystation to at least another designated subscriber keystation through said message switching interface network and for receiving trading data input to said message switching interface network by said designated other subscriber keystation for controlling communication of said trading conversation between said one subscriber keystation and said designated other subscriber keystation, said conversation keystation terminal controller means comprising means for analyzing said trading conversation substantially in real time for automatically providing trading conversation context sensitive trading data messages in conjunction with said trading conversation based on said read time trading conversation analysis, said trading conversation analyzing means further comprising means for parsing said trading conversation for automatically providing said trading conversation context sensitive trading data messages.

2. A video communication trading system network in accordance with claim 1 wherein said trading conversation comprises trading textual data, said means for analyzing said trading conversation further comprising means for extracting trading information from said trading textual data for providing said trading data messages based thereon, said information extracting means comprising said parsing means for automatically providing said trading conversation context sensitive trading data messages.

3. A video communication trading system network in accordance with claim 2 wherein said conversion analyzing keystation terminal controller means comprises means for controlling said one subscriber keystation video display means for providing said trading conversation textual data and said trading data messages on said video display means in conjunction with said trading conversation textual data being analyzed in real time.

4. A video communication trading system network in accordance with claim 3 wherein said trading conversation comprises a foreign exchange trading transaction.

5. A video communication trading system network in accordance with claim 2 wherein said trading conversation comprises a foreign exchange trading transaction.

6. A video communication trading system network in accordance with claim 5 wherein said means for extracting trading information from said textual data for said foreign exchange trading transaction further comprises means for extracting currency involved in said transaction trading information from said textual data, said information extracting means comprising said parsing means.

7. A video communication trading system network in accordance with claim 5 wherein said means for extracting trading information from said textual data for said foreign exchange trading transaction further comprises means for extracting amount and currency in which said amount is quoted trading information from said textual data, said information extracting means comprising said parsing means.

8. A video communication trading system network in accordance with claim 5 wherein said means for extracting trading information from said textual data for said foreign exchange trading transaction further comprises means for extracting period and value data trading information from said textual data, said information extracting means comprising said parsing means.

9. A video communication trading system network in accordance with claim 1 wherein said trading conversation comprises a foreign exchange trading transaction.

10. A video communication trading system network in accordance with claim 1 wherein said conversation analyzing keystation terminal controller means comprises an analysis server means for analyzing said trading conversation.

11. A video communication trading system network in accordance with claim 10 wherein said conversation analyzing keystation terminal controller means further comprises a data base server means, a line server means and a terminal computer means associated with said one subscriber keystation, said analysis server means, said data base server means, said line server means and said terminal computer means being operatively connected together in a local area network.

12. In a video communication trading system network capable of providing textual data messages to a plurality of subscriber terminals throughout said network for selectively conducting trading conversations therebetween, at least a portion of said plurality of subscriber terminals comprising subscriber keystations, each of said subscriber keystations comprising a video display means for providing a textual video display of trading data input to said network, said trading system network including a message switching interface network for routing video conversational textual data trading messages throughout said trading system network; the improvement comprising at least one conversation analyzing keystation terminal controller interface means operatively connected between at least one of said subscriber keystations and said message switching interface network for routing trading data input by said one subscriber keystation to at least another designated subscriber keystation through said message switching interface network and for receiving trading data input to said message switching interface network by said designated other subscriber keystation for controlling communication of said trading conversation between said one subscriber keystation and said designated other subscriber keystation, said conversation analyzing keystation terminal controller means comprising means for analyzing said trading conversation substantially in real time for providing messages in conjunction with said trading conversation based on said real time trading conversation analysis, said means for analyzing said trading conversation substantially in real time comprising means for providing displayable conversation prompt messages comprising selectable trading conversation textual data in conjunction with said trading conversation based on said real time trading conversation analysis and further comprising means for parsing said trading conversation for automatically providing said displayable conversation prompt messages.

13. A video communication trading system network in accordance with claim 12 wherein said trading conversation comprises trading textual data, said means for analyzing said trading conversation further comprising means for extracting information from said trading textual data and controlling provision of a current selectable displayable trading conversation prompt message based on said real time trading conversation analysis, said information extracting means comprising said parsing means for providing said prompt message.

14. A video communication trading system network in accordance with claim 13 wherein said conversation analyzing keystation terminal controller means comprises means for controlling said one subscriber keystation video display means for providing said trading conversation textual data and said current selectable displayable trading conversation prompt message on said video display means in conjunction with said trading conversation textual data being analyzed in real time.

15. A video communication trading system network in accordance with claim 14 wherein said trading conversation comprises a foreign exchange trading transaction.

16. A video communication trading system network in accordance with claim 13 wherein said trading conversation comprises a foreign exchange trading transaction.

17. A video communication trading system network in accordance with claim 12 wherein said trading conversation comprises a foreign exchange trading transaction.

18. In a video communication trading system network capable of providing textual data messages to a plurality of subscriber terminals throughout said network for selectively conducting trading conversations therebetween, at least a portion of said plurality of subscriber terminals comprising subscriber keystations, each of said subscriber keystations comprising a video display means for providing a textual video display of trading data input to said network, said trading system network including a message switching interface network for routing video conversational textual data trading messages throughout said trading system network; the improvement comprising at least one conversation analyzing keystation terminal controller interface means operatively connected between at least one of said subscriber keystations and said message switching interface network for routing trading data input by said one subscriber keystation to at least another designated subscriber keystation through said message switching interface network and for receiving trading data input to said message switching interface network by said designated other subscriber keystation for controlling communication of said trading conversation between said one subscriber keystation and said designated other subscriber keystation, said conversation analyzing keystation terminal controller means comprising means for analyzing said trading conversation substantially in real time for providing messages in conjunction with said trading conversation based on said real time trading conversation analysis, said trading conversation comprising trading textual data, said means for analyzing said trading conversation further comprising means for providing an updateable substantially real time summary of said trading conversation analysis in conjunction with said trading conversation and for extracting information from said trading textual data for providing said messages based thereon and further comprising means for parsing said trading conversation for automatically extracting said information from said trading textual data for providing said messages.

19. A video communication trading system network in accordance with claim 18 wherein said conversation analyzing keystation terminal controller means further comprises a trading transaction ticket printing means for providing a trading ticket record of the trading transaction from said summary of said trading conversation analysis.

20. A video communication trading system network in accordance with claim 19 wherein said trading conversation comprises a foreign exchange trading transaction.

21. A video communication trading system network in accordance with claim 18 wherein said trading conversation comprises a foreign exchange trading transaction.

22. A video communication trading system network in accordance with claim 12 wherein said trading conversation comprises trading textual data, said means for analyzing said trading conversation further comprising means for extracting information from said trading textual data and controlling provision of a selectable context sensitive prompt message comprising said trading conversation textual data based on said real time trading conversation analysis, said information extracting means comprising said parsing means for automatically providing said context sensitive prompt message.

23. A video communication trading system network in accordance with claim 22 wherein said trading conversation comprises a foreign exchange trading transaction.

24. In a video communication trading system network capable of providing textual data messages to a plurality of subscriber terminals throughout said network for selectively conducting trading conversations therebetween, at least a portion of said plurality of subscriber terminals comprising subscriber keystations, each of said subscriber keystations comprising a video display means for providing a textual video display of trading data input to said network, said trading system network including a message switching interface network for routing video conversational textual data trading messages throughout said trading system network; the improvement comprising at least one conversation analyzing keystation terminal controller interface means operatively connected between at least one of said subscriber keystations and said message switching interface network for routing trading data input by said one subscriber keystation to at least another designated subscriber keystation through said message switching interface network and for receiving trading data input to said message switching interface network by said designated other subscriber keystation for controlling communication of said trading conversation between said one subscriber keystation and said designated other subscriber keystation, said conversation analyzing keystation terminal controller means comprising means for analyzing said trading conversation substantially in real time for providing messages in conjunction with said trading conversation based on said real time trading conversation analysis, said means for analyzing said trading conversation further comprising means for detecting trading inconsistencies substantially in real time as they occur during said trading conversation and reporting any detected trading inconsistencies in said trading conversation to said one subscriber keystation.

25. A video communication trading system network in accordance with claim 24 wherein said conversation analyzing means comprises means for controlling said one subscriber keystation video display means for displaying said detected trading inconsistencies in said trading conversation on said video display means.

26. A video communication trading system network in accordance with claim 25 wherein said trading conversation comprises a foreign exchange trading transaction.

27. A video communication trading system network in accordance with claim 24 wherein said trading conversation comprises a foreign exchange trading transaction.

28. A video communication trading system network in accordance with claim 25 wherein said trading conversation comprises trading textual data, said means for controlling said one subscriber keystation video display means for displaying said detected trading inconsistencies comprising means for highlighting said detected trading inconsistencies in a video display of said trading textual data.

29. A video communication trading system network in accordance with claim 28 wherein said trading conversation comprises a foreign exchange trading transaction.

30. In a video communication trading system network capable of providing textual data messages to a plurality of subscriber terminals throughout said network for selectively conducting trading conversations therebetween, at least a portion of said plurality of subscriber terminals comprising subscriber keystations, each of said subscriber keystations comprising a video display means for providing a textual video display of trading data input to said network, said trading system network including a message switching interface network for routing video conversational textual data trading messages throughout said trading system network; the improvement comprising at least one conversation analyzing keystation terminal controller interface means operatively connected between at least one of said subscriber keystations and said message switching interface network for routing trading data input by said one subscriber keystation to at least another designated subscriber keystation through said message switching interface network and for receiving trading data input to said message switching interface network by said designated other subscriber keystation for controlling communication of said trading conversation between said one subscriber keystation and said designated other subscriber keystation, said conversation analyzing keystation terminal controller means comprising means for analyzing said trading conversation substantially in real time for providing messages in conjunction with said trading conversation based on said real time trading conversation analysis, said means for analyzing said trading conversation further comprising means for providing an updateable substantially real time summary of said trading conversation analysis in conjunction with said trading conversation and still further comprising means for parsing said trading conversation for automatically providing said messages in conjunction with said trading conversation based on said real time trading conversation analysis.

31. A video communication trading system network in accordance with claim 30 wherein said means for analyzing said trading conversation further comprises means for detecting trading inconsistencies substantially in real time as they occur during said trading conversation and reporting any detected trading inconsistencies in said trading conversation to said one subscriber keystation.

32. A video communication trading system network in accordance with claim 31 wherein said trading conversation comprises a foreign exchange trading transaction.

33. A video communication trading system network in accordance with claim 31 wherein said conversation analyzing means comprises means for controlling said one subscriber keystation video display means for displaying said detected trading inconsistencies in said trading conversation on said video display means.

34. A video communication trading system network in accordance with claim 33 wherein said conversation analyzing keystation terminal controller means comprises means for controlling said one subscriber keystation video display means for providing said trading conversation textual data and said messages on said video display means in conjunction with said trading conversation textual data being analyzed in real time.

35. A video communication trading system network in accordance with claim 34 wherein said conversation analyzing keystation terminal controller means comprises means for controlling said one subscriber keystation video display means for providing said trading conversation textual data and said current displayable conversation prompt message on said video display means in conjunction with said trading conversation textual data being analyzed in real time.

36. In a video communication trading system network capable of providing textual data messages to a plurality of subscriber terminals throughout said network for selectively conducting trading conversations therebetween, at least a portion of said plurality of subscriber terminals comprising subscriber keystations, each of said subscriber keystations comprising a video display means for providing a textual video display of trading data input to said network, said trading system network including a message switching interface network for routing video conversational textual data trading messages throughout said trading system network; the improvement comprising at least one conversation analyzing keystation terminal controller interface means operatively connected between at least one of said subscriber keystations and said message switching interface network for routing trading data input by said one subscriber keystation to at least another designated subscriber keystation through said message switching interface network and for receiving trading data input to said message switching interface network by said designated other subscriber keystation for controlling communication of said trading conversation between said one subscriber keystation and said designated other subscriber keystation, said conversation analyzing keystation terminal controller means comprising means for analyzing said trading conversation substantially in real time for automatically providing messages in conjunction with said trading conversation based on said real time trading conversation analysis, said conversation analyzing keystation terminal controller means further comprising means for selectively inhibiting said automatically provided prompt messages in conjunction with said trading conversation.

37. A video communication trading system network in accordance with claim 36 wherein said trading conversation comprises a foreign exchange trading transaction.

38. A video communication trading system network in accordance with claim 36 wherein said trading conversation comprises a foreign exchange trading transaction.

39. A video communication trading system network in accordance with claim 36 wherein said trading conversation comprises trading textual data, said means for analyzing said trading conversation further comprising means for extracting information from said trading textual data and controlling provision of a context sensitive prompt message based on said real time trading conversation analysis.

* * * * *

UNITED STATES PATENT AND TRADEMARK OFFICE
CERTIFICATE OF CORRECTION

PATENT NO. : 5,195,031
DATED : March 16, 1993
INVENTOR(S) : Christopher J. Ordish et al It is certified that error appears in the above-indentified patent and that said Letters Patent is hereby corrected as shown below:

On the title page, Item (75) Inventor, add -- John M. Richards Oxfordshire, England --.

Column 563, line 26, after "conversation" insert --analyzing--.
line 31, after "said" delete "read" and insert --real--.
Column 563, line 48, "conversion" should read --conversation--.

Signed and Sealed this

Fifteenth Day of February, 1994

Attest:

BRUCE LEHMAN

Attesting Officer     Commissioner of Patents and Trademarks